(12) United States Patent
Zerhusen et al.

(10) Patent No.: US 10,470,955 B2
(45) Date of Patent: Nov. 12, 2019

(54) PATIENT BED HAVING TRANSLATABLE SIDERAIL FOR BED EXIT

(71) Applicant: Hill-Rom Services, Inc., Batesville, IN (US)

(72) Inventors: Robert M. Zerhusen, Batesville, IN (US); Richard H. Heimbrock, Cincinnati, OH (US); Mark Chiacchira, Lawrenceburg, IN (US); Nicholas A. Mann, Cincinnati, OH (US); David C. Newkirk, Lawrenceburg, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 15/990,285

(22) Filed: May 25, 2018

(65) Prior Publication Data

US 2018/0271729 A1 Sep. 27, 2018

Related U.S. Application Data

(63) Continuation of application No. 15/257,058, filed on Sep. 6, 2016, now Pat. No. 10,004,654, which is a
(Continued)

(51) Int. Cl.
*G05B 11/01* (2006.01)
*A61G 7/018* (2006.01)
(Continued)

(52) U.S. Cl.
CPC ............. *A61G 7/018* (2013.01); *A61G 7/001* (2013.01); *A61G 7/005* (2013.01); *A61G 7/012* (2013.01);
(Continued)

(58) Field of Classification Search
None
See application file for complete search history.

(56) References Cited

U.S. PATENT DOCUMENTS

| 421,656 A | 2/1890 | Blanken |
| 993,119 A | 5/1911 | Stannard |
| (Continued) | | |

FOREIGN PATENT DOCUMENTS

| DE | 19900602 C1 | 7/2000 |
| DE | 102013114798 A1 | 6/2015 |
| (Continued) | | |

OTHER PUBLICATIONS

Notification of Reasons for Rejection for Japanese Patent Application No. 2017-011583 dated Feb. 26, 2019; 14 pages.
(Continued)

*Primary Examiner* — Adolf Dsouza
(74) *Attorney, Agent, or Firm* — Barnes & Thornburg LLP

(57) ABSTRACT

A number of patient beds are disclosed. Some patient beds have siderails that are movable by a patient so that the patient can egress from the bed without interference from the siderails. Various caregiver control panels and patient control panels for controlling features and functions of a patient bed are also disclosed. For example, a cart with caregiver control inputs, including hand inputs on a graphical user interface (GUI) and foot inputs, is disclosed. Patient positioning and transfer devices are also disclosed. Various types of in-bed physical therapy devices are also disclosed.

20 Claims, 82 Drawing Sheets

Related U.S. Application Data continuation of application No. 14/640,182, filed on Mar. 6, 2015, now Pat. No. 9,463,126.

(60) Provisional application No. 61/951,236, filed on Mar. 11, 2014.

(51) Int. Cl.

| | | |
|---|---|---|
| *A61G 7/05* | (2006.01) | |
| *A61G 7/053* | (2006.01) | |
| *A61G 7/08* | (2006.01) | |
| *A61G 12/00* | (2006.01) | |
| *G08C 17/02* | (2006.01) | |
| *A61G 7/00* | (2006.01) | |
| *A61G 7/005* | (2006.01) | |
| *A61G 7/012* | (2006.01) | |
| *A61G 7/015* | (2006.01) | |
| *A61G 7/10* | (2006.01) | |
| *G06F 3/0484* | (2013.01) | |
| *H02J 7/00* | (2006.01) | |
| *G06F 3/01* | (2006.01) | |
| *G06F 3/0482* | (2013.01) | |

(52) U.S. Cl.
CPC .............. *A61G 7/015* (2013.01); *A61G 7/05* (2013.01); *A61G 7/051* (2016.11); *A61G 7/0503* (2013.01); *A61G 7/053* (2013.01); *A61G 7/0506* (2013.01); *A61G 7/0507* (2013.01); *A61G 7/0509* (2016.11); *A61G 7/0513* (2016.11); *A61G 7/0514* (2016.11); *A61G 7/0516* (2016.11); *A61G 7/0524* (2016.11); *A61G 7/0536* (2013.01); *A61G 7/08* (2013.01); *A61G 7/1017* (2013.01); *A61G 7/1044* (2013.01); *A61G 7/1051* (2013.01); *A61G 12/001* (2013.01); *G06F 3/04842* (2013.01); *G08C 17/02* (2013.01); *H02J 7/0052* (2013.01); *A61G 2203/12* (2013.01); *A61G 2203/16* (2013.01); *A61G 2203/20* (2013.01); *A61G 2203/44* (2013.01); *A61G 2203/70* (2013.01); *G06F 3/017* (2013.01); *G06F 3/0482* (2013.01); *G08C 2201/20* (2013.01); *G08C 2201/30* (2013.01); *G08C 2201/92* (2013.01); *G08C 2201/93* (2013.01)

(56) References Cited

U.S. PATENT DOCUMENTS

| | | |
|---|---|---|
| 2,136,088 A | 11/1938 | Stevens, Sr. |
| 2,587,291 A | 2/1952 | Des Rochers |
| 2,644,173 A | 7/1953 | Wallace |
| 2,710,976 A | 6/1955 | Martensen |
| 2,722,017 A | 11/1955 | Burst et al. |
| 2,817,854 A | 12/1957 | Pratt |
| 2,817,855 A | 12/1957 | Pratt |
| 2,951,252 A | 9/1960 | Roche |
| 3,018,492 A | 1/1962 | Rosen |
| 3,021,534 A | 2/1962 | Hausted |
| 3,055,020 A | 9/1962 | Mann |
| 3,148,387 A | 9/1964 | Sarnie, Jr. et al. |
| 3,249,387 A | 5/1966 | Pivacek |
| 3,321,779 A | 5/1967 | Kaufman et al. |
| 3,344,445 A | 10/1967 | Crawford |
| 3,351,962 A | 11/1967 | Dodrill et al. |
| 3,486,176 A | 12/1969 | Murcott |
| 3,585,659 A | 6/1971 | Burst et al. |
| 3,593,350 A | 7/1971 | Knight et al. |
| 3,619,824 A | 11/1971 | Doyle |
| 3,624,847 A | 12/1971 | Murcott et al. |
| 3,742,530 A | 7/1973 | Clark |
| 3,823,428 A | 7/1974 | Whyte |
| 3,851,345 A | 12/1974 | Benoit et al. |
| 3,865,434 A | 2/1975 | Sully |
| 3,877,090 A | 4/1975 | Schutz |
| 3,905,591 A | 9/1975 | Schorr |
| 3,932,903 A | 1/1976 | Adams et al. |
| 3,971,083 A | 7/1976 | Peterson |
| 4,183,015 A | 1/1980 | Drew et al. |
| 4,186,456 A | 2/1980 | Huempfner |
| 4,214,326 A | 7/1980 | Spann |
| 4,215,446 A | 8/1980 | Mahoney |
| 4,232,415 A | 11/1980 | Webber |
| 4,370,765 A | 2/1983 | Webber |
| 4,439,880 A | 4/1984 | Koncelik et al. |
| D276,112 S | 10/1984 | Ferrell et al. |
| 4,607,402 A | 8/1986 | Pollard |
| 4,612,679 A | 9/1986 | Mitchell |
| 4,653,129 A | 3/1987 | Kuck et al. |
| 4,654,903 A | 4/1987 | Chubb et al. |
| 4,670,923 A | 6/1987 | Gabriel et al. |
| 4,672,698 A | 6/1987 | Sands |
| 4,676,687 A | 6/1987 | Koffler |
| 4,704,750 A | 11/1987 | Wheelock |
| 4,710,049 A | 12/1987 | Chang |
| 4,710,992 A | 12/1987 | Falwell et al. |
| 4,745,647 A | 5/1988 | Goodwin |
| 4,747,171 A | 5/1988 | Einsele et al. |
| 4,767,419 A | 8/1988 | Fattore |
| 4,768,249 A | 9/1988 | Goodwin |
| 4,783,864 A | 11/1988 | Turner |
| 4,800,600 A | 1/1989 | Baum |
| 4,827,545 A | 5/1989 | Arp |
| 4,839,933 A | 6/1989 | Plewright et al. |
| 4,872,228 A | 10/1989 | Bishop |
| 4,873,734 A | 10/1989 | Pollard |
| 4,985,946 A | 1/1991 | Foster et al. |
| 4,993,089 A | 2/1991 | Solomon et al. |
| 5,010,611 A | 4/1991 | Mallett |
| 5,035,014 A | 7/1991 | Blanchard |
| 5,044,025 A | 9/1991 | Hunsinger et al. |
| 5,077,843 A | 1/1992 | Dale et al. |
| 5,083,332 A | 1/1992 | Foster et al. |
| 5,083,334 A | 1/1992 | Huck et al. |
| 5,084,925 A | 2/1992 | Cook |
| 5,097,550 A | 3/1992 | Marra, Jr. |
| 5,129,117 A | 7/1992 | Celestina et al. |
| 5,175,897 A | 1/1993 | Marra, Jr. |
| 5,179,774 A | 1/1993 | Massie |
| 5,191,663 A | 3/1993 | Holder et al. |
| D336,577 S | 6/1993 | Celestina et al. |
| 5,216,768 A | 6/1993 | Bodine et al. |
| 5,381,571 A | 1/1995 | Gabhart |
| 5,384,927 A | 1/1995 | Mardero et al. |
| 5,410,765 A | 5/1995 | Youngblood |
| 5,418,988 A | 5/1995 | Iura |
| 5,421,046 A | 6/1995 | Vande Streek |
| 5,450,641 A | 9/1995 | Montgomery |
| 5,455,973 A | 10/1995 | Brumfield et al. |
| 5,481,772 A | 1/1996 | Glynn et al. |
| 5,485,699 A | 1/1996 | Gabhart |
| 5,524,306 A | 6/1996 | George |
| 5,537,701 A | 7/1996 | Elliott |
| 5,557,817 A | 9/1996 | Haddock |
| 5,577,277 A | 11/1996 | Sundberg et al. |
| 5,642,545 A | 7/1997 | Howard |
| 5,671,490 A | 9/1997 | Wu |
| 5,678,267 A | 10/1997 | Kinder |
| 5,689,839 A | 11/1997 | Laganiere et al. |
| 5,732,423 A | 3/1998 | Weismiller et al. |
| 5,749,112 A | 5/1998 | Metzler |
| 5,761,756 A | 6/1998 | Nowak et al. |
| 5,771,506 A | 6/1998 | Joiner |
| 5,781,945 A | 7/1998 | Scherer et al. |
| 5,802,636 A | 9/1998 | Corbin et al. |
| 5,832,549 A | 11/1998 | Le Pallec et al. |
| 5,864,900 A | 2/1999 | Landau |
| 5,878,452 A | 3/1999 | Brooke et al. |
| 5,926,873 A | 7/1999 | Fountain |
| 6,058,531 A | 5/2000 | Carroll |

(56) References Cited

U.S. PATENT DOCUMENTS

| | | | |
|---|---|---|---|
| 6,363,552 B1 | 4/2002 | Hornbach et al. | |
| 6,640,360 B2 | 11/2003 | Hornbach et al. | |
| 6,779,209 B2 | 8/2004 | Ganance | |
| 6,951,036 B2 | 10/2005 | Lemire | |
| 7,073,220 B2 | 7/2006 | Simmonds et al. | |
| 7,293,305 B2 | 11/2007 | Metz et al. | |
| 7,712,166 B2 | 5/2010 | Stryker et al. | |
| 7,810,183 B2 | 10/2010 | Kawaguchi et al. | |
| 8,104,118 B2 | 1/2012 | Derenne et al. | |
| 8,387,179 B2 | 3/2013 | Metz et al. | |
| 8,631,524 B2 | 1/2014 | Derenne et al. | |
| 8,732,875 B2 | 5/2014 | O'Keefe | |
| 8,745,785 B2 | 6/2014 | Metz et al. | |
| 9,265,677 B2 | 2/2016 | Manouchehri et al. | |
| 9,381,125 B2 | 7/2016 | Herbst et al. | |
| 2002/0095724 A1 | 7/2002 | Hornbach et al. | |
| 2002/0144348 A1* | 10/2002 | Ganance | A61G 7/00 5/600 |
| 2008/0235872 A1* | 10/2008 | Newkirk | A61G 7/018 5/600 |
| 2009/0162596 A1* | 6/2009 | Rios | A43B 13/04 428/45 |
| 2012/0047652 A1 | 3/2012 | Metz et al. | |
| 2013/0227787 A1 | 9/2013 | Herbst et al. | |

FOREIGN PATENT DOCUMENTS

| | | | |
|---|---|---|---|
| EP | 0037063 | A2 | 3/1981 |
| JP | 2002-253621 | A | 9/2002 |
| JP | 2002-263145 | A | 9/2002 |
| JP | 2005-527245 | A | 9/2005 |
| JP | 2011-30419 | A | 2/2011 |
| JP | 2011-254457 | A | 12/2011 |
| JP | 2012-152521 | A | 8/2012 |
| WO | 9817153 | A1 | 4/1998 |

OTHER PUBLICATIONS

Extended European Search Report for European Patent Application No. 19167989.3; dated Jul. 5, 2019 (9 pages).

* cited by examiner

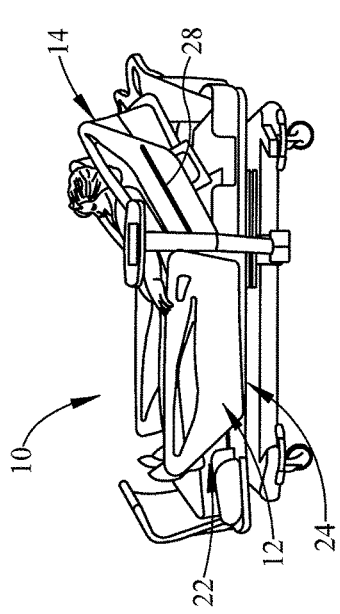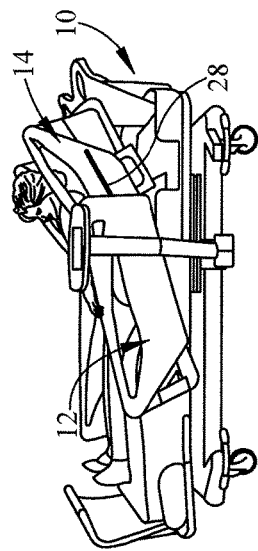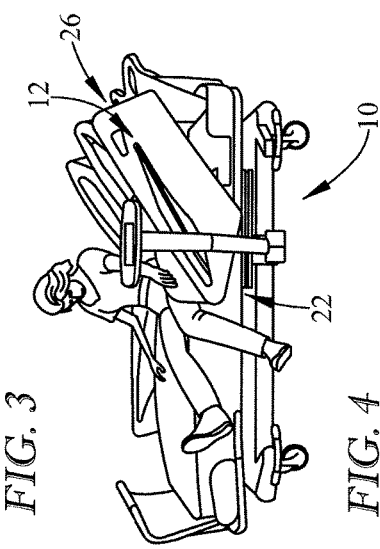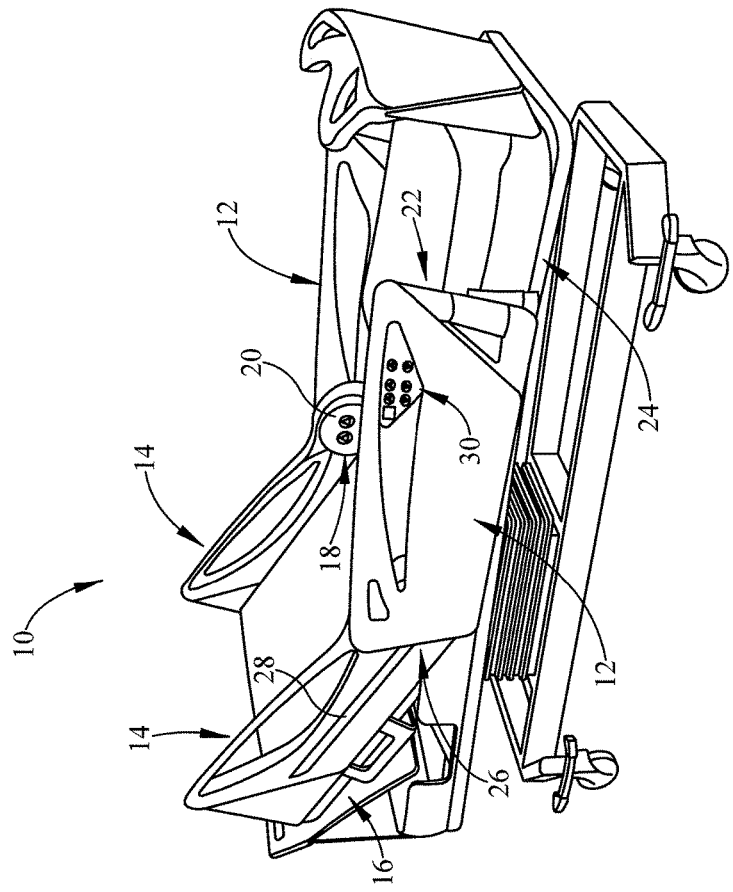

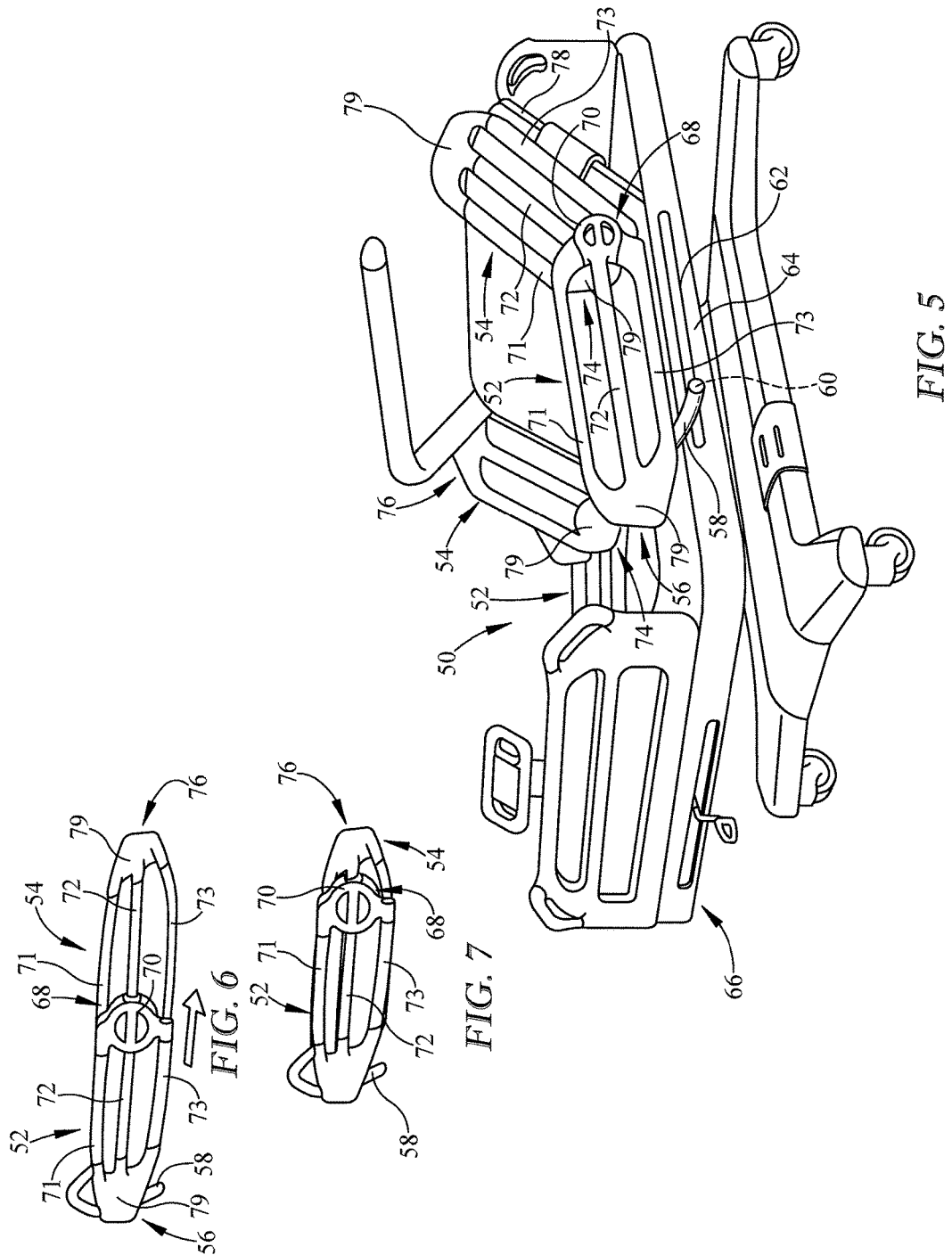

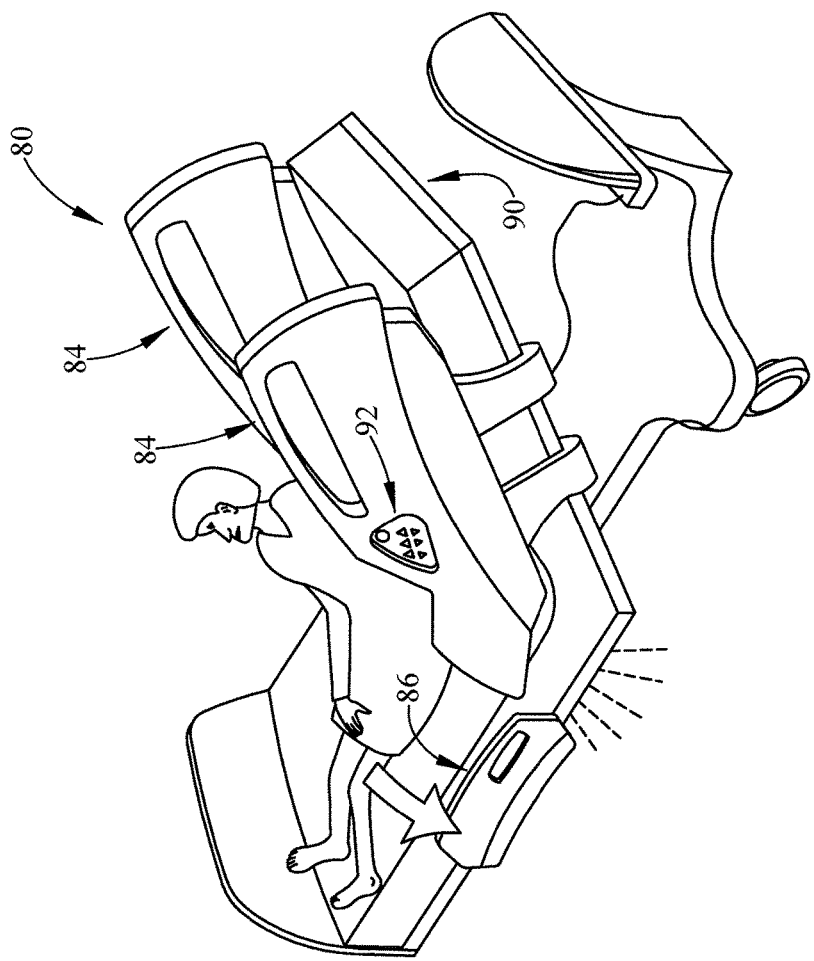
FIG. 10
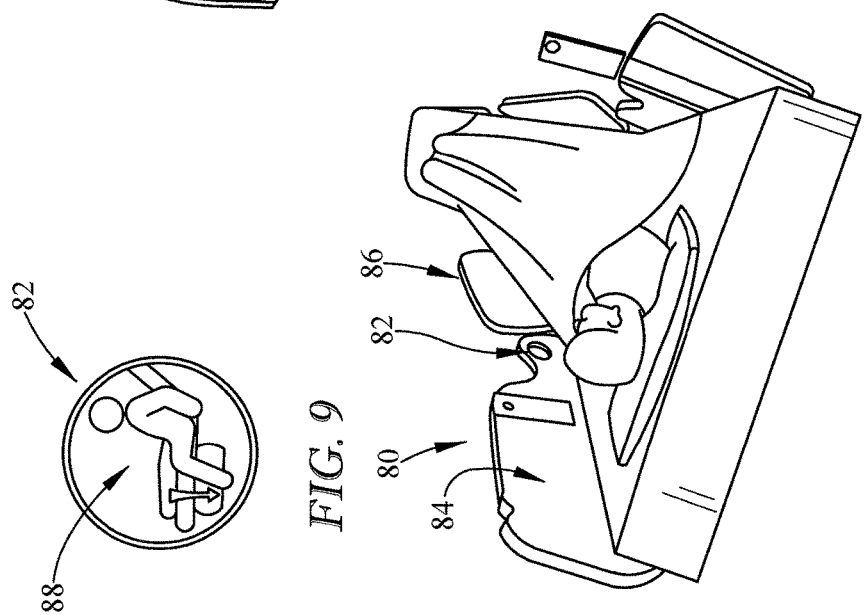
FIG. 9
FIG. 8

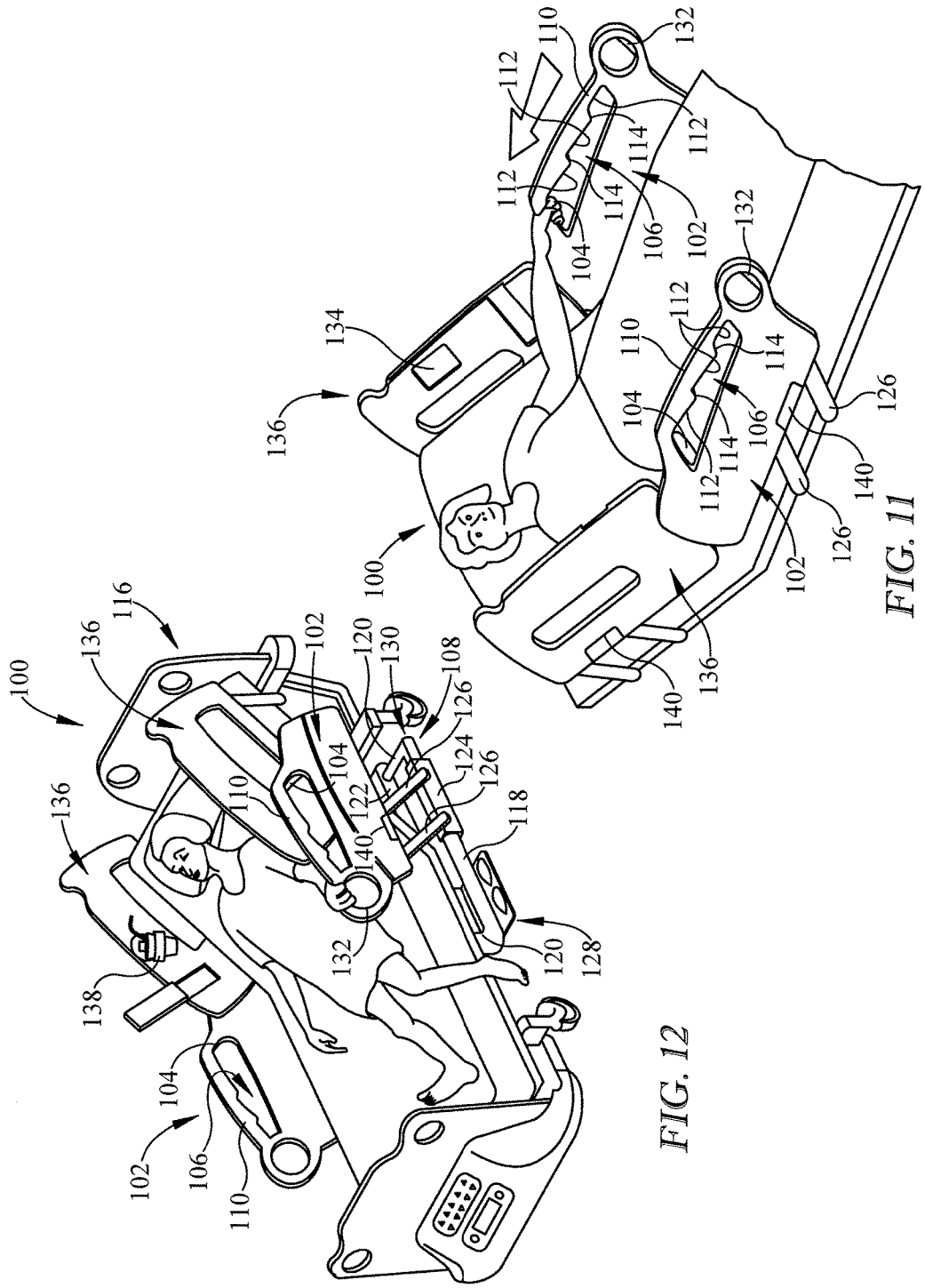

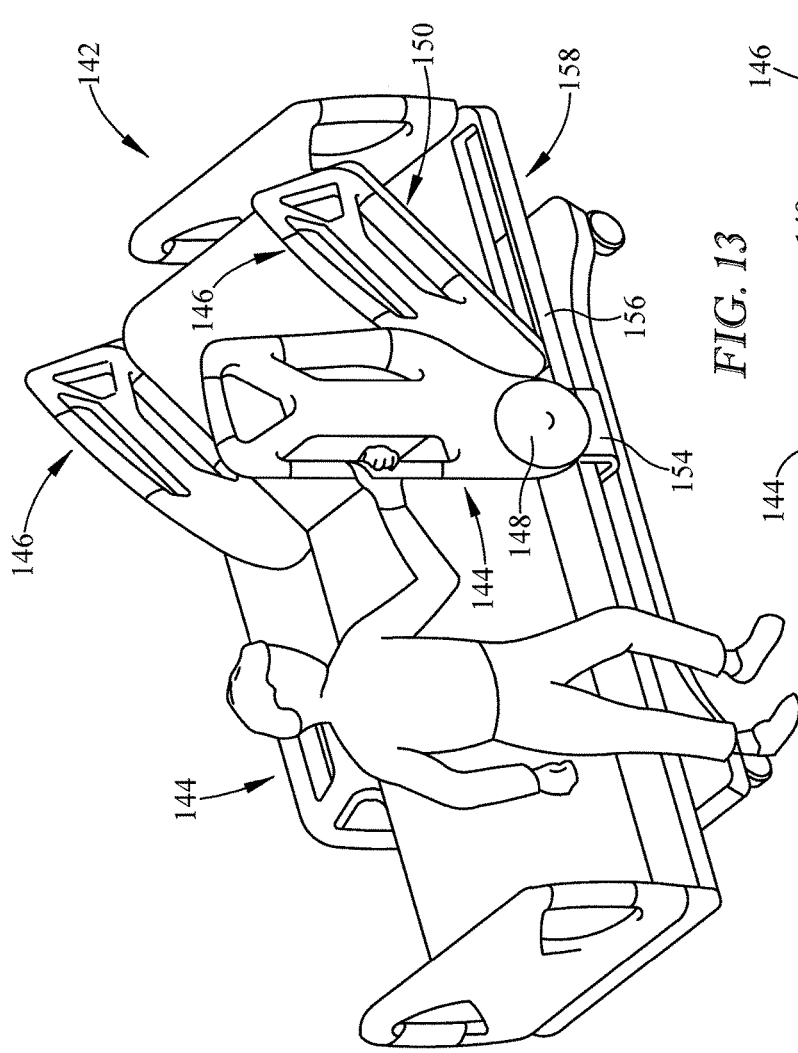
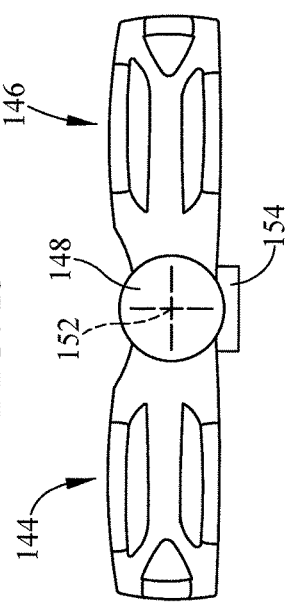
FIG. 13
FIG. 14

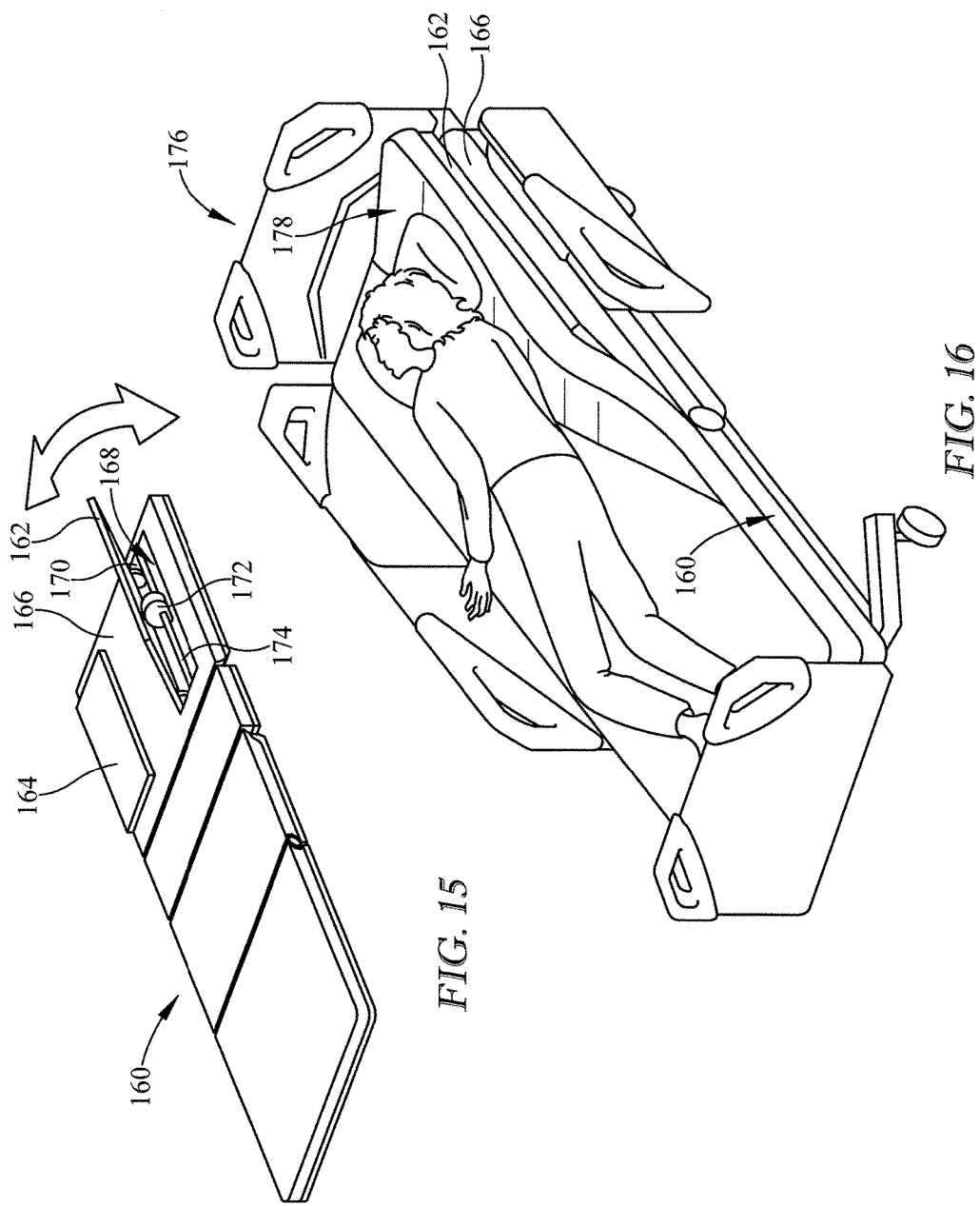

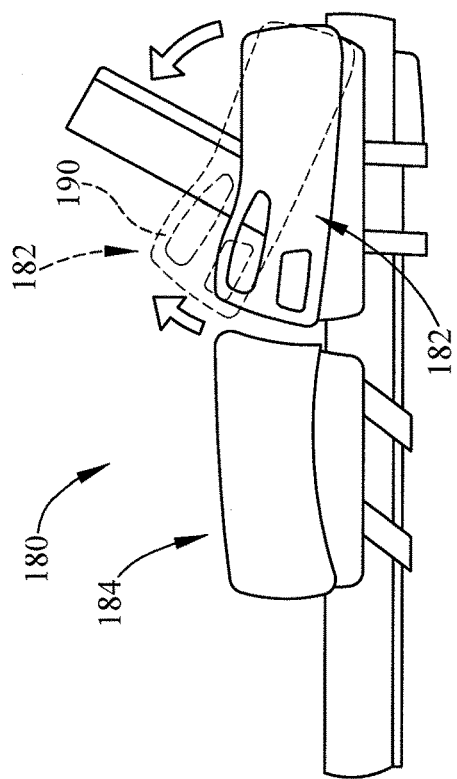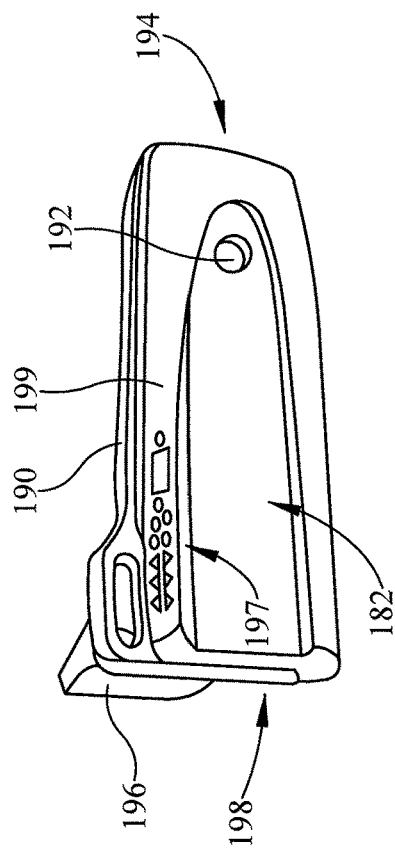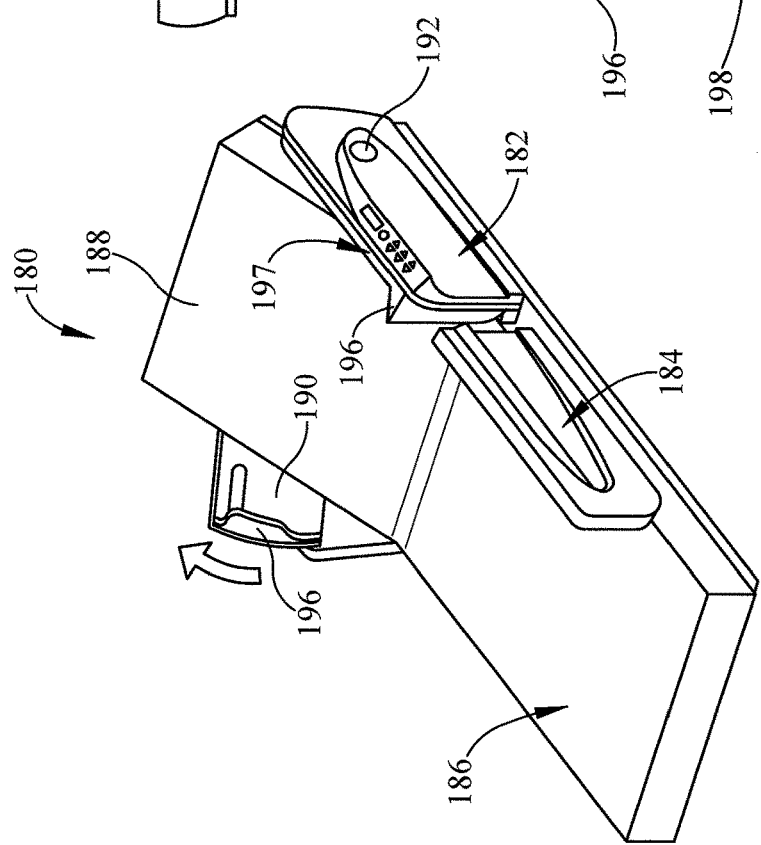
FIG. 19
FIG. 18
FIG. 17

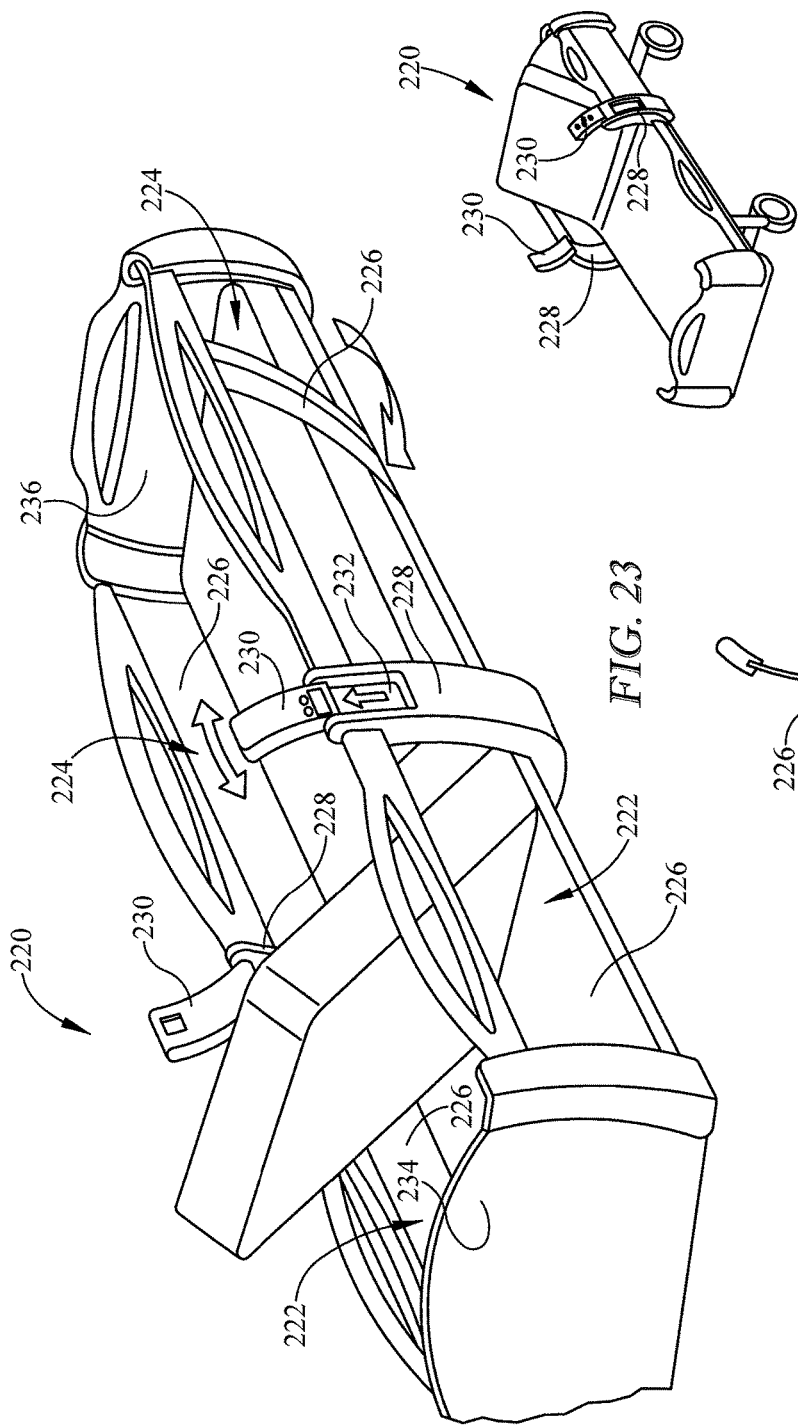
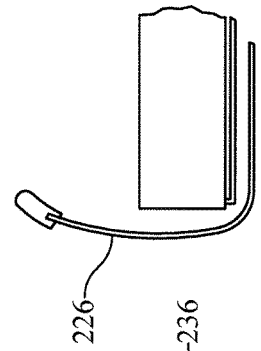
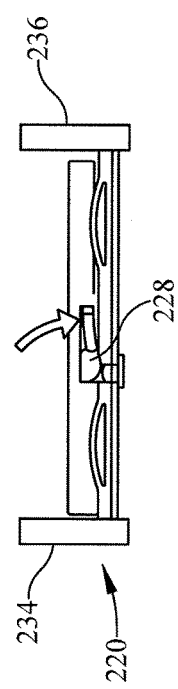

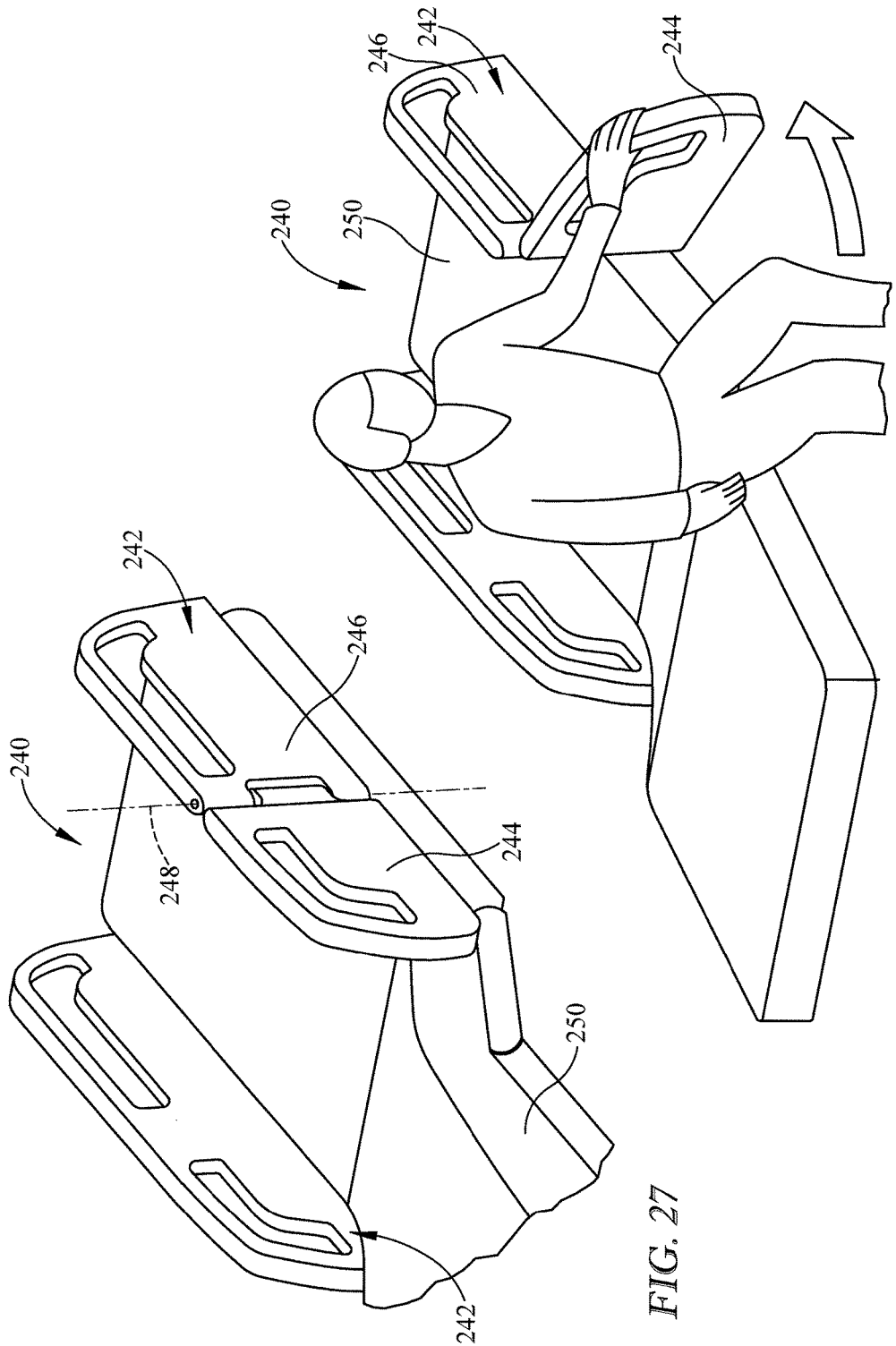

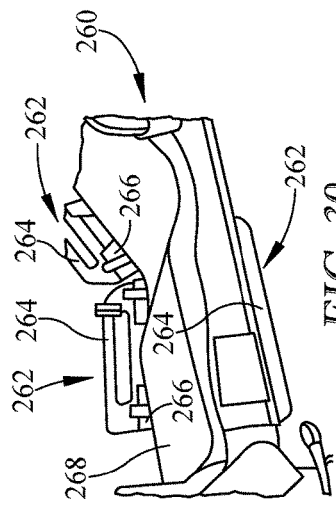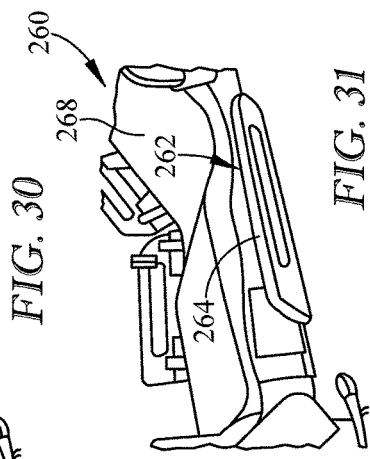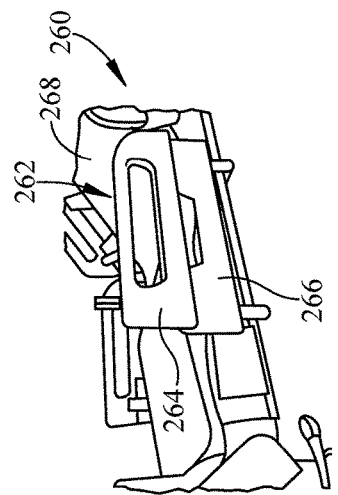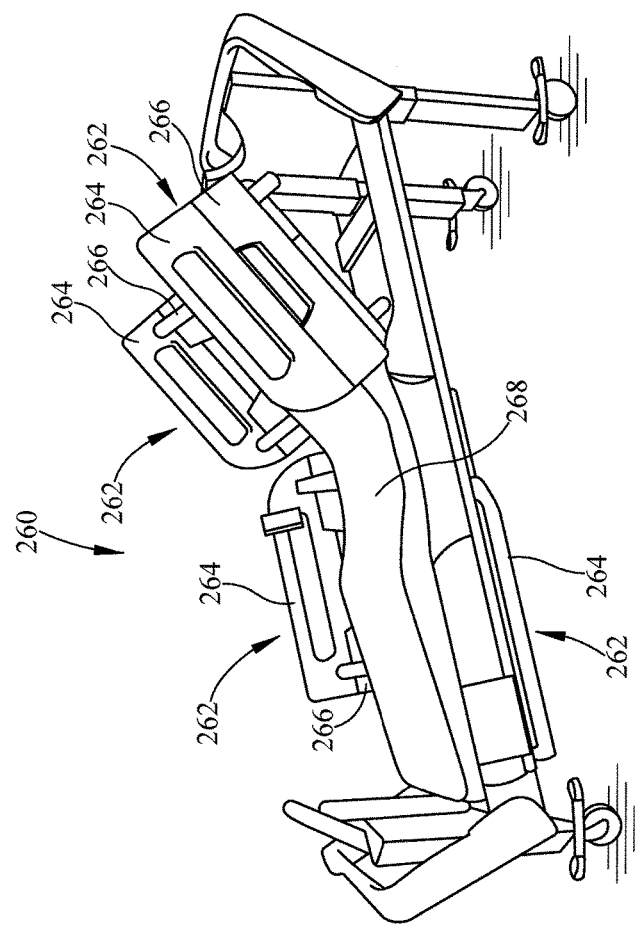

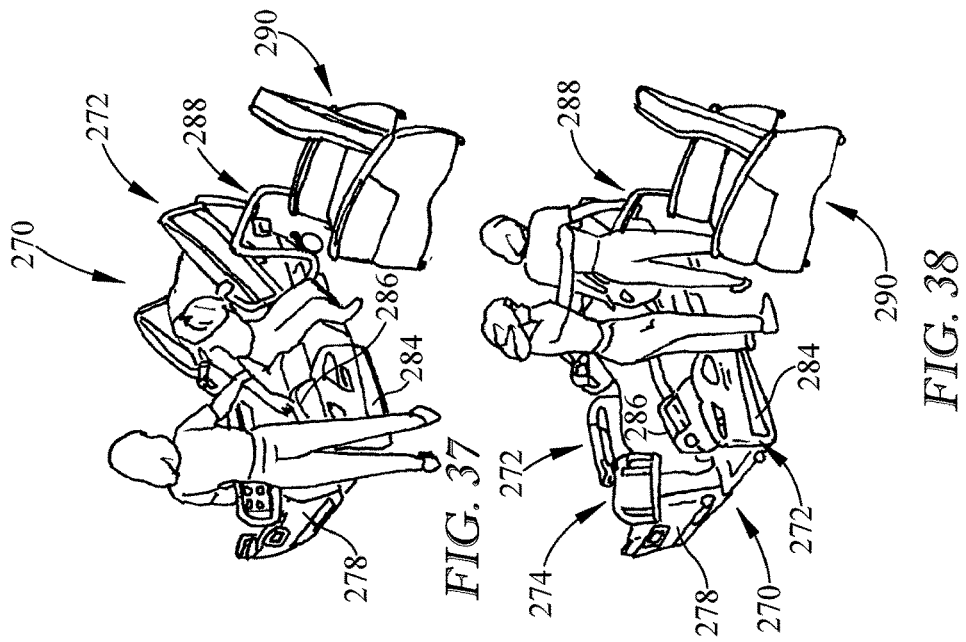
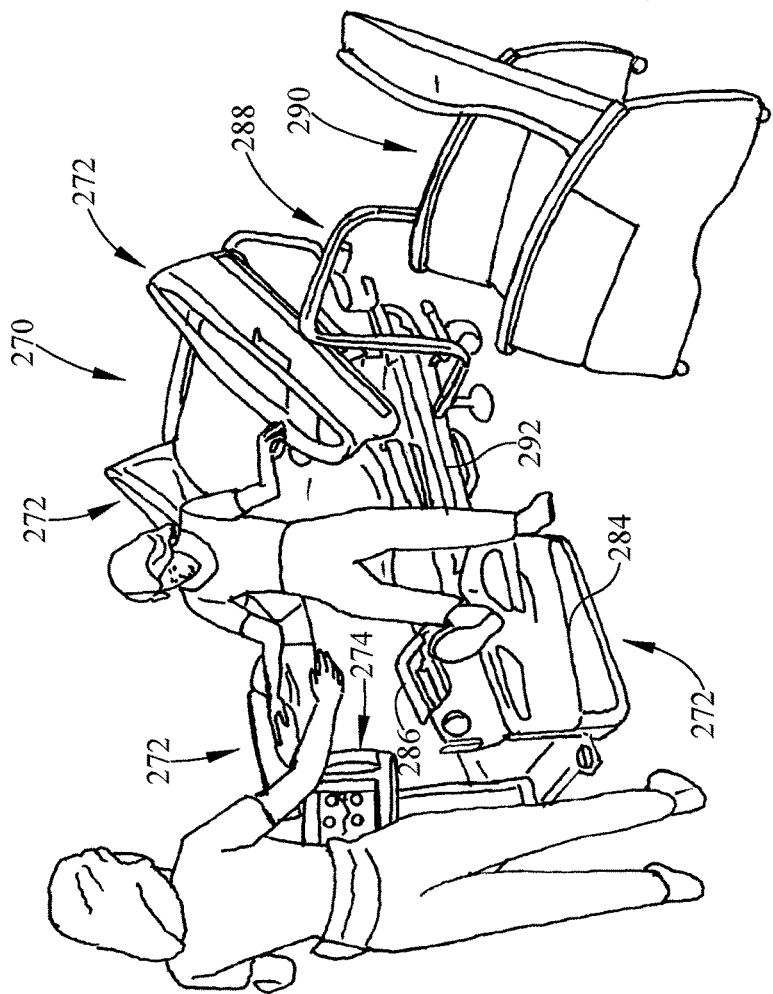

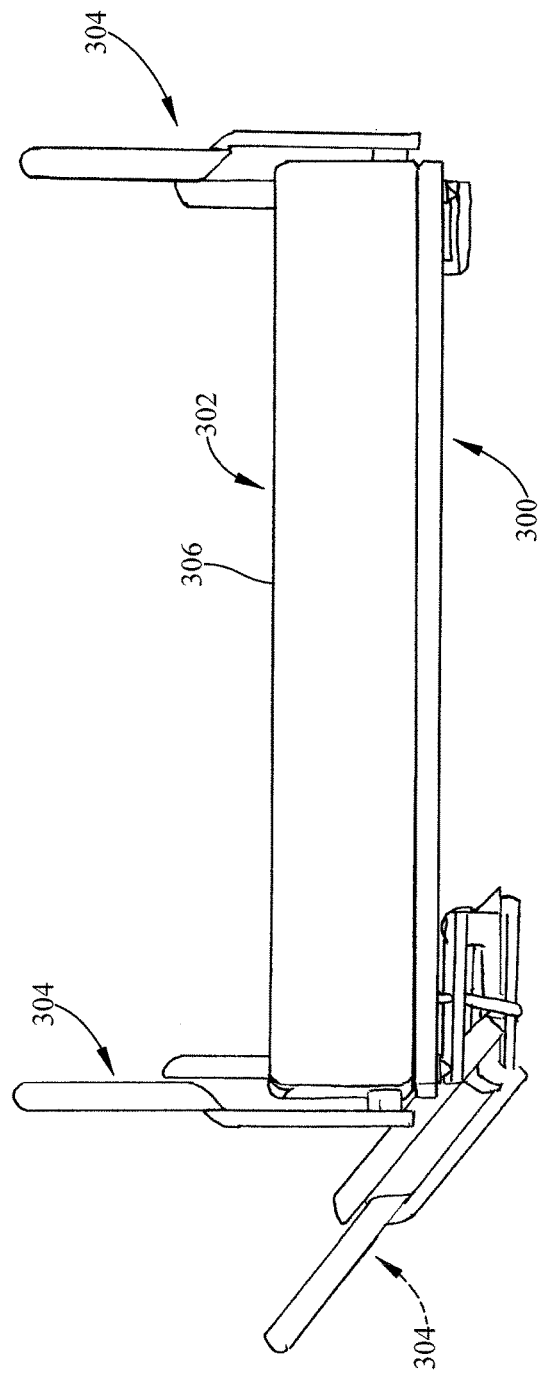
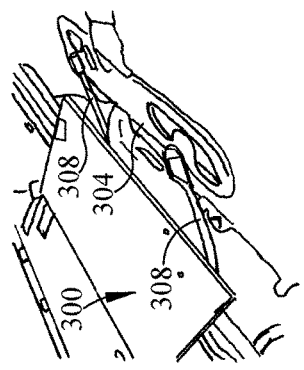
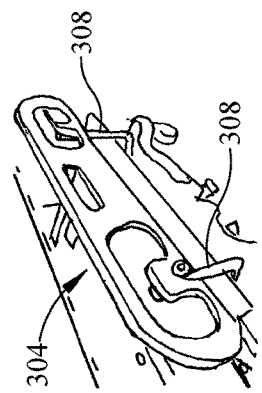
FIG. 39 FIG. 40 FIG. 41 FIG. 42

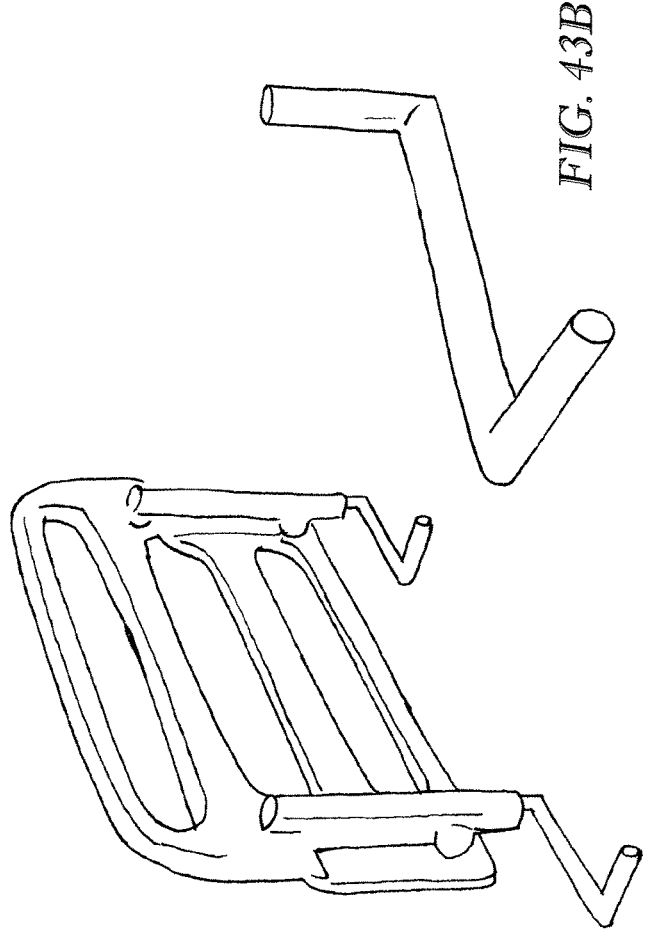
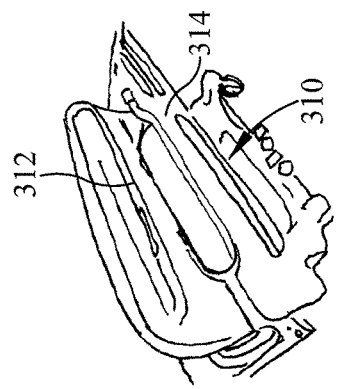
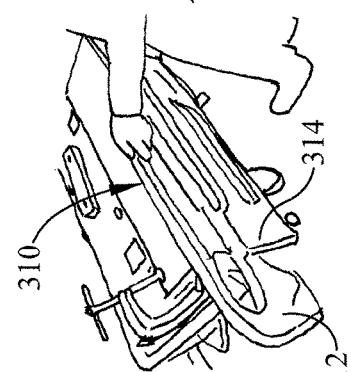
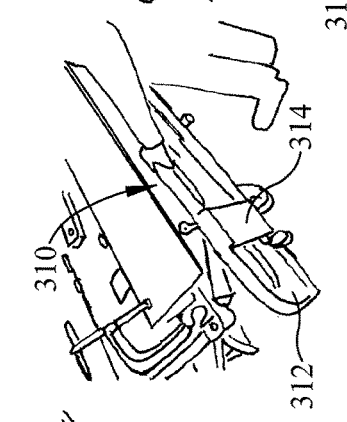
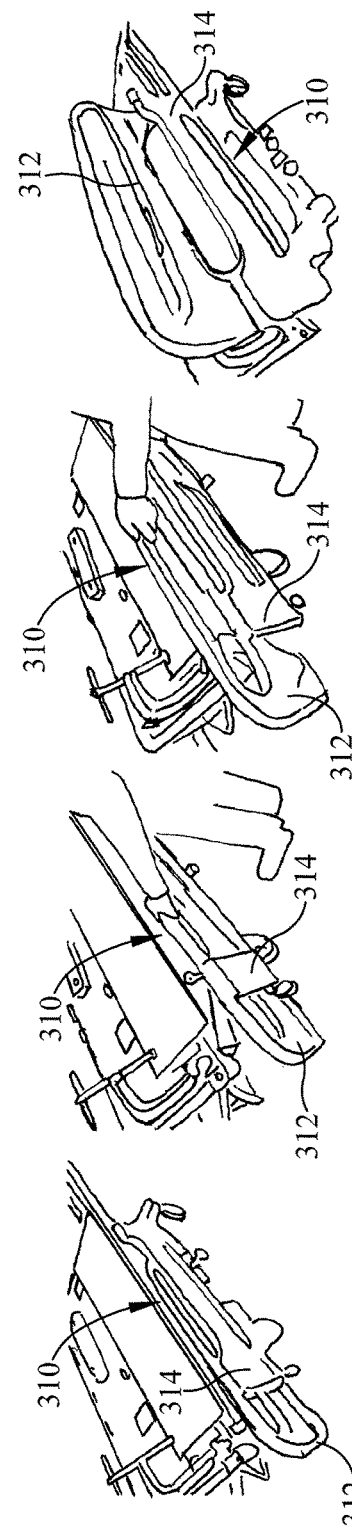

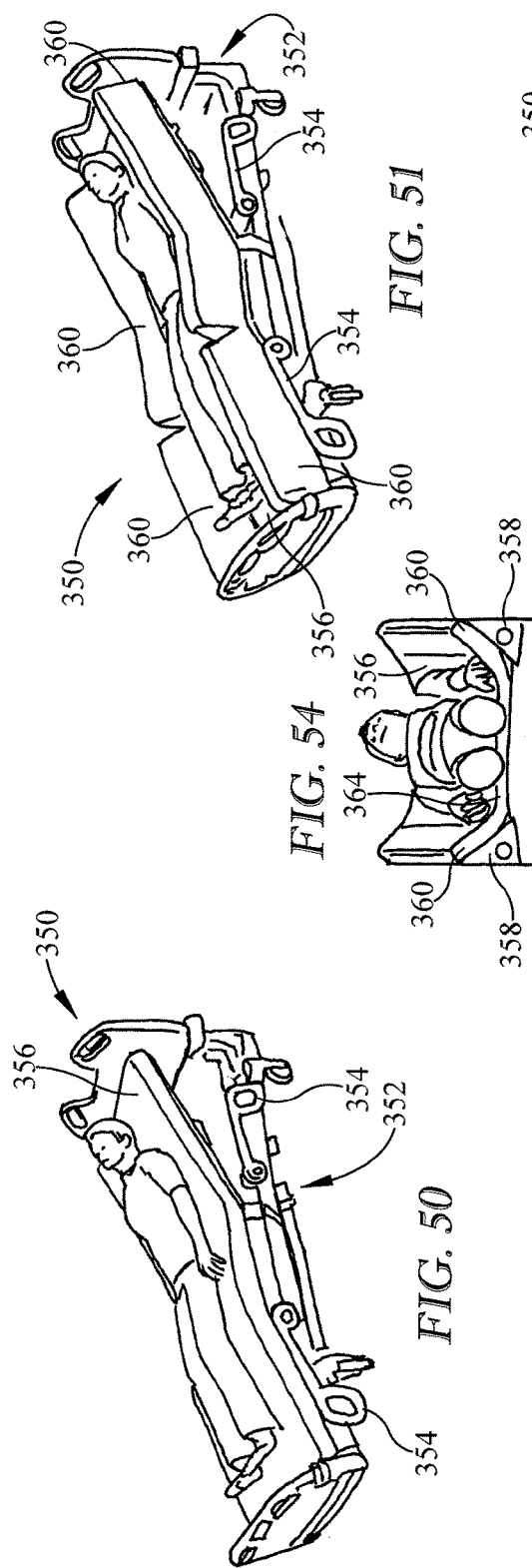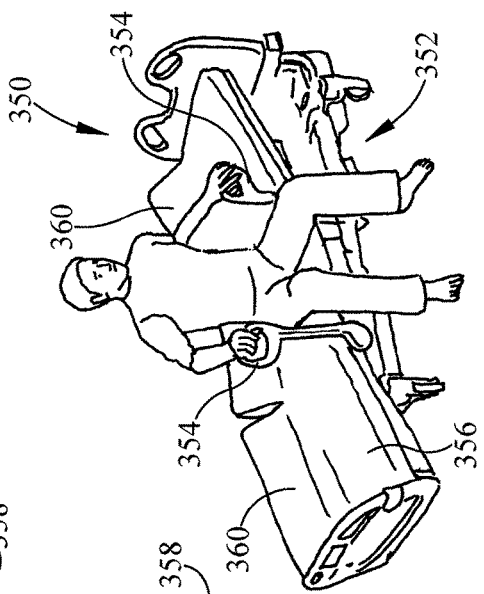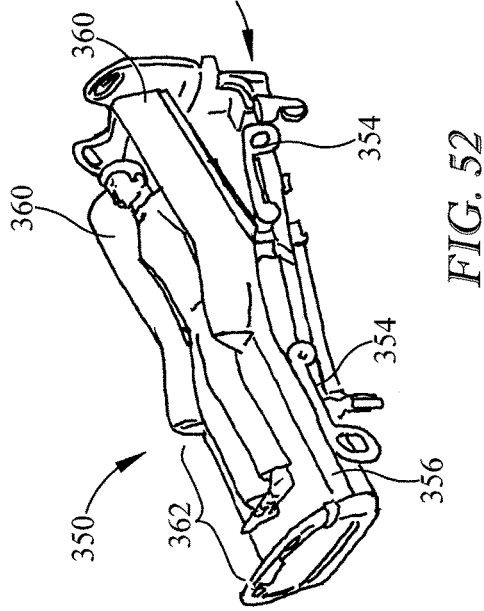

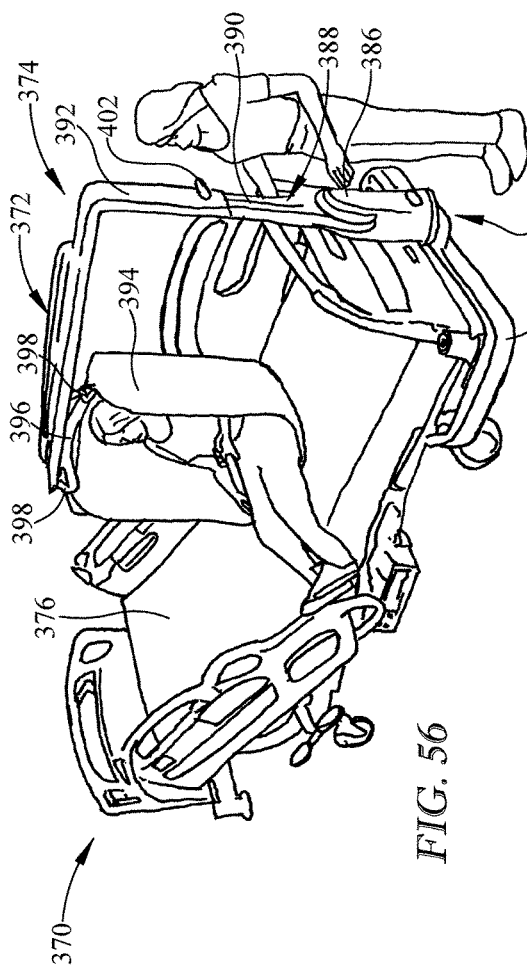
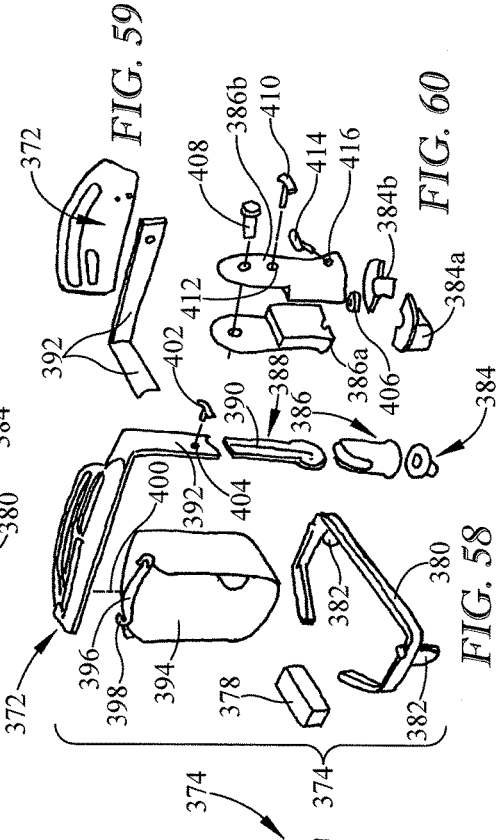
FIG. 56
FIG. 57
FIG. 58
FIG. 59
FIG. 60

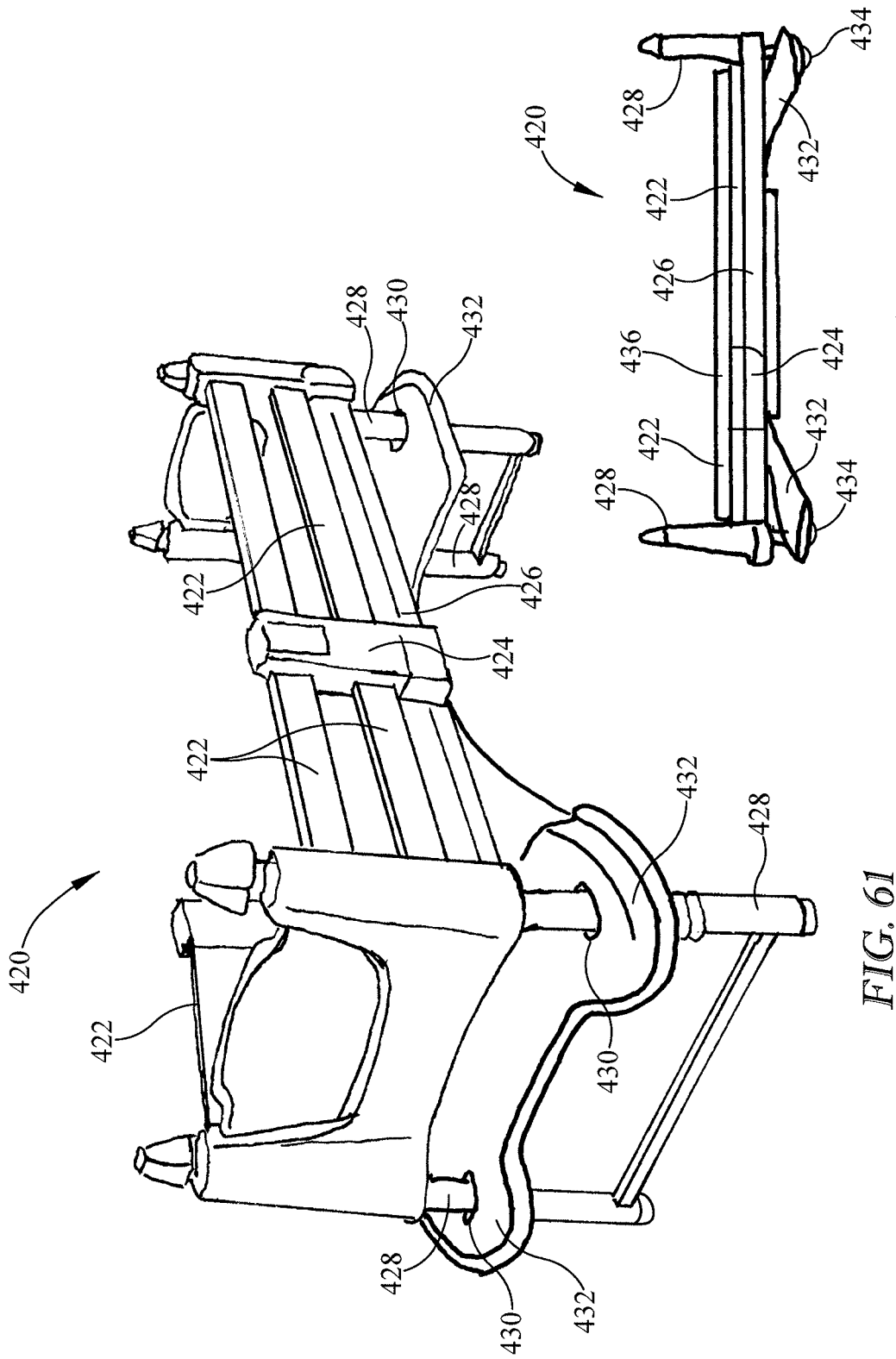

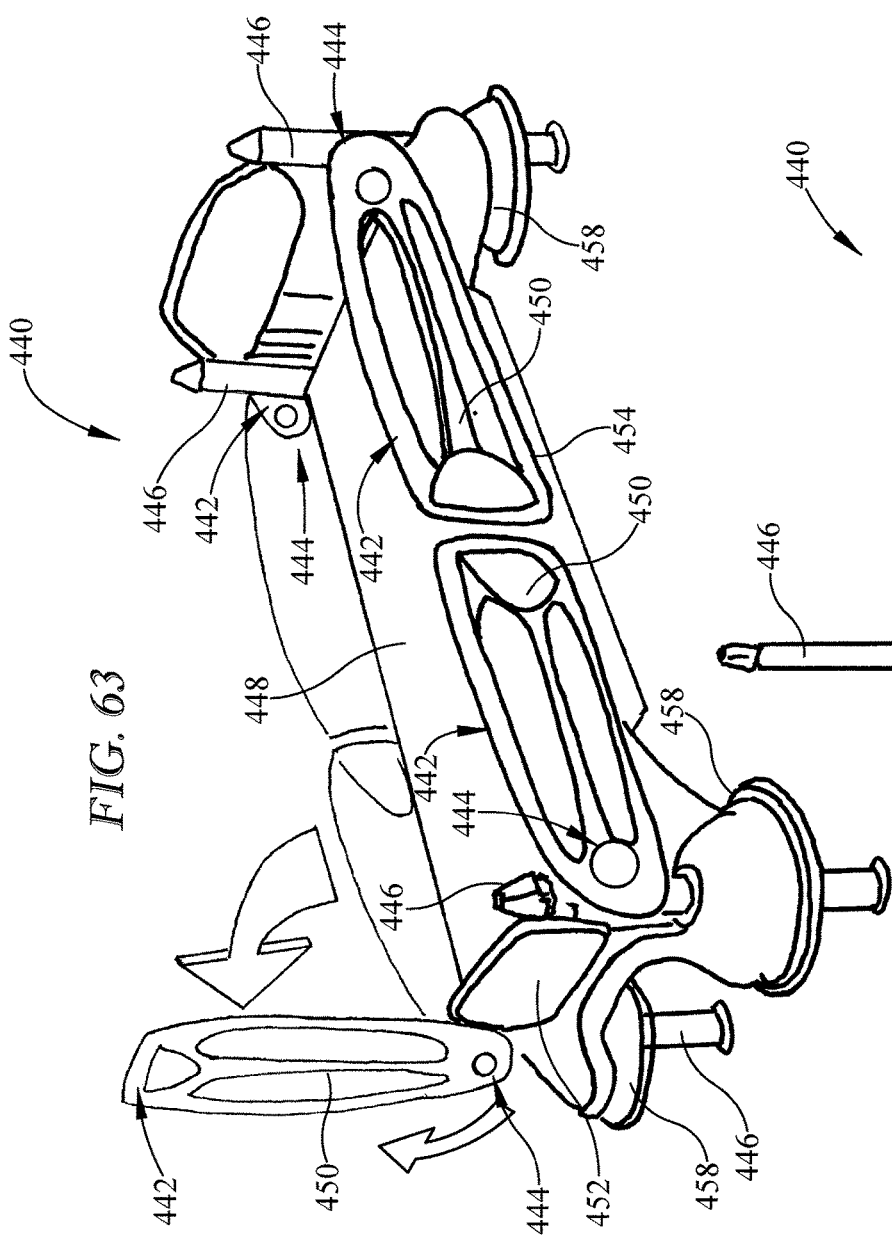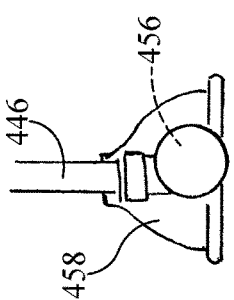

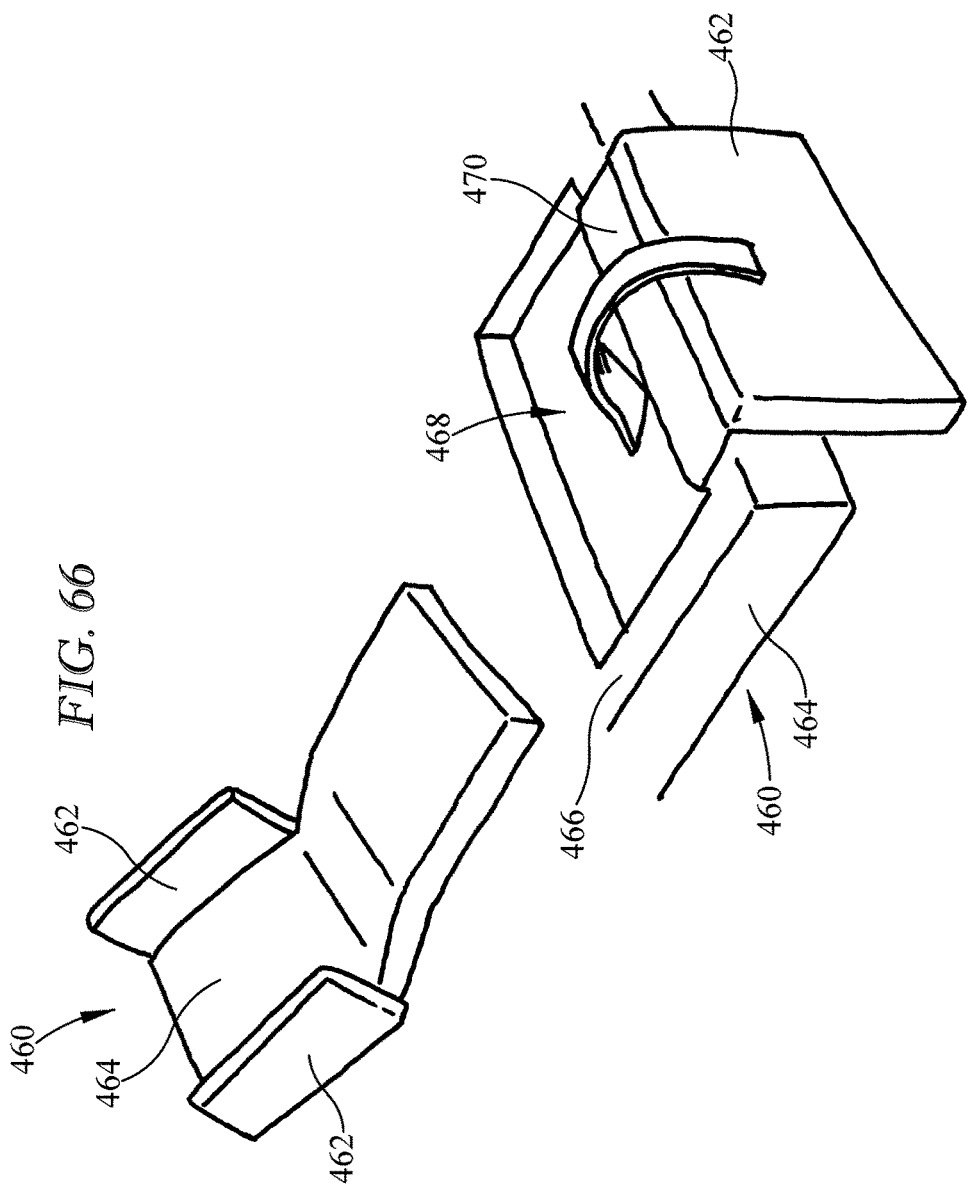

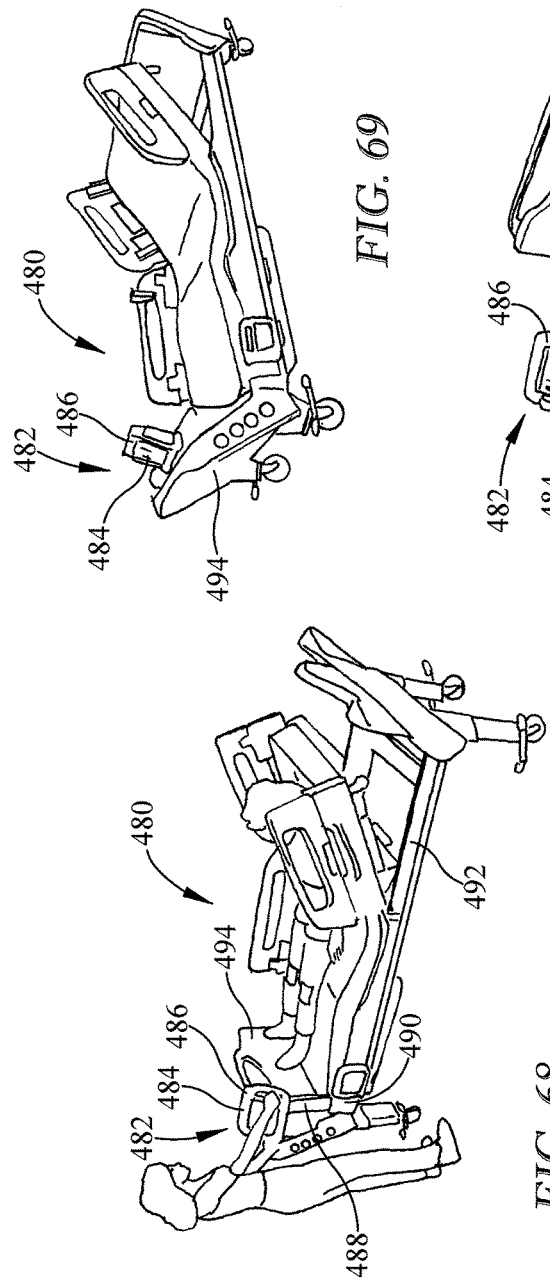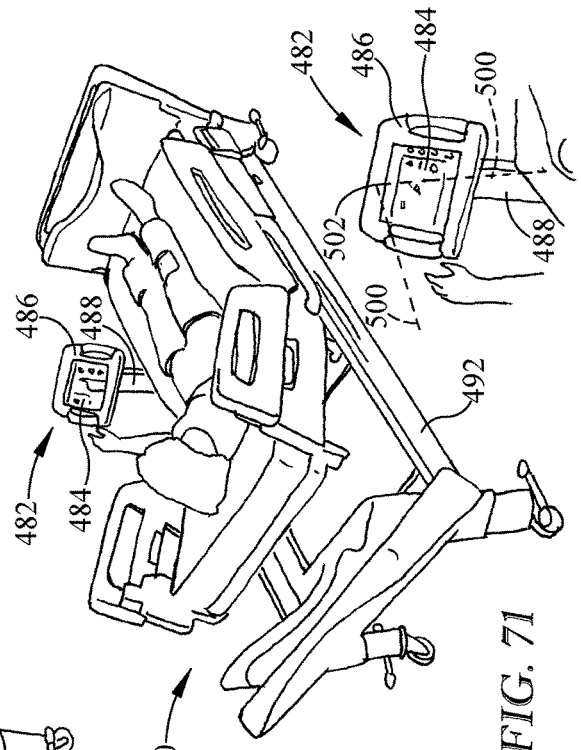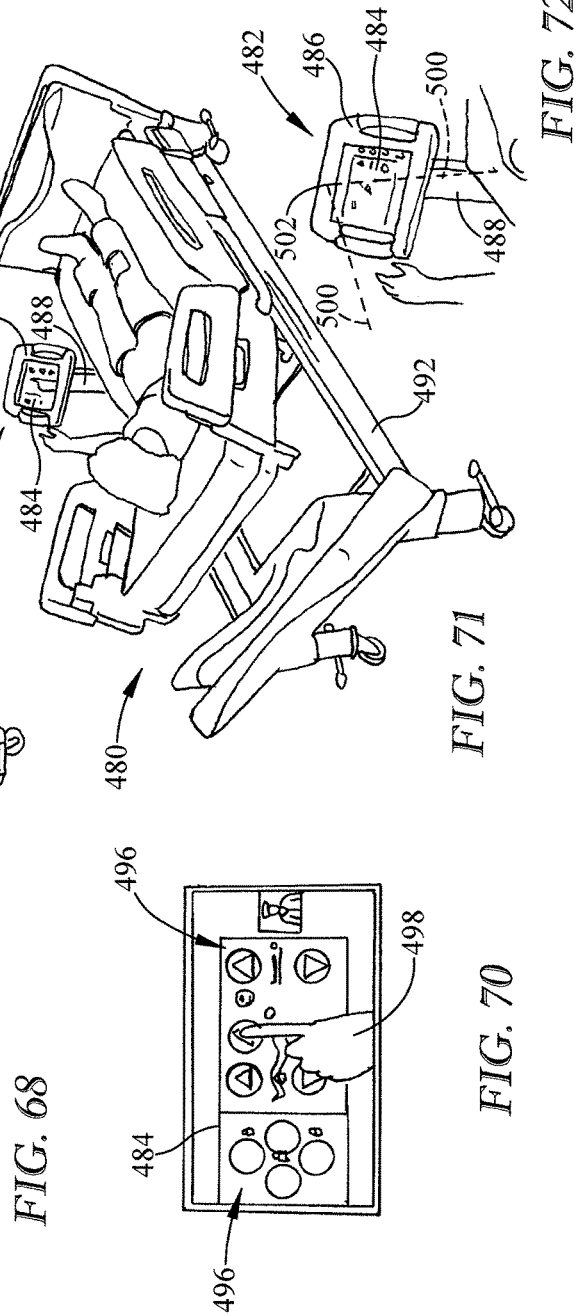

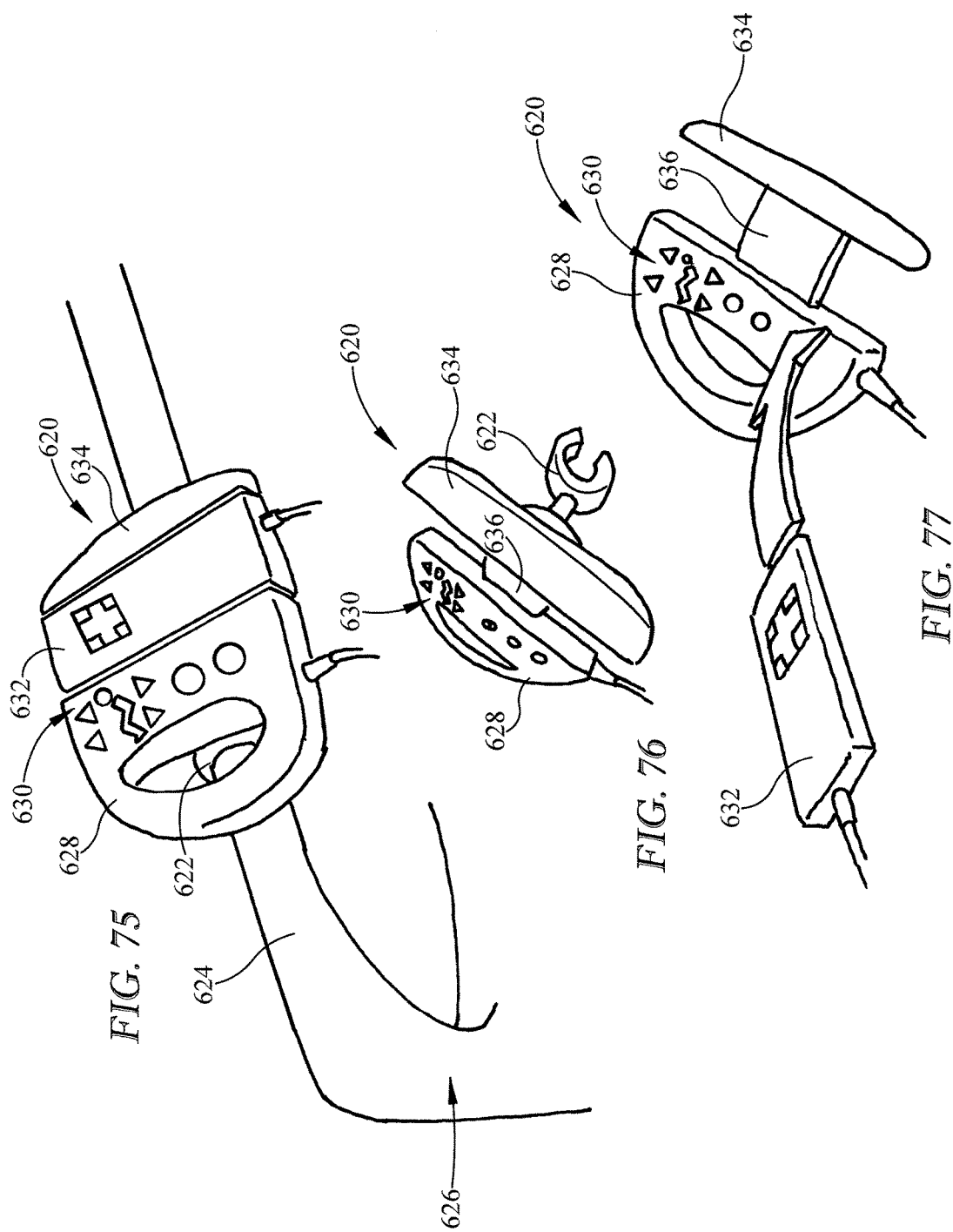

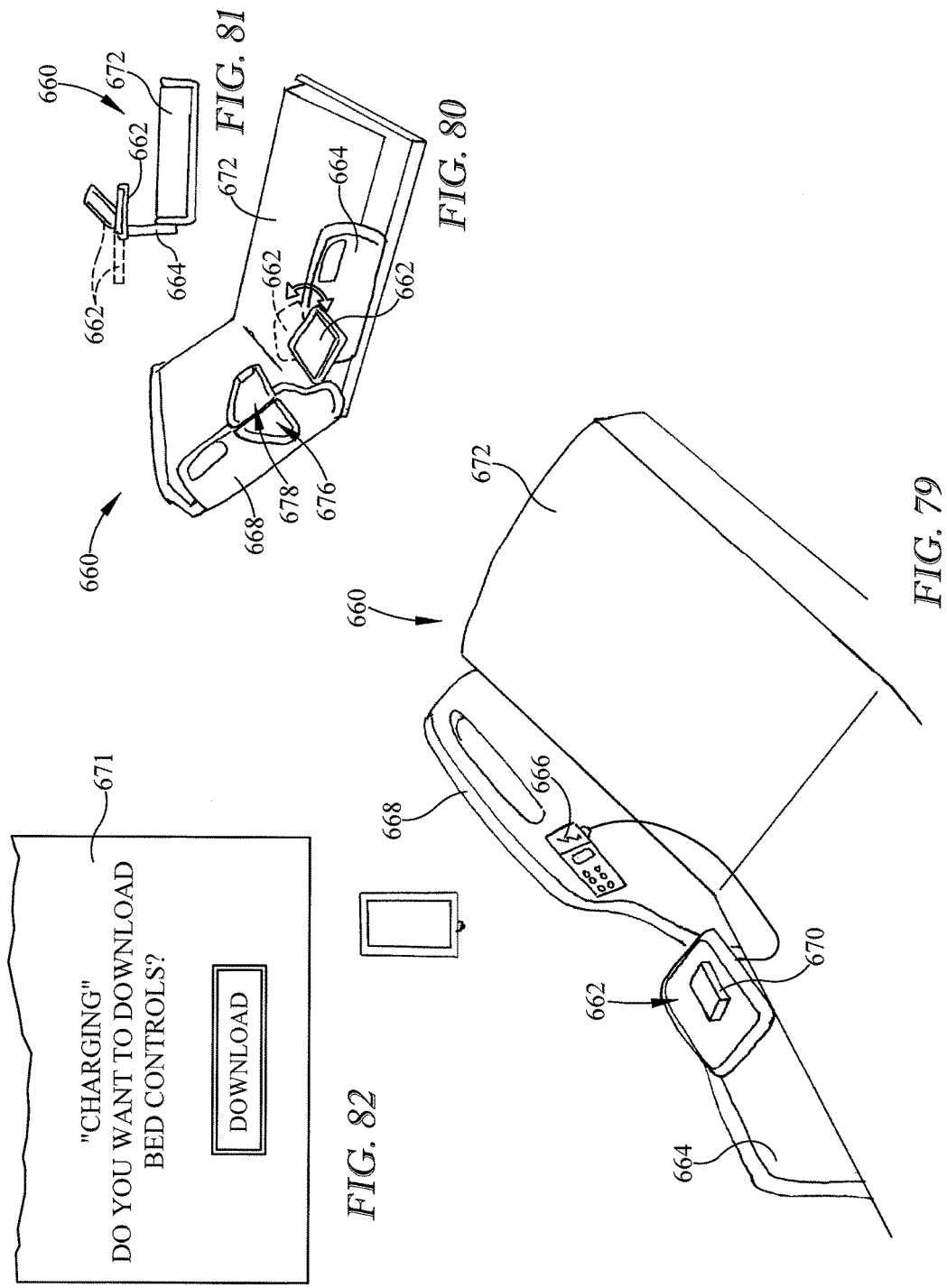

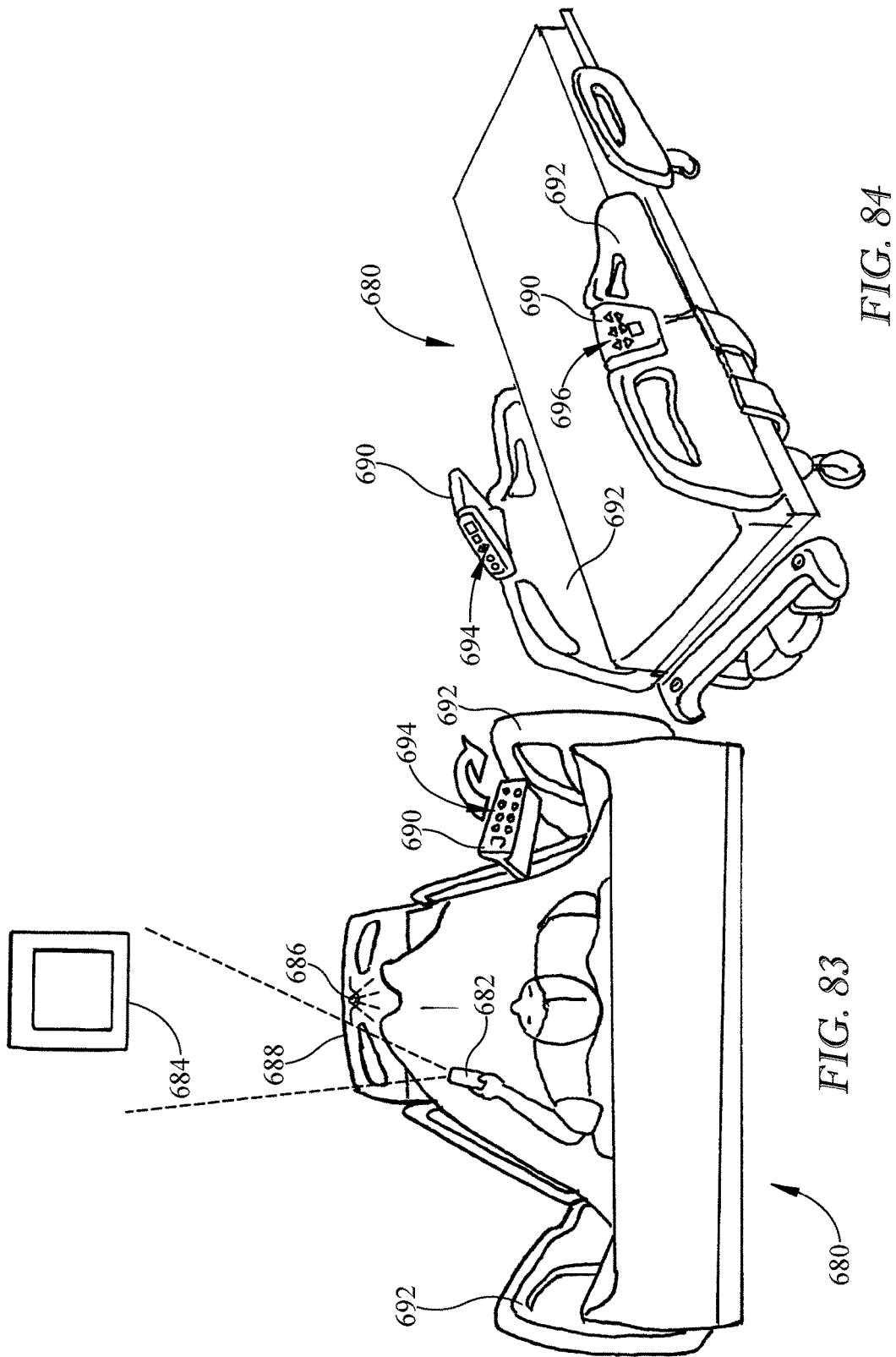

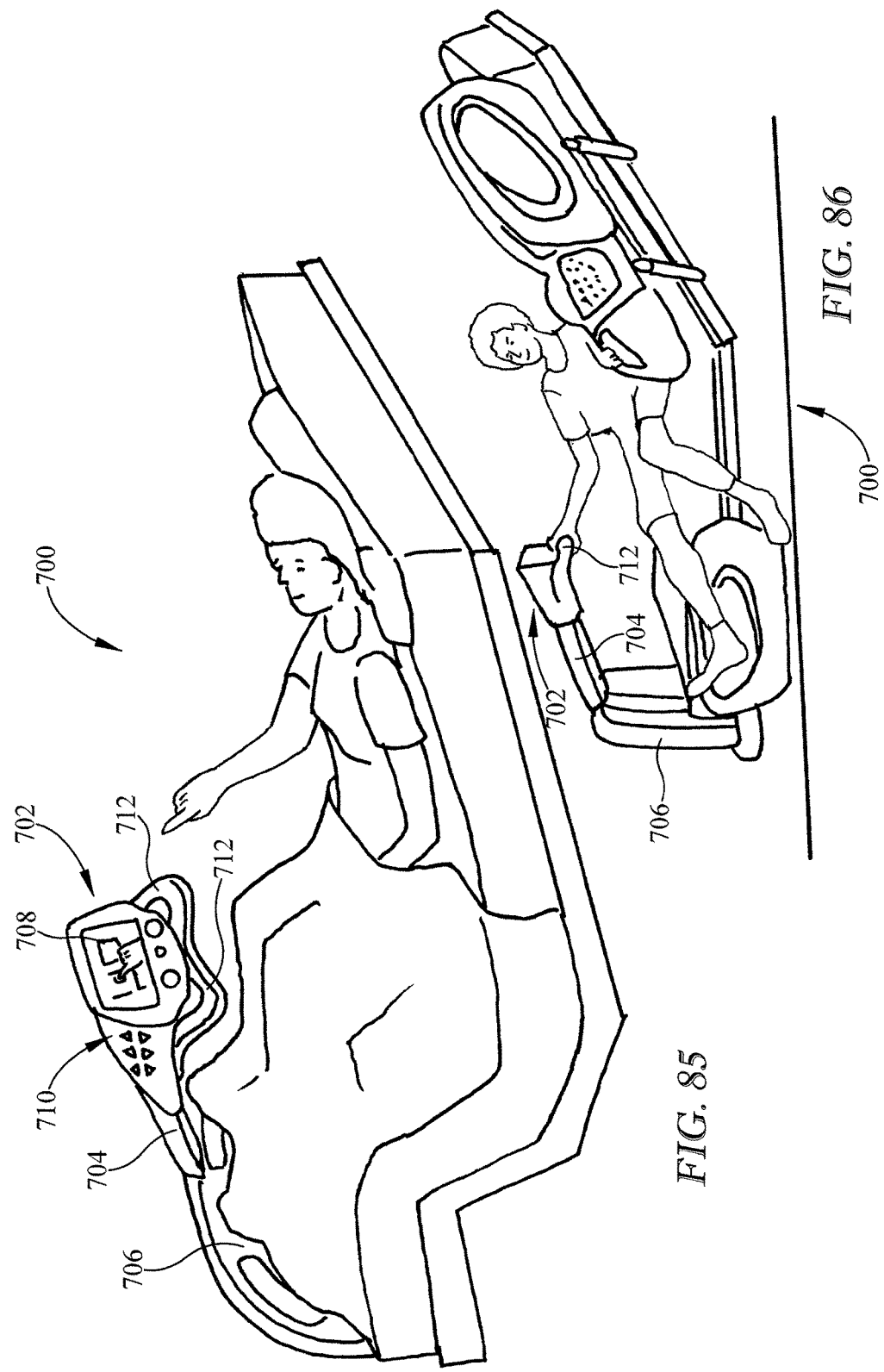

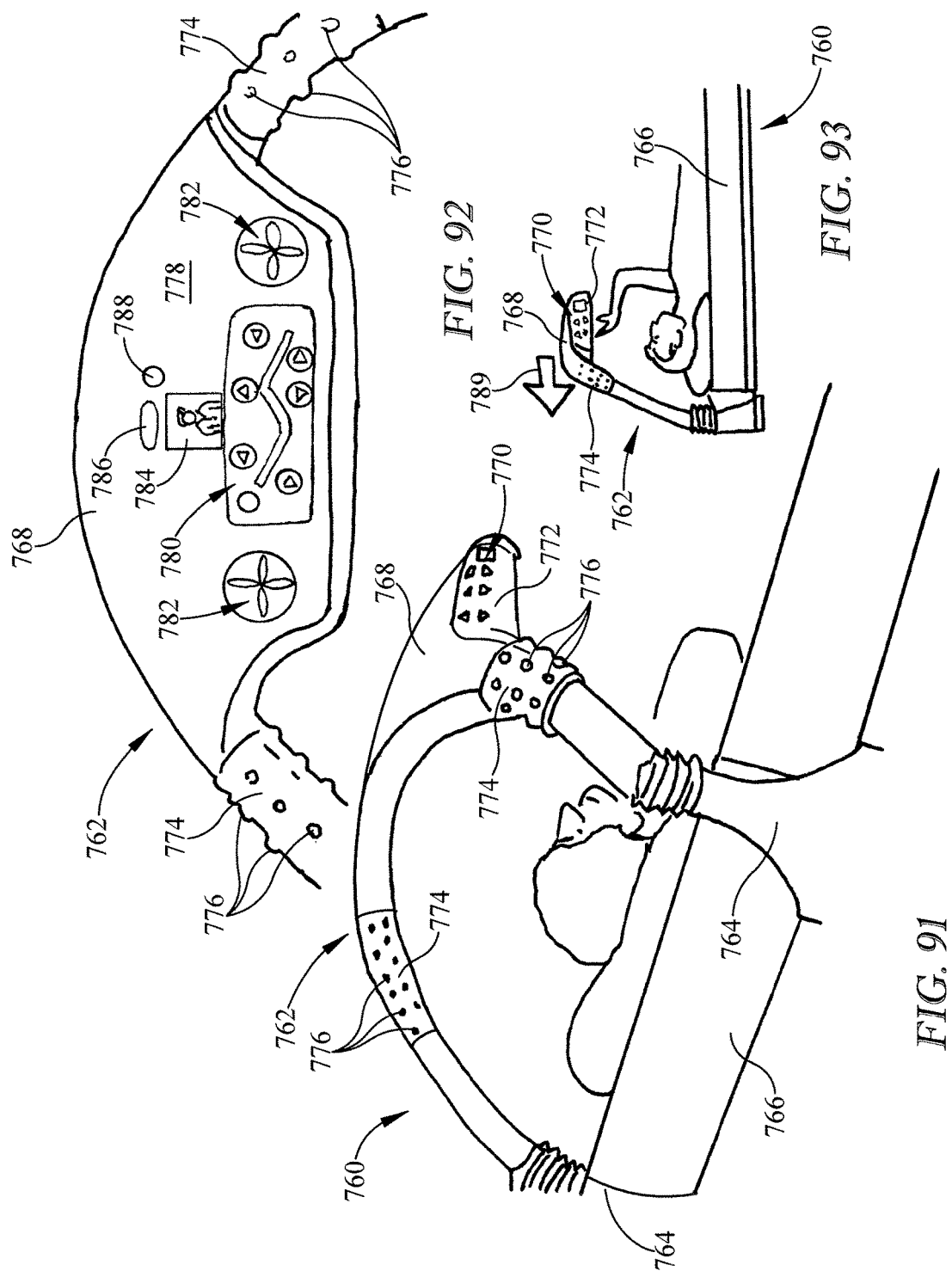

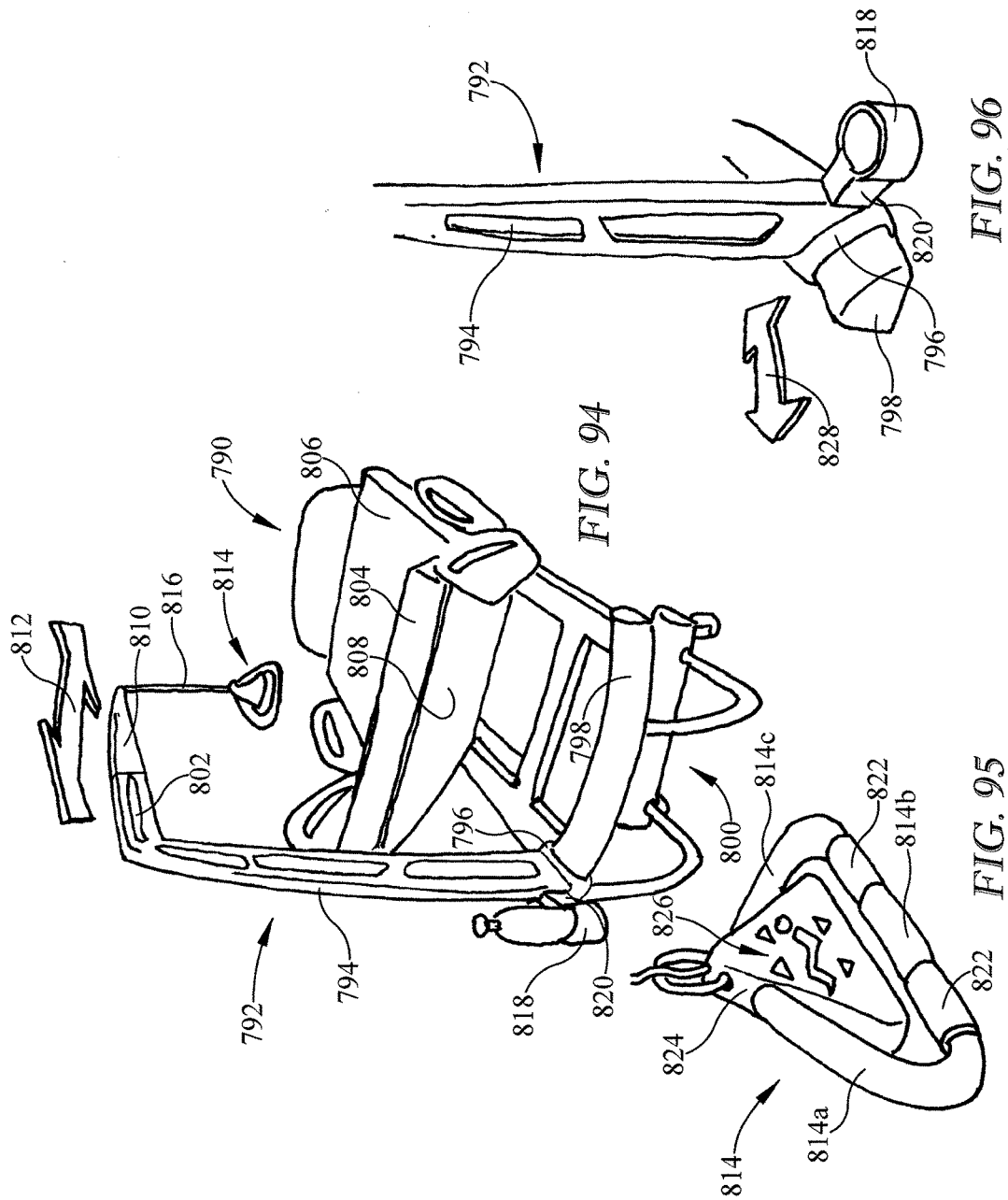

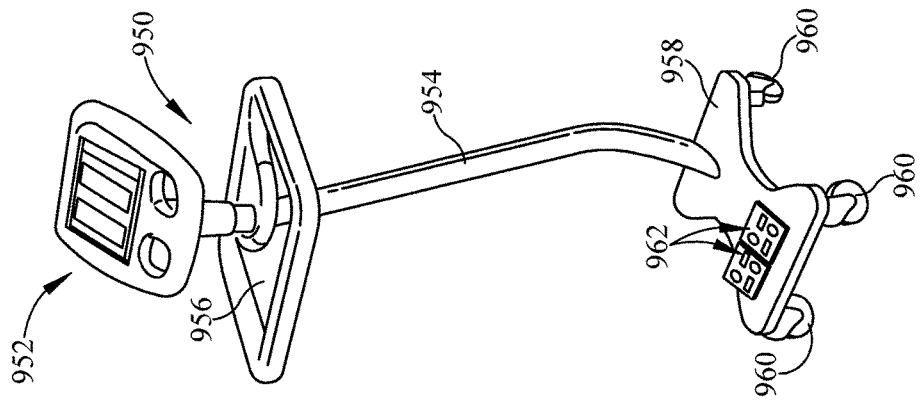
FIG. 104
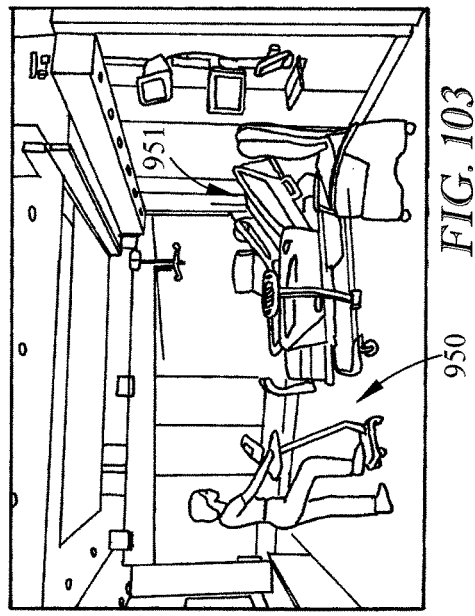
FIG. 103
FIG. 105

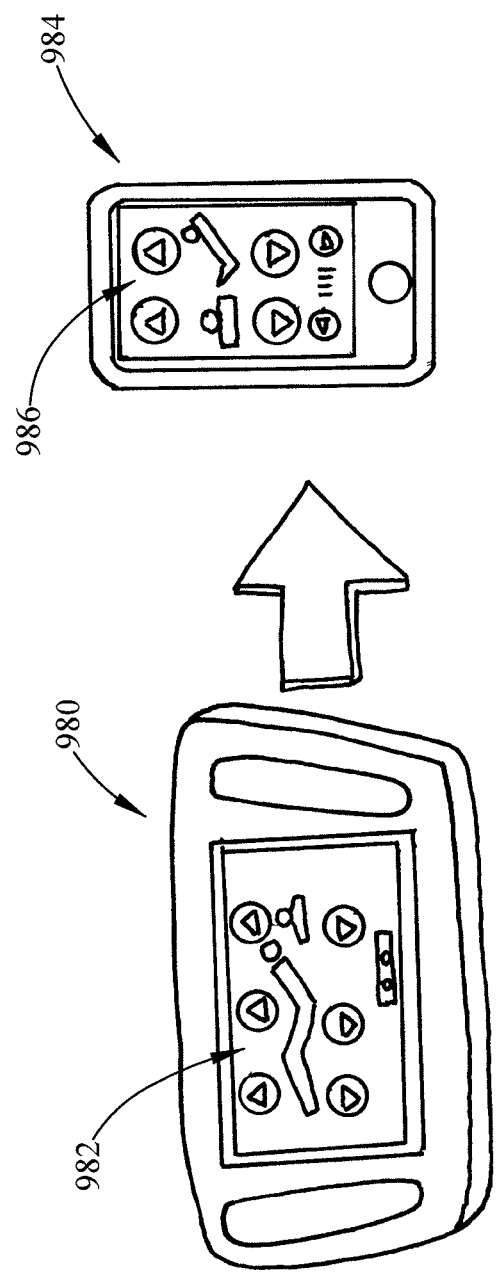

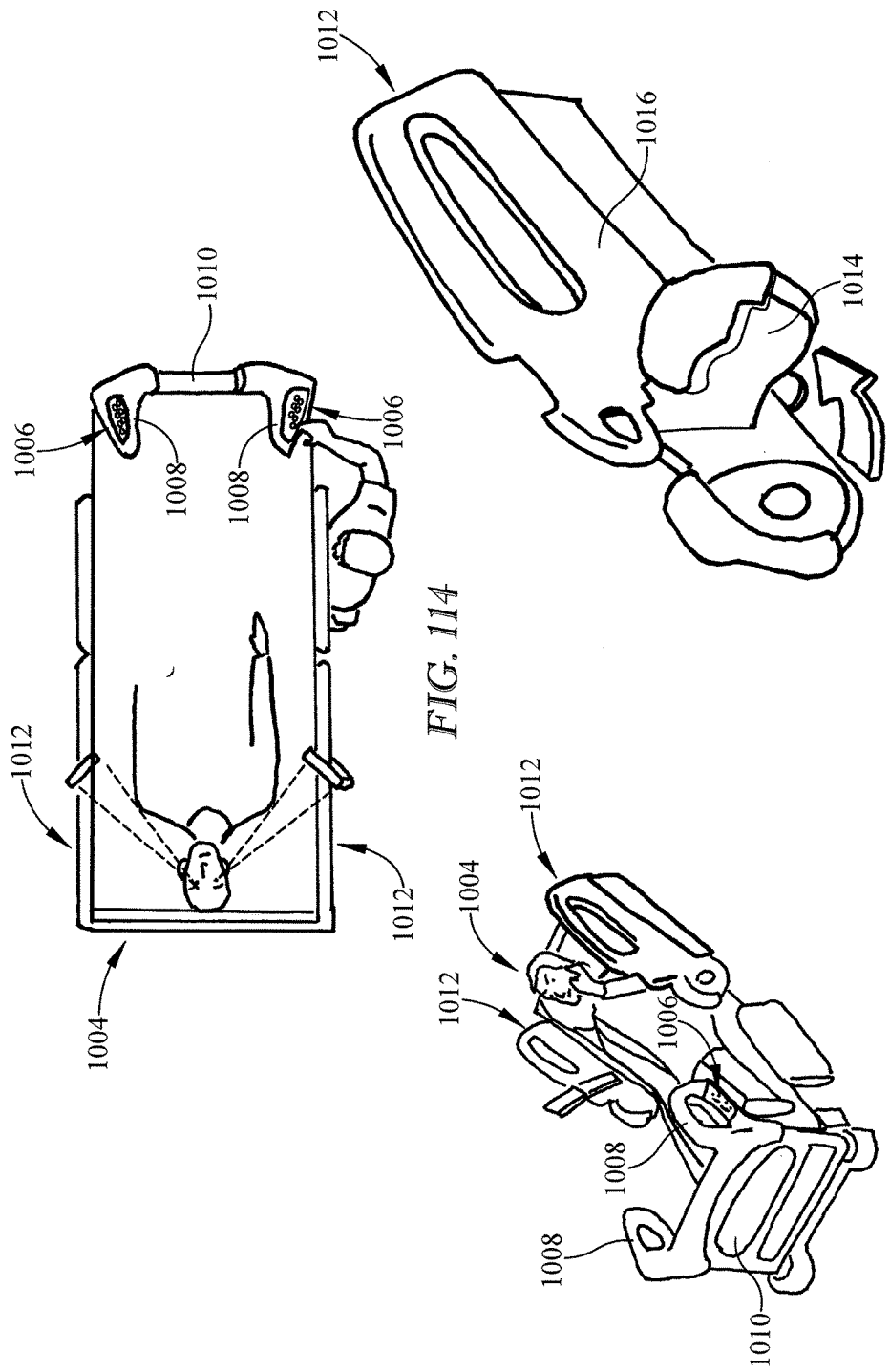

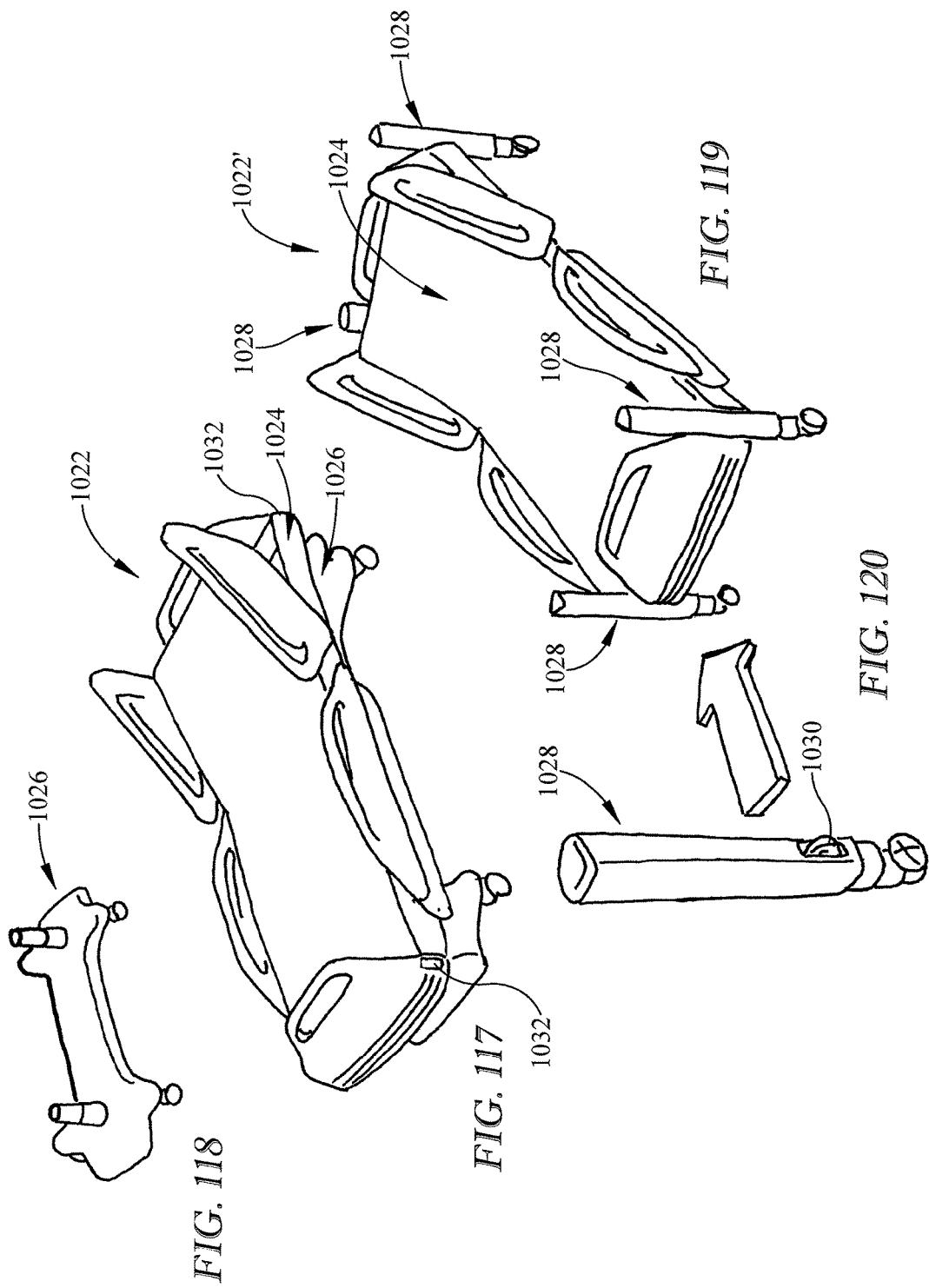

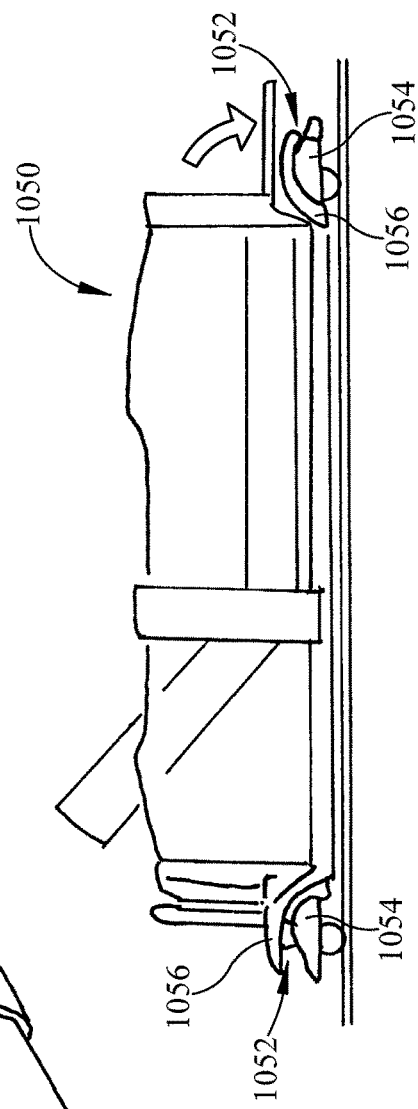
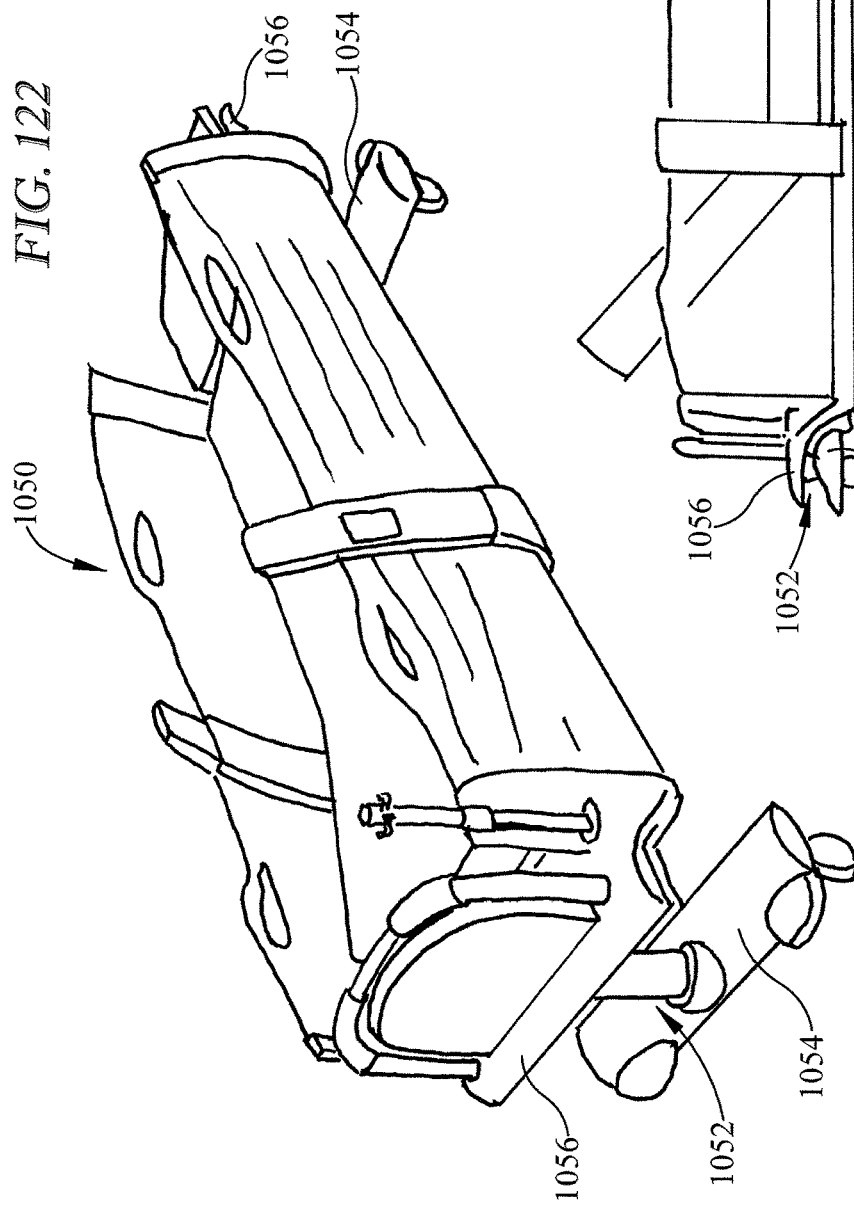

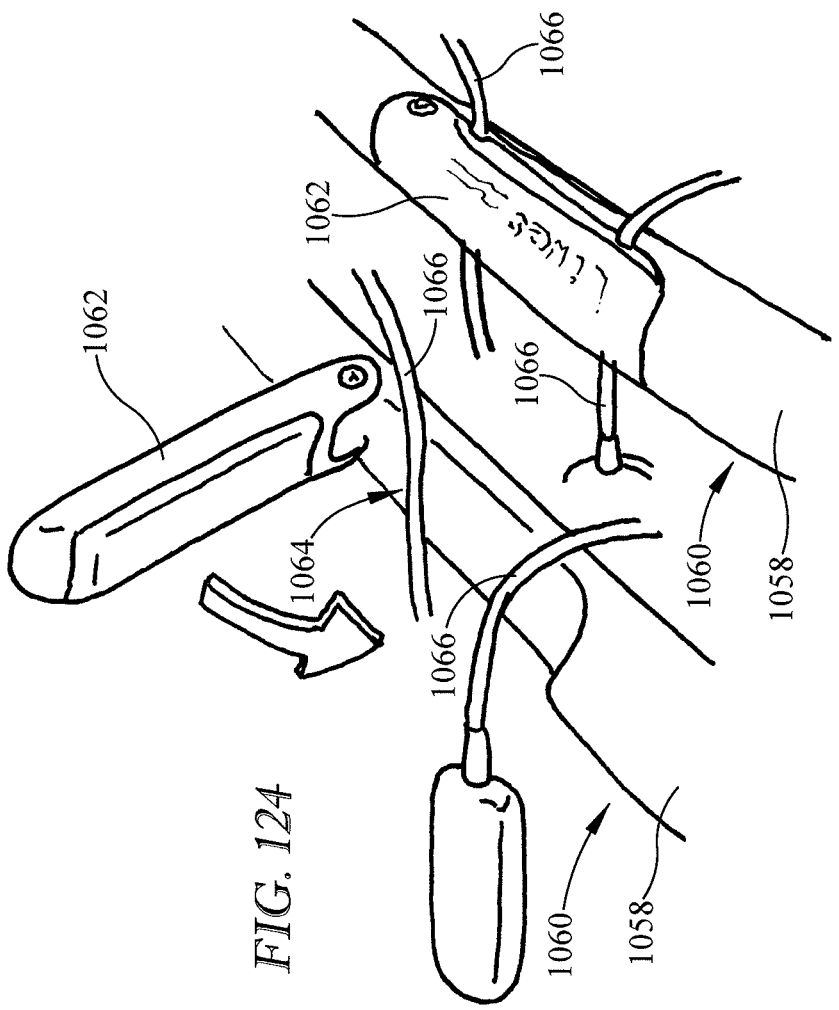

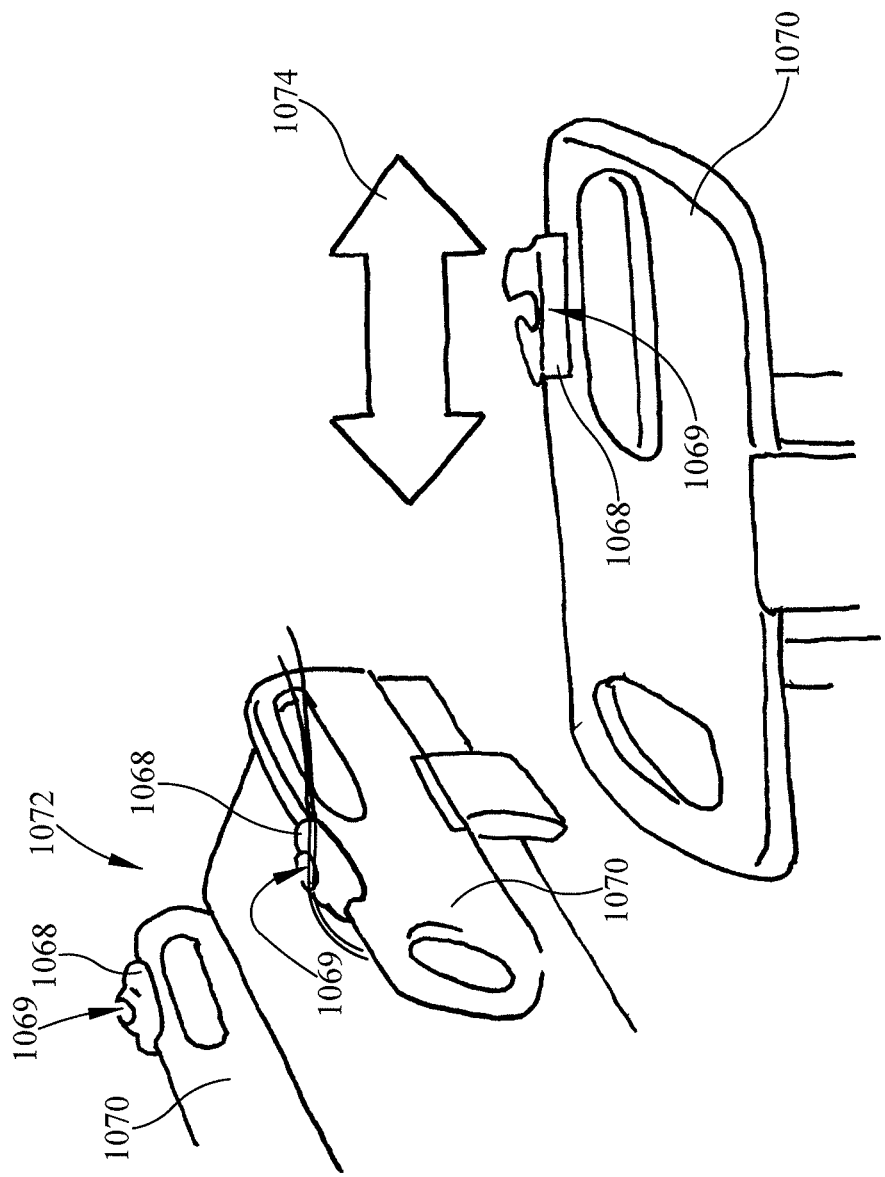

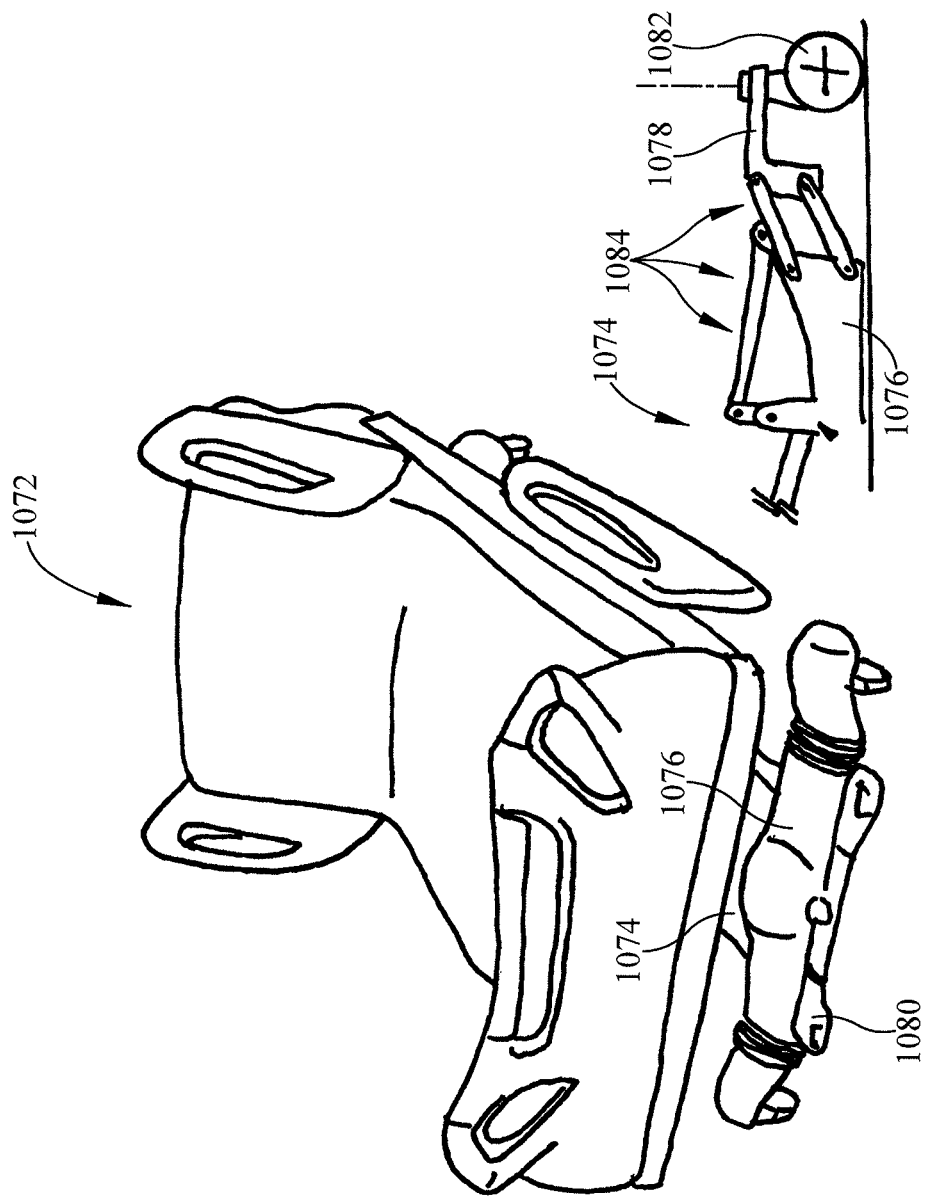
FIG. 128
FIG. 130
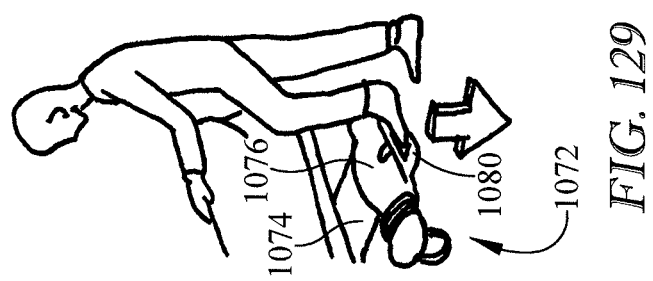
FIG. 129

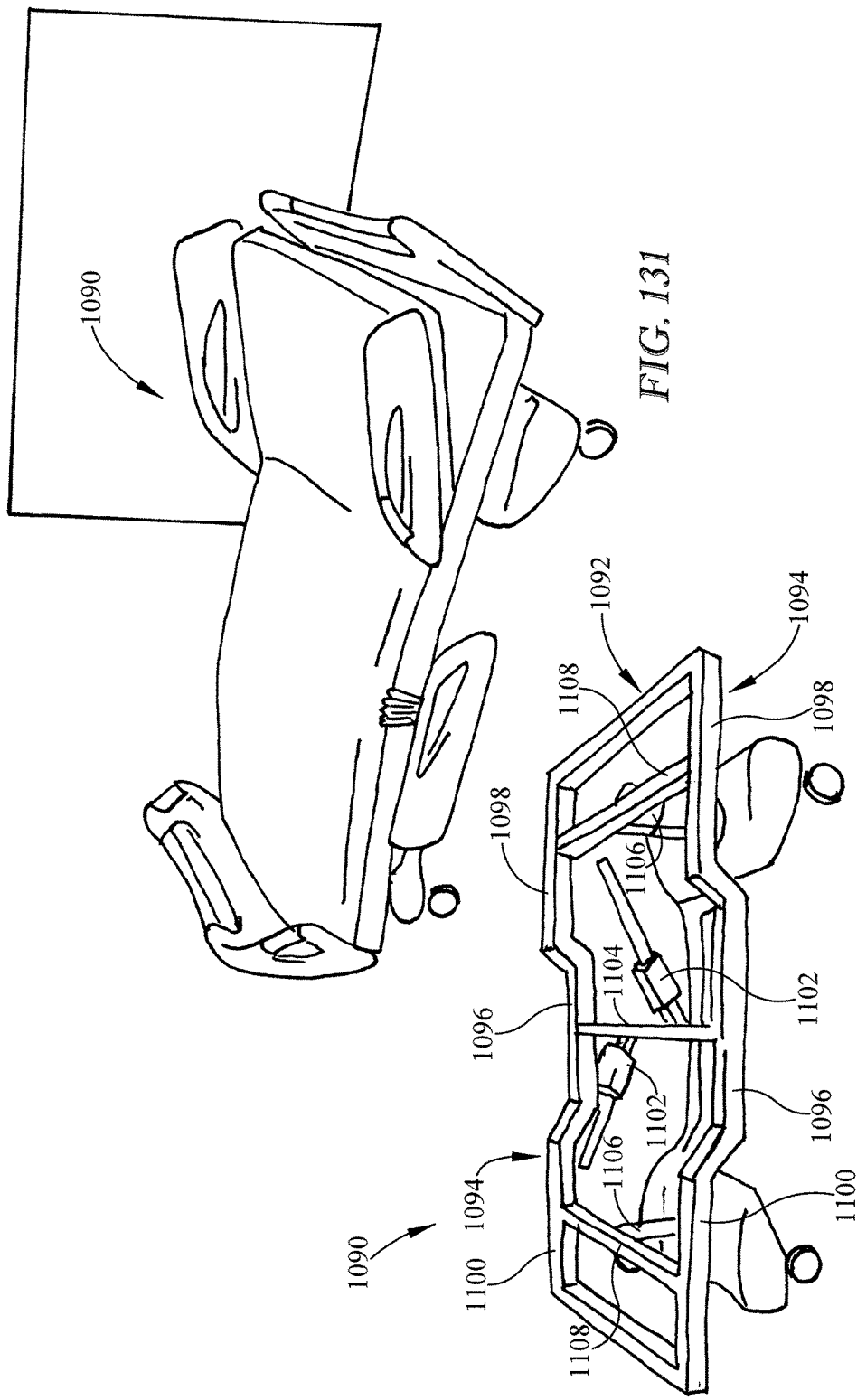

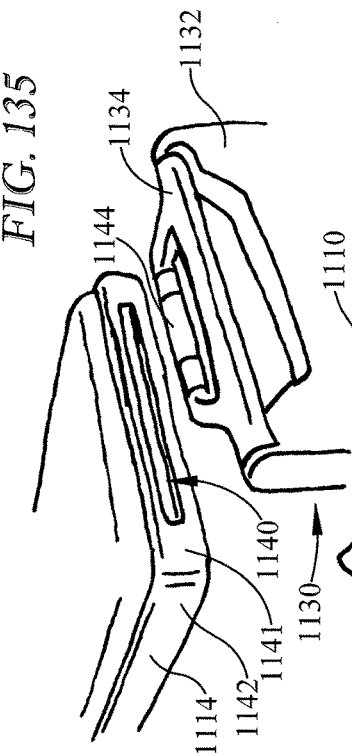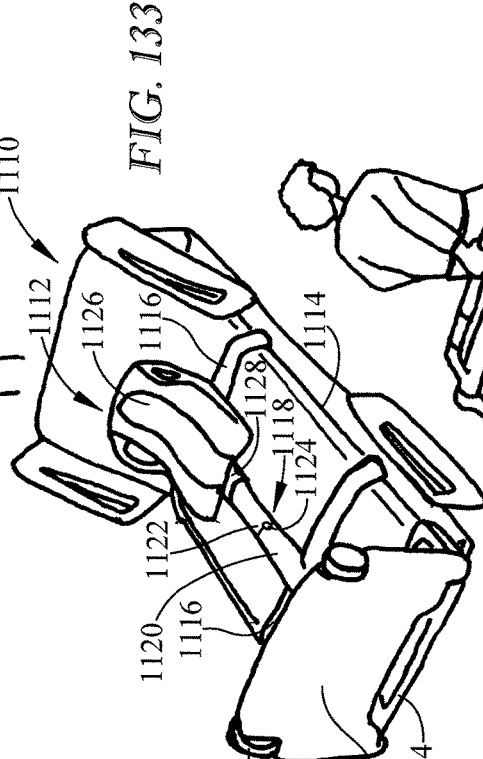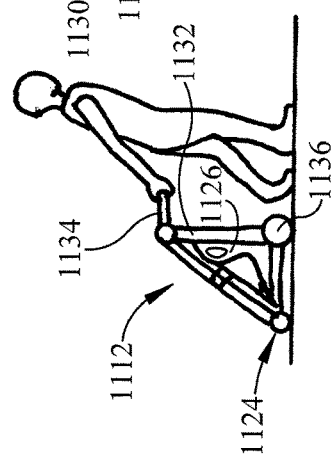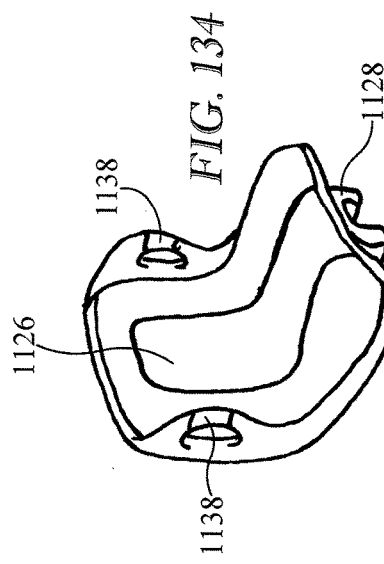

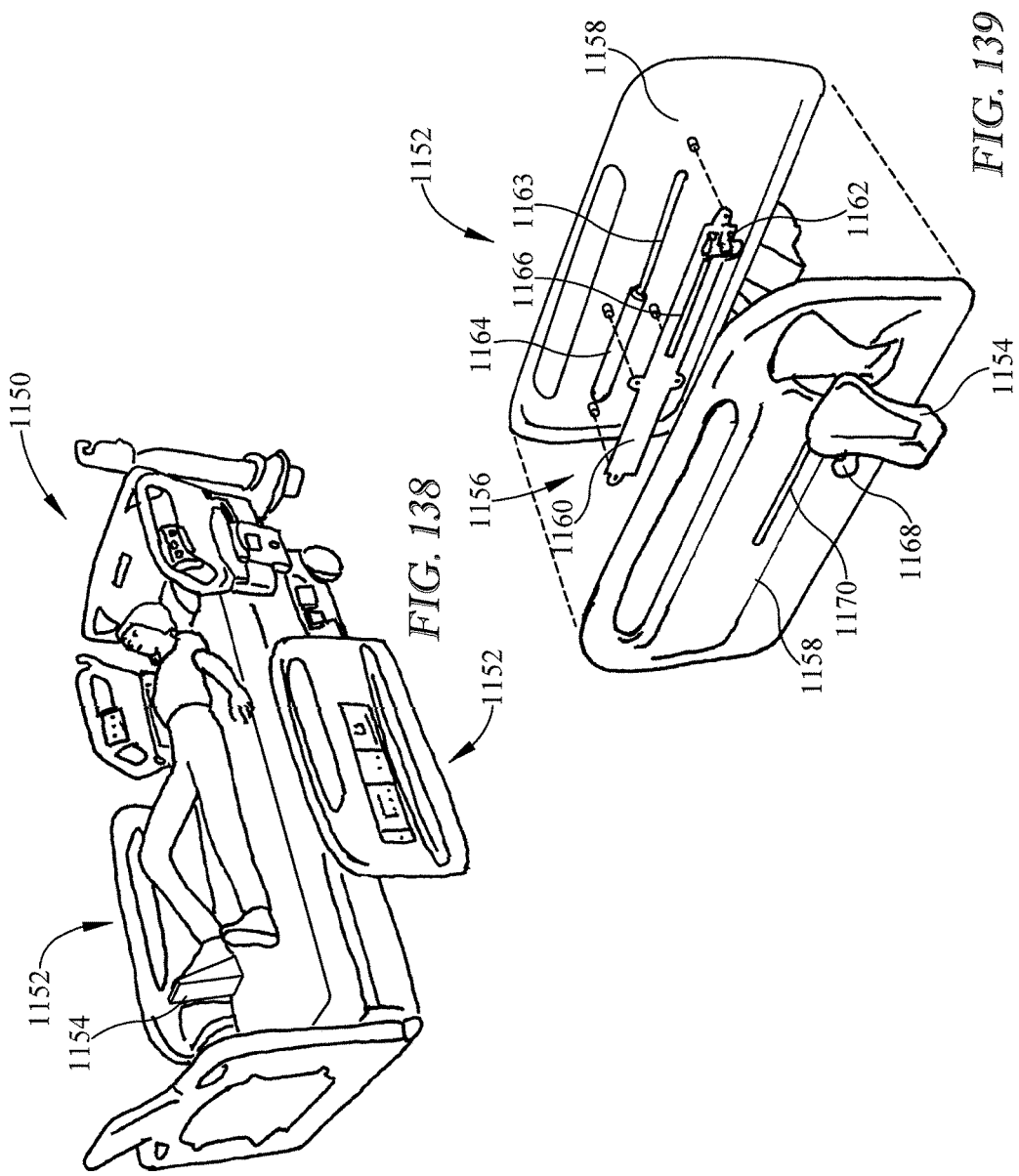

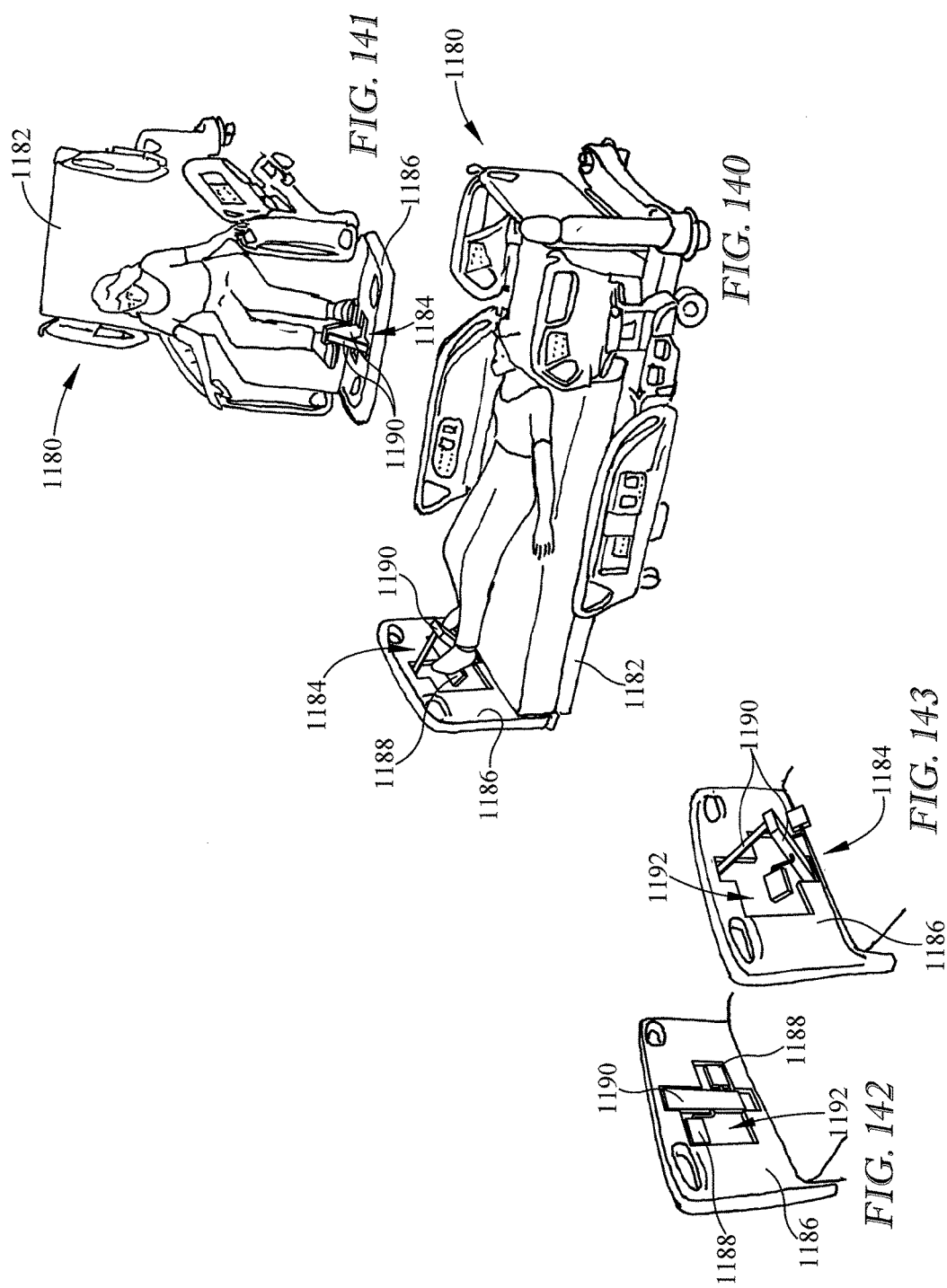

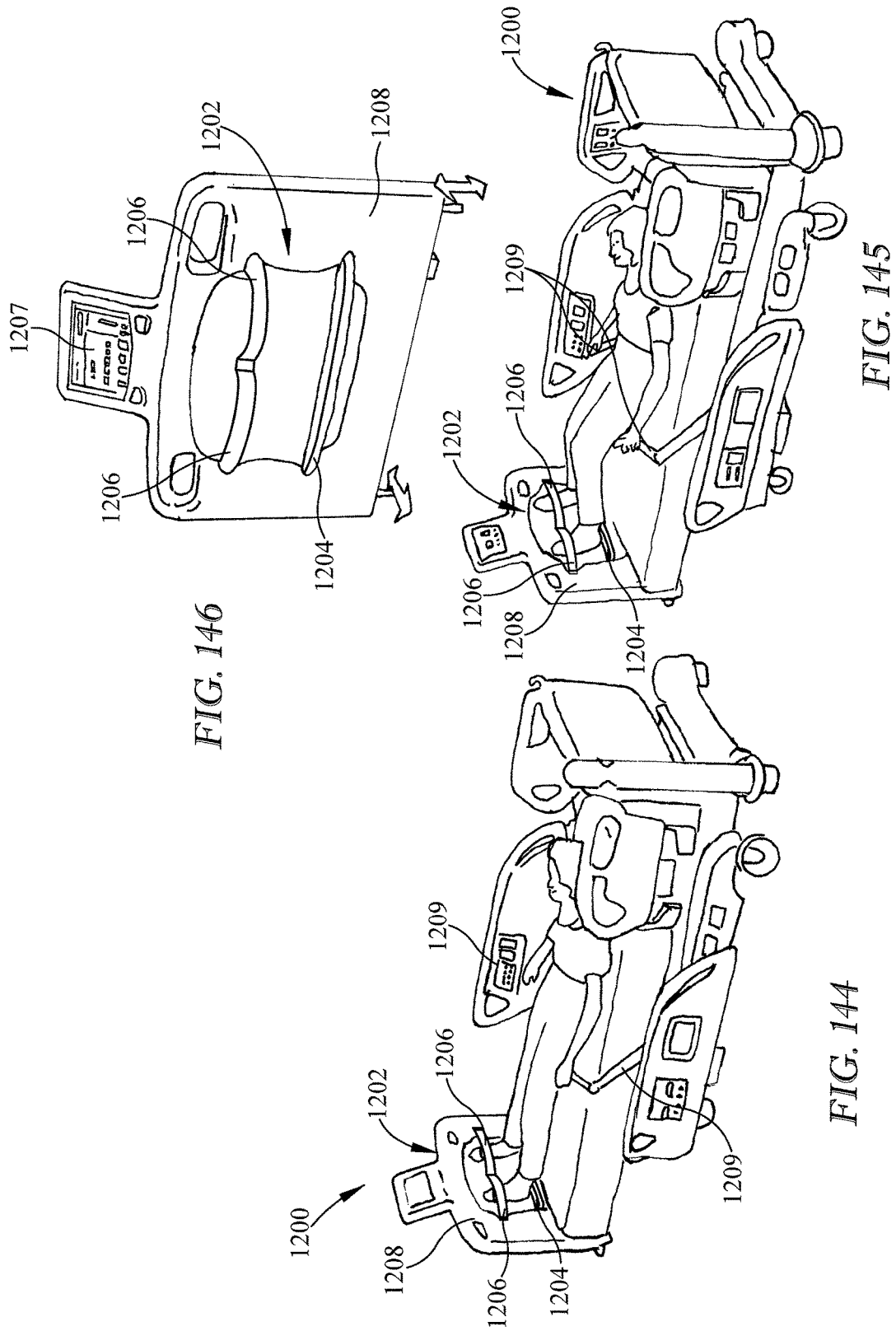

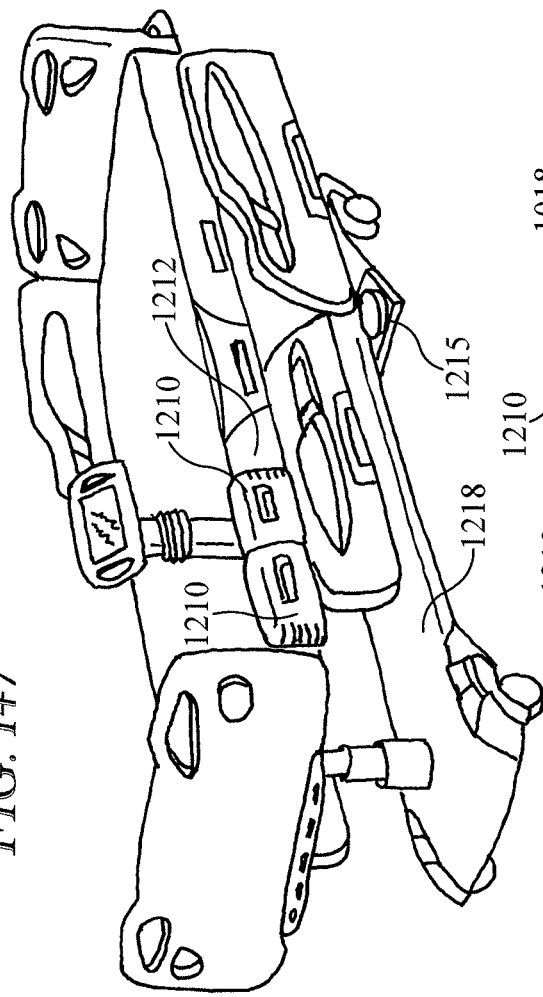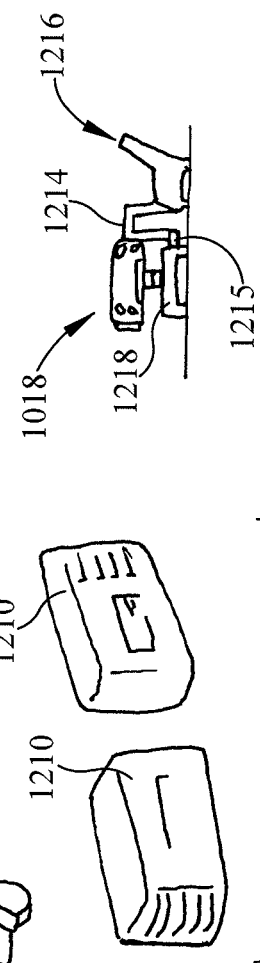

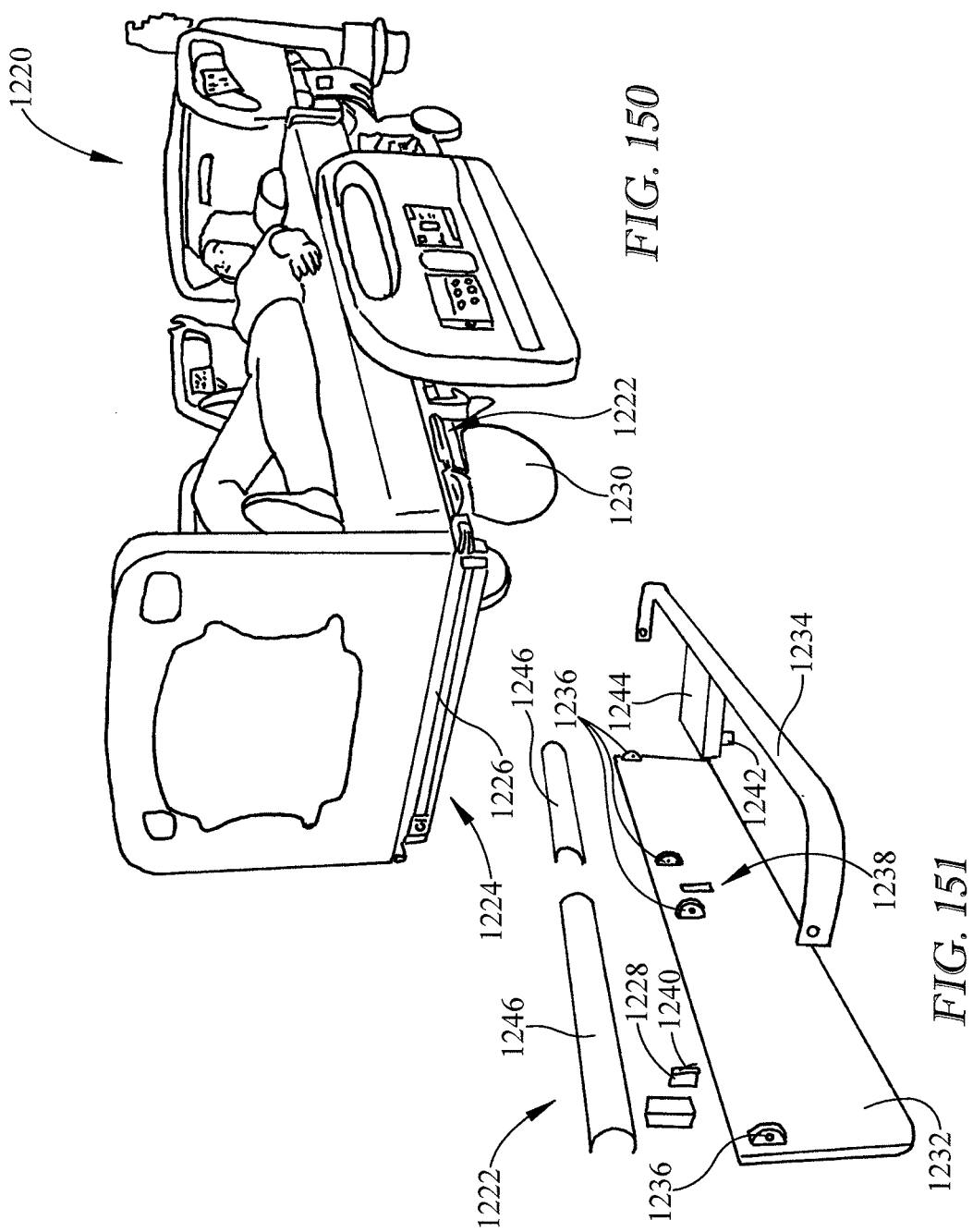

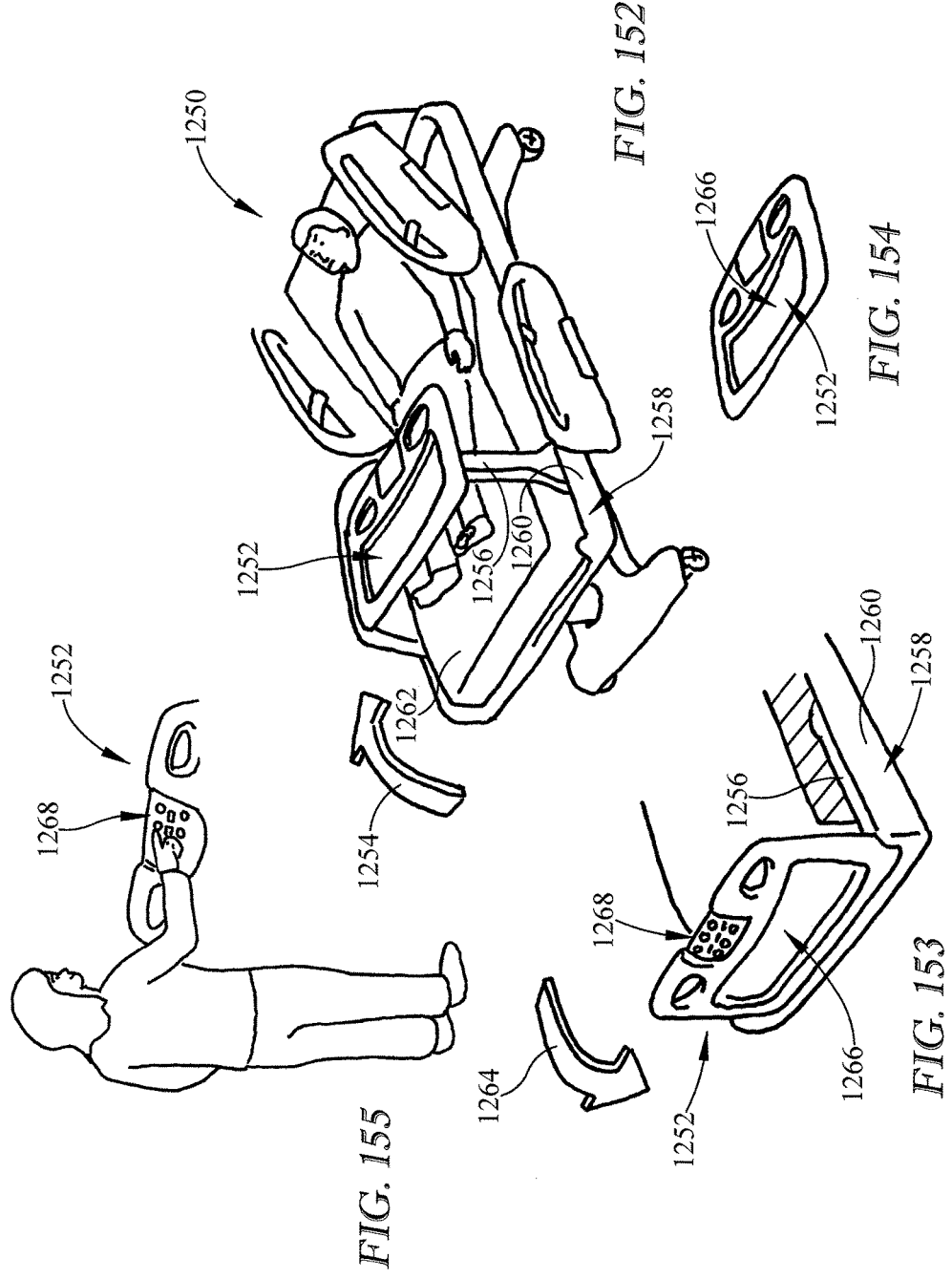

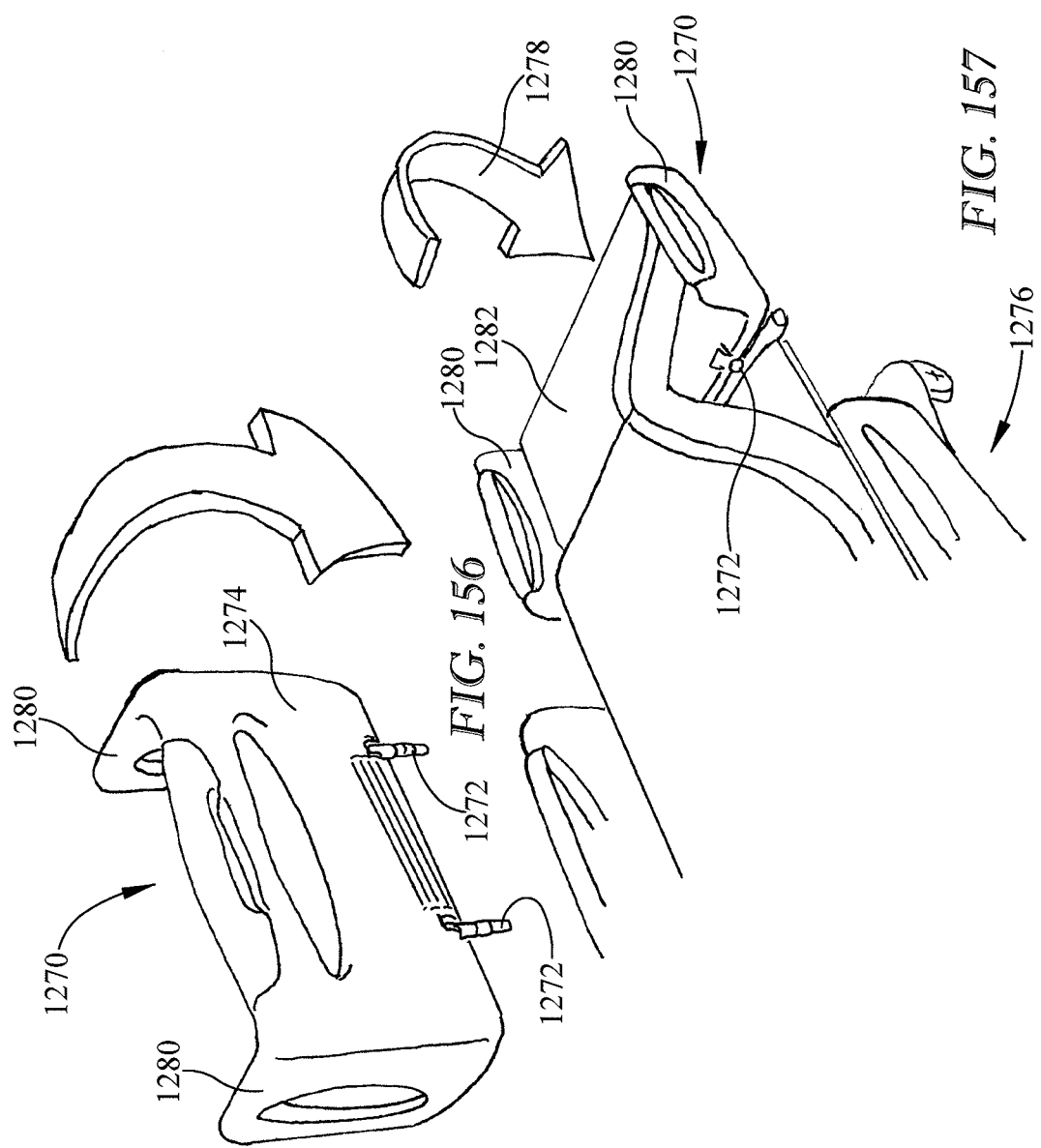

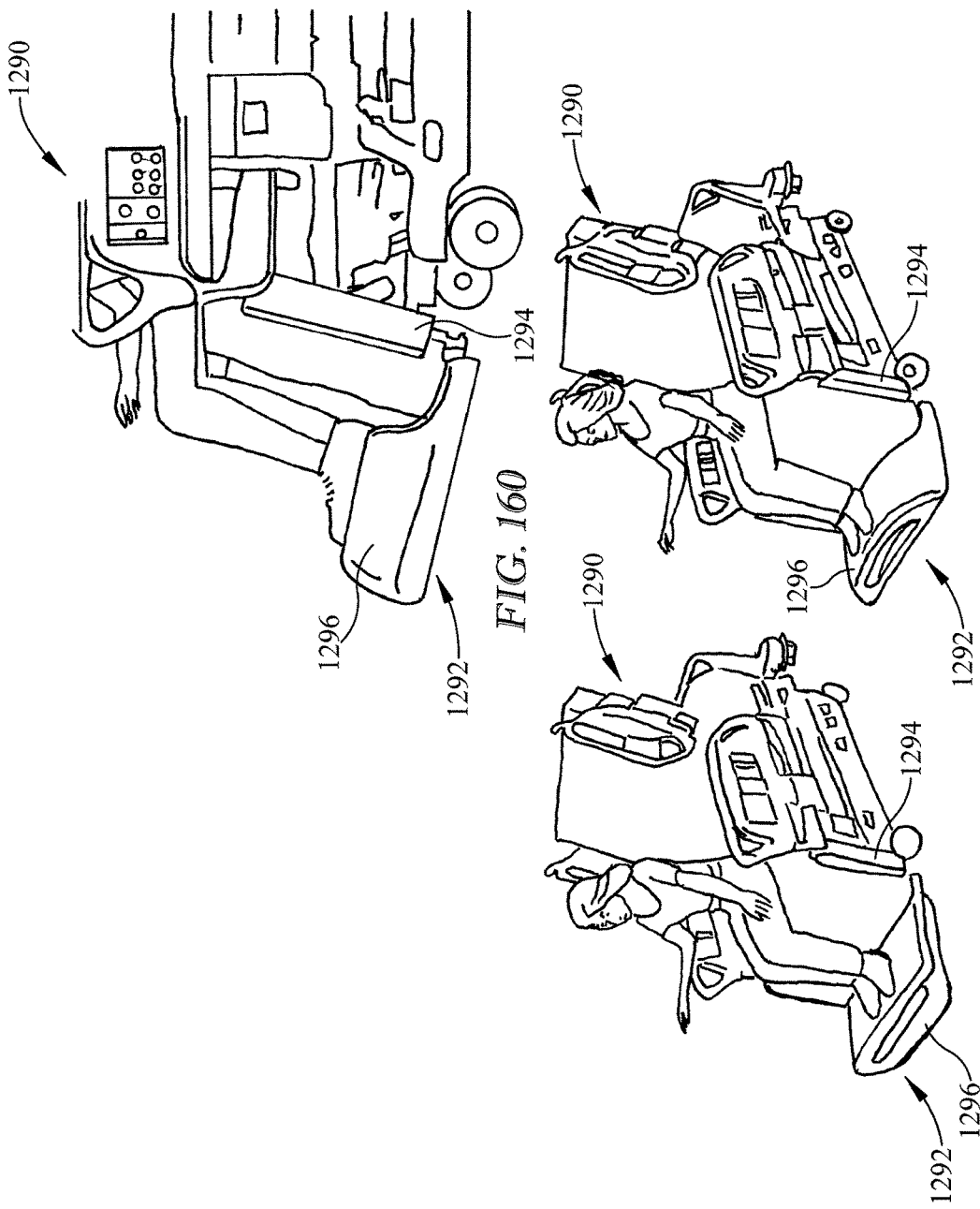

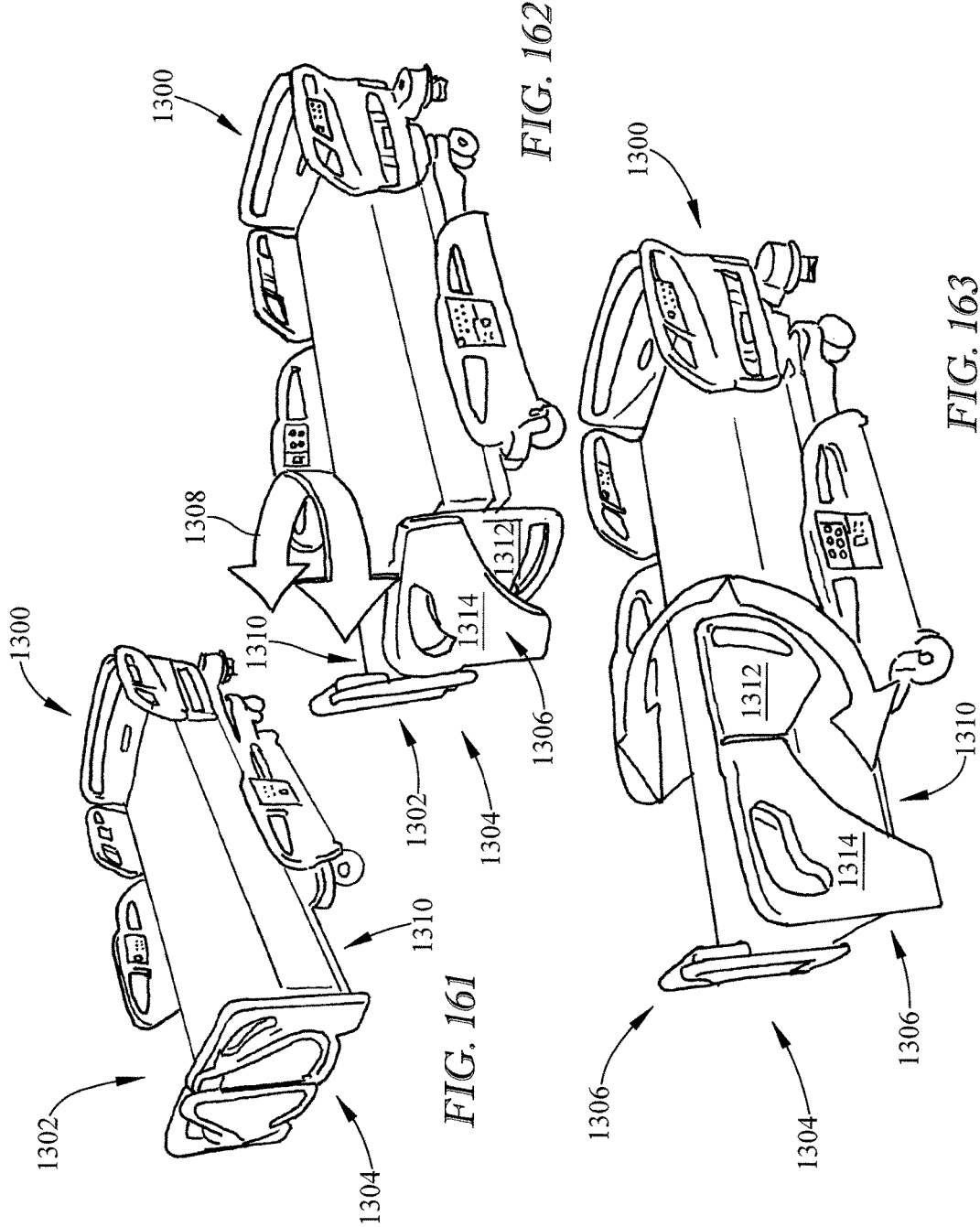

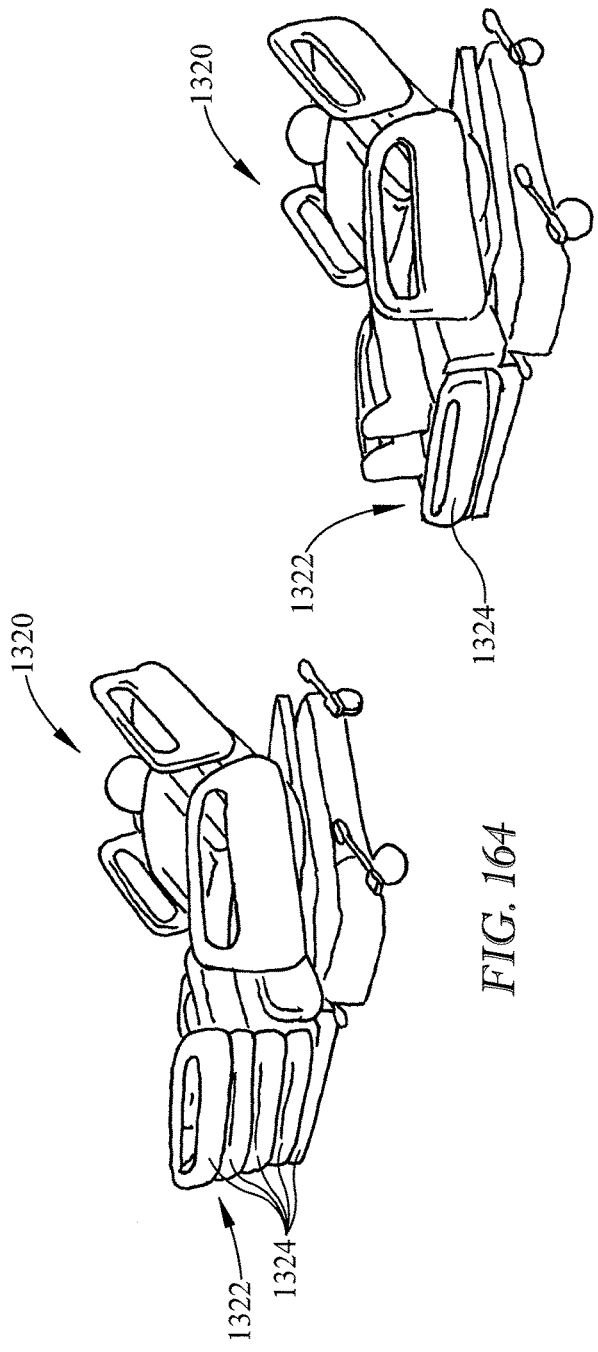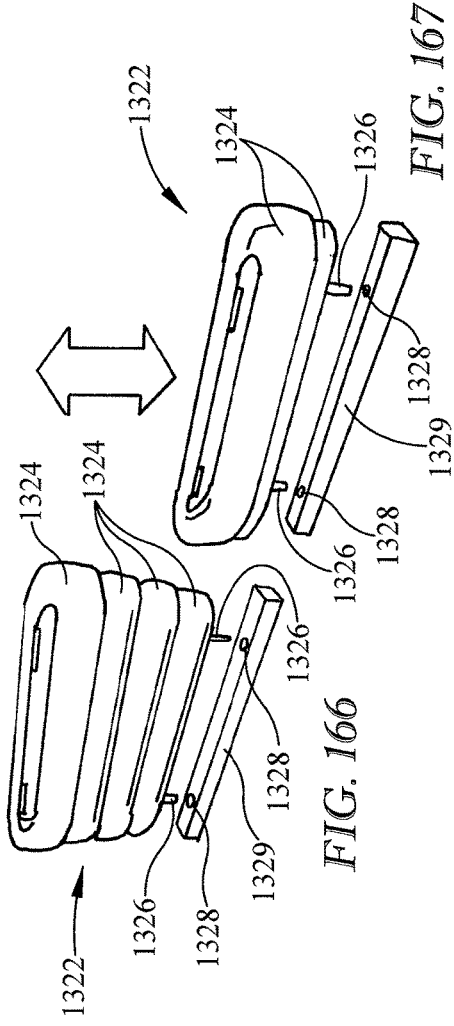

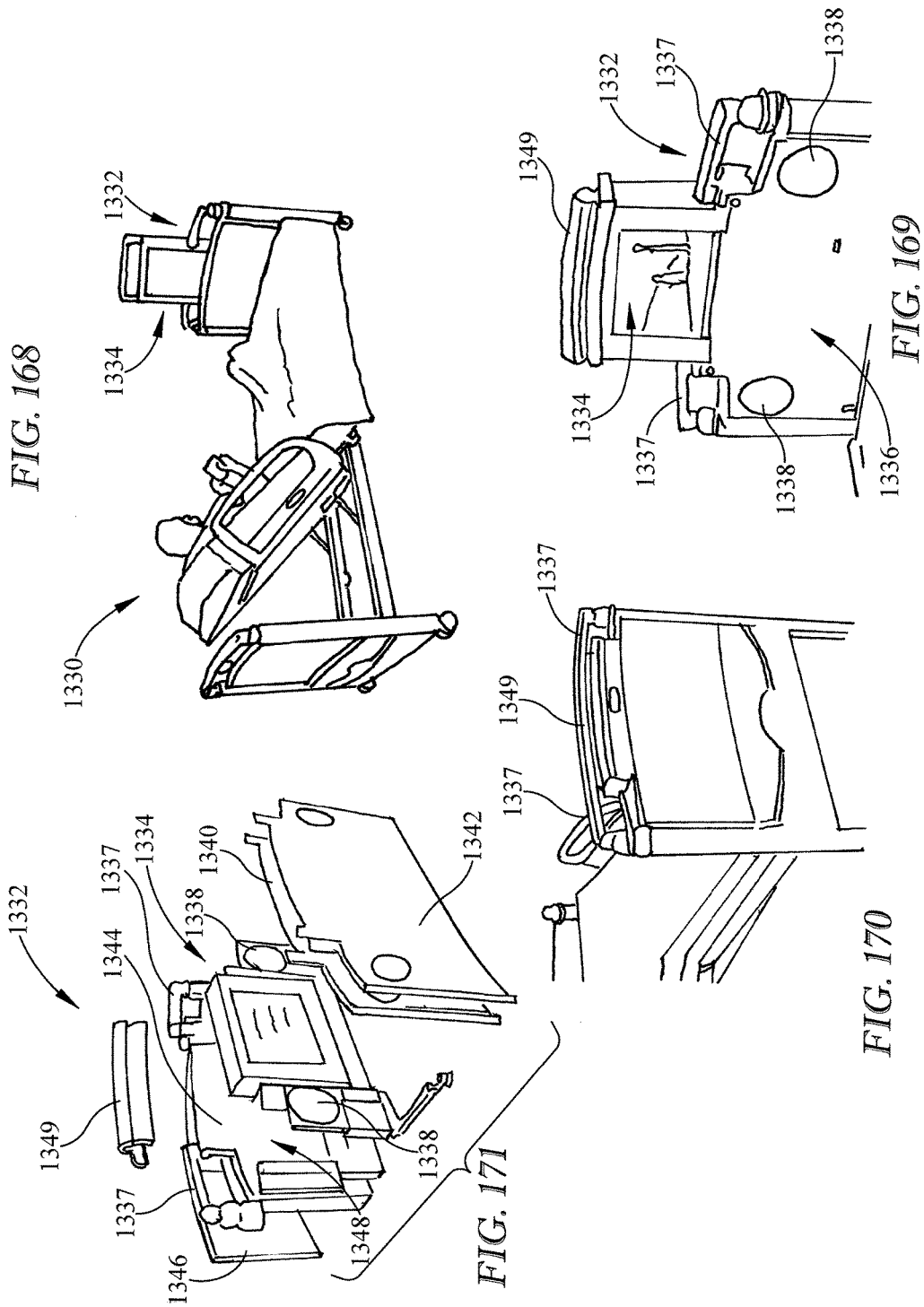

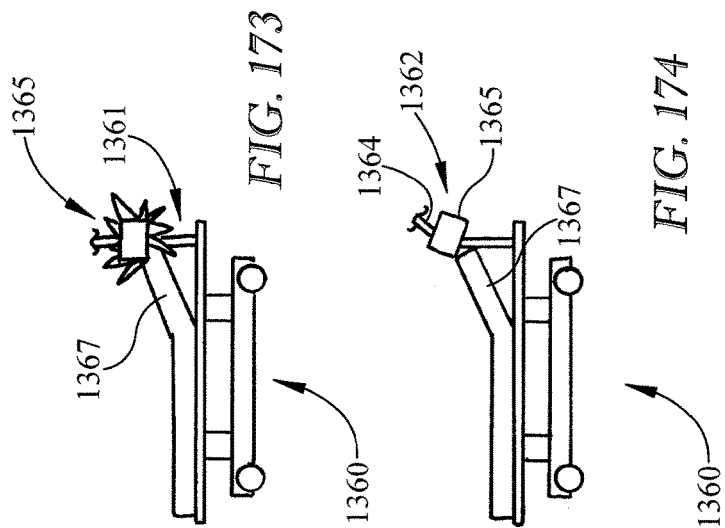
FIG. 173
FIG. 174
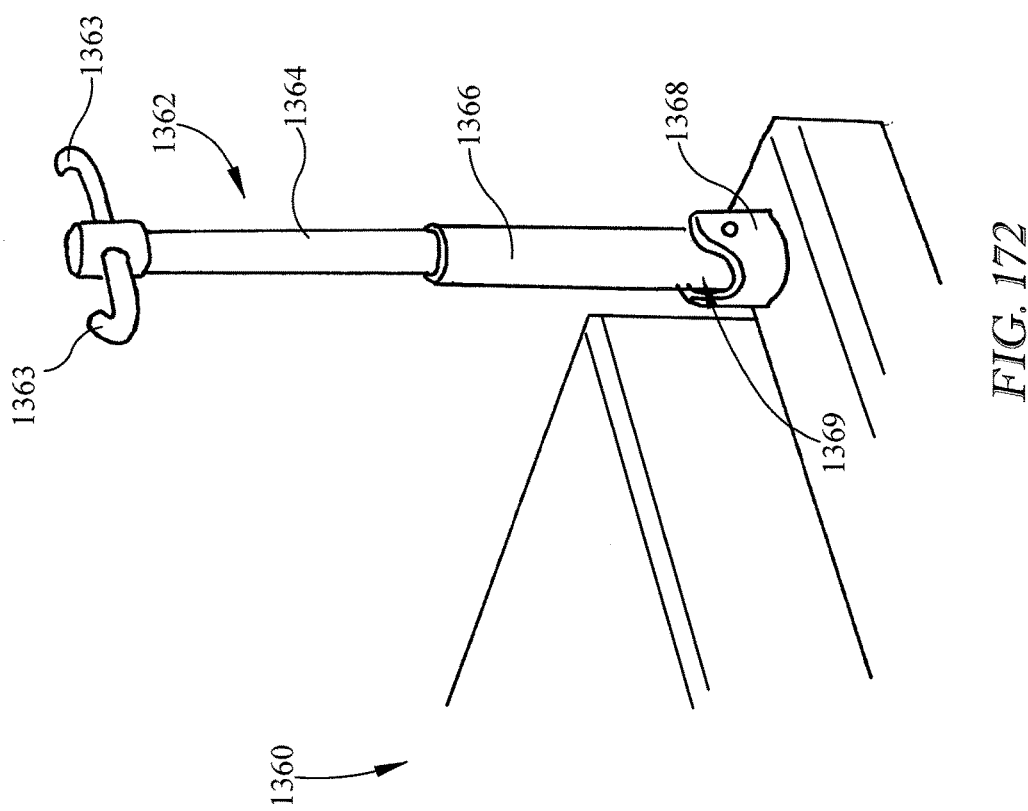
FIG. 172

| "BED EXIT" | "WANDERING ALERT" | PATIENT EXIT ASSIST |
|---|---|---|
| 2 SENSITIVITIES<br>• PATIENT SITS UP<br>• PATIENT MOVES TO EDGE | SEPARATE FROM BED EXIT<br>• ALERTS NURSE WHEN PT. IS OUT OF BED.<br>• DOES NOT SOUND ALARM | PATIENT ACTIVATES BUTTON<br>• LOWERS FOOT RAIL *IF EQUIPPED<br>• RAISES HEAD<br>• LOWERS KNEE<br>• INFLATES SEAT *IF EQUIPPED<br>• ALERTS NURSE<br>• BRIGHTENS NIGHT LIGHT |

FIG. 179

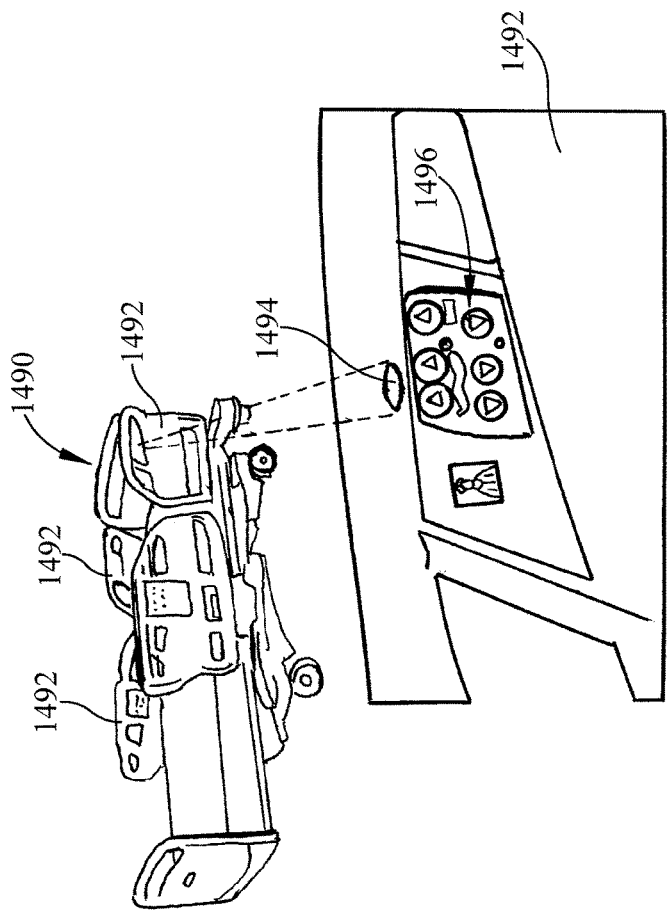
FIG. 195
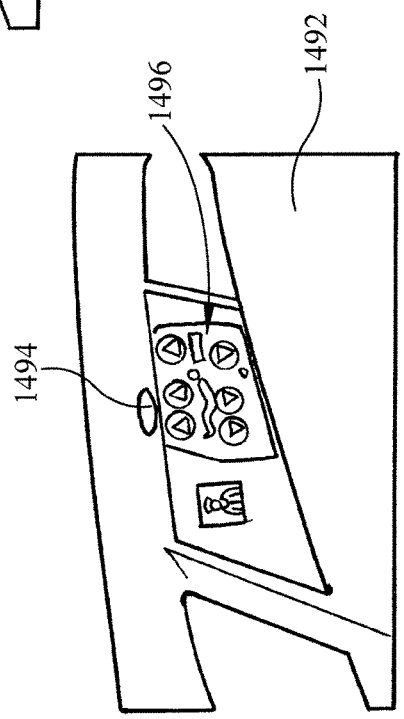
FIG. 196
FIG. 197

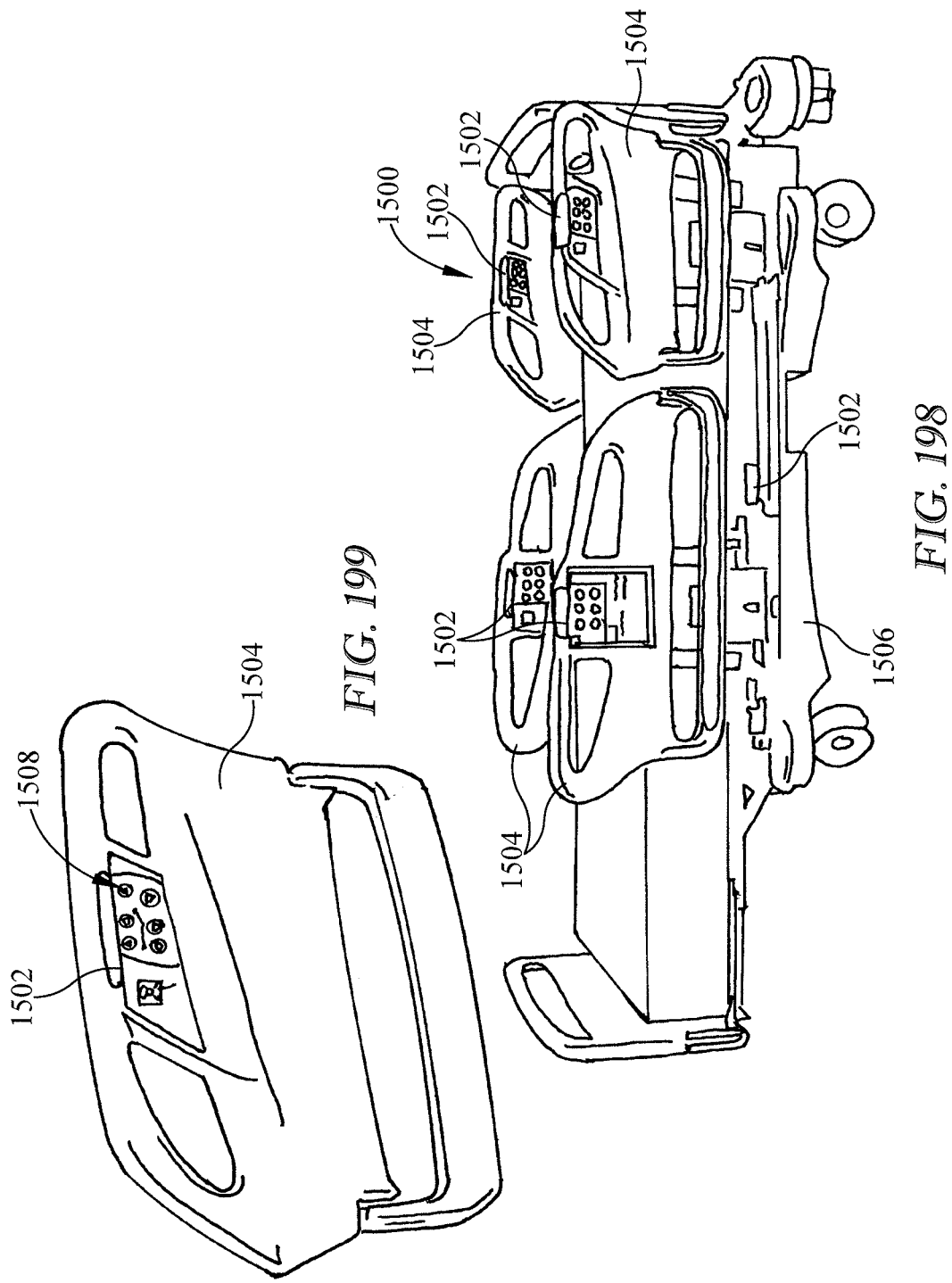

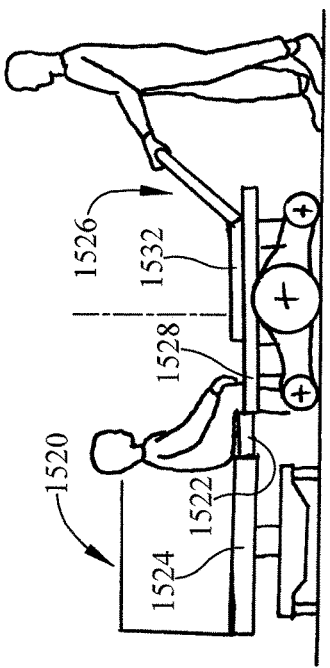
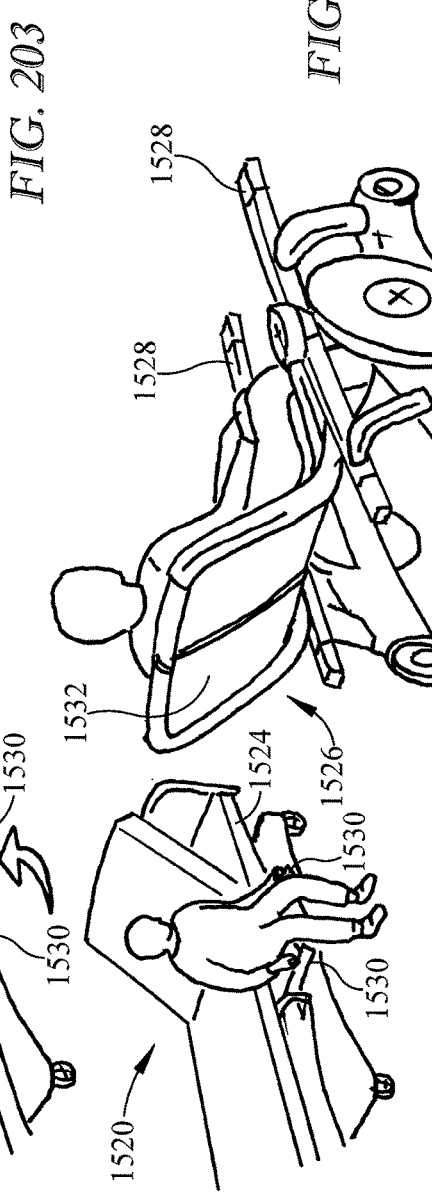
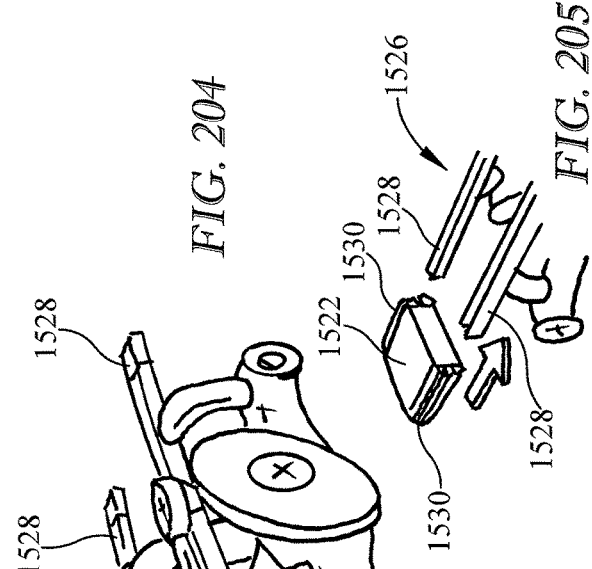
FIG. 201
FIG. 202
FIG. 203
FIG. 204
FIG. 205

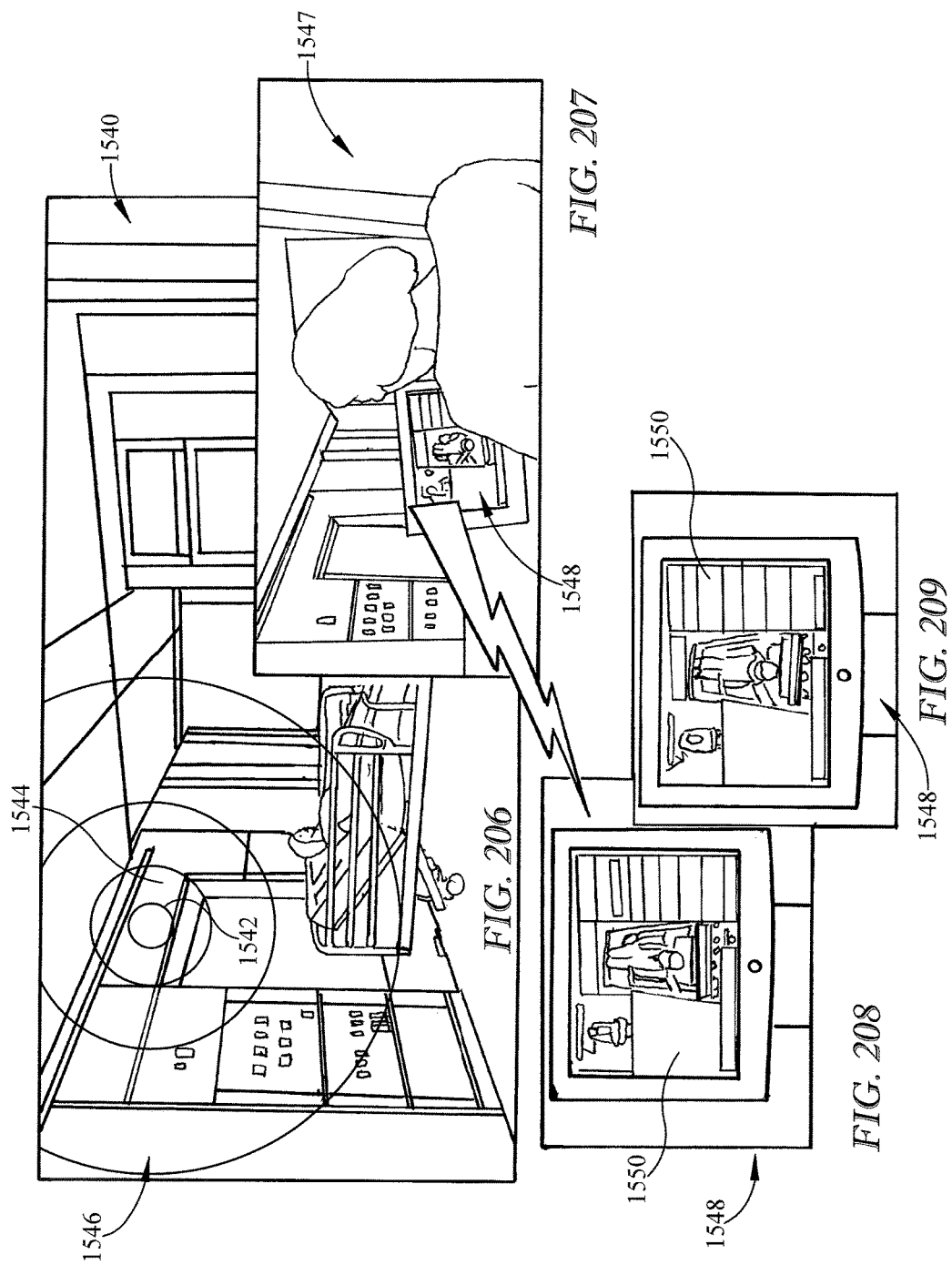

PATIENT BED HAVING TRANSLATABLE SIDERAIL FOR BED EXIT

CROSS REFERENCE TO RELATED APPLICATIONS

The present application is a continuation of U.S. application Ser. No. 15/257,058, filed Sep. 6, 2016, now issued as U.S. Pat. No. 10,004,654, which is a continuation of U.S. application Ser. No. 14/640,182, filed Mar. 6, 2015, now issued as U.S. Pat. No. 9,463,126, which claims the benefit, under 35 U.S.C. § 119(e), of U.S. Provisional Application No. 61/951,236, which was filed Mar. 11, 2014, and each of which is hereby incorporated by reference herein in its entirety.

BACKGROUND

The present disclosure relates to controllers for patient beds and features of bed frames of patient beds that are typically found in healthcare facilities such as hospitals and nursing homes. More particularly, the present disclosure relates to bed frames having enhanced patient and caregiver interaction such as controlling overall bed functionality, siderail positioning for bed exit, patient repositioning within a bed, transfer of a patient from a bed, and patient therapy.

SUMMARY

An apparatus, system, or method may comprise one or more of the features recited in the appended claims and/or the following features which, alone or in any combination, may comprise patentable subject matter:

A bed control cart for controlling features of a patient bed may include a wheeled base with foot inputs, a support extending upwardly from the wheeled base, a GUI supported by the support, the GUI displaying hand inputs, and circuitry configured to send wireless signals to control the features of the bed in response to use of each of the foot inputs and hand inputs of the bed control cart.

In some embodiments, the foot inputs may control raising and lowering of an upper frame of the patient bed relative to a base of the patient bed. Alternatively or additionally, the foot inputs may control tilting of the upper frame of the patient bed between Trendelenburg and reverse Trendelenburg positions.

The wheeled base may include a set of casters. The support of the bed control cart may comprise a pole. The GUI may be mounted to an upper end or top of the pole. A tray may be mounted to the pole beneath the GUI.

In some embodiments, the hand inputs may control motors that may move mattress support deck sections of the patient bed. Alternatively or additionally, the hand inputs may control a pneumatic system that may inflate and deflate portions of a mattress of the patient bed. For example, the hand inputs may control a mattress therapy function of a mattress of the patient bed. The mattress therapy functions may include one or more of the following: a rotation therapy, an alternating pressure therapy, a percussion therapy, a vibration therapy, and a low airloss therapy. Further alternatively or additionally, the hand inputs may control a turn assist function of the patient bed.

In some embodiments, the hand inputs may control a scale system of the bed. The circuitry may be configured to receive wireless communications from the patient bed. The wireless communications from the patient bed may include information relating to one or more alarms occurring on the patient bed. The GUI may, in turn, display information pertaining to the one or more alarms. Alternatively or additionally, the wireless communications from the patient bed may include information relating to a patient weight as measure by a scale system of the patient bed.

In some embodiments, the wireless communications from the patient bed may include information received by the patient bed from a network of a healthcare facility. The hand inputs may be usable to lockout functions of the patient bed from being controlled by user inputs on the patient bed. Optionally, each of the hand controls and foot controls may be able to be locked out from use by user inputs on the patient bed. Alternatively or additionally, the circuitry may be configured to send wireless signals to control features of at least one other piece of healthcare equipment in response to use of any one or more of the foot inputs and the hand inputs.

In some embodiments, the circuitry of the bed control cart may communicatively pair with bed circuitry of the bed after the bed control cart is brought into a patient room in which the patient bed is located. Furthermore, the circuitry may communicatively pair with bed circuitry of other patient beds in other patient rooms after the bed control cart is brought into respective rooms of the other patient beds. At least one user input selection on the hand controls of the GUI may be a prerequisite to the communicative pairing between the circuitry and the bed circuitry. Alternatively or additionally, at least one user input selection on the foot controls may be a prerequisite to the communicative pairing between the circuitry and the bed circuitry. Further alternatively or additionally, at least one user input selection on at least one user input of the patient bed may be a prerequisite to the communicative pairing between the circuitry and the bed circuitry.

A patient bed may have foot rails that may be movable by a patient in the bed to an out-of-the-way position to permit the patient to egress from the bed. The foot rails may slide relative to a bed frame of the patient bed in a longitudinal direction of the bed. A portion of the foot rails may slide relative to a head rail of the patient bed.

A patient bed may have a head rail with a button that is pressed by a patient in the bed to cause motorized lowering of a foot rail of the patient bed.

A patient bed may have a foot rail and linkage system that is manually slideable as a unit on a rail of an upper frame of a bed when a patient actuates a release lever of the foot rail.

A patient bed may have a hub mounted to an upper frame of the patient bed. A head rail and a foot rail may each be pivotably coupled to the hub and may be moveable relative to the hub between respective raised and lowered positions.

A patient bed may have a mattress support deck including a head section having turn assist panels that are cam driven to raised positions.

A patient bed may have an upper frame and a graphical user interface (GUI) mounted to a top of an arm that has its bottom end coupled to the upper frame. The arm and GUI may be repositionable as a unit along the upper frame.

In some embodiments, the GUI may comprise a transparent patient control panel mounted to the arm assembly. The transparent patient control panel may be operable in a day mode and a night mode. Images on the transparent patient control panel may be controlled via organic light-emitting diode/heads up display (OLED/HUD) technology. The arm may have a first arm segment that may extend upwardly from a head deck section and a second arm segment that may extend from an upper end of the first arm over the head deck section.

A patient bed may have a siderail that moves to a raised position elevated over a central region of a mattress of the patient bed for use as part of a patient lift of the patient bed.

A patient bed may have physical therapy equipment integrated therein. For example, the physical therapy equipment may be integrated into a siderail or footboard of the bed. The physical therapy equipment may be attachable to an upper frame of the bed.

A patient bed may have lift posts at corners of an upper frame and siderails coupled to the lift posts by respective multi-axis joints.

A mattress for a patient bed may have siderail pads coupled to a main mattress body and the main mattress body may have recesses in an undersurface thereof for storage of the siderail pads.

A patient bed may have a GUI with a sensor to sense movements of a patient's hand at a distance so that a patient is able to control features of the patient bed without directly touching the GUI. In some embodiments, a hand avatar may be shown on the GUI when the sensor senses the patient's hand.

A control module for a patient bed may include a first pendant and a second pendant that may be held in place against the first pendant by a spring loaded clamp. In some embodiments, the first pendant may have bed controls and the second pendant may have a nurse call button.

A patient bed may have a port that may be connectable to a handheld electronic device to recharge the handheld electronic device and to download bed control software to the handheld electronic device. The handheld electronic device may comprise a phone or a tablet computer, for example.

In some embodiments, the patient bed may include a frame that may have a barrier extending upwardly with respect to a patient support surface and the port may be provided on the barrier. For example, the barrier may comprise a siderail. Optionally, user inputs may be coupled to the siderail to control one or more features of the patient bed. The siderail may comprise a first siderail and the patient bed may further include a shelf and a second siderail that may be spaced from the first siderail. The shelf may be attached to the second siderail, for example. The shelf may be pivotable relative to the second siderail to a plurality of positions. The patient bed may include a mattress and the shelf may be pivotable relative to the second siderail between a first position overlying the mattress and a second position extending in an opposite direction away from the mattress.

In some embodiments, a control panel housing may be pivotable relative to the siderail between a raised position and a lowered position. The control panel housing may move upwardly out of a recess in the siderail when moving from the lowered position to the raised position. The patient bed may include a mattress and the control panel housing may carry caregiver controls that may face away from the mattress when the control panel housing is in the raised position and the control-panel housing may have patient controls that may be provided on an edge of the control panel housing.

A patient bed may have a control module with caregiver controls on one surface and having patient controls on another surface.

A patient bed may have a control module that may include a generally vertical arm extending upwardly from a base of the patient bed, a GUI mounted to an upper end of the arm, and at least one foot pedal mounted to a lower end of the arm. The GUI and at least one foot pedal may be used to send wireless signals to other bed electronics of the patient bed. In some embodiments, the control module may be repositionable along the base. Alternatively or additionally, a housing for the GUI may have patient controls on a back wall thereof.

A siderail may have a trough along its upper edge for receipt of patient care lines.

A patient bed may have a GUI in a siderail that may deploy automatically out of a cavity in a siderail to a use position in response to a brake pedal of the patient bed being moved to a brake position to brake casters of the patient bed. The GUI may be moved automatically back into the cavity in response to the brake pedal being moved to another position other than the brake position.

A patient bed may have a sensor to sense presence of a user's foot in a designated region and movement of the user's foot into the designated region may cause a preselected feature of the patient bed to operate.

The patient bed may further have a control panel that may be used to select the preselected feature from among a plurality of bed features to bed operated subsequently by movement of the user's foot into the designated region. The patient bed may have a frame that may include a base frame and an upper frame supported above the base frame. The control panel may be coupled to the upper frame. The designated region may be defined by a light curtain beneath the base frame. Interruption of the light curtain by the user's foot may result in operation of the preselected feature. For example, the patient bed may have a mattress and the preselected feature may include a turn assist function of the mattress.

A patient bed may have a siderail with an integrated line clip.

A patient bed may have a drainage bag holder including a bar and a sensor to sense when a drainage bag is coupled to the bar.

The drainage bag holder may be located at a foot end of an upper frame of the bed. The drainage bag holder may include a substantially vertically oriented plate and the bar may be pivotably coupled to the substantially vertically oriented plate. In some embodiments, pivot tabs may extend from the plate and the bar may be pivotably coupled to the pivot tabs. The drainage bag holder may further include a pair of cosmetic trim pieces that may be situated on the substantially vertically oriented plate between respective pairs of pivot tabs.

In some embodiments, the sensor may include a limit switch that may be received in a hole formed in the substantially vertically oriented plate. The limit switch may have a lever that is contacted and moved to a closed position by an arm that may extend from a shelf of the bar when the drainage bag is attached to the bar.

A patient bed may have a footboard that flips up to serve as an overbed table.

A patient bed may have a footboard that flips down to serve as a foot deck extension for the patient bed.

A patient bed may have a footboard with telescopic segments that may move between extended and retracted positions.

A patient bed may have a footboard with an integrated television unit. The television unit may store downwardly in a footboard body and may raise upwardly out of the footboard body for viewing.

A patient bed may project a lighted bed exit zone image onto a floor at a side of the bed.

In some embodiments, the lighted bed exit zone image may include text that may indicate a status of a position of an upper frame of the bed relative to a lower frame of the bed. For example, the text may include the words "BED NOT LOW" if the upper frame of the bed is not in a lowered position relative to the lower frame. The words "EXIT ZONE" also may appear in the lighted bed exit zone image in some embodiments. The lighted bed exit zone image may be generally semicircular in overall shape but all other shapes are within the scope of this disclosure.

A patient bed may light up an icon on a footboard to notify a patient not to get out of the bed.

A patient bed may light up icons on a footboard to indicate a status of monitored features of the patient bed.

The icons may be illuminated green to indicate a satisfactory status of an associated monitored bed feature. The icons may be illuminated a color other than green to indicate an unsatisfactory status of the associated monitored condition. The icons may be unlit if the associated feature of the bed is not being monitored. The icons may comprise translucent portions of a wall of the footboard. The patient bed may further include lights that may be situated behind the translucent portions.

A patient bed may project icons onto a floor near a foot end of the bed and may project a message onto the floor near a side of the bed.

In some embodiments, each of the icons may indicate a status of a respective monitored feature of the bed. The message may advise the patient to call a nurse if the patient desires to get out of the bed. The icons may be illuminated green to indicate a satisfactory status of an associated monitored feature. The icons may be illuminated a color other than green to indicate an unsatisfactory status of the associated monitored feature. In some embodiments, each icon is not projected onto the floor if the associated feature of the bed is not being monitored.

A patient bed may have a footboard with a foot warmer.

A patient bed may have a camera that automatically takes a picture of a patient on the bed when a weight scale reading is taken. In some embodiments, the weight reading and the picture may be transmitted from the bed to a remote computer.

A patient bed may have sensors in surfaces of the bed to sense whether the bed is clean or dirty and may have a display to indicate whether the bed is clean or dirty.

In some embodiments, the surfaces of the bed having at least one of the sensors may include a surface of a siderail of the bed. Alternatively or additionally, the surfaces of the bed having at least one of the sensors may include a surface of an endboard of the bed. In some embodiments, the sensors may detect cleaning agents. The patient bed may include a lighted sign that may display a message to indicate whether the bed is clean or dirty. The lighted sign may be coupled to a footboard of the bed, for example. The lighted sign may face away from a mattress of the bed. In response to the sensors indicating that the bed is clean and in response to a weigh scale system indicating a patient is not on the bed, the weigh scale system may be automatically zeroed.

A patient bed may have nozzles through which a disinfectant mist is sprayed onto surfaces of the bed.

A patient bed may have integrated UV lights to disinfect surfaces of the bed.

A patient bed may have an egress seat that may deploy out of an upper frame of the bed for a patient to sit during egress. A wheeled chair may dock with the egress seat. The wheeled chair may have arms that may be received by channels at the sides of the egress seat when the wheeled chair is docked to the egress seat.

In some embodiments, the egress seat may deploy laterally outwardly from the upper frame in a direction substantially perpendicular to a long dimension of the bed. The arms may be configured so that the patient stands between the arms when moving from the egress seat onto a set of the wheeled chair. The arms and channels may be substantially at the same elevation and oriented horizontally when an upper frame of the bed is in a lowered position relative to base of the bed.

A patient bed may have a frame, a siderail that may be coupled to the frame and that may be moveable relative to the frame between a raised position and a lowered position, and an egress handle that may be movable upwardly out of a top opening of the siderail from a storage position to a use position. An upper end region of the egress handle may be gripped by a patient during egress from the bed when the siderail is in the lowered position.

The siderail may comprise a foot rail and the patient bed may further include a head rail that may be coupled to the frame. The siderail may include a siderail body that may have a channel and the egress handle may be received in the channel for movement between the storage and use positions. The channel may be inclined such that the egress handle may move within the channel along a path that is neither horizontal nor vertical.

The egress handle may have a recess that may facilitate the patient gripping the upper end region. The patient bed may further include a lock to lock the egress handle in the raised position relative to the siderail.

In some embodiments, the patient bed may further have a second egress handle that may be movable relative to the siderail. For example, the second egress handle may be extendable horizontally from a head end of a body of the siderail to provide a grip handle for use by a patient during egress from the bed when the siderail is in the raised position.

A patient bed may include a frame and a siderail that may be coupled to the frame. The siderail may have a main body and a shelf may be coupled to the main body. The shelf may have a use position extending from the siderail in a cantilevered manner. The patient bed may also have an inductive charger that may be coupled to the shelf. The inductive charger may be operable to inductively recharge electrical devices placed upon the shelf.

The shelf may be movable relative to the siderail between the use position and a storage position. The inductive charger may be situated beneath an upper surface of the shelf. For example, the inductive charger may be situated in an interior region of the shelf. The inductive charger may be supported by an upper surface of the shelf. For example, the inductive charger may be embedded in a recess in the upper surface of the shelf. In such embodiments, an upper surface of the inductive charger and the upper surface of a remainder of shelf around the recess may be substantially coplanar. The electrical devices that the inductive charger may be operable to inductively recharge include one or more of the following: a smart phone, a tablet computer, and a laptop computer.

A patient bed may include a frame that may have an upper frame and generally vertical lift legs at corners of the upper frame. At least one caster shroud may have at least one aperture through which a corresponding one of the lift legs may extend.

The lift legs may extend and retract such that the at least one shroud and the upper frame may move upwardly and downwardly relative to the lift legs. The patient bed may have at least one caster beneath the at least one caster shroud and when the lift legs are fully retracted, the upper frame may be in a lowered position having the at least one caster engaging a floor beneath the at least one caster shroud. When the lift legs are extended from the fully retracted position, the at least one caster may be moved upwardly out of contact with the floor. The at least one caster shroud may be coupled to the upper frame to move upwardly and downwardly therewith as the lift legs extend and retract.

A patient bed may include a frame, a footboard that may be coupled to the frame, an arm that may extend from the footboard over a patient support surface of the frame, and a control unit that may be mounted to an end of the arm. The control unit may include a graphical user interface (GUI) and a sensor to sense movements of a patient's hand at a distance so that a patient may be able to control features of the patient bed without directly touching the GUI.

In some embodiments, a hand avatar may be shown on the GUI when the sensor senses the patient's hand. The control unit may include at least one grip handle arranged to be grabbed by a patient during egress from the patient bed. The at least one grip handle may be located below the GUI. The patient bed may further include caregiver controls that may be located on a side of the control unit.

A patient bed may include a frame that may have a first end and a second end. The first end of the frame may include a laterally extending rail. A collar may be mounted to the rail and may be repositionable along the rail. An oxygen tank holder may be attached to the collar to move with the collar along the rail.

In some embodiments, the oxygen tank holder may include a cylindrical wall. The oxygen tank holder may be offset from the collar by an arm. The rail may be arched in some embodiments. The rail may be generally triangular in cross section and the collar may be shaped complementary to the rail The patient bed may further include a patient helper that may have a first arm portion that may extend upwardly from the collar and a second arm portion that may extend in a generally horizontal cantilevered manner from an upper end of the first arm portion over a patient support surface of the frame. The patient helper may further include a third arm portion that may telescopically extend and retract relative to the second arm portion.

In some embodiments, the patient helper may include a grab bar that may hang at a lower end of a tether that may extend downwardly from an end of the third arm portion. The grab bar may be generally triangular in shape. The grab bar may include a tubular portion that may have a pair of hand grip areas. The grab bar may include a patient control housing with patient controls that may be used to control one or more functions of the patient bed.

A patient bed may include a patient position monitoring system that may have a first mode of operation in which an alarm may be generated at the patient bed and an alert message may be sent to a nurse call system in response to a threshold amount of movement of a patient relative to the patient bed. The patient position monitoring system may have a second mode of operation in which an alert may be sent to the nurse call system but no alarm may be generated at the patient bed in response to the threshold amount of movement of the patient relative to the patient bed.

In some embodiments, the patient position monitoring system may have a third mode of operation in which an alarm may be generated at the patient bed and an alert message may be sent to a nurse call system in response the patient moving by a lesser amount than the threshold amount relative to the patient bed. The lesser amount may correspond, for example, to the patient sitting up in the patient bed or moving to the edge of the patient bed. The threshold amount of the first and second modes may correspond to the patient being out of the bed, if desired.

The patient bed may further include a patient exit assist input that, when selected, may result in at least one siderail of the patient bed moving automatically from a raised position to a lowered position. Alternatively or additionally, selection of the patient exist assist input may cause a head section of a mattress support deck of the patient bed to raise to a predetermined position if the head section is lower than the predetermined position when the patient exit assist input is selected. Alternatively or additionally, selection of the patient exit assist input may cause a thigh and foot section of a mattress support deck of the patient bed to lower if they are raised when the patient exist assist input is selected. Alternatively or additionally, selection of the patient exit assist input may cause at least one bladder of an air mattress to be inflated to a target pressure if the bladder has a lower pressure than the target pressure when the patient exit assist input is selected. In some embodiments, the at least one bladder may include or be included in a seat section of the air mattress.

In some embodiments, an exit assist alert may be sent from the patient bed to a nurse call system in response to the selection of the patient exit assist input. Alternatively or additionally, a night light of the patient bed may be illuminated brighter in response to the selection of the patient exit assist input. In some embodiments, the patient exit assist input may include a button that may be selected by pressing the button.

According to this disclosure, a system may include a patient bed that may include a scale system and a radio frequency identification (RFID) tag reader. The system may also have one or more RFID tags that may be programmable with equipment weight data. The RFID tags may be attachable to respective equipment to be added to the patient bed. The RFID tag reader may read the RFID tags of the equipment added to the bed. In response to the RFID tag reader reading the RFID tag of corresponding equipment added to the bed, the scale system may recalculate a tare weight to account for a weight of the equipment added to the bed.

A mattress control box may comprises the equipment added to the bed although the RFID tags may be used in connection with any desired equipment that may be added to a bed. In some embodiments, each of the RFID tags may include a connector, such as a universal serial bus (USB) connector. Each of the RFID tags may include a cover that may be removable from the remainder of the respective RFID tag to expose the USB connector.

The may further include a computer and the USB connector of the RFID tag may be coupled to a USB port of the computer to be programmed by the computer with the equipment weight data of respective equipment. Alternatively or additionally, the USB connector of the RFID tag may be coupled to a USB port of the computer to have a battery of the RFID tag charged.

Also according to this disclosure, a patient bed may include a siderail that may have a urinal dock. The urinal dock may include a recess for a handle of a urinal. The siderail may include a coupling bar that may extend across the recess to retain the handle of the urinal in the recess when the urinal is docked to the siderail. The recess may be open at a top edge of the siderail.

In some embodiments, the siderail may further include a grab handle that may be below the recess. Alternatively or additionally, the siderail may include a channel that may be configured to receive a portion of a control pendant alongside the recess. For example, the channel may be complementary in shape to a shaped edge of the control pendant. If desired, a top edge of the siderail may include a line manager. The line manager may comprise a notch that may be situated alongside an opening to the recess that may be located at the top edge of the siderail.

Many other patient bed embodiments and features are disclosed below. Thus, additional features, which alone or in combination with any other feature(s), such as those listed above and those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which:

FIG. 1 is a perspective view of a patient bed having four siderails including a pair of foot rails that each overlap a respective head rail of a pair of head rails, each foot rail being manually movable by a patient;

FIG. 2 is a perspective view of the bed of FIG. 1 showing a patient being supported by the bed and showing the foot rails in a first position blocking egress of the patient from the bed;

FIG. 3 is a perspective view of the bed, similar to FIG. 2, showing the patient having manually moved one of the foot rails to a second position, a foot end of the foot rail having been translated along an upper frame of the bed and a head end of the foot rail having been translated along the head rail;

FIG. 4 is a perspective view of the bed, similar to FIG. 3, showing the patient having further manually moved one of the foot rails to a third position so that the patient is able to egress from the bed, the foot end of the foot rail having been translated further along the upper frame of the bed and the head end of the foot rail having been translated further along the head rail;

FIG. 5 is a perspective view of another patient bed having four siderails including a pair of foot rails that each overlap a respective head rail of a pair of head rails, a foot end of each foot rail having a downwardly extending arm that carries an anti-friction element, such as a roller, that is received in a slot formed in a frame member of an upper frame of the bed, and a head end of each foot rail including a slider that couples to an elongated middle tube of the associated head rail;

FIG. 6 is a perspective view showing one of the foot rails in an extended position relative to the associated head rail such that the slider is near a foot end of the head rail;

FIG. 7 is a perspective view showing the foot rail moved to a retracted position relative to the head rail such that the slider is near a head end of the head rail;

FIG. 8 is a perspective view of another patient bed having a button on a head rail that is pressed by a patient to initiate motorized lowering of an associated foot rail;

FIG. 9 is an enlarged side view of the button of FIG. 8;

FIG. 10 is a perspective view showing the foot rail having moved to a lowered position to permit patient egress from the bed;

FIG. 11 is a perspective view of a portion of another patient bed having a foot rail with a lever that is accessible in a hand hole and that is used by a patient to release the foot rail for translational movement along a frame of the bed, a grip handle over the hand hole having a stepped bottom surface to provide grip areas for the patient to hold onto while moving the foot rail in increments toward a head end of the bed;

FIG. 12 is a perspective view of the patient bed of FIG. 11 showing the foot rail having been moved out of the way toward the head end of the bed to permit patient egress from the bed and showing a pendulum cup holder on one of the head rails that maintains a drink cup in a vertical orientation even when the head section and head rails are raised;

FIG. 13 is a perspective view of another patient bed showing a foot rail being rotated by a patient about a hub to a vertical position to permit patient egress from the bed, a head rail also being coupled to the hub;

FIG. 14 is a side view of the foot rail, the head rail, and the hub showing the foot rail and the head rail each being in a respective lowered position;

FIG. 15 is a perspective view of a mattress support deck showing left and right turn assist panels coupled to a head section of the deck and showing the left turn assist panel being articulated upwardly by a cam attached to a longitudinally extending shaft;

FIG. 16 is a perspective view of a patient bed that includes the mattress support deck of FIG. 15 showing a mattress having a portion lifted upwardly by the articulated left turn assist panel;

FIG. 17 is perspective view of a portion of another patient bed showing head and foot rails on one side of a mattress remaining in horizontal alignment even though a head section of a mattress is raised and showing a head rail on an opposite side of the mattress including a head rail portion that pivots upwardly to provide additional egress barrier coverage in the region of the raised head section;

FIG. 18 is a perspective view of one of the head rails of FIG. 17 showing a push button near a head end of the head rail, a patient control panel extending laterally from a foot end of the head rail, and a set of caregiver controls on an inclined surface near the foot end of the head rail;

FIG. 19 is a side view of the portion of the patient bed of FIG. 17 showing the head rail portion pivoting upwardly automatically in response to the head section of the mattress being raised;

FIG. 23 is a perspective view of a portion of yet another patient bed showing head and foot rails each comprising a curved flexible panel and showing a pair of curved guide posts that are located between respective head and foot rails to provide guide channels for a head end of the respective foot rail and a foot end of the respective head rail, a head board having guide channels for head ends of the head rails, a foot board having guide channels for foot ends of the foot rails, and a pair of curved control panels that are extendable from channels formed at upper end regions of the guideposts;

FIG. 24 is a side view of the portion of the patient bed of FIG. 23 showing the head and foot rails in respective lowered positions and showing the guide post folded downwardly to a storage position;

FIG. 25 is a diagrammatic end view of part of the portion of the bed to shown the amount of curvature of one of the siderails;

FIG. 26 is a perspective view of a patient bed containing the portion of FIG. 23 showing the foot rails in lowered positions and showing the head rails in raised positions;

FIG. 27 is a perspective view of a portion of another patient bed having a head rail with a foot end portion pivoted to a head end portion for movement about a generally vertical pivot axis;

FIG. 28 is a perspective view, similar to FIG. 27, showing the foot end portion of the head rail pivoted by about 90° relative to the head end portion of the head rail so that the foot rail portion extends away from an associated mattress to provide a grip handle for patient egress;

FIG. 29 is a perspective view of another patient bed having four siderails that each include an upper section that moves relative to a lower section from a raised position to a lowered position such that when the upper section is in the lowered position, the siderail is compact and can be rotated outwardly away from the mattress and then slid underneath the mattress for storage in an orientation substantially parallel with the mattress;

FIG. 30 is a perspective view showing a foot rail of the siderails in the storage position;

FIG. 31 is a perspective view, similar to FIG. 30, showing the foot rail pulled out from under the mattress and rotated slightly upwardly;

FIG. 32 is a perspective view, similar to FIG. 31, showing the foot rail oriented vertically with the upper section raised relative to the lowered section;

FIG. 36 is a perspective view of the bed of FIG. 33 showing one of the foot rails lowered for patient egress having a first portion of foot rail separated from and situated below a second portion of the foot rail and showing a grip bar connected to a chair and to a base frame of the bed;

FIG. 37 is a perspective view, similar to FIG. 36, showing the patient gripping a handle of the second portion of the foot rail and gripping a handle of the head rail in preparation for standing up from the bed;

FIG. 38 is a perspective view, similar to FIG. 36, showing the patient in a standing position and using the grip bar that interconnects the base frame of the bed and the chair;

FIG. 39 is an end elevation view of a mattress support deck, a mattress and a pair of siderails, showing one of the siderails pivoting toward a position parallel with an upper surface of the mattress for eventual storage under the mattress support deck;

FIG. 40 is a perspective view of a model constructed in accordance with FIG. 39 showing a siderail in a storage position beneath a section of the mattress support deck;

FIG. 41 is a perspective view, similar to FIG. 40, showing the siderail being pulled out from under the mattress support deck and being pivoted partially toward a raised position;

FIG. 42 is a perspective view, similar to FIG. 41, showing the siderail in the raised position;

FIG. 43A is a perspective view of a siderail assembly having upper and lower siderail body sections and a pair of linkage arms extending from a bottom of the lower siderail body section;

FIG. 43B is a perspective view of one of the linkage arms showing that the linkage arm has X, Y and Z segments;

FIG. 44 is a perspective view of a model constructed in accordance with FIGS. 43A and 43B showing the siderail in a lowered position;

FIG. 45 is a perspective view, similar to FIG. 44, showing a user grabbing part of the upper siderail body section in preparation for raising the siderail;

FIG. 46 is a perspective view, similar to FIG. 45, showing the user raising the siderail to an intermediate position;

FIG. 47 is a perspective view, similar to FIG. 46, showing the siderail in the raised position;

FIG. 50 is a perspective view of another patient bed showing that the bed frame of the bed lacks traditional siderails and showing a pair of grab bars in storage positions below a mattress support deck of the bed;

FIG. 51 is a perspective view, similar to FIG. 50, showing barrier air bladders situated along the sides of the mattress inflated to provide barriers to inhibit the patient from falling out of the bed;

FIG. 52 is a perspective view, similar to FIG. 51, showing the barrier air bladders at the sides of a foot section of the mattress being in a deflated state while the other barrier air bladders remain inflated;

FIG. 53 is a perspective view similar to FIG. 51, showing the barrier air bladder along one of the sides of the mattress deflated to permit patient egress from the bed and showing the grab bars pivoted upwardly to use positions to be gripped by a patient situated between the grab bars;

FIG. 54 is a lateral cross sectional view of the mattress of FIG. 51 showing that the bladders, in the inflated state, create a barrier of about 6.5 inches high with respect to an upper surface of the central region of the mattress;

FIG. 55 is a lateral cross sectional view, similar to FIG. 54, showing the bladders in the deflated state;

FIG. 56 is a perspective of another patient bed showing one of the siderails of the bed being used as part of a patient lift system when moved to a raised position over a central region of a mattress of the bed;

FIG. 57 is a perspective view, similar to FIG. 56, showing the lift system siderail moved to a position alongside the mattress to serve as a traditional siderail;

FIG. 58 is an exploded view of the lift system of the bed of FIGS. 56 and 57 showing the various components of the lift system;

FIG. 59 is an exploded view showing a siderail body of the siderail of FIGS. 56-58 exploded away from an L-shaped lift arm to which the siderail body attaches;

FIG. 60 is an exploded view of a pivot housing of the lift system of FIGS. 56-58 showing the components of the pivot housing;

FIG. 61 is a perspective view of still a further patient bed showing the bed having collapsible siderails with a vertically oriented center post serving as a siderail support in a central region of an upper frame of the bed and showing lift legs at the corner of the bed extending through apertures formed in caster shrouds;

FIG. 62 is a side elevation view of the bed of FIG. 61 showing the lift legs retracted to place the upper frame in a lowered position having casters engaging a floor beneath the caster shrouds, showing the siderails in collapsed positions, and showing the center posts pivoted to a horizontally oriented storage position alongside the upper frame;

FIG. 63 is a perspective view of another patient bed having four siderails each pivoted by a respective multi-axis joints to upper regions of lift posts at the corners of the bed, the multi-axis joints permitting movement of each siderail from a use position extending generally horizontally alongside a mattress of the bed and an out-of-the-way position extending generally vertically upwardly from the upper region of a respective lift post with a siderail body oriented generally parallel with an endboard of the bed;

FIG. 64 is a side elevation view of the bed of FIG. 63 showing the upper frame lowered with respect to the lift legs so that casters beneath caster shrouds engage a floor;

FIG. 65 is a cross sectional view of one of the caster shrouds showing a caster that is braked when the caster shroud is lowered and that is unbraked when the caster shroud is raised;

FIG. 66 is a perspective view of a mattress having integrated siderail pads;

FIG. 67 is a perspective view of a portion of the bottom of the mattress showing a mattress pad storage recess formed in an undersurface of the mattress;

FIG. 68 is a perspective view of yet a further patient bed having a repositionable GUI located at a foot end corner region of the bed;

FIG. 69 is a perspective view of the bed of FIG. 68 with the GUI located at the foot end of the bed near a central region of a footboard of the bed;

FIG. 70 is a front elevation view of a touch screen display of the GUI of the bed of FIGS. 68 and 69 showing a patient controls screen that appears on the GUI when the GUI is rotated to fact toward a patient;

FIG. 71 is a perspective view of the bed of FIGS. 68 and 69 showing a patient being able to select controls on the patient controls screen without touching screen due to hand motions within a sensor field of the GUI;

FIG. 72 is a perspective view of the GUI showing the sensor field diagrammatically;

FIG. 75 is a perspective view of a patient control module that snaps onto an upper region of a siderail, the patient control module having a main body with user input buttons, a nurse call pendant that is detachable from the main body, and a spring loaded clamp that retains the nurse call pendant in place relative to the main body;

FIG. 76 is a perspective view showing a snap clamp of the patient control module;

FIG. 77 is a perspective view of the patient control module with the nurse call pendant detached from the main body;

FIG. 79 is a perspective view of a portion of another patient bed having a shelf pivoted to a use position relative to a foot rail of the bed and having a port on a head rail of the bed that is used to charge wireless devices such as phones, tablet computers, and the like;

FIG. 80 is a perspective view of the bed of FIG. 79 showing the shelf being pivotable relative to the foot rail between a first position overlying a mattress of the bed and a second position extending in an opposite direction away from the mattress and showing a control panel housing pivoted upwardly out of a recess in the head rail to a raised position, the control panel housing carrying caregiver controls that face away from the mattress when the control panel housing is in the raised position and having patient controls on an edge of the control panel housing;

FIG. 81 is an end view of a portion of the bed of FIGS. 79 and 80 showing the shelf in an intermediate position inclined upwardly from the foot rail;

FIG. 82 is a portion of a display screen of the phone indicating that bed control software can be downloaded to the phone and indicating that the phone is charging;

FIG. 83 is a perspective of another patient bed showing a patient holding a wireless pendant that is used to control bed functions and a television in the room, the bed having an IR receiver in a foot board to receive signals from the wireless pendant, and the bed having a flip over control panel housing that is coupled to a head rail and that has patient controls located on a side of the control panel housing;

FIG. 84 is a perspective view of the bed of FIG. 83 showing the control panel housing of one of the head rails in a first position with caregiver controls facing away from the head rail and showing the control panel housing of the other head rail flipped over to expose the patient controls for use by a patient;

FIG. 85 is a perspective view of still another patient bed showing a control unit mounted to an end of an arm that extends from a top of a foot board toward a patient, showing the control unit having a graphical display screen and having a motion detector to detect movement of a patient's hand at a distance from the screen, showing caregiver controls location on a side of the control unit, and showing grip handles of the control unit located below the graphical display screen;

FIG. 86 is a side view of the bed of FIG. 85 showing a patient grabbing one of the grip handles to assist with egress from the bed;

FIG. 91 is a perspective view of a portion of another hospital bed showing a U-shaped grab bar arching between mounts that are situated adjacent head end corner regions of a mattress and showing a control unit extending over a patient from a central region of the U-shaped grab bar, the control unit having caregiver controls on a sidewall thereof and the grab bar including hand grip areas with bumps on each side of the control unit;

FIG. 92 is a bottom plan view of an undersurface of the control unit and hand grip areas of FIG. 91 showing a patient control panel on the under surface, an air flow fan on each side of the patient control panel, nurse call button above the patient control panel, and a light with adjacent on/off switch above the nurse call button;

FIG. 93 is a side view of the portion of the hospital bed of FIG. 91 showing a patient reaching upwardly to engage the patient control panel and showing an arrow indicating that the U-shaped grab bar can be moved relative to the pivot mounts so as not to obstruct patient egress;

FIG. 94 is a perspective view of yet another patient bed showing a patient helper having a first arm portion extending upwardly from a mount collar that attaches to a horizontally oriented arched rail located at a head end of the bed, a second arm portion extending in a generally horizontal cantilevered manner from an upper end of the first arm portion over a head section of a mattress and mattress support deck of the bed, a third arm portion that telescopically extends and retracts relative to the second arm portion (as indicated by the double headed arrow), a trapeze grab bar hanging at a lower end of a tether that extends downwardly from an end of the third arm portion, and a cylindrical oxygen tank holder at an end of an arm that extends from a bottom end of the first arm portion of the patient helper, the entire patient helper being repositionable along the arched rail;

FIG. 95 is an enlarged perspective view of the trapeze grab bar showing the trapeze grab bar being generally triangular in shape and having a triangular patient control housing with patient controls;

FIG. 96 is an enlarged perspective view of a portion of the patient helper showing the mount collar on a portion of the arched rail and showing a double headed arrow to indicate the ability to reposition the patient helper along the arched rail;

FIG. 103 is a perspective view of a hospital room showing a caregiver using a caregiver universal remote cart to control a patient bed and other patient care equipment in the room;

FIG. 104 is a perspective view of the caregiver universal remote cart showing a GUI mounted to a top of a pole, a tray mounted to the pole beneath the GUI, a base with casters coupled to a lower end of the pole, and the base having foot operated controls to control features of the patient bed;

FIG. 105 is a perspective view, similar to FIG. 103, showing diagrammatic wireless signals between the caregiver universal remote cart and some of the equipment in the hospital room;

FIG. 109 is a front elevation view of a caregiver GUI used to control features and functions of a hospital bed;

FIG. 110 is a front elevation view of a phone having bed controls displayed on its display screen for use in controlling features and functions of a hospital bed;

FIG. 113 is a perspective view of another patient bed having caregiver control panels located on bottom portions of grip handles that extend from upper regions of a footboard toward a head end of the bed;

FIG. 114 is a top plan view of the patient bed of FIG. 113 showing a caregiver using one of the control panels of the footboard grip handles;

FIG. 115 is a perspective view of a head rail of the patient bed of FIGS. 113 and 114 showing the head rail having a grip handle at its foot end that pivots about 90° relative to a siderail body of the head rail to assist in patient egress;

FIG. 117 is a perspective view of another patient bed showing an upper portion of the bed mounted to a first type of base and lift system;

FIG. 118 is a perspective view of the first type of base and lift system of the bed of FIG. 117;

FIG. 119 is a perspective view showing the upper portion of the bed of FIG. 117 mounted to a second type of lift system that includes vertical lift tubes attached to corner regions of the upper portion of the bed;

FIG. 120 is an enlarged perspective view of one of the vertical lift tubes;

FIG. 121 is a perspective view of yet another patient bed having a single lift column that extends vertically between a base frame and an upper frame of the bed;

FIG. 122 is a perspective view of a further patient bed similar to the patient bed of FIGS. 23-26 showing a vertically oriented spiral lift mechanism extending between a laterally extending base portion and an upper frame of the bed;

FIG. 123 is a side elevation view of the bed of FIG. 122 showing the upper frame moved to a lowered position relative to a base of the bed;

FIG. 124 is a perspective view of a portion of an upper region of a siderail showing a line management clip in an opened position pivoted upwardly out of a line receiving recess to allow patient care lines to be routed through the recess;

FIG. 125 is a perspective view, similar to FIG. 124, showing the line management clip moved to a closed position to engage and retain the patient care lines in the recess;

FIG. 126 is a perspective view showing a pair of line managers attached to a top of a respective siderail of a patient bed;

FIG. 127 is a side elevation view of one of the siderails and line managers of FIG. 126 showing a double headed arrow that indicates that the line manager is slideable along the top of the siderail for repositioning;

FIG. 128 is a perspective view of another patient bed having a base with a central portion that raises and lowers relative to caster brackets that are situated on opposite sides of the central portion;

FIG. 129 is a perspective view of a portion of the bed of FIG. 128 showing a caregiver stepping downwardly on a foot pedal to move the central portion of the base downwardly;

Figure 20:
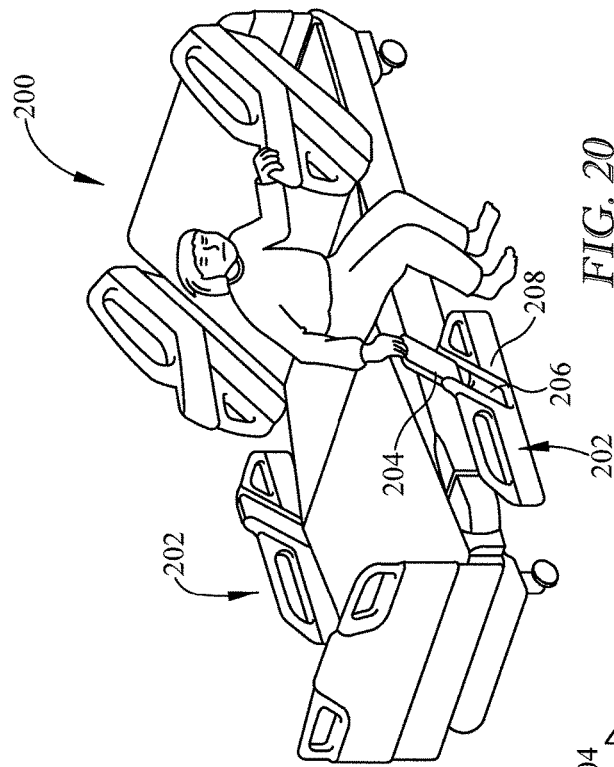
FIG. 20 is a perspective view of another patient bed showing a foot rail in a lowered position and having an extendable egress handle raised upwardly within an inclined channel formed in a foot rail body to provide a grip handle for use by a patient egressing from the bed when the foot rail is in the lowered position.
Figure 87:
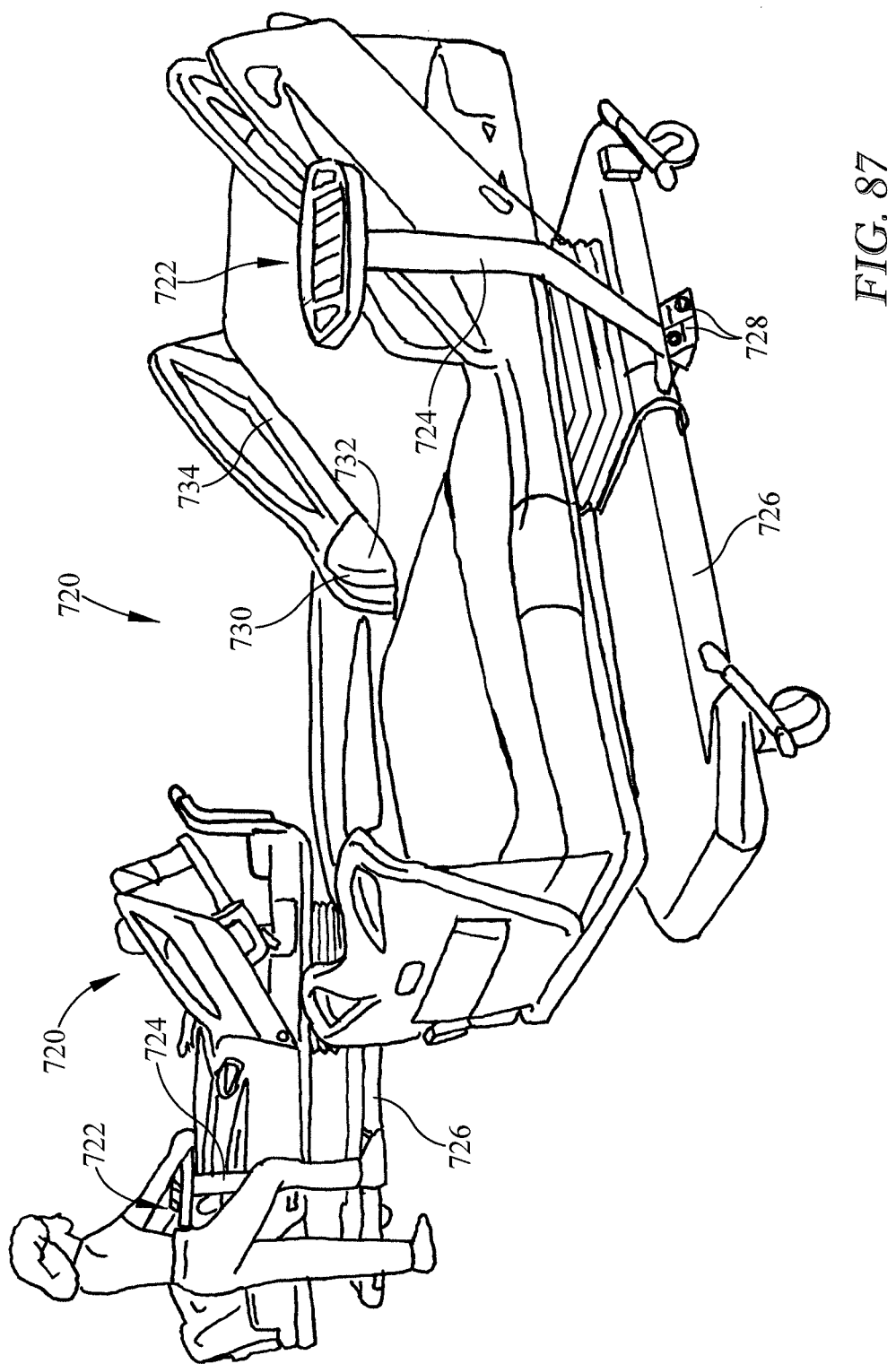
FIG. 87 is a perspective view of two patient beds showing that each bed has a caregiver GUI located at an upper end of an arm that couples, at its lower end, to a base of the bed for sliding movement along a longitudinal dimension of the bed, showing foot pedals for bed control extending from a lower end of the arm, and showing a repositionable patient handle extending from a hub to which a head rail of the bed couples.
Figure 116:
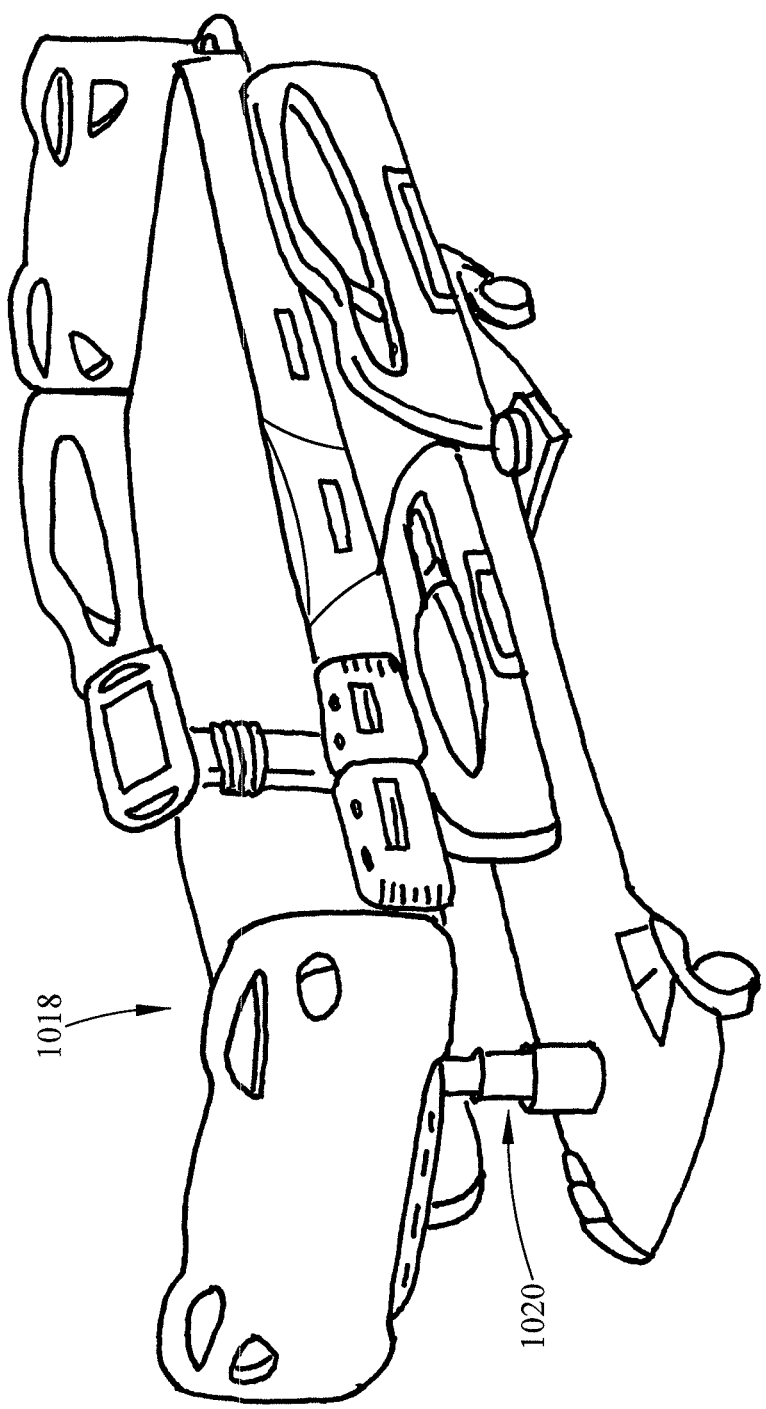
FIG. 116 is a perspective view of a patient bed having a telescopic lift system.
Figure 175:
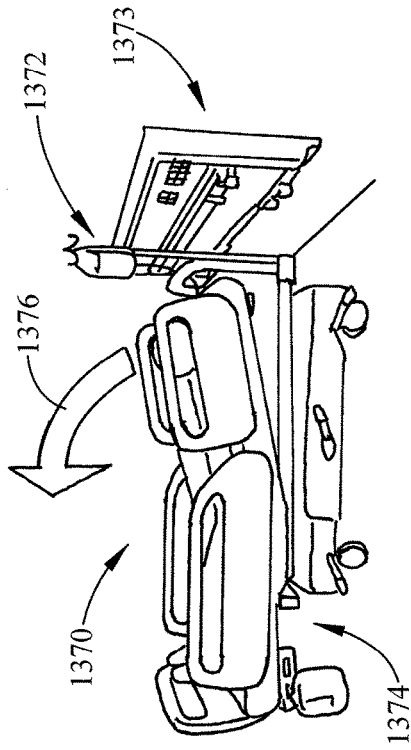
Figure 176:
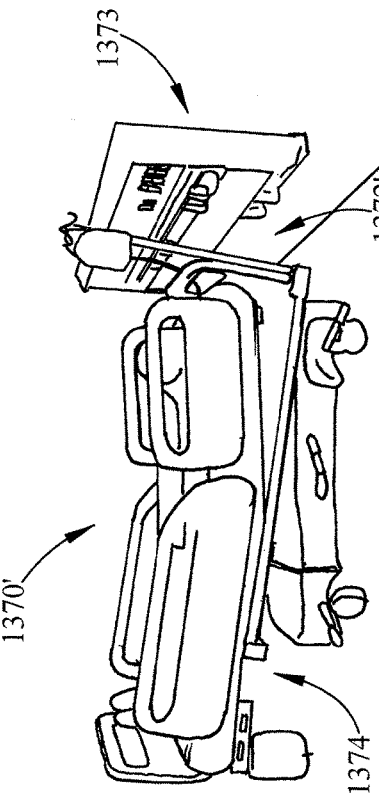
Figure 177:
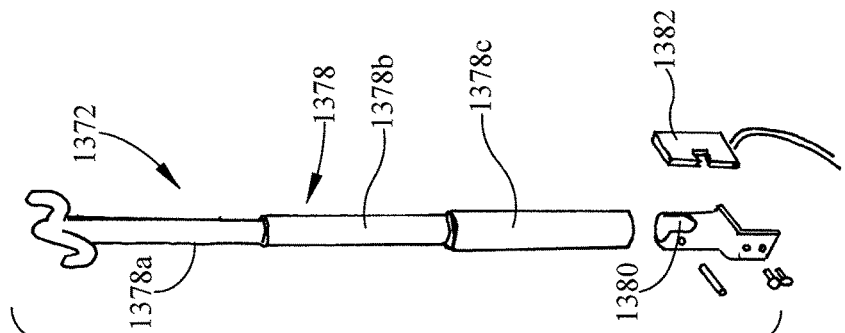
Figure 178:
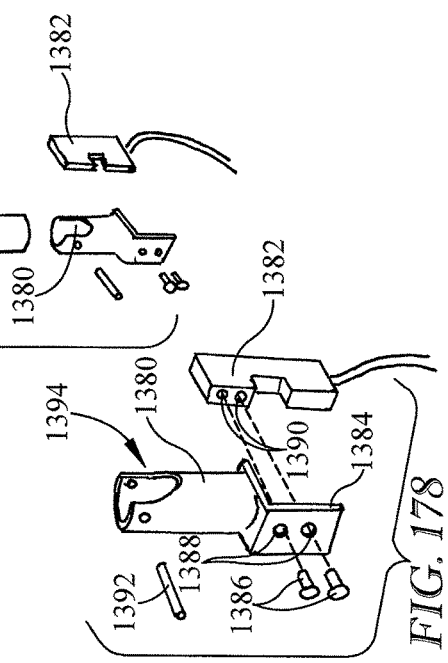
Figure 180:
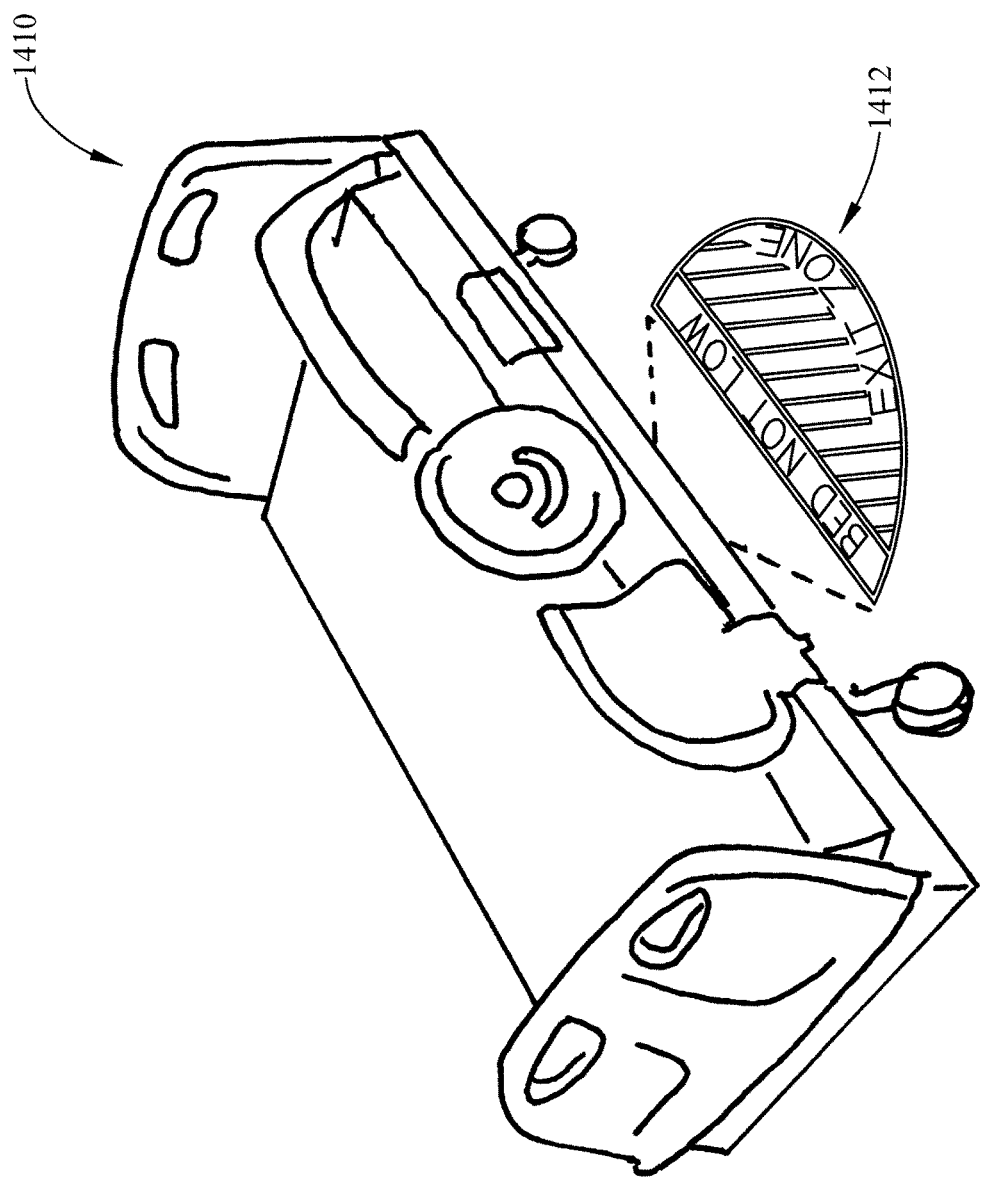
Figure 181:
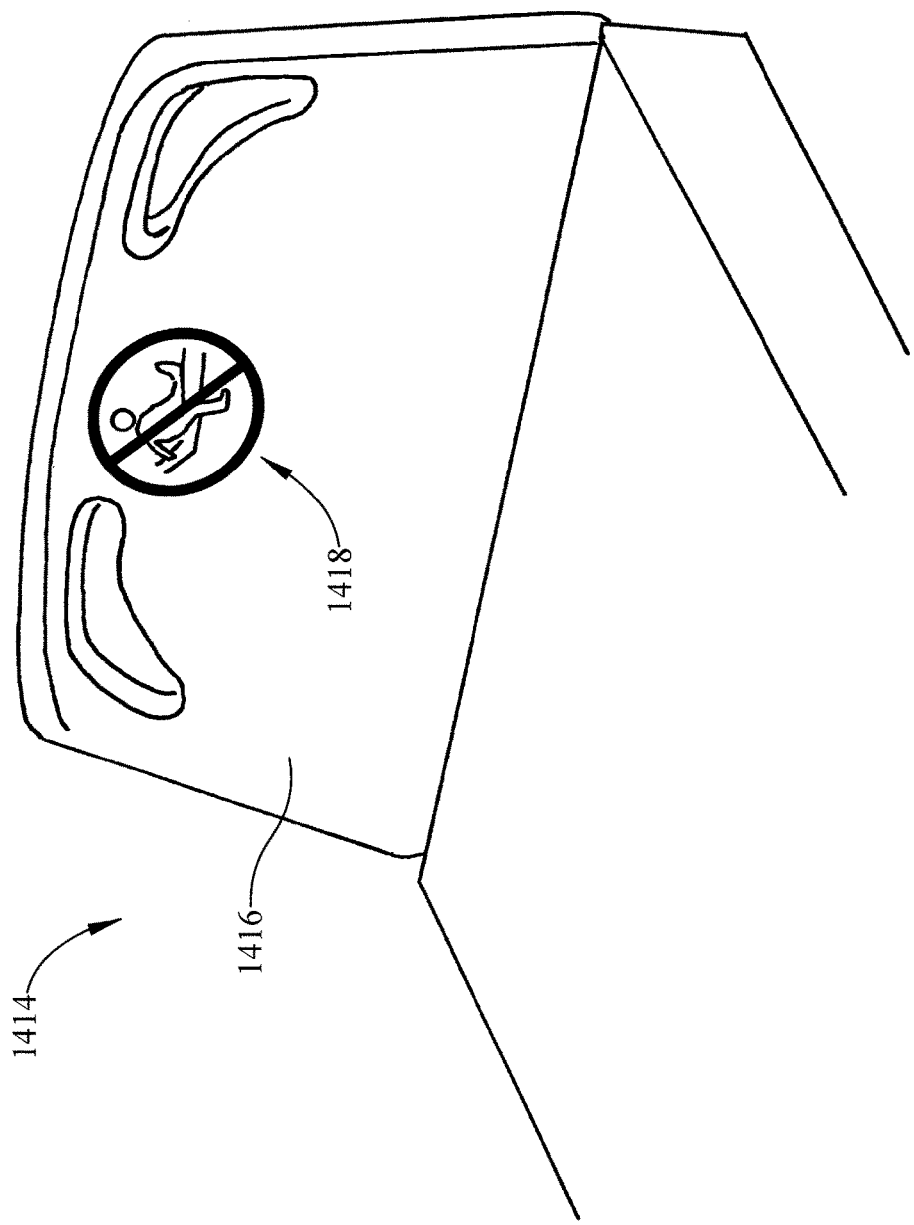
Figure 182:
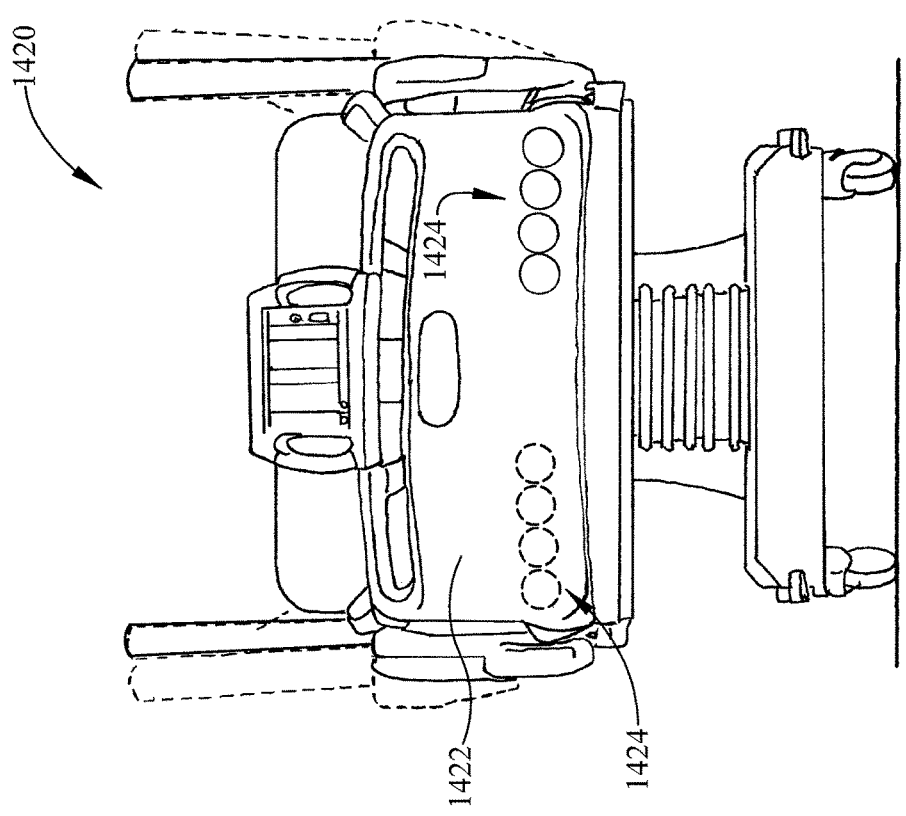
Figure 183:
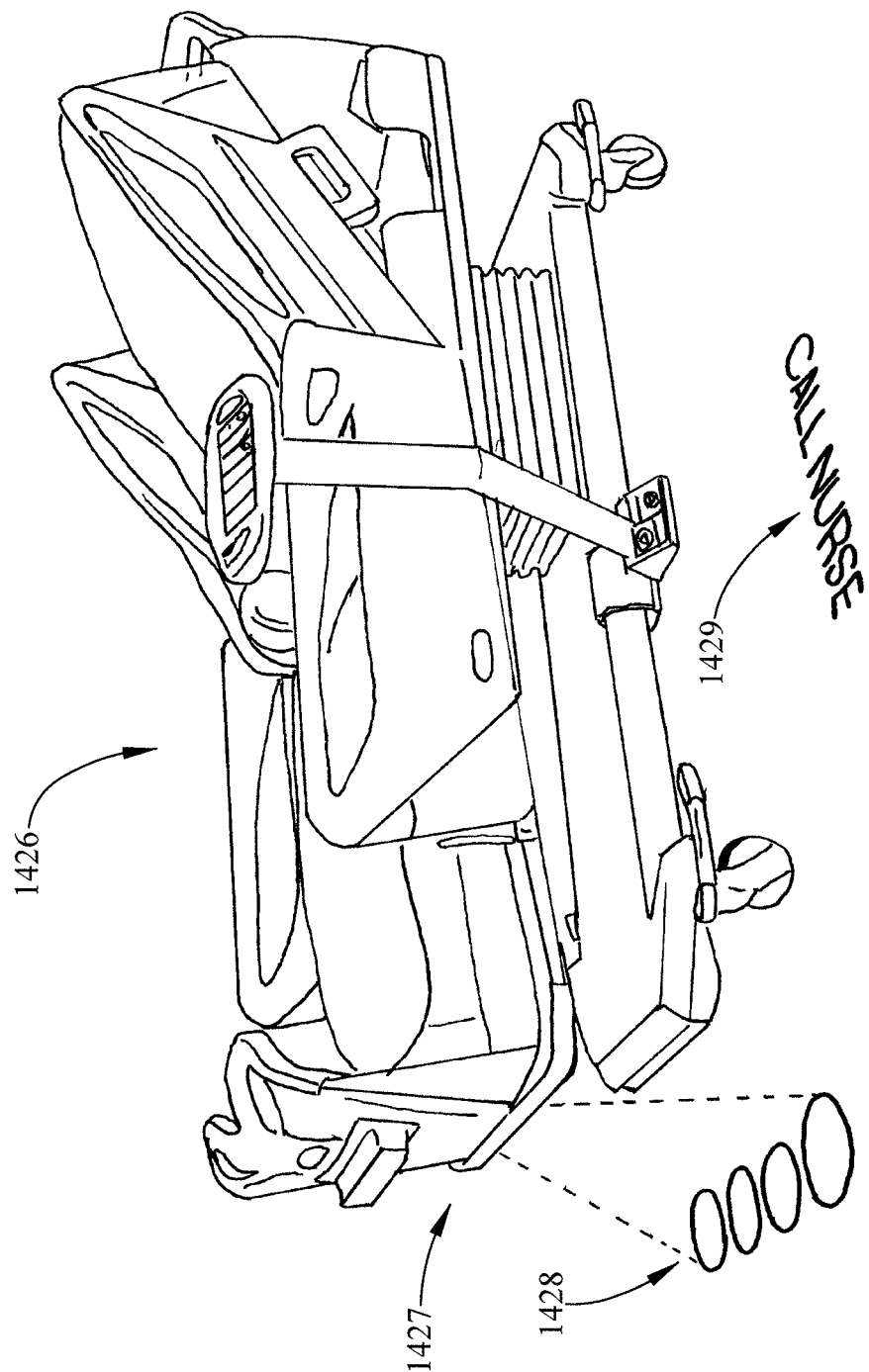
Figure 184:
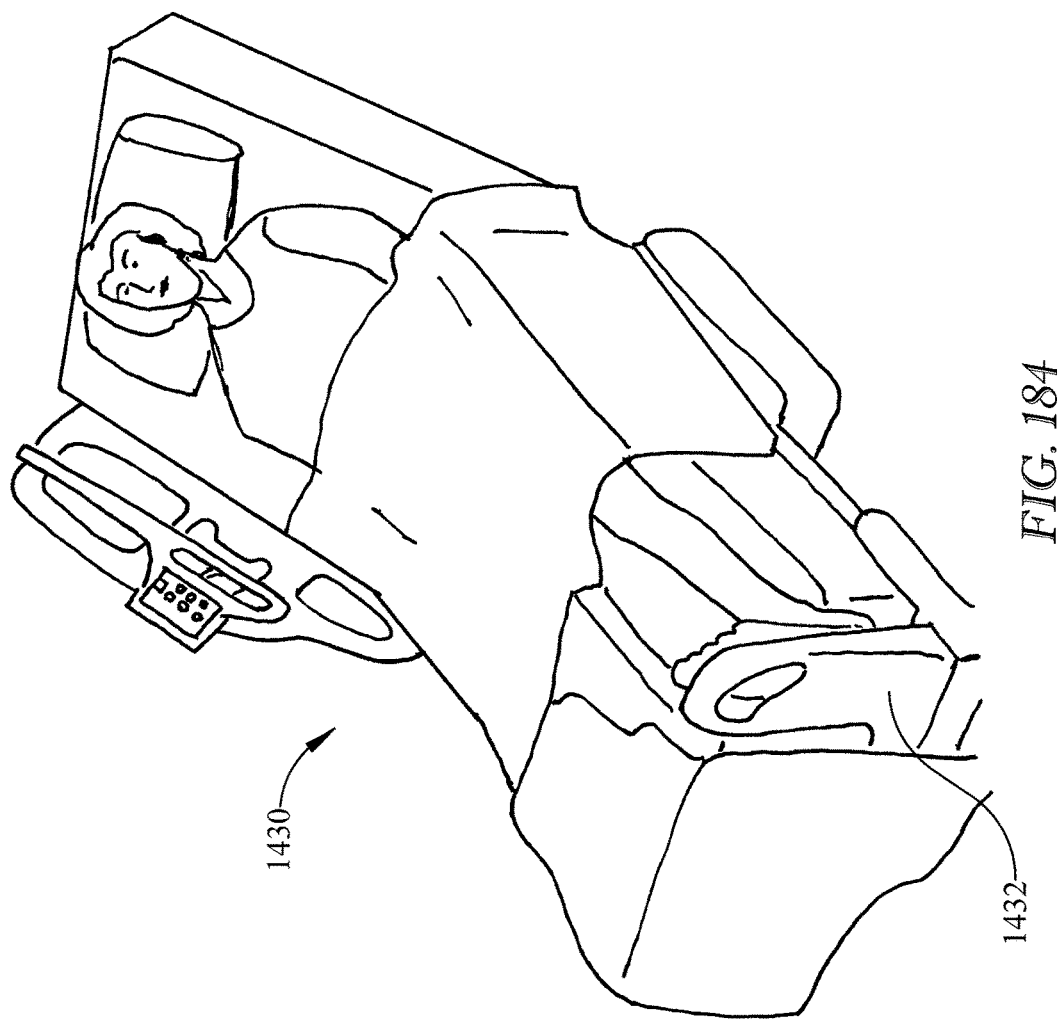
Figure 185:
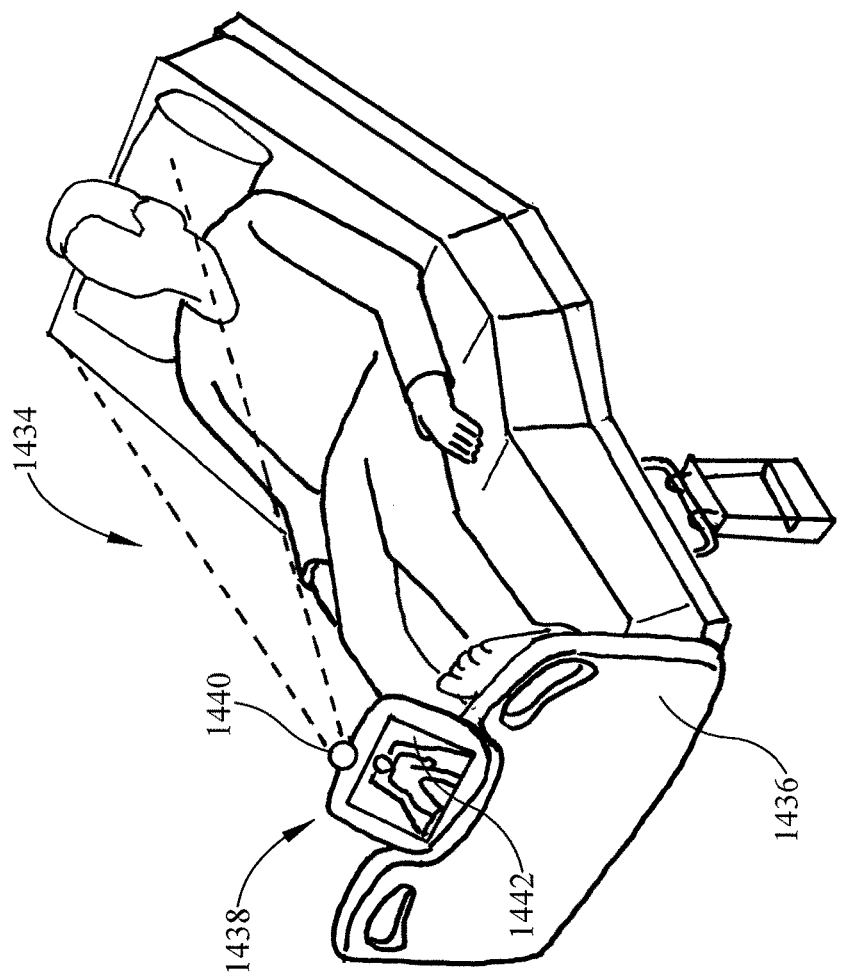
Figure 189:
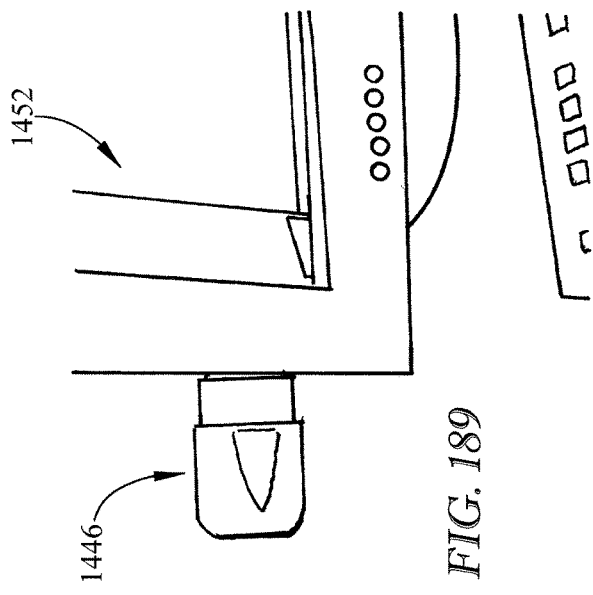
Figure 188:
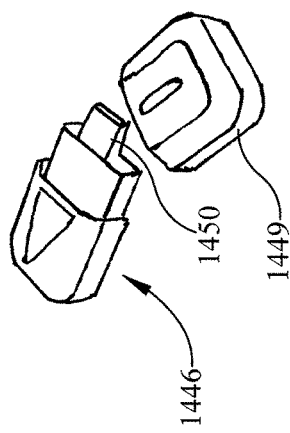
Figure 187:
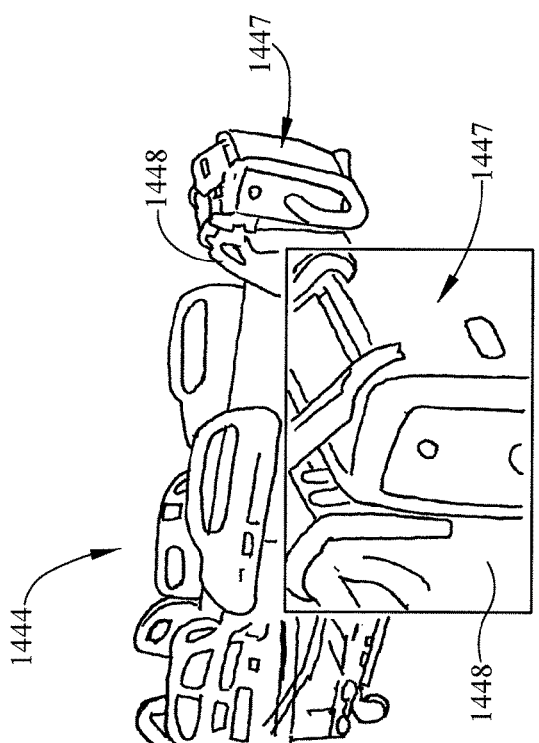
Figure 186:
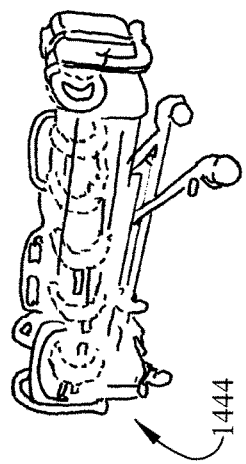
Figure 190:
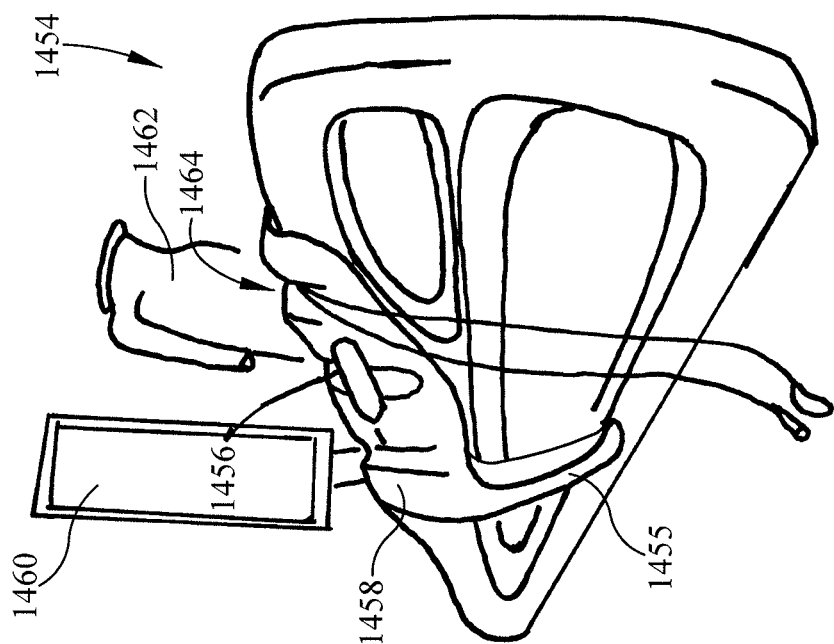
Figure 191:
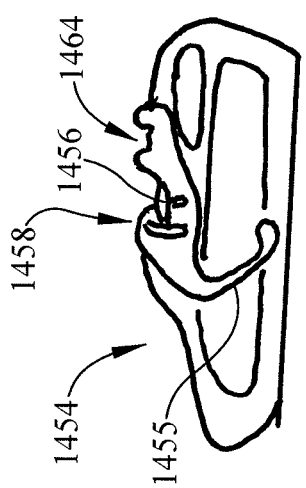
Figure 192:
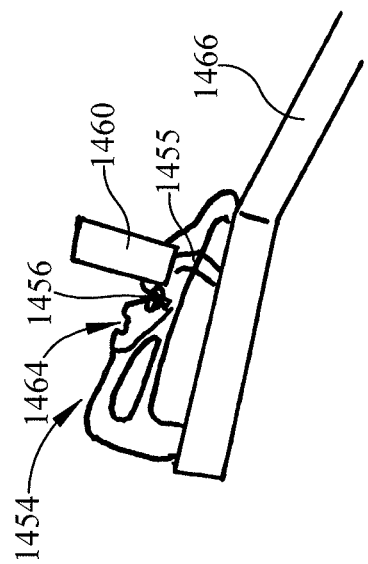
Figure 193:
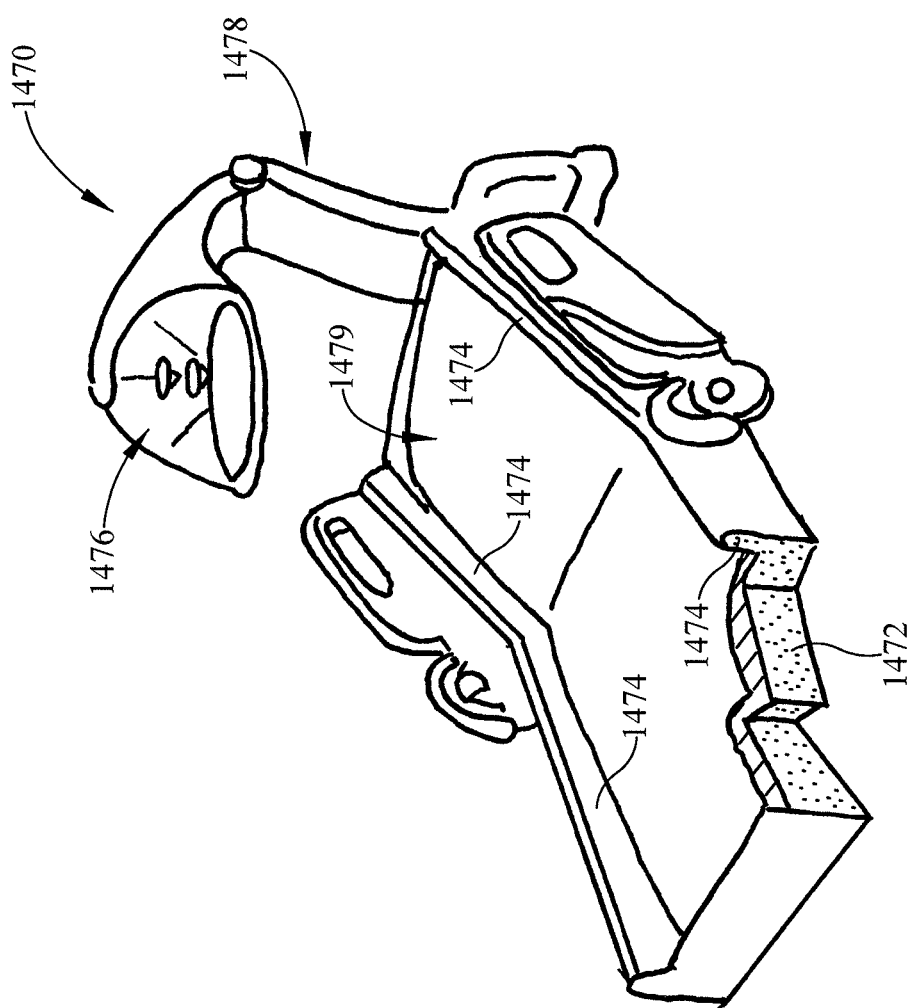
Figure 194:
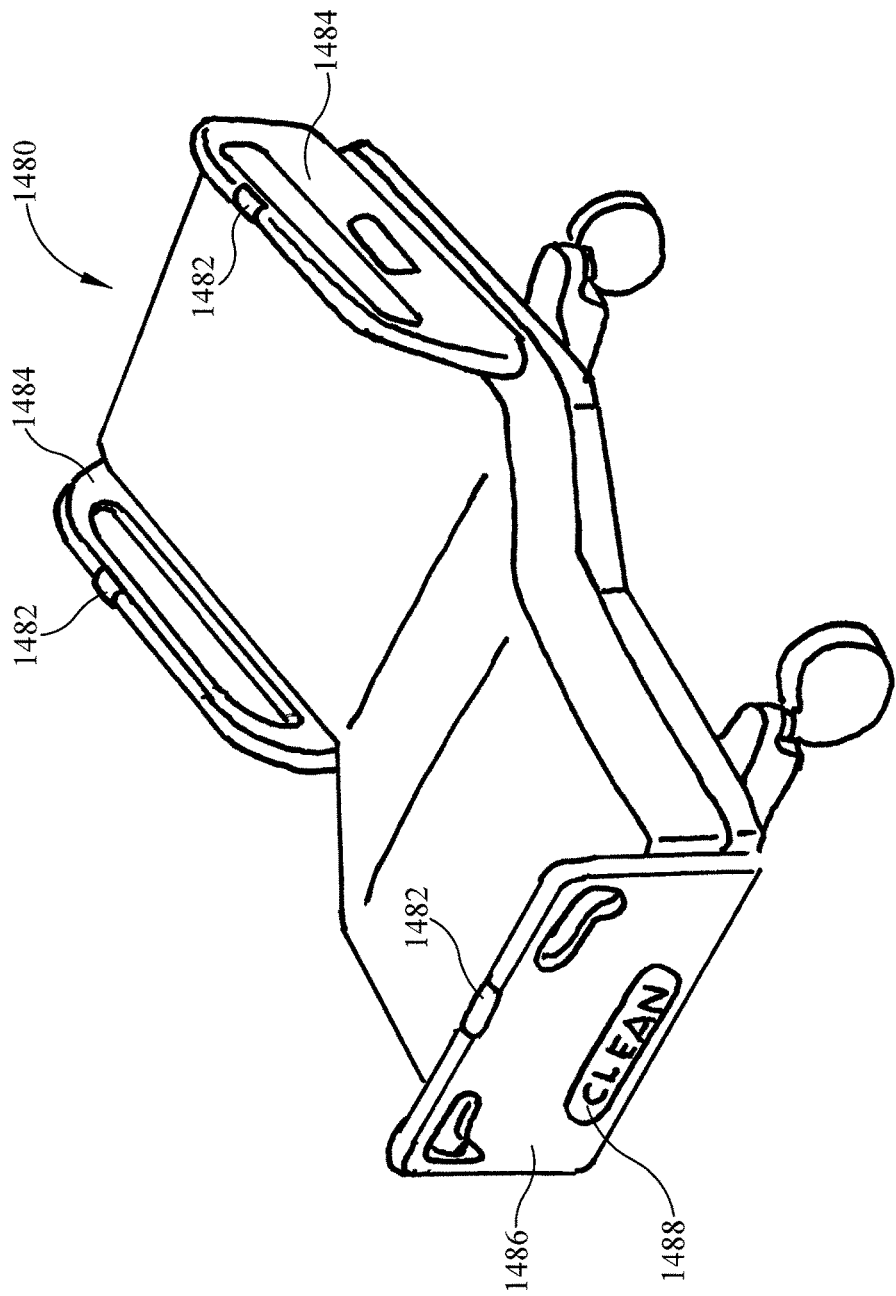
Figure 200:
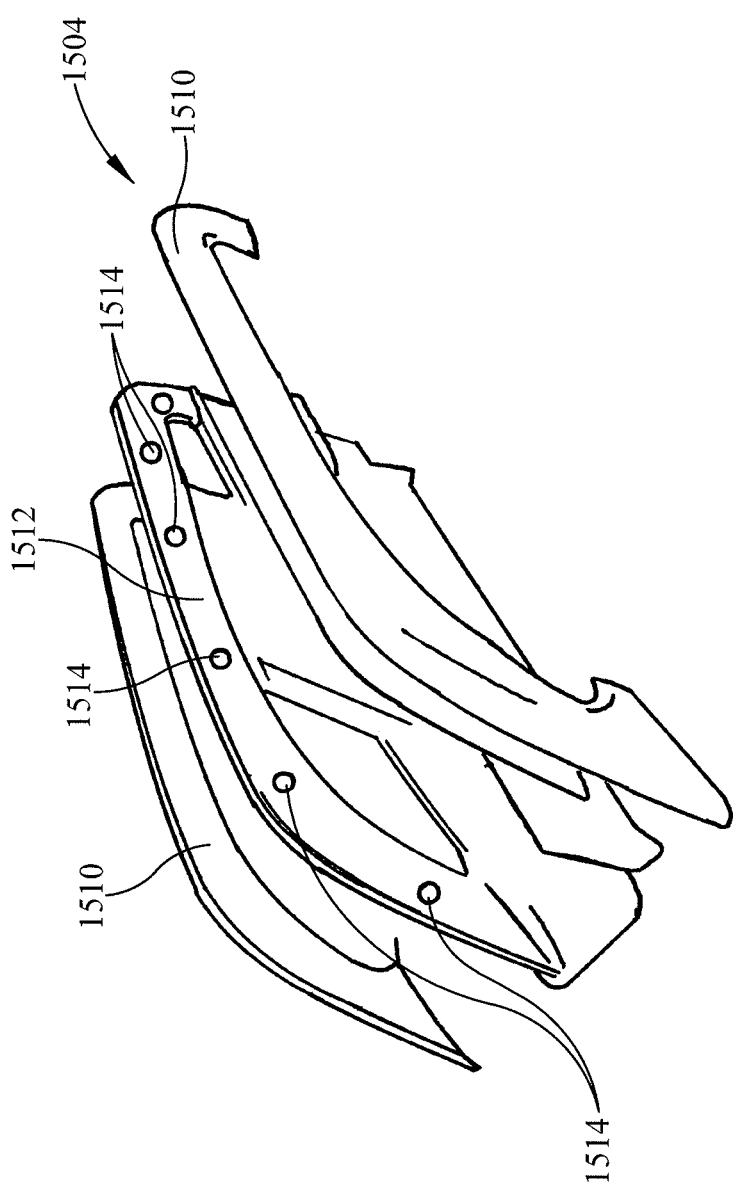
Figure 210:
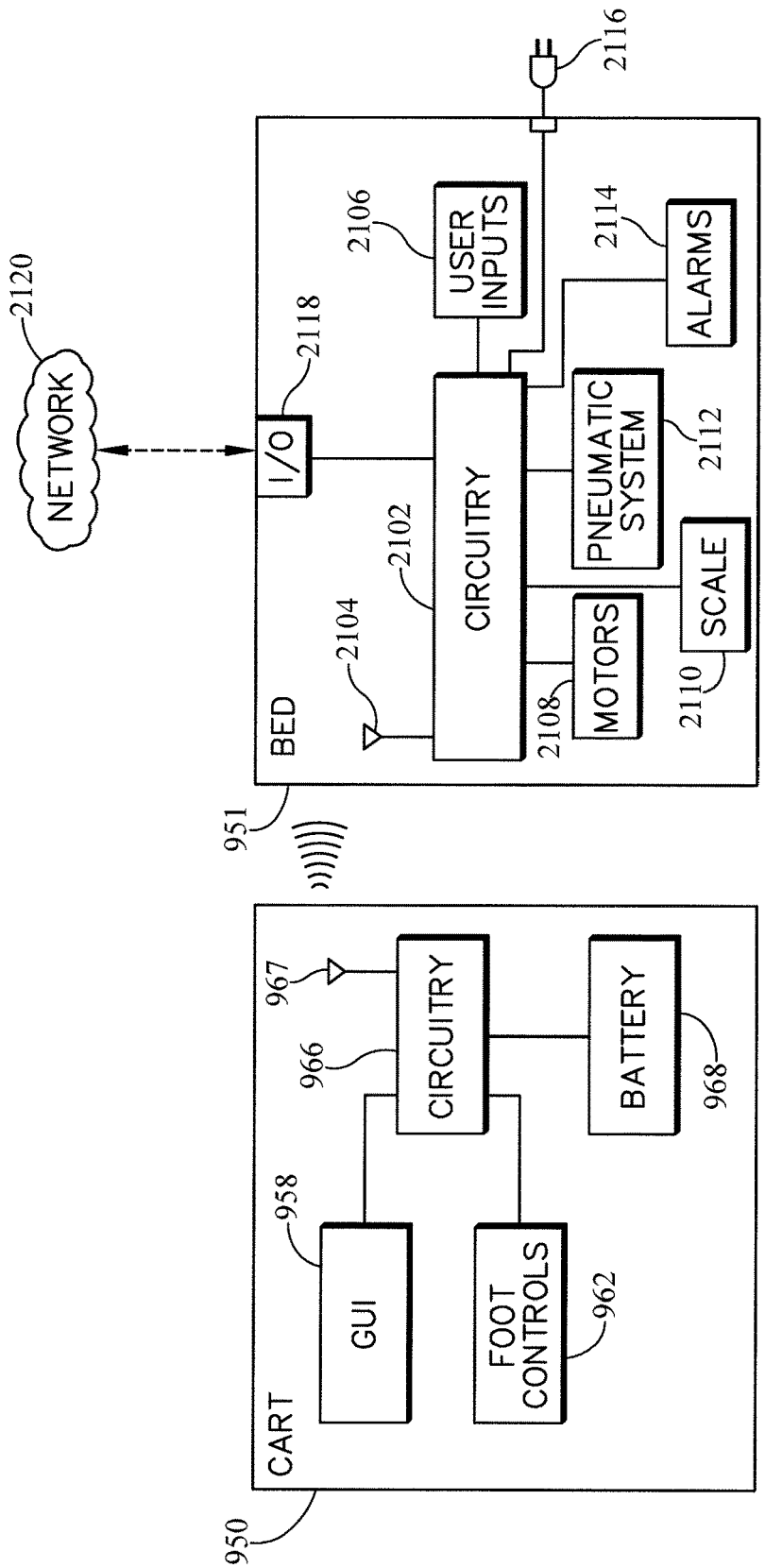
Figure 211:
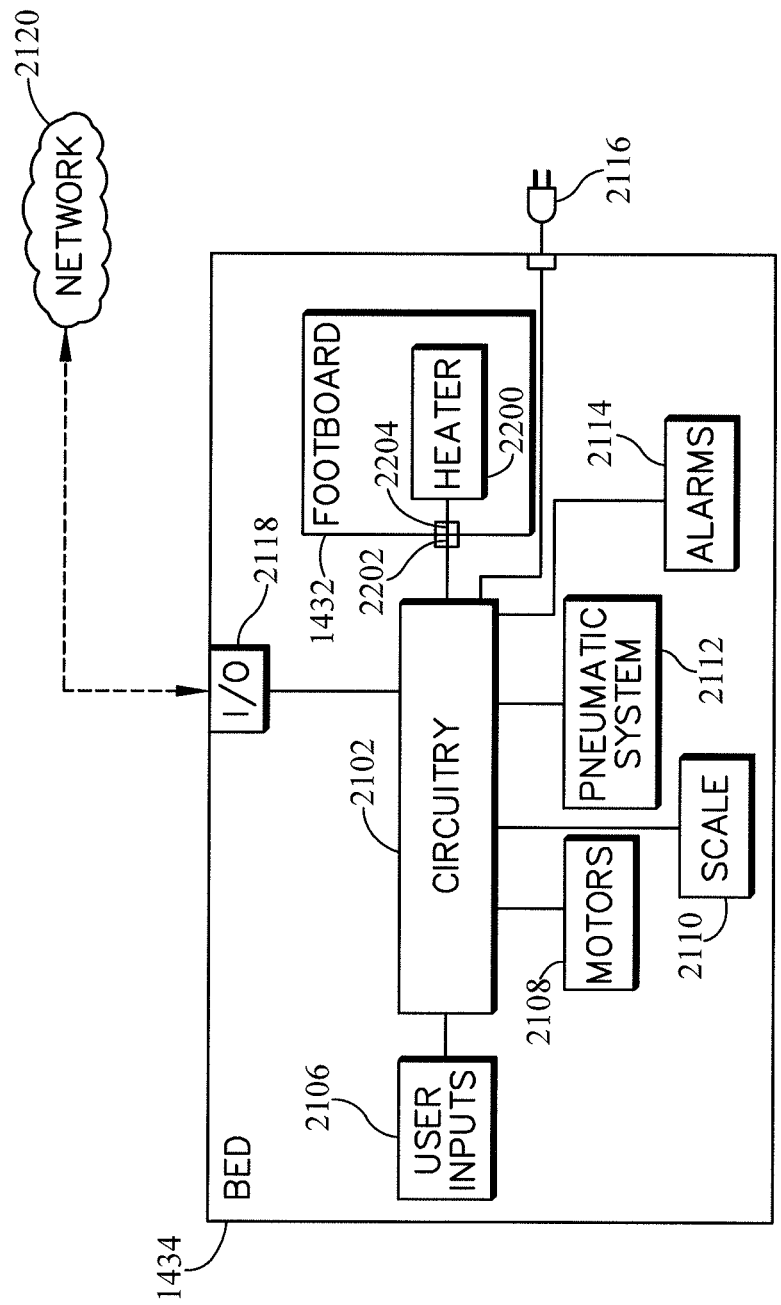

FIG. 130 is an end elevation view of a portion of the base showing a caster attached to a caster bracket and a linkage mechanism that interconnects the caster bracket with the central portion of the base and that allows for the central portion of the base to raise and lower relative to the caster bracket;

FIG. 131 is a perspective view of another patient bed;

FIG. 132 is a perspective view of a portion of the patient bed of FIG. 131 showing an upper frame of the bed including longitudinal frame members each having a central section dropped downwardly relative to head end and foot end portions of the longitudinal frame members;

FIG. 133 is a perspective view of a patient bed showing an exercise machine mounted to the patient bed;

FIG. 134 is a perspective view of a seat of the exercise machine;

FIG. 135 is a perspective view showing a portion of a foot deck section of the bed and a portion of a foot panel of the exercise machine, the foot panel being coupled to a bar that inserts into a slot formed in the foot deck section to couple the foot panel to the bed;

FIG. 136 is a perspective view of the exercise machine decoupled from the bed and folded up for transport by a caregiver;

FIG. 137 is a side elevation view of the folded up exercise machine being pulled by a caregiver;

FIG. 138 is a perspective view of still another patient bed showing one of the foot rails of the bed in a raised position and having a foot pedal that a patient moves back and forth with the patient's foot as part of physical therapy;

FIG. 139 is an exploded view of one of the foot rails of the bed of FIG. 138 showing components of a therapy device that is located inside the foot rail between panels of the foot rail, the therapy device including a slotted plate having a slider that attaches to a gas cylinder damper and that slides along the plate within the slot, the foot pedal having an arm that extends through a slot in one of the foot rail panels and pivotably couples to the slider, the panel of the foot rail having a storage recess that receives the foot pedal when not in use;

FIG. 140 is a perspective view of another patient bed showing a patient lying on a mattress of the bed and showing a footboard of the bed having a pedal mechanism being used by the patient for physical therapy;

FIG. 141 is a perspective view of the bed of FIG. 140 showing the bed in a chair position and showing the patient using the pedal mechanism while in a sitting position on the bed;

FIG. 142 is a perspective view of the footboard of the bed of FIGS. 140 and 142 showing the pedal mechanism received in a recess of the footboard for storage;

FIG. 143 is a perspective view, similar to FIG. 142, showing the pedal mechanism deployed out of the recess for use by a patient;

FIG. 144 is a perspective view of another patient bed showing a foot pad with a heel support and foot anchor straps attached to a foot board of the bed, a patient's feet being anchored to the foot pad while in a lying position on the bed;

FIG. 145 is a perspective view, similar to FIG. 144, showing the patient flexing her knees to draw her body toward the footboard as part of physical therapy, the bed having a pair of grip handles that are grabbed by the patient during the physical therapy if desired;

FIG. 146 is an enlarged perspective view of the footboard of FIGS. 144 and 145, the footboard having a graphical display that extends upwardly from a central region of a main body of the footboard, the display screen displaying information and messages pertaining to the physical therapy;

FIG. 147 is a perspective view of the same bed shown in FIG. 116;

FIG. 148 is a perspective view of a pair of clear, disposable drainage canisters that are attached to a mattress retention wall of the bed of FIG. 147 for collection of fluids;

FIG. 149 is an end elevation view of the bed of FIG. 147 showing an upside down U-shaped grab bar coupled to a bracket extending from a base of the bed and coupled to a chair situated adjacent to the bed;

FIG. 150 is a perspective view of a further patient bed showing a drainage bag holder at the foot end of an upper frame of the bed, the drainage bag holder having a sensor that detects the presence of a drainage bag on the holder;

FIG. 151 is an exploded perspective view of the drainage bag holder of FIG. 150 showing the drainage bag holder having a vertically oriented plate, a drainage bag bar that pivotably couples to pivot tabs extending from the plate, and a limit switch that is received in a hole formed in the plate, the limit switch having a lever that is contacted and moved to a closed position by an arm extending from the drainage bag bar when a drainage bag is attached to the bar;

FIG. 152 is a perspective view of another patient bed showing a footboard of the bed pivoted upwardly in the direction of the arrow into a position overlying a patient's legs so that the footboard serves as an overbed table for the bed;

FIG. 153 is a perspective view of a portion of the bed of FIG. 152 showing the footboard moved back to its normal position to serve as a footboard;

FIG. 154 is a perspective view of the footboard showing a recess formed in the footboard to help retain items on the footboard when it is being used as an overbed table;

FIG. 155 is a perspective view showing a caregiver using a control panel that is included as part of the footboard;

FIG. 156 is a perspective view of a footboard showing a pair of posts extending downwardly from a main body of the footboard, the posts being pivotably coupled to the main body;

FIG. 157 is a perspective view of the footboard of FIG. 156 attached to a patient bed and pivoted downwardly in the direction of the arrow about the posts to serve as a foot extender for the bed;

FIG. 158 is a perspective view of another patient bed in a chair position showing a patient's feet resting atop a footboard that is attached to a foot section of the bed in a first orientation having a foot prop bulge in the footboard facing downwardly toward a floor;

FIG. 159 is a perspective view, similar to FIG. 158, showing the patient's feet resting atop the foot prop bulge when the footboard is attached to the foot section of the bed in a second orientation;

FIG. 160 is a side elevation view of a portion of the bed of FIG. 159 showing the patient's feet resting atop the foot prop bulge;

FIG. 161 is a perspective view of still another patient bed having a split foot board situated adjacent a foot end of the bed to serve as a footboard;

FIG. 162 is a perspective view, similar to FIG. 161, showing one of the sections of the split footboard being pivoted about a vertical axis, as indicated by the double headed curved arrow, around a corner of a foot section of the bed;

FIG. 163 is a perspective view, similar to FIG. 162 showing the footboard section alongside the foot section of the bed and having a grip handle panel of the footboard section pivoted upwardly to a raised position relative to another panel of the footboard;

FIG. 164 is a perspective view of a further patient bed showing the bed having a footboard that includes a plurality of segments that are telescopically coupled together, the footboard being in a raised position having the telescopic segments in an expanded configuration;

FIG. 165 is a perspective view, similar to FIG. 164, showing the footboard in a collapsed or lowered position having the telescopic segments retracted into an uppermost segment;

FIG. 166 is an enlarged perspective view of the footboard of FIG. 164 in the raised position;

FIG. 167 is an enlarged perspective view of the footboard of FIG. 165 in the lowered position;

FIG. 168 is a perspective view of yet another patient bed showing a footboard of the bed having a television unit moved upwardly to a raised position for viewing by a patient on the bed;

FIG. 169 is an enlarged perspective view of the footboard of FIG. 168 with the television unit in the raised position;

FIG. 170 is a perspective view of a part of the bed of FIG. 168 showing the television unit in a lowered position stored inside the footboard;

FIG. 171 is an exploded view of the footboard of the bed of FIG. 168;

FIG. 172 is a perspective view of a portion of another hospital bed having an IV pole that includes a flexible upper segment;

FIG. 173 is a diagrammatic view showing a standard IV pole carrying a piece of equipment that is being damaged due to contact with a head section of the bed;

FIG. 174 is a diagrammatic view, similar to FIG. 173, showing the flexible segment deflecting in response to the head section of the bed contacting the piece of equipment carried by the flexible segment of the IV pole;

FIG. 175 is a perspective view of a further patient bed having an IV pole with a contact sensor that provides a signal to a bed controller indicating that the IV pole is contacting an obstacle so that the bed controller can signal actuators of the bed to take corrective action;

FIG. 176 is a perspective view, similar to FIG. 175, showing a bed having an IV pole without any contact sensor, the IV pole being driven into a head wall unit due to tilting of an upper frame of the bed;

FIG. 177 is an exploded view of the IV pole of FIG. 175 showing a telescopic pole over a coupling socket and a load cell adjacent to the coupling socket;

FIG. 178 is an enlarged exploded view of the coupling socket and load cell of FIG. 177;

FIG. 179 is a table having information pertaining to bed exit and patient egress alert modes of a patient bed;

FIG. 180 is a perspective view of another patient bed showing the bed having the capability to project a lighted image onto a floor adjacent to the bed to indicate to a patient a location of a bed exit zone;

FIG. 181 is a perspective view of a portion of still another patient bed showing a footboard having an icon that illuminates when a bed exit alarm system is armed, the icon providing an indication to the patient not to get out of the bed;

FIG. 182 is an end elevation view of another patient bed showing a footboard of the bed having a set of icons that are illuminated green to indicate a satisfactory status of an associated monitored bed feature and that are illuminated a color other than green to indicate an unsatisfactory status of the associated monitored condition, the icons being unlit if the associated feature of the bed is not being monitored;

FIG. 183 is a perspective view of a bed similar to the beds of FIG. 87 showing the bed projecting a set of icons onto the floor near a foot end of the bed and projecting a message near a side of the bed, the icons indicating statuses of monitored features of the bed and the message advising the patient to call a nurse if the patient desires to get out of the bed;

FIG. 184 is a perspective view of a portion of another patient bed showing a footboard that includes a built-in foot warmer;

FIG. 185 is a perspective view of a portion of still another patient bed having a footboard with a camera unit extending upwardly from a central region of a foot board, the camera module has a camera that faces toward a patient on the bed and a GUI, the bed having control circuitry that commands the camera to take a picture of the patient at substantially the same time as a patient weight reading is taken using a weigh scale system of the bed, and the GUI displays the picture that was taken;

FIG. 186 is a perspective view of a further patient bed having an RFID tag reader that reads RFID tags of equipment placed on the bed so that a weigh scale system can recalculate a tare weight to account for the added equipment;

FIG. 187 is a perspective view similar to FIG. 186 but showing, in an enlarged window, a mattress control box hanging on a footboard of the bed;

FIG. 188 is a perspective view of an RFID tag having a cover removed to expose a universal serial bus (USB) connector of the tag;

FIG. 189 is a perspective view of the RFID tag and part of a computer showing the RFID tag coupled to a USB port of the computer to be encoded with data to be transmitted wirelessly and to be charged;

FIG. 190 is a perspective view of a siderail showing the siderail having a built in grab handle, a channel to receive a shaped edge of a control pendant, a recess and coupling bar for a urinal, and a built in line manager;

FIG. 191 is a rear elevation view of the siderail of FIG. 190;

FIG. 192 is a rear elevation view of the siderail of FIG. 190 and a portion of a mattress;

FIG. 193 is a perspective view of a portion of another patient bed showing a foam mattress having integral foam side bolsters extending upwardly along opposite sides of the mattress and a white noise generator/noise cancellation unit supported by an arm assembly above a head section of the bed;

FIG. 194 is a perspective view of yet a further patient bed having sensors on siderails and endboards of the bed to detect cleaning agents and a lighted sign on a footboard of the bed that displays a message to indicate whether the bed is clean or dirty;

FIG. 195 is a perspective view of another patient bed that includes a disinfectant mister system;

FIG. 196 is an enlarged perspective view of one of the siderails of the bed of FIG. 195 showing a mister spray nozzle through which a mist of disinfectant is delivered;

FIG. 197 is an enlarged perspective view, similar to FIG. 196 showing mist being delivered from the nozzle downwardly onto user inputs of the siderail to disinfect the user inputs;

FIG. 198 is a perspective view of still another patient bed having directional ultraviolet (UV) lights included on siderails and a base of the bed for infection control;

FIG. 199 is an enlarged perspective view of one of the siderails of the bed of FIG. 198;

FIG. 200 is an exploded view of a portion of the siderail of FIG. 199 showing the siderail having translucent grip portions and a steel frame with UV light emitting diodes (LED's) mounted thereto;

FIG. 201 is a perspective view of a portion of another patient bed showing the bed having an egress seat that deploys laterally outwardly from an upper frame of the bed;

FIG. 202 is a perspective view, similar to FIG. 201, showing a patient sitting on the deployed egress seat;

FIG. 203 is a side elevation view showing the patient sitting on the egress seat and a transport chair being wheeled up to the patient by a caregiver, the transport chair having horizontal arms that slide into channels situated at the side of the egress seat so that the patient is surrounded by portions of the bed and the chair during egress from the bed to the chair;

FIG. 204 is a perspective view showing the patient sitting on a seat of the transport chair;

FIG. 205 is a perspective view showing the horizontal arms of the transport chair spaced from, and aligned with, the channels of the egress seat;

FIG. 206 is a perspective view of patient room having a 3-dimensional (3D) sensor mounted to a panel of a headwall unit;

FIG. 207 is a perspective view showing a caregiver at a nurse's station using a computer to view an image obtained by the 3D sensor;

FIG. 208 is front elevation view of the computer of FIG. 207 showing the information displayed on a display screen of the computer prior to a remote weight reading of the patient being taken;

FIG. 209 is a front elevation view of the computer, similar to FIG. 208, showing information displayed on the display screen after the weight reading is taken;

FIG. 210 is a block diagram of the electrical systems of the universal care cart and bed of FIGS. 103-105; and FIG. 211 is a block diagram of the electrical system of the bed of FIG. 184 which has a heater in the footboard.

DETAILED DESCRIPTION

Referring to FIG. 1, a patient bed 10 has four siderails including a pair of foot rails 12 that each overlaps a respective head rail 14 of a pair of head rails 14. As a head section 16 of the bed is raised, each head rail 14 pivots about a respective circular hub 18 that does not pivot. Hub 18 includes a patient control panel 20. Each foot rail 12 is manually movable by a patient from a first position, shown in FIG. 1, to a second position, shown for example in FIG. 4. In the first position, the foot rail 12 blocks the patient from egressing from bed 10 as shown in FIG. 2. When the foot rail 12 is in the second position, the patient is able to egress from the bed as shown in FIG. 4.

While the patient manually moves one of the foot rails 12 between the first and second positions, a foot end 22 of the foot rail 12 translates along an upper frame 24 of the bed 10 and a head end 26 of the foot rail 12 translates along the associated head rail 14. The head rails 14 each have a track or groove 28 that receives an antifriction element (not shown), such as a roller or glide pad, that is mounted to a sidewall of the foot rail 12 near the head end 26. Another antifriction element (not shown) provides the interface between the foot end 24 of the foot rail 12 and the upper frame 24 of bed. In some embodiments, the upper frame also has a track or groove to receive the antifriction element.

The foot rail 12 of FIGS. 1-4 works similar to the manner in which a sliding door of a minivan works. Movement of the foot rails 12 of bed 10 between the first and second positions is easily accomplished by the patient. In some embodiments, a post extending from each foot rail 12 enters into an interior region of the associated head rail 14 through a slot and attaches to a gas cylinder damper situated in the interior region of the head rail 14. The gas cylinder damper holds the foot rail 12 in any position between the first and second positions relative to the head rail 14. When the foot rail 12 is in the second position, as shown in FIG. 4, it overlaps nearly the entirety of the head rail 14 when viewed from alongside the bed 10.

As shown in FIG. 1, bed 10 has a caregiver control pod 30 mounted to the foot rail 12. The pod 30 is a wireless module communicates wirelessly with bed control circuitry carried by the upper frame of the bed. Thus, there are no electrical wires that need to be routed through the foot rails 12 of bed 10.

Referring now to FIGS. 5-7, a patient bed 50 has four siderails including a pair of foot rails 52 and a pair of head rails 54. The foot rails 52 partially overlap a respective head rail 54 when the foot rails are in an extended position as shown in FIGS. 5 and 6. The foot rails 52 substantially overlap the head rails when the foot rails are in a retracted position as shown in FIG. 7. A foot end 56 of each foot rail has a downwardly extending arm 58 that carries an antifriction element 60, such as a roller of glide pad, that is received in a slot 62 formed in a frame member 64 of an upper frame 66 of the bed 50 as shown in FIG. 5. A head end 68 of each foot rail 52 includes a slider 70 that couples to an elongated middle tube 72 of the associated head rail 54. When the foot rails 52 are in an extended position relative to the associated head rail 54, the slider 70 is near a foot end 74 of the associated head rail 54. When the foot rails 52 are moved to the retracted positions relative to the associated head rails 54, the slider 72 is near a head end 76 of the respective head rail 54.

In the illustrative example, the foot rails 52 and the head rails 54 each having an upper tube 71, a middle tube 72, and a lower tube 73. When a head section 78 of bed 50 is lowered and the upper frame 66 is in a horizontal orientation, each of the tubes 71, 72, 73 of the foot rails 52 and head rails 54 are oriented substantially horizontally. End caps 79 are provided at the foot end 56 of foot rails 52 and both ends of the head rails 54. The end caps 79 interconnect the ends or the respective tubes 71, 72, 73. The slider 70 serves as the end cap at the head ends 68 of the foot rails 52. The sliders 70 are configured to accommodate the pivoting movement of the head rails 54 as the head section 78 is raised and lowered. Thus, each slider 70 includes an outer piece fixed to the tubes 71, 72, 73 of the associated foot rail 52 and an inner piece coupled to the middle tube 72 of the associated head rail 54. The inner piece of each of the sliders 70 is rotatable relative to the outer piece and the inner piece of each slider 70 slides along the middle tube 72 of the associated head rail 54 as the foot rail 52 is extended and retracted relative to the respective head rail.

Referring now to FIG. 8, a patient bed 80 has a button 82 on a head rail 84 that is pressed by a patient to initiate motorized lowering of an associated foot rail 86. Both head rails 84 of bed 80 have buttons 82 even though only one button 80 can be seen in FIG. 8. FIG. 9 shows an enlarged view of one of the buttons 82 and there is an indicia or icon 88 on button 82 that depicts the foot rail lowered and a patient swinging one leg out of bed over the lowered foot rail. Thus, a patient in bed 80 is able to lower the foot rails 86 by pressing button 82 on a respective head rail 84. In some embodiments, pressing button 82 also causes motorized raising of a head section 90 of bed 80. Head section 90 raises while button 82 is pressed and stops raising when button 82 is released. Additionally, in some embodiments, pressing button 82 also causes thigh and foot sections of bed 80 to flatten if they were raised to provide a knee break. The thigh and foot sections are unnumbered in FIGS. 8 and 10 but are well-known the art of patient beds. Further additionally, in some embodiments, a signal is sent from bed 80 to a nurse call system when either of buttons 82 is pressed in order to alert one or more nurses that the patient is preparing to exit bed 80. In some embodiments, a night light of bed 80 is turned on or is illuminated more brightly in response to either of buttons 82 being pressed as shown in FIG. 10.

In some embodiments, a caregiver control panel 92 of bed 80 includes user inputs that caregivers can use to lockout or disable buttons 82 from being usable by a patient to lower the foot rails 86 (and to disable the other bed movements and bed signal to a nurse call system that occur when button 82 is pressed). Of course, the user inputs also can be used to enable the functionality of button 82 after it has been disabled. If the buttons 82 are disabled and a patient presses either of buttons 82, a nurse call signal is sent from the bed to a nurse call system so that caregivers are made aware of the patient's desire to exit from bed 80 and can go to the patient's room to assist the patient. It is contemplated by this disclosure that foot rails 86 include normal latch releases for caregivers to manually lower siderails in a manner well known in the art. During motorized lowering of the foot rails 86 in response to presses of buttons 82, the motor speed is slow such that the lowering of the foot rails 86 by the patient occurs slowly. During normal latch release by a caregiver, the foot rails 86 can be lowered much more quickly.

Referring now to FIG. 11, a patient bed 100 has a pair of foot rails 102 that each includes a lever 104 that is accessible in a hand hole 106 and that is used by a patient to release the associated foot rail 102 for translational movement along a frame 108 of the bed 100. A grip handle 110 over the hand hole 106 has a stepped bottom surface to provide grip areas 112 separated by steps 114. The patient holds onto each respective grip area 112 while moving the foot rail 102 in increments toward a head end 116 of the bed 100. After the patient moves one of the foot rails 102 from an egress blocking position, as shown in FIG. 11, to an out-of-the-way position, as shown in FIG. 12, the patient is able to egress from bed 100 at its side.

As shown in FIG. 12, the bed frame 108 includes a longitudinally extending rail 118 that is supported by a pair of laterally extending tubes 120 at a distance from a longitudinally extending upper frame member 122 of bed 100. A slider 124 is mounted on rail 118 and a pair of links 126 interconnects the slider 124 and the associated foot rail 102. When slider 124 is located near a foot end 128 of rail 118, it is locked in place. When the patient pulls lever 104, slider 124 is unlocked from the rail 124 to permit the patient to manually move the associated foot rail 102, links 126, and slider 124 as a unit along rail 118 toward the head end of bed 116. When slider 118 reaches a head end 130 of rail 118, it once again locks in place on rail 118. A second release lever 132 is provided on each foot rail 102 for use by the patient to unlock slider 118 from its locked condition adjacent head end 130 of rail 118 so that the foot rail 102, links 126 and slider 124 can be moved back to their original position blocking patient egress from the bed 100.

Other features of bed 100 include a cup holder 134 that stores flush in one of a pair of head rails 136, as shown in FIG. 11, and a pendulum cup holder 138 that is coupled to the other of the pair of head rails 136, as shown in FIG. 12. The pendulum cup holder pivots relative to the head rail 136 due to the force of gravity in order to maintain a drink cup in an upright position as the head section of bed 100 is raised and lowered. In some embodiments, a night light of bed 100 is turned on or made to illuminate more brightly in response to lever 104 being actuated to unlock an associated foot rail 102 for movement toward the head end 116 of bed 100. Each foot rail 102 and each head rail 136 includes a release handle 140 that is used by a caregiver to manually unlock the associated foot rail 102 or head rail 136 for manual lowering.

Referring now to FIG. 13, a patient bed 142 has four side rails including a pair of foot rails 144 and a pair of head rails 146. Each foot rail 144 is coupled to a circular hub 148 and is able to be manually rotated by a patient relative to the hub 148 from a horizontal lowered position, shown in FIG. 14, to a vertical raised position to permit patient egress from the bed 142 as shown in FIG. 13. Each head rail 146 is also coupled to a respective hub 148 and is able to rotate relative to the hub 148 between respective raised and lowered positions. The head rails 146 rotate relative to hub 148 when a head section 150 of bed 142 is raise and lowered. In the illustrative example, the foot rails 144 and the head rails 146 on each side of bed 142 rotate about a common axis 152 of hub 148. A stop within hub 148 prevents the foot rails 144 from rotating below their horizontal lowered positions. Hubs 148 are each coupled to one end of an L-shaped arm 154 that has its other end coupled to a frame member 156 of an upper frame 158 of bed 142.

Referring now to FIG. 15, a mattress support deck 160 has left and right turn assist panels 162, 164 coupled to a head section 166 of the deck 160. Panels 162, 164 are each rectangular in the illustrative example. Head section 166 has a pair of rectangular holes 168 formed therein, only one of which can be seen in FIG. 15. The panels 162, 164 are pivotably coupled to end walls 170 that define the head end and foot ends of each hole 168. The pivotable coupling of the panels 162, 164 to walls 170 is adjacent to the corner regions of holes 168 toward the central region of head section 166. A cam 172 is mounted to a shaft 174 that extends longitudinally between walls 170 of hole 168. The shaft 174 is situated about midway between the corner regions of hole 168 and is a parallel with the long sides of the rectangular hole 168. Cam 172 is mounted on shaft 174 about midway between the end walls 170 of hole 168. Each cam 172 engages a bottom surface of the respective panel 162, 164.

Rotation of each shaft 174 by a respective motor (not shown) in a first direction causes the associated cam 172 to wipe against the bottom surface of the respective panel 162, 164 and lift the panel upwardly as shown in FIG. 15 for panel 162. Rotation of each shaft 174 by the respective motor in a second direction, opposite to the first direction, permits the associated panel 162, 164 to lower back down onto head section 166. It will be appreciated that shafts 174 are rotated less than a full revolution, such as on the order of about 90°, while lifting and lowering panels 162, 164. Movement of panels 162, 164 upwardly provides a bed 176 with turn assist functionality as shown in FIG. 16. Thus, a mattress 178 of bed 176 has a portion lifted upwardly by the articulated left turn assist panel 162 in the illustrative example. Also in the illustrative example, mattress 178 is a foam mattress.

Referring now to FIG. 17, a portion 180 of another patient bed has head and foot rails 182, 184 on one side of a mattress 186 remaining in horizontal alignment even though a head section 188 of a mattress is raised. A head rail 182 on an opposite side of the mattress 186 includes a head rail portion 190 that pivots upwardly to provide additional egress barrier coverage in the region of the raised head section 188 of mattress 186.

As shown in FIG. 18, the head rails 182 each have a push button 192 near a head end 194 of the head rail 182. Button 192 is pressed to release portion 190 for upward manual movement. When button 192 is released, portion 190 is locked in place in its raised position. A patient control panel 196 extends laterally from a foot end 198 of the head rail 182 and a set of caregiver controls 197 are provided on an inclined surface 199 near the foot end 198 of each head rail 182 as also shown in FIG. 18. In the FIG. 19 example, buttons 192 are omitted and the head rail portion 190 pivots upwardly automatically in response to the head section 188 of the mattress 186 being raised. Accordingly, portion 190 is moved by a motor in the FIG. 19 example.

Figure 21:
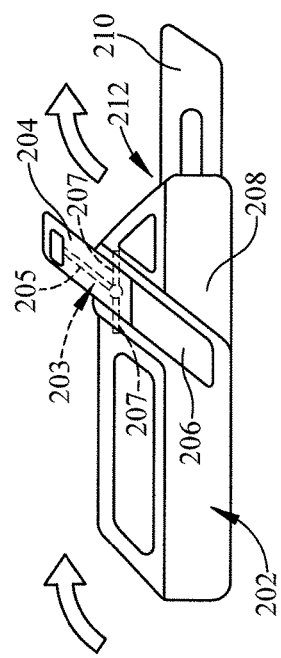
FIG. 21 is a side view of the foot rail of FIG. 20 showing the extendable egress handle raised upwardly within the inclined channel and showing a second egress handle that is extendable horizontally from a head end of the foot rail to provide a grip handle for use by a patient egressing from the bed when the foot rail is in a raised position.
Figure 22:
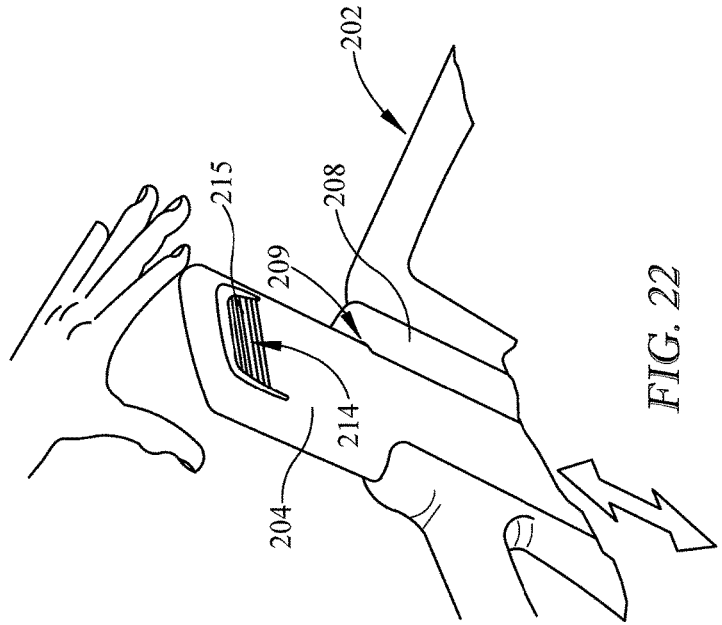
FIG. 22 is an enlarged perspective view of the extendable egress handle and the inclined channel that guides the movement of the extendable egress handle.
Figure 33:
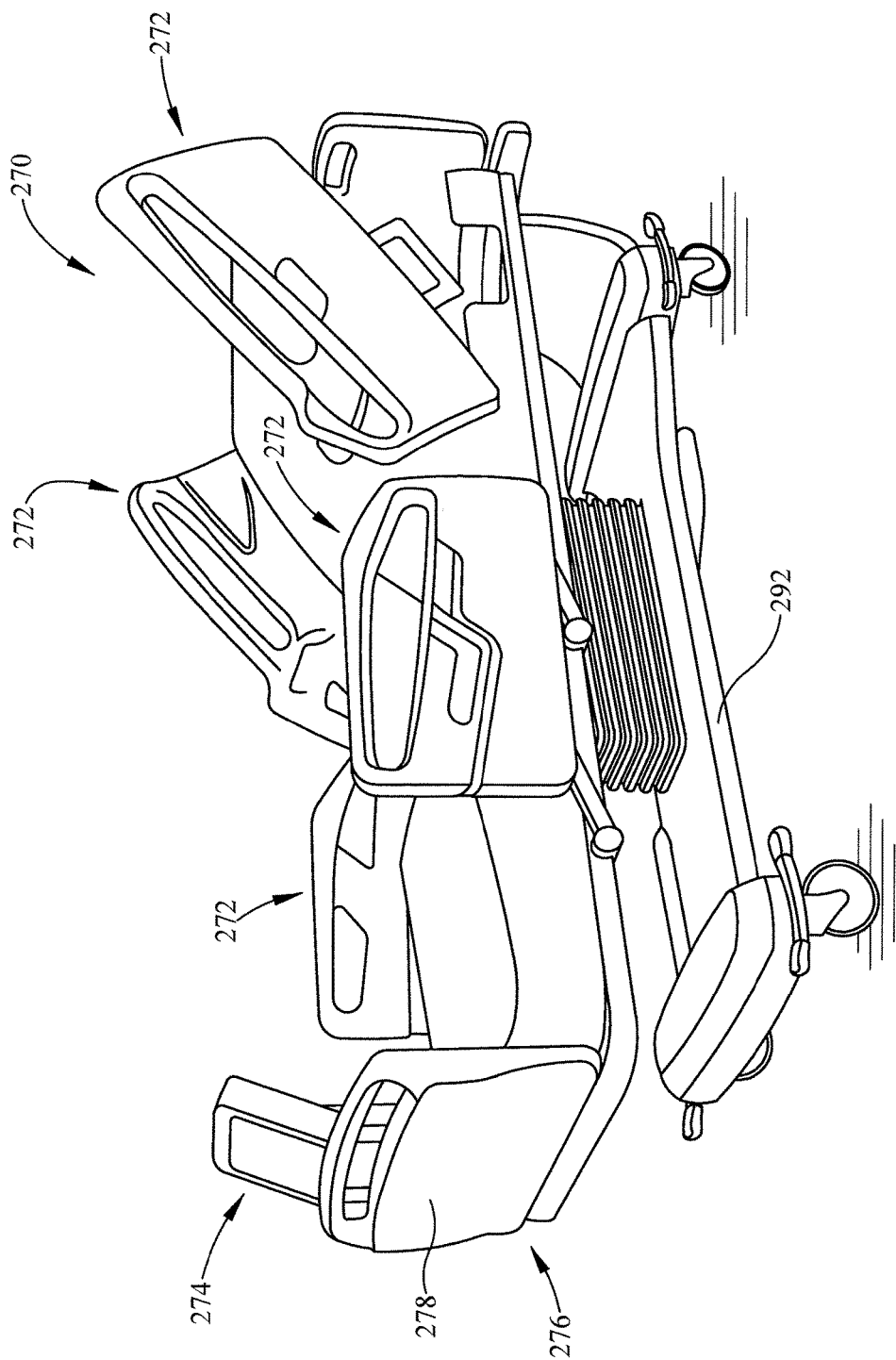
FIG. 33 is a perspective view of still another patient bed.

Referring now to FIG. 20, a patient bed 200 has a siderail, illustratively a foot rail 202, in a lowered position and has an extendable egress handle 204 raised upwardly within an inclined channel 206 formed in a foot rail body 208 to provide a grip handle for use by a patient egressing from the bed 200 when the foot rail 202 is in the lowered position. The incline of the channel 206 is such that the egress handle 204 moves within the channel 206 along a path that is neither horizontal nor vertical. Channel 206 terminates at an opening 209 located at the top of body 208 and handle 204 moves upwardly out of opening 209 when being raised to a use position. As shown in FIG. 21, foot rail 202 has a second egress handle 210 that is extendable horizontally from a head end 212 of the foot rail body 208 to provide a grip handle for use by a patient egressing from the bed when the foot rail 202 is in a raised position. FIG. 22 shows that the extendable egress handle 204 has a recess 214 that facilitates the patient gripping the upper end region of handle 204.

A lock 203 is provided in handle 204 to lock handle 204 in the raised position relative to body 208 of siderail as shown in FIG. 21. Lock 203 includes a linkage 205 and a pair of pins 207 that extend outwardly from sides of handle 204 and that are received in apertures (not shown), such holes or pockets, formed in walls of body 208 that define the sides of channel 206. A paddle 215 in recess 214 is moved by the patient to actuate linkage 205 thereby to retract pins 207 from the apertures to permit handle 202 to be moved from the raised, use position back to a lowered, storage position. A similar type of lock is provided in handle 210 in some embodiments. Other suitable locks that may be used in lieu of illustrative lock 203 include a wrap spring clutch mechanism (e.g., a MECHLOK® device available from Porter Systems, Inc. of Novi, Mich.) having one end attached to handle 204 and the other attached to body 208 of siderail 202, a locking gas spring having one end attached to handle 204 and the other end attached to body 208 of siderail, a ratchet type mechanism, and a jack screw device, just to name a few.

Referring now to FIGS. 23-26, a patient bed 220 has head and foot rails 222, 224 that each comprises a curved flexible panel 226. A pair of curved guide posts 228 is each located between respective head and foot rails 222, 224 to provide guide channels for a head end of the respective foot rail 224 and a foot end of the respective head rail 222. A control pendant 230 is extendable out of a channel 232 formed in each post 228. Pendant 230 has patient controls on one side and caregiver controls on the other side. A head board 234 of bed 220 has guide channels for head ends of the head rails 222 and a foot board 236 has guide channels for foot ends of the foot rails 224.

The movement of head rails 222 between raised and lowered positions is guided by the guide channels of the head board 234 and guide posts 228. In a similar fashion, the movement of foot rails 224 between raised and lowered positions is guided by the guide channels of the foot board 236 and guide posts 228. As shown in FIG. 24, after the head and foot rails are moved to respective lowered positions, the guide posts are able to be folded downwardly to a storage position.

Referring now to FIG. 27, a patient bed 240 has a head rail 242 with a foot end portion 244 pivoted to a head end portion 246 for movement about a generally vertical pivot axis 248. The foot end portion 244 of the head rail 242 pivots by about 90° relative to the head end portion 246 so that the foot rail portion 244 extends away from an associated mattress 250 to provide a grip handle for patient egress as shown in FIG. 28.

Referring now to FIG. 29, a patient bed 260 has four siderails 262 that each include an upper section 264 that moves relative to a lower section 266 from a raised position to a lowered position such that when the upper section 264 is in the lowered position, the siderail is compact and can be rotated outwardly away from a mattress 268 of bed 260 and then slid underneath the mattress 268 for storage in an orientation substantially parallel with the mattress 268. FIG. 30 shows one of the foot rails of the siderails 262 in the storage position. FIG. 31 shows the foot rail 262 pulled out from under the mattress and rotated slightly upwardly. FIG. 32 shows the foot rail 262 oriented vertically with the upper section 264 raised relative to the lowered section 266.

Figure 35:
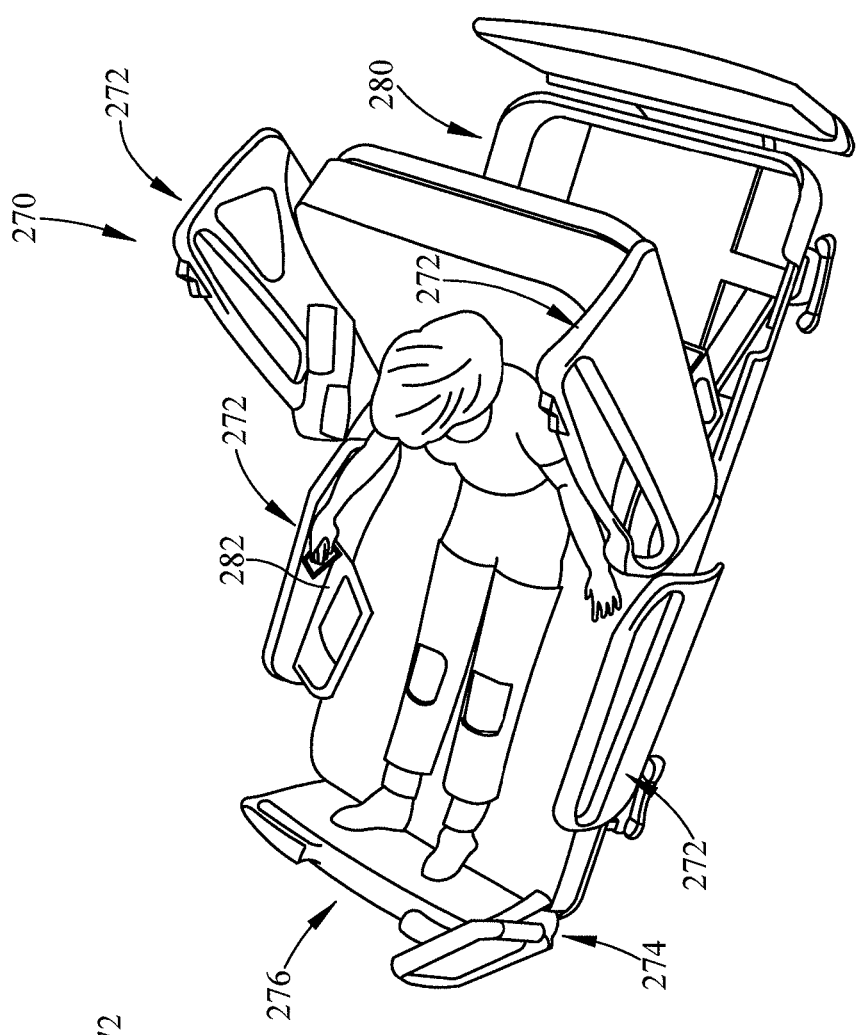
FIG. 35 is a perspective view of the bed of FIG. 33 showing the GUI moved to a corner region of an upper frame of the bed, a fold out overbed table in a use position, and showing a patient's feet located against a footboard that includes a foot massager.
Figure 34:
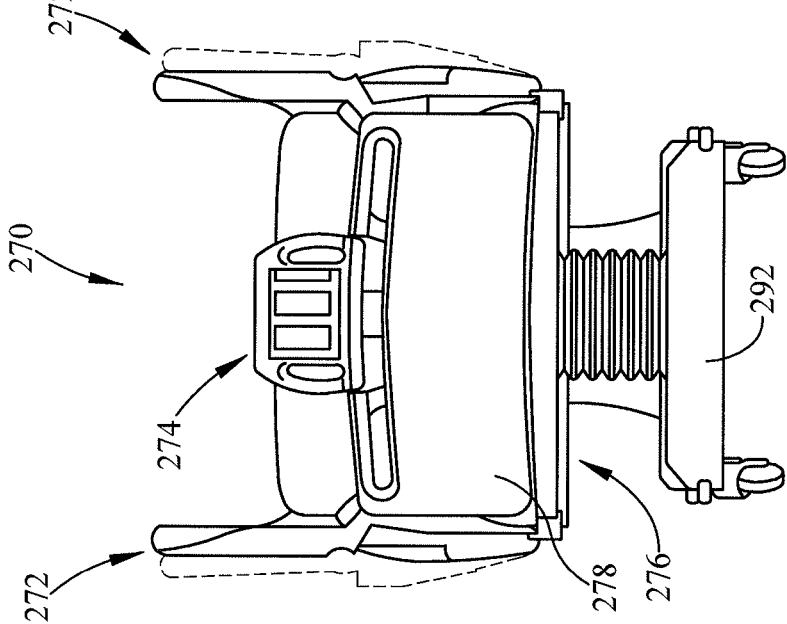
FIG. 34 is an end elevation view of the bed of FIG. 33 showing that the bed has expandable width siderails and a repositionable caregiver graphical user interface (GUI) at the foot end of the bed adjacent a central region of a footboard.

Referring now to FIGS. 33-38, a patient bed 270 has expandable width siderails 272 and a repositionable caregiver graphical user interface (GUI) 274. GUI 274 is shown at a foot end 276 of the bed adjacent a central region of a footboard 278 in FIGS. 33 and 34. The GUI 274 is moved to a corner region of an upper frame 280 of the bed 270 in FIG. 35. A fold out shelf or overbed table 282 in a use position relative to one of the siderails 272 is also shown in FIG. 35. Shelf 282 extends from the siderail in a cantilevered manner when in the use position. Shelf 282 is movable relative to the siderail from the use position to a storage position folded against the siderail 272. A patient's feet are located against footboard 278 and, according to this disclosure, the footboard 278 includes a foot massager (not shown).

According to this disclosure, an inductive charger is carried by shelf 282. For example, in some embodiments, the inductive charger is situated beneath the upper surface of shelf 282, such as being situated in an interior region of shelf 282. In some embodiments, the inductive charger is supported by the upper surface of shelf 282. It is also contemplated that, in some embodiments, an inductive charger is embedded in a recess in the upper surface of shelf 282 such that an upper surface of the inductive charger and an upper surface of the remainder of shelf 282 are substantially coplanar. The inductive charger is a Near Field 3 inductive charger in some embodiments. The inductive charger is operable to inductively recharge electrical devices placed upon the shelf. The electrical devices include, for example, a patient's smart phone, tablet computer, laptop computer, and the like.

In FIG. 36, one of the foot rails 272 is lowered for patient egress. The lowered foot rail 272 has a first portion 284 separated from and situated below a second portion 286 of the foot rail 272. As also shown in FIG. 36, a grip bar 288 is connected to a chair 290 and to a base frame 292 of the bed 270. As shown in FIG. 37, the patient grips a handle of the second portion 286 of the foot rail 272 and grips a handle of the head rail 272 in preparation for standing up from the bed 270. After the patient stands up, the patient uses the grip bar 288 that interconnects the base frame 292 of the bed and the chair 290. By gripping the grip bar 288, the patient is able to move from the bed 270 to the chair 290 and minimize the chance of falling.

Referring now FIG. 39, a mattress support deck 300 supports a mattress 302 and a pair of siderails 304. In FIG. 39, one of the siderails 304 is shown (in phantom) pivoting toward a position parallel with an upper surface 306 of the mattress for eventual storage under the mattress support deck 300. FIG. 40 shows a model constructed in accordance with FIG. 39. The siderail 304 in FIG. 40 is in a storage position beneath a section of the mattress support deck 300. In FIG. 41, the siderail 304 is pulled out from under the mattress support deck 300 and is being pivoted partially toward a raised position. A pair of arms 308 guides the movement of siderail 304 as it raises and lowers relative to deck 300. In FIG. 42, the siderail 304 is in the raised position.

Referring now to FIG. 43A, a siderail assembly has upper and lower siderail body sections and a pair of linkage arms extending from a bottom of the lower siderail body section. Each of the linkage arms has X, Y and Z segments as shown in FIG. 43B. The Z segment is the vertically oriented segment, the Y segment is the long horizontally oriented segment, and the X segment is the short horizontally oriented segment. The black background of FIGS. 43A and 43B prevents the use of reference numbers in these figures.

FIG. 44 shows a model constructed in accordance with FIGS. 43A and 43B. In FIG. 44, a siderail 310 is in a lowered position. The siderail 310 has first and second sections 312, 314 with the first section 312 being tucked behind the second section 314 in FIG. 44. In FIG. 45, a user is grabbing part of the upper siderail body section 312 in preparation for raising the siderail 310. In FIG. 46, the user continues to raise the siderail 310 which is shown in an intermediate position. In FIG. 47, the siderail 310 is in the raised position having the first section 312 situated above the second section 314.

Figure 48:
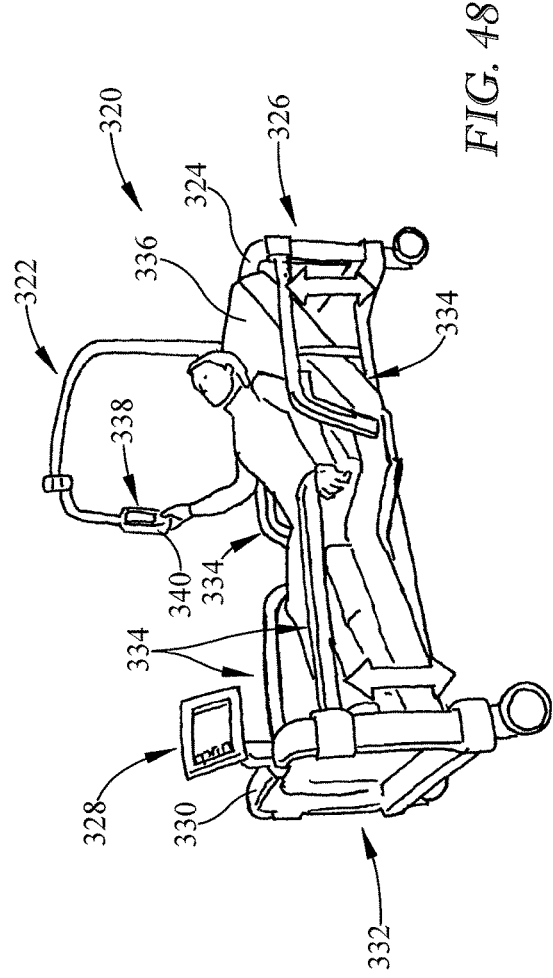
FIG. 48 is a perspective view of another patient bed showing a patient helper that is repositionable along a first laterally extending rail adjacent a head end of the bed, a GUI that is repositionable along a second laterally extending rail adjacent a foot end of the bed, and four siderails providing barriers along left and right sides of a mattress of the bed to prevent a patient from falling out of the bed.
Figure 49:
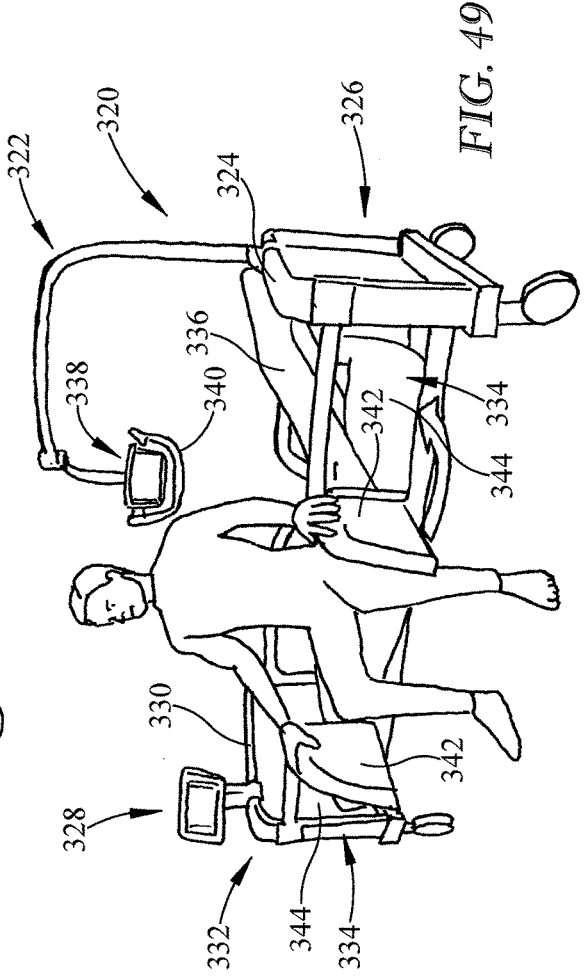
FIG. 49 is a perspective view of the patient bed of FIG. 48 showing first portions of each siderail adjacent central regions along the left side of the bed pivoted by about 90° relative to second portions of the siderails to provide an opening between the siderails through which the patient is able to egress from the bed.

Referring now to FIG. 48, a patient bed 320 has a patient helper 322 that is repositionable along a first laterally extending rail 324 adjacent a head end 326 of the bed 320. Bed 320 also has a GUI 328 that is repositionable along a second laterally extending rail 330 adjacent a foot end 332 of the bed 320. Bed 320 further has four siderails 334 that provide barriers along left and right sides of a mattress 336 of the bed 320 to prevent a patient from falling out of the bed. A GUI 338 is suspended from an end of the patient helper 322 and a grip handle 340 is built around the GUI 338. As shown in FIG. 49, first portions 342 of each siderail 334 adjacent central regions along the left side of the bed are pivoted by about 90° relative to second portions 344 of the siderails to provide an opening between the siderails 334 through which the patient is able to egress from the bed 320.

Referring now to FIG. 50, a patient bed 350 has a bed frame 352 that lacks traditional siderails, but instead has a pair of grab bars 354 on each side of bed frame 352. In FIGS. 50-52, the grab bars 354 that can be seen on one side of the bed 350 are in storage positions below a mattress 356 of the bed 350. Mattress 356 has barrier air bladders 358, shown for example in FIG. 54, that are situated along the sides of the mattress 356 and that are inflated to provide barriers 360 to inhibit the patient from falling out of the bed as shown, for example, in FIG. 51. In FIG. 52, the barrier air bladders 358 at the sides of a foot section 362 of the mattress 356 are in a deflated state while the other barrier air bladders 358 remain inflated to provide respective barriers 360 in the hip and torso region of the patient. In FIG. 53, the barrier air bladders 358 along one of the sides of the mattress 356 are deflated to permit patient egress from the bed 350. Also in FIG. 53, the grab bars 354 are pivoted upwardly to use positions to be gripped by a patient situated between the grab bars 354. FIG. 54 shows how the bladders 358, in an inflated state, create a barrier 360 of about 6.5 inches high with respect to an upper surface 364 of the central region of the mattress. In FIG. 55, the bladders 358 are in a deflated state;

Referring now to FIG. 56, a patient bed 370 is configured so that one of the siderails, in particular foot rail 372, is used as part of a patient lift system 374 when moved to a raised position over a central region of a mattress 376 of the bed 370. In FIG. 57, the lift system siderail 372 is moved to a position alongside the mattress 376 to serve as a traditional siderail for bed 370.

FIG. 58 shows an exploded view of the lift system 374 of the bed 370. The lift system 374 includes a winch lift housing 378 that contains a winch motor (not shown), a bent steel tube fame 380 with casters 382, a hub 384, a clevis or pivot housing 386, a cast aluminum pivot arm 388 with an adjustment slot 390, an L-shaped aluminum extruded lift arm 392, a sling 394, a sling arm 396 with hooks 398, and a tether 400 having one end coupled to sling arm 396 and the other end coupled to the motor in winch lift housing 378. Thus, tether 400 routes through the various components of lift system 374 between sling arm 396 and winch lift housing 378. The lower end of arm 388 is pivotably coupled to clevis 386 and the upper end of arm 388 is received inside the short segment of L-shaped arm 392. A threaded portion of T-handle 402 threads through an opening 404 of arm 392 and extends through slot 390 to engage the opposite wall of arm 388. Thus, the height of arm 392 and foot rail 372 above mattress 376 is adjustable by loosening T-handle 402, sliding arm 293 upwardly or downwardly on arm 388 to a desired height, and then tightening T-handle 402.

It will be appreciated that arm 388 is coupled to clevis 386 for pivoting movement about a substantially horizontal axis to permit the foot rail 372, arm 392, and arm 388 to pivot as a unit between the lowered position, shown in FIG. 57, and the raised position, shown in FIG. 56. Furthermore, clevis 386 is coupled to hub 384 for pivoting movement about a substantially vertical axis. As shown in FIG. 60, hub 384 includes first and second hub pieces 384a, 384 b and clevis 386 includes first and second clevis pieces 386a, 386b. A bushing 406 provides the pivot joint between clevis 386 and hub 384. Arm 388 is mounted to clevis 386 between clevis pieces 386a, 386b by a main pivot pin 408. A T-handle 410 threads through an opening 412 in clevis piece 386b and is used to tighten against the lower end of arm 388 to retain arm 388 in its raised or lowered position. A T-handle 414 threads through another opening 416 in clevis piece 386b and is used to tighten against an upper surface of hub 384 to retain clevis 386 and the components of lift system 374 supported thereby in place relative to hub 384. Thus, when T-handle 414 is loosened, the patient supported by sling 394 beneath foot rail 372 can be swung out from bed 370 to a position above another piece of patent support equipment such as a stretcher or wheelchair.

Referring now to FIG. 61, a patient bed 420 has collapsible siderails 422 with a vertically oriented center post 424 serving as a siderail support in a central region of an upper frame 426 of the bed 420. Bed 420 further includes lift legs 428 at the corners of upper frame 426 of bed 420 that extend through respective apertures 430 formed in caster shrouds 432. Legs 428 extend and retract such that shrouds 432 and upper frame 426 move upwardly and downwardly relative to legs 428. In the illustrative embodiment, caster shrouds 432 are coupled to the upper frame 426 to move upwardly and downwardly therewith. When legs 428 are fully retracted, the upper frame is in a lowered position having casters 434 engaging a floor beneath the caster shrouds 432 as shown in FIG. 62. When legs 428 are extended from the fully retracted positions, casters 434 are moved upwardly out of contact with the floor. To facilitate patient egress from a mattress 436 of the bed 420 when upper frame 426 is in the lowered position, the siderails 422 are moved to collapsed positions and the center posts 424 are pivoted to a horizontally oriented storage position alongside the upper frame 426 as also shown in FIG. 62.

Referring now to FIG. 63, a patient bed 440 has four siderails 442 each pivoted by a respective multi-axis joint 444 to an upper region of a respective lift post 446 at the corners of the bed 440. Multi-axis joints 444 permit movement of each siderail 442 from a use position extending generally horizontally alongside a mattress 448 of the bed 440 and an out-of-the-way position extending generally vertically upwardly from the upper region of a respective lift post 446 with a siderail body 450 oriented generally parallel with an endboard 452 of the bed as shown in FIG. 63 with regard to one of the siderails 442 at the left side of the figure.

As shown in FIG. 64, bed 440 is configured so that an upper frame 454 of the bed can be lowered with respect to the lift legs 446 so that casters 456 beneath caster shrouds 458 engage the floor. As shown in FIG. 65, each of the caster shrouds 458 substantially cover from view a respective caster 456 that is braked when the caster shroud 458 is lowered and that is unbraked when the caster shroud 458 is raised.

Referring now to FIG. 66, a mattress 460 has integrated siderail pads 462. In the illustrative example, pads 462 are included as part of a head section 464 of mattress 460. As shown in FIG. 67, a bottom surface 466 of the mattress 460 has a pad storage recess 468 formed therein. In the illustrative example, pad 462 and recess 468 are rectangular in shape and are similarly sized so that pad 462 fills the entirety of recess 468 when in a storage positions. A strip 470 of material tethers pad 462 to the remainder of mattress 460.

Referring now to FIG. 68, a patient bed 480 includes a repositionable GUI 482 which, in FIG. 68, happens to be located at a foot end corner region of the bed 480. GUI 482 includes a touchscreen display 484 in a housing 486 that is mounted atop an arm 488. A lower end of arm 488 includes a movable mount 490 that slidably couples to an upper frame 492 of bed 480. In FIG. 69, the GUI 482 is located at the foot end of the bed 480 near a central region of a footboard 494 of the bed 480. The electronics of GUI 482 communicate wirelessly with other bed electronics of bed 480 in some embodiments. In such embodiments, there are no wires that route from the GUI to other portions of bed 480. In alternative embodiments, the electronics of GUI communicate via a wired connection with other bed electronics.

As shown in FIG. 70, touch screen display 484 has a set of controls 496 including inputs to raise, lower, extend and retract a foot section of bed 480, inputs to articulate head, thigh and foot sections of a mattress support deck of bed 480, inputs to raise and lower an upper frame and mattress of bed 480, and a nurse call input. In FIG. 70, a hand avatar 498 appears on the display 484. As shown in FIG. 71, a patient is able to select controls on the GUI display 484 without touching the GUI 482 due to hand motions being detected within a sensor field 500, shown diagrammatically in FIG. 72, of the GUI 482. A sensor that defines field 500 is situated within an aperture 502 provided in housing 486 above display 484. The avatar 498 is shown on display 484 based on the position of the patient's hand within field 500. After the patient moves the avatar 498 to a desired position having a finger hovering over the particular user input 496 of interest, the patient moves his or her hand or finger in the direction of display 484 to mimic a button press. This movement is detected in sensor field 500 and bed 480 responds by activating the feature or function chosen by the patient.

Figure 73:
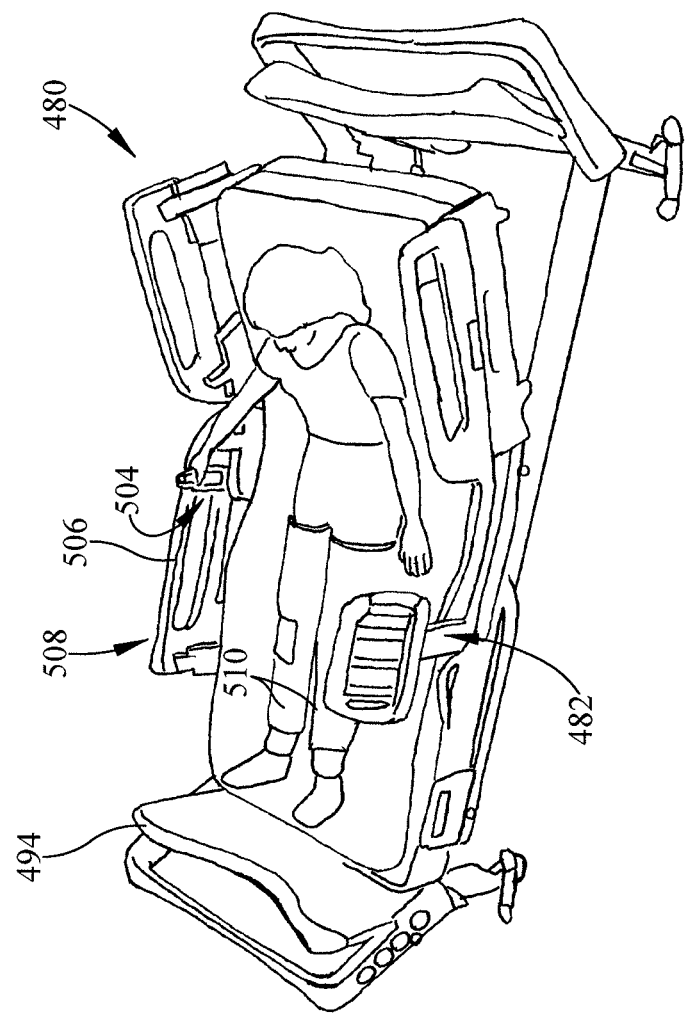
FIG. 73 is a perspective view of the bed of FIGS. 68 and 69 showing the GUI alongside a mattress of the bed, the footboard of the bed having an integrated sequential compression device attached to legs of the patient, and a wireless patient remote control pendant coupled to a siderail of the bed.
Figure 74:
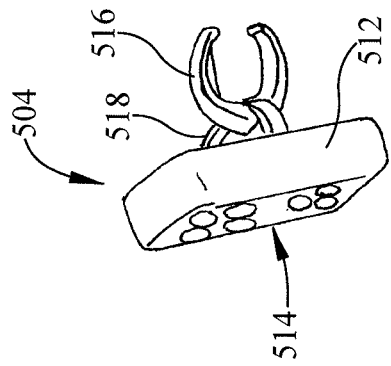
FIG. 74 is a perspective view of the wireless patient remote control pendant.

Referring now to FIGS. 73 and 74, bed 480 further includes a wireless patient remote control pendant 504 coupled to an upper rail 506 of a siderail 508 of the bed 480. As also shown in FIG. 73, the footboard 494 of the bed 480 has an integrated sequential compression system that communicates pressurized air via tubing to compression sleeves 510 that are attached to legs of the patient. As shown in FIG. 74, pendant 504 includes a box-shaped main housing 512 with user inputs 514 on a front of the housing 512 and a C-shaped clip 516 extending from an arched track 518 that extends from a back of the housing 512. Clip 516 is sized and shaped to snap onto and off of rail 506. When clipped to rail 506, housing 512 can be moved to desired position with track 518 sliding through clip 516 as the housing 512 is moved. Pendant 504 has electronics that communicate wirelessly with electronics elsewhere on bed 480. The wireless communication occurs in response to the patient pressing or otherwise selecting one of the user inputs 516 which in the illustrative example are membrane switches or buttons.

Referring now to FIG. 75, a patient control module 620 has a C-shaped clamp 622 that is sized and configured to snap onto an upper rail 624 of a siderail 626. The patient control module 620 has a main body 628 with user input buttons 630, a nurse call pendant 632 that is detachable from the main body 628, and a spring loaded clamp 634 that retains the nurse call pendant 632 in place relative to the main body 628. In some embodiments, the manufacturer of the nurse call pendant 632 is different than the manufacturer of main body 628 and clamp 634.

As shown in FIGS. 76 and 77, an arm 636 extends from clamp 634 and enters into an interior region of main body 628. One or more springs (not shown) in the interior region of the main body 628 act upon arm 636 to bias clamp 634 toward main body 628. Thus, when pendant 632 is placed in the space between clamp 634 and main body 628, the clamp 634 is biased against one of the sidewalls of the pendant 632 and the other of the sidewalls of pendant 632 is urged against a sidewall of the main body 628. Also, a bottom surface of pendant 632 rests atop an upper surface of arm 636 when pendant 632 is placed in the space between clamp 634 and main body 628.

Figure 78:
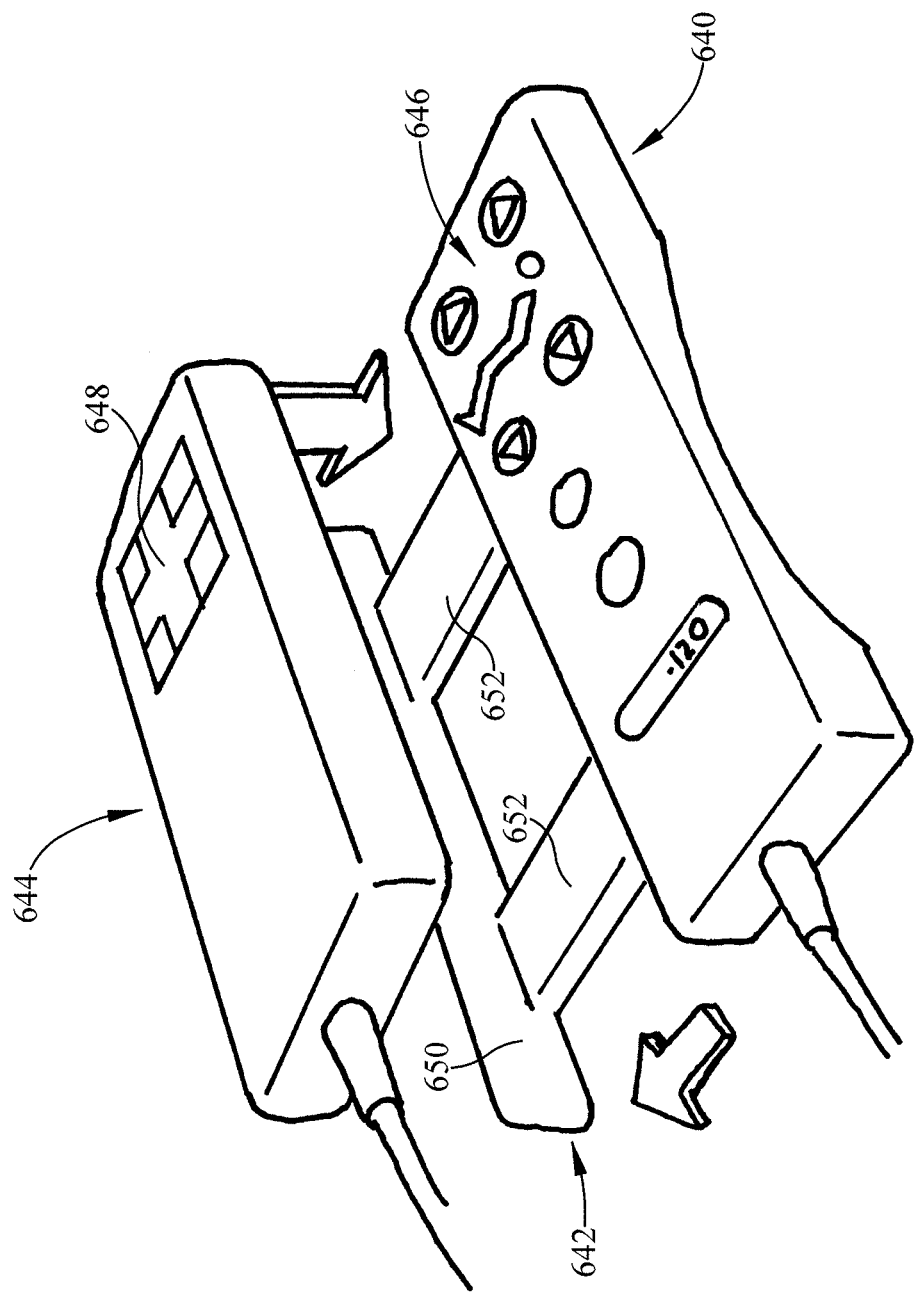
FIG. 78 is a perspective view showing a first pendant including a spring loaded retainer that holds a second pendant in position relative to the first pendant, the first pendant having bed control inputs and the second pendant having a nurse call button.

Referring now to FIG. 78, a first pendant 640 includes a spring loaded retainer 642 that holds a second pendant 644 in position relative to the first pendant 640. In the illustrative example, the first pendant 640 has bed control inputs 646 and the second pendant 644 having a nurse call button 648. Pendants 640, 644 may be made by different manufacturers. Retainer 642 includes a clamp arm 650 that is generally parallel with a sidewall of pendant 640. Retainer also has a pair of support arms 652 that each enter into an interior region of pendant 640. One or more springs (not shown) in the interior region of the pendant 640 act upon arms 652 to bias clamp arm 650 toward pendant 640. Thus, when pendant 644 is placed in the space between clamp arm 650 and pendant 640, the clamp arm 650 is biased against one of the sidewalls of the pendant 644 and the other of the sidewalls of pendant 644 is urged against a sidewall of pendant 640. Also, a bottom surface of pendant 644 rests atop upper surfaces of arms 652 when pendant 644 is placed in the space between clamp arm 650 and pendant 640.

Referring now to FIG. 79, a patient bed 660 has a shelf 662 pivoted to a use position relative to a barrier, such as illustrative foot rail 664 of the bed 660, and has a port 666 on another barrier, such as a head rail 668 of the bed 660, that is used to charge wireless devices such as phones, tablet computers, and the like when the barriers are in raised positions extending upwardly with respect to a patient support surface (e.g., mattress) so that the port is accessible to a patient supported on the patient support surface. In the illustrative example, a phone 670 is resting on shelf 662 and is being charged via port 666.

As shown in FIG. 80, shelf 662 is pivotable relative to the foot rail 664 between a first position (in phantom) overlying a mattress 672 of the bed 660 and a second position (in solid) extending in an opposite direction away from the mattress 672. As also shown in FIG. 80, a control panel housing 674 is pivoted upwardly out of a recess 676 in the head rail 668 to a raised position. The control panel housing 674 carries caregiver controls 678 that face away from the mattress 672 when the control panel housing 674 is in the raised position. In some embodiments, patient controls (not shown) on an edge of the control panel housing 674 are accessible to a patient on mattress 672 when housing 674 is in the raised position. Optionally, rail 668 has caregiver controls and/or patient controls at locations spaced from housing 674 in some embodiments.

As shown in FIG. 81, the shelf 662 is movable to an intermediate position inclined upwardly from the foot rail 664. As shown in FIG. 82, a display screen 671 of the phone 670 includes text indicating that bed control software to control features and functions of bed 660 can be downloaded to the phone 670 and indicating that the phone is charging.

Referring now to FIG. 83, a patient bed 680 includes a wireless pendant 682 that is used by a patient to control bed functions and a television 684 in the room. The bed 680 has an IR receiver 686 in a foot board 688 to receive signals from the wireless pendant 682 for control of the bed functions and features. The bed 680 further includes a flip over control panel housing 690 that is coupled to each head rail 692 and that has patient controls 694 located on a side of the control panel housing 690 as shown in FIGS. 83 and 84. The control panel housings 690 also each include caregiver controls 696 that face away from the associated head rail 692 when the respective housing 690 is moved to a storage position within a recess of the respective head rail 692. Thus, when housing 690 is in the recess, the caregiver controls 696 are accessible to a caregiver alongside bed 680 and the patient controls 694 are blocked from access by the head rail 692. When the control panel housing 690 is flipped over out of the recess, the patient controls 694 are exposed for use by a patient.

Referring now to FIG. 85, a patient bed 700 has a control unit 702 mounted to an end of an arm 704 that extends from a top of a foot board 706 toward a patient. The control unit 702 has a graphical display screen or GUI 708 and a motion detector or sensor (similar to that described above in connection with FIGS. 70-72) to detect movement of a patient's hand at a distance from the screen 708. A hand avatar is shown on GUI 708 when the sensor senses the patient's hand. In the illustrative example, caregiver controls 710 are located on a side of the control unit 702 as shown in FIG. 85. The control unit 702 has grip handles 712 located below the graphical display screen 708. In FIG. 86, a patient is grabbing one of the grip handles 712 to assist with egress from the bed.

Figure 88:
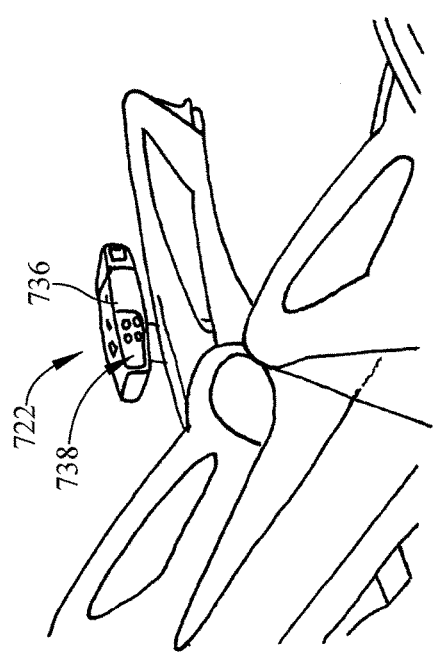
FIG. 88 is an enlarged view of the GUI of FIG. 87 showing that a GUI housing has patient controls on a back wall of the housing that face toward a patient.
Figure 89:
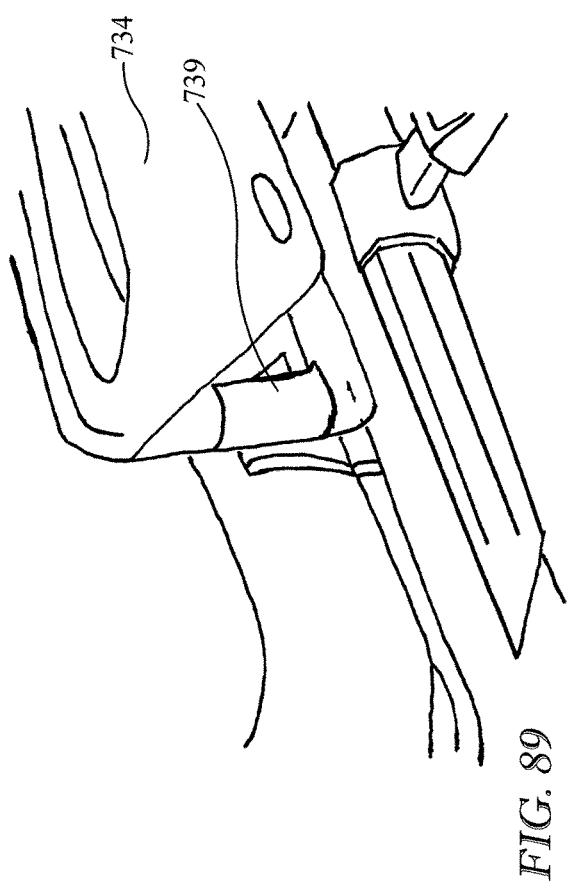
FIG. 89 is an enlarged view of a portion of one of the siderails of the bed of FIG. 87 showing that the siderail includes an integrated urinal.

Referring now to FIG. 87, a pair of patient beds 720 each have a caregiver GUI 722 located at an upper end of an arm 724 that couples, at its lower end, to a base 726 of the bed for sliding movement along a longitudinal dimension of the bed 720. Foot pedals 728 for bed control extend from the lower end of the arm 724. Each bed 720 also has a patient grip handle 730 extending from a hub 732 to which a head rail 734 of the bed 720 couples. As shown in FIG. 88, a GUI housing 736 of GUI 722 has patient controls 738 on a back wall of the housing 736 that face toward a patient. As shown in FIG. 89, one of the siderails 734 of the bed 720 includes an integrated urinal 739.

Figure 90:
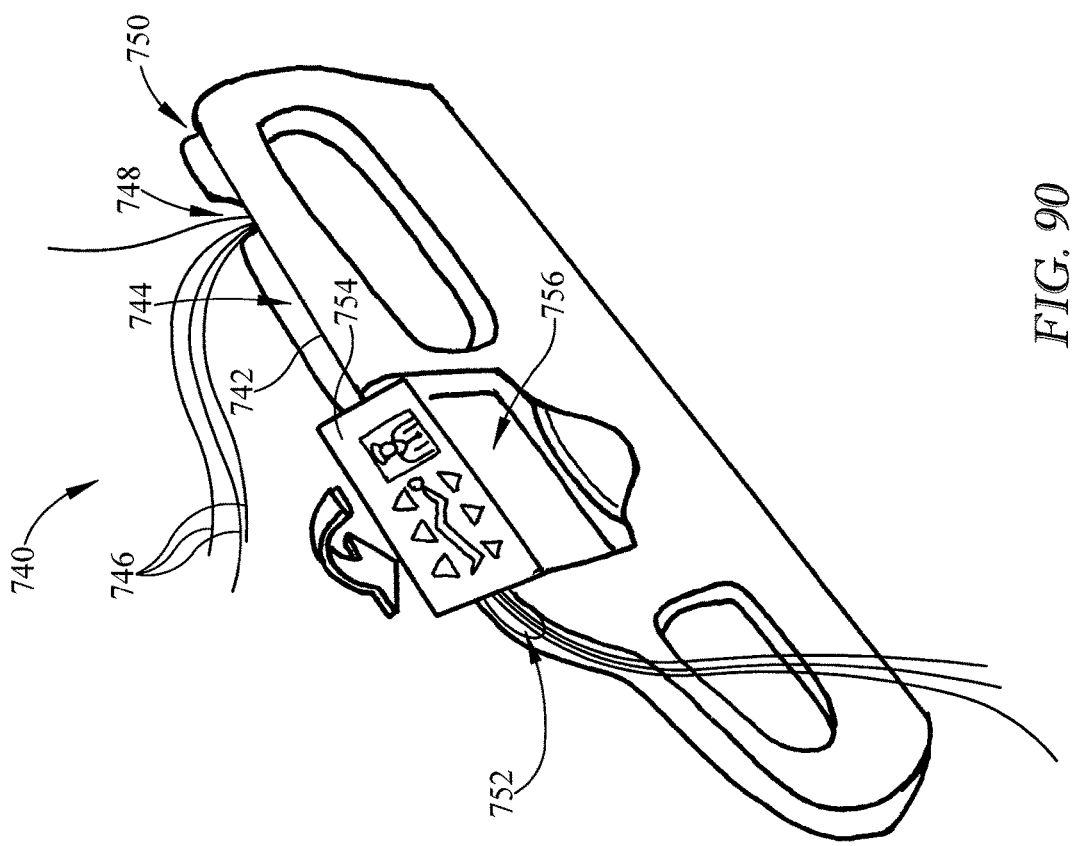
FIG. 90 is a perspective view of an alternative siderail showing that an upper surface of the siderail is formed with a trough through which patient care lines are routable and showing a caregiver control panel flipped upwardly to a raised position.

Referring now to FIG. 90, a siderail 740 has an upper surface 742 formed with a trough 744 through which patient care lines 746 are routed from one end of the siderail 740 to the other end. The patient care lines 746 enter one end of the trough 744 through a notch 748 or an end opening 750 and exit the other end of the trough 744 through an end opening 752. In the illustrative embodiment, a caregiver control panel 754 is flipped upwardly out of a recess 756 to a raised position.

Referring now to FIG. 91, a patient bed 760 includes a U-shaped grab bar 762 arching between mounts 764 that are situated adjacent head end corner regions of a mattress 766. A control unit 768 extends over a patient from a central region of the U-shaped grab bar 762. The control unit 768 has caregiver controls 770 on a sidewall 772 thereof. The grab bar 762 includes hand grip areas 774 with bumps 776 adjacent each side of the control unit 768.

As shown in FIG. 92, an undersurface 778 of the control unit 768 includes a patient control panel 780, an air flow fan 782 on each side of the patient control panel 780, a nurse call button 784 above the patient control panel 780, and a light 786 with adjacent on/off switch 788 above the nurse call button 784. In FIG. 93, a patient is shown reaching upwardly to engage the patient control panel 780. An arrow 789 in FIG. 93 indicates that the U-shaped grab bar 762 can be moved in that direction relative to the pivot mounts 764 so as not to obstruct patient egress.

Referring now FIG. 94, a patient bed 790 has a patient helper 792 having a first arm portion 794 extending upwardly from a mount collar 796 that attaches to a horizontally oriented arched rail 798 located at a head end 800 of the bed 790, a second arm portion 802 extending in a generally horizontal cantilevered manner from an upper end of the first arm portion 794 over a head section 804 of a mattress 806 and mattress support deck 808 of the bed 790, a third arm portion 810 that telescopically extends and retracts relative to the second arm portion 802 (as indicated by the double headed arrow 812). Rail 798 is generally triangular in cross section and collar 796 is shaped complementary to the rail 798.

Patient helper 792 includes a trapeze grab bar 814 hanging at a lower end of a tether 816 that extends downwardly from an end of the third arm portion 810. Patient helper 792 further includes an oxygen tank holder 818 defined by a cylindrical wall situated at an end of an arm 820 that extends from a bottom end of the first arm portion 794 of the patient helper 792. A bottom wall or cross member or other suitable stop (not shown) is provided at the bottom of tank holder 818 to prevent an oxygen tank from slipping out of the bottom of holder 818. The entire patient helper 792 is repositionable along the arched rail 798.

As shown in FIG. 95, the trapeze grab bar 814 is generally triangular in shape with tubular portions 814a, 814b, 814c. Tubular portion 814b has a pair of hand grip areas 822. The trapeze grab bar 814 also includes a triangular patient control housing 824 with patient controls 826. In FIG. 96, it can be seen that the arched rail 798 is generally triangular in cross section and the collar 796 is shaped complementary to the rail 798. A double headed arrow 828 in FIG. 96 indicates the ability to reposition the patient helper 792 along the arched rail 798.

Figures 97, 98:
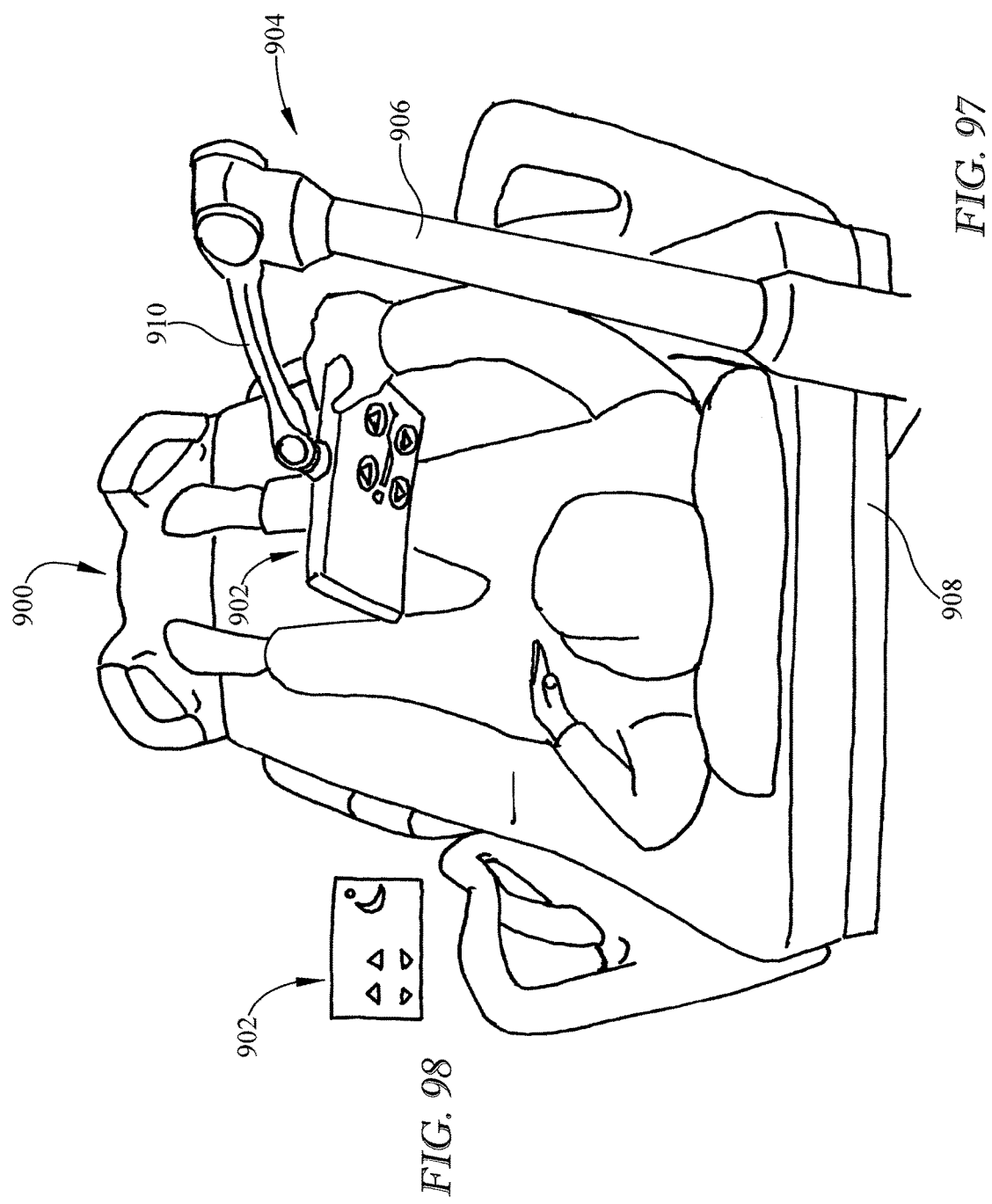
FIG. 97 is perspective view of another patient bed showing a transparent patient control panel mounted to an end of an articulated arm assembly that has a first arm extending upwardly from a head deck section and a second arm extending from an upper end of the first arm over the head deck section.
FIG. 98 is a front elevation view of the transparent patient control panel showing the panel in a night mode, the images on the transparent patient control panel being controlled via organic light-emitting diode/heads up display (OLED/HUD) technology.

Referring now to FIG. 97, a patient bed 900 has a transparent patient control panel 902 mounted to an end of an articulated arm assembly 904 that has a first arm 906 extending upwardly from a head deck section 908 and a second arm 910 extending from an upper end of the first arm 906 over the head deck section 908. Patient control panel 902 and arm assembly 904 are repositionable as a unit along the frame, particularly head deck section 908, of bed 900. In FIG. 97, control panel 902 has graphical user inputs displayed in a first format for day time use. In FIG. 98, the transparent patient control panel 902 is in a night mode having the user inputs displayed in a second format. In the illustrative embodiment, the images on the transparent patient control panel 92 are controlled via organic light-emitting diode/heads up display (OLED/HUD) technology. The day mode and night mode of control panel 902 helps the patient to properly maintain their biological clock because of the visual feedback provided to the patient as to the time of day (e.g., day time or night time).

Figures 99, 100:
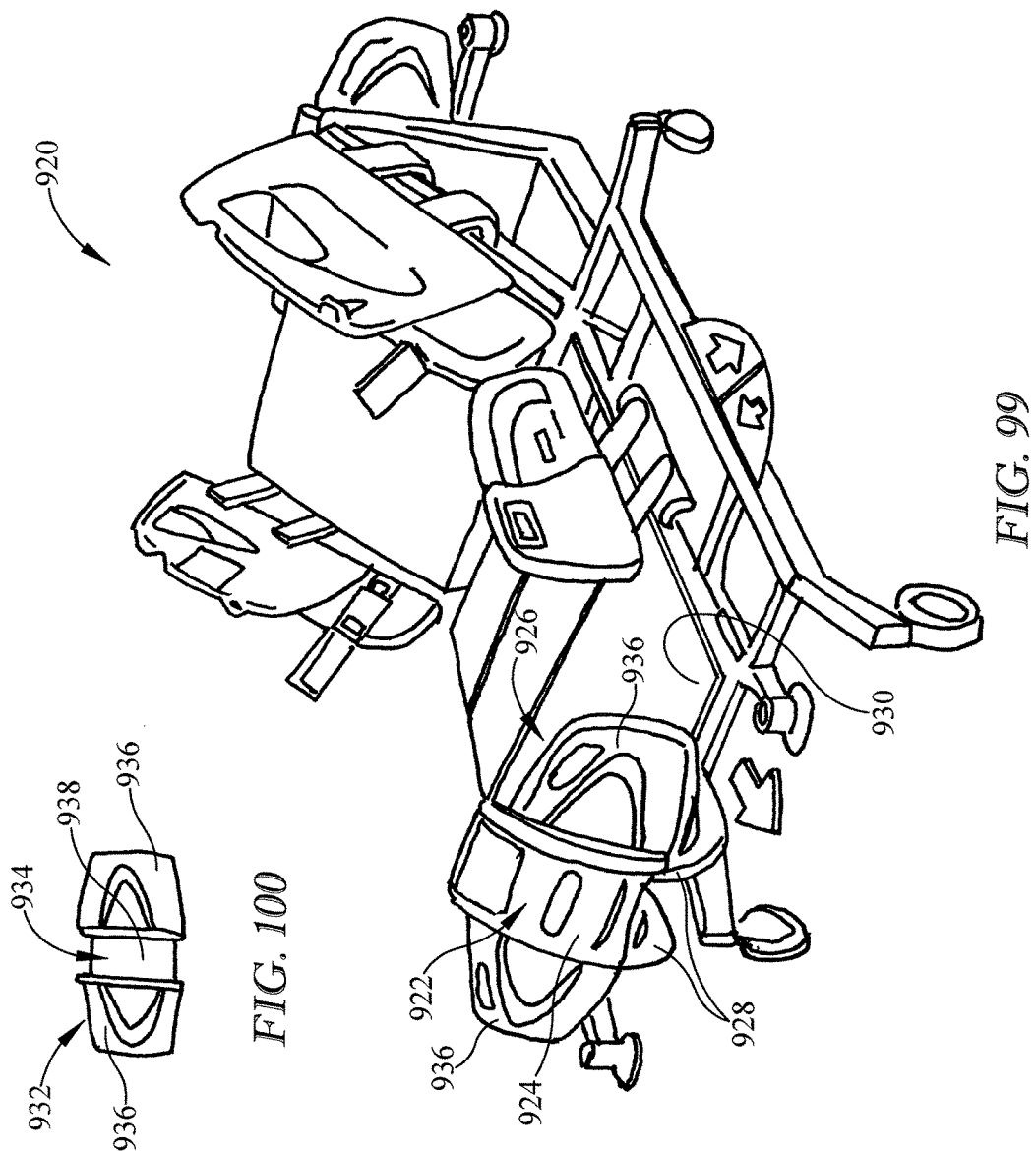
FIG. 99 is a perspective view of a further patient bed showing a caregiver control unit having a housing that serves as a central region of a footboard.
FIG. 100 is a front elevation view of a footboard panel that snaps onto the housing of the caregiver control unit, the footboard panel having a central recess that receives a portion of the housing.

Referring now to FIG. 99, a patient bed 920 has a caregiver control unit 922 having a housing 924 that serves as a central region of a footboard 926. A pair of arms 928 supports the footboard 926 relative to a foot deck section 930 of bed 920. Arms 928 are manually extendable and retractable relative to foot deck section 930. When extended, a caregiver inserts pillows into the gap created between the footboard 926 and a mattress (not shown but similar to those disclosed herein) supported on bed 920. Thus, the pillows increase the length of the patient support area on bed 920. As shown in FIG. 100, a footboard panel or wing set 932 snaps onto the housing 924 of the caregiver control unit 922. The footboard panel 932 has a central recess 934 that receives a portion of the housing 924 and wings 936 on opposite sides of the recess 934. A back wall 938 of footboard panel 932 interconnects the wings 936.

Figure 102:
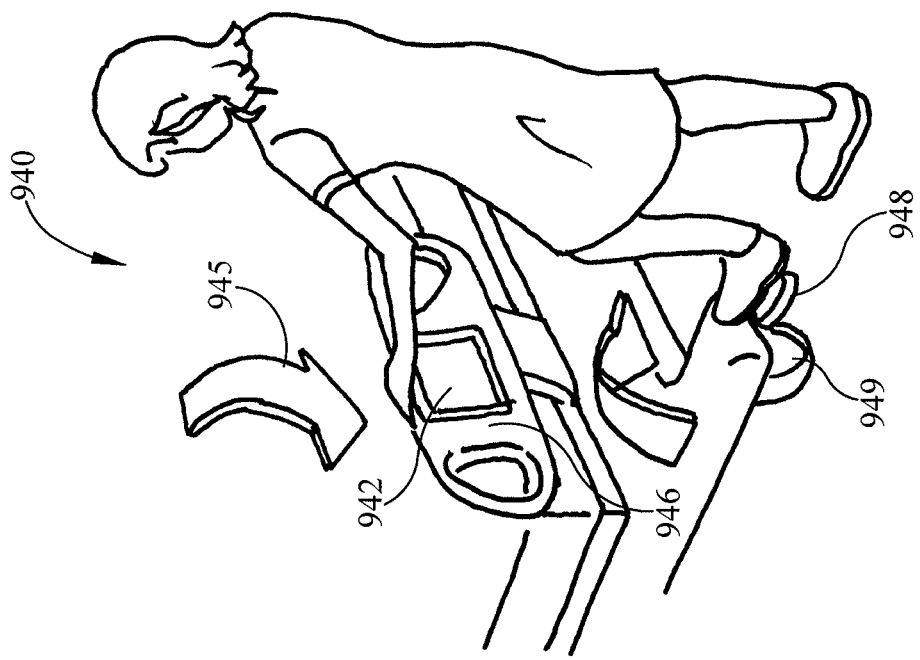
FIG. 102 is a perspective view, similar to FIG. 101, showing the caregiver GUI being automatically pivoted back into the recess in the siderail to a storage position in response to the caster brake pedal being moved to a neutral or steer position.
Figure 101:
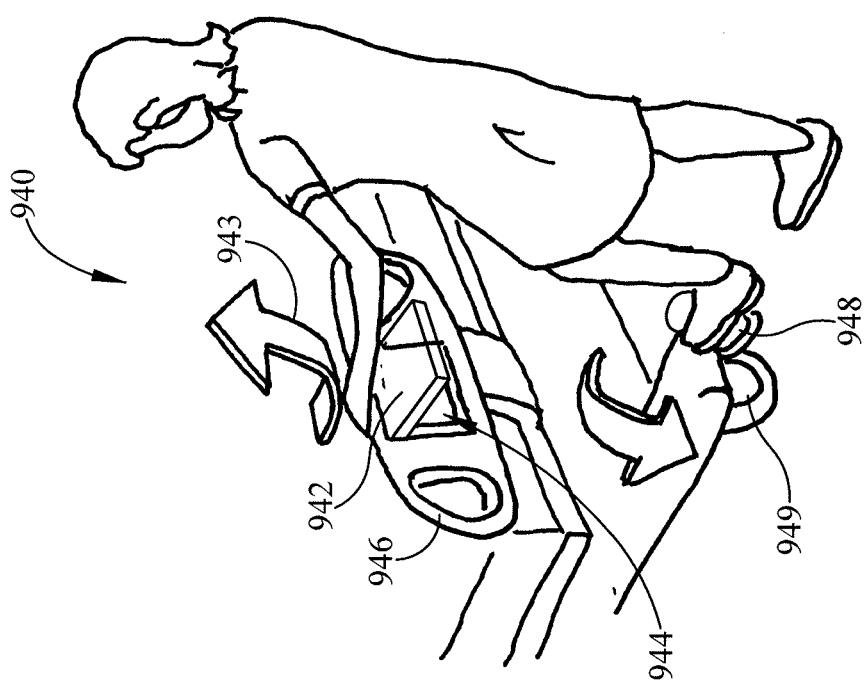
FIG. 101 is a perspective view of a portion of another patient bed showing a caregiver GUI being automatically pivoted out of a recess in a siderail to an ergonomic use position in response to a caster brake pedal being moved to a brake position to brake casters of the bed.

Referring now to FIG. 101, a patient bed 940 has a caregiver GUI 942 that is automatically pivoted in the direction of arrow 943 out of a recess 944 in a siderail 946 to an ergonomic use position in response to a caster brake pedal 948 being moved to a brake position to brake casters 949 of the bed 940. In FIG. 102, the caregiver GUI 942 is automatically pivoted in the direction of arrow 945 back into the recess 944 in the siderail 946 to a storage position in response to the caster brake pedal 948 being moved to a neutral or steer position. A controller (not shown) of bed 940 receives signals from one or more sensors (not shown), such as limit switches, to indicate the position of pedal 948 and then the controller signals a motor (not shown) to pivot GUI 942 in direction 943 or direction 945 as the case may be.

Referring now to FIGS. 103-105, a caregiver universal remote cart 950 is used to control a patient bed 951 and other patient care equipment in a patient room. As shown in FIG. 104, the caregiver universal remote cart 950 has a GUI 952 mounted to a top of a pole 954, a tray 956 mounted to the pole 954 beneath the GUI 952, a base 958 with casters 960 coupled to a lower end of the pole 954. The base 958 having foot operated controls 962 or foot inputs to control features of the patient bed. In the illustrative example, the foot operated controls control used to raise and lower an upper frame of bed 951 relative to a base and to control tilting of the upper frame between Trendelenburg and reverse Trendelenburg positions. As shown diagrammatically in FIG. 105, wireless signals 964 are transmitted between the caregiver universal remote cart 950 and some of the other equipment in the hospital room.

Thus, bed control cart 950 is used for controlling features of patient bed 951 and includes wheeled base 958 with foot inputs 962, support 954 extending upwardly from wheeled base 958, and GUI 952 supported by support 954. In some embodiments, GUI 952 is a touchscreen display that displays hand inputs such as icons and buttons that are selected by a caregiver to control features of bed 961 and to control features of other equipment in the patient room. While the present disclosure is intended to cover any and all graphical depictions on GUI 952 for providing hand inputs for controlling bed 951 and other medical equipment, some representative examples of suitable bed control screen shots providing hand inputs can be found in U.S. Pat. No. 8,572,778 and in U.S. Patent Application Publication No. 2012/0089419, each of which is hereby incorporated by reference herein to the extent not inconsistent with the present disclosure which shall control as to any inconsistencies. Additionally, GUI 952 displays data of an informational nature (e.g., bed data, head of bed angle, patient weight) on various screens in some embodiments. Exemplary details of the use of a GUI to control patient bed and devices other than patient beds can be found in U.S. Patent Application Publication No. 2014/0297327 which is hereby incorporated by reference herein to the extent not inconsistent with the present disclosure which shall control as to any inconsistencies.

As shown in FIG. 210, cart 950 includes circuitry 966 configured to send wireless signals, such as via transmitter 967, to control the features of bed 951 in response to use of each of the foot inputs or controls 962 and hand inputs from GUI 958 of bed control cart 950. In some embodiments, some or all of circuitry 966 is housed in base 958 of cart 958. Alternatively or additionally, some or all of circuitry 966 is housed in the structure that carries GUI 958 at the upper region of support 954. Further alternatively or additionally, some or all of circuitry 966 is housed in an interior region of tray 956 and/or support 954. Cart 950 also includes a battery 968 to provide power to circuitry 966 and to GUI 958 and foot controls 962.

Still referring to FIG. 210, bed 951 includes circuitry 2102 that receives wireless signals from cart 950 such as via receiver 2104. In some embodiments, circuitry 966 of cart 950 and circuitry 2102 of bed 951 is configured for bidirectional wireless communication with each other. In such embodiments, transceivers 967, 2104 are provided, respectively. However, it is within the scope of this disclosure for cart 950 and bed 951 to each have separate receivers and transmitters rather than transceivers 967, 2104. Circuitry 2102 of bed 951 is also coupled to user inputs 2106, motors 2108, a scale system 2110, a pneumatic system 2112, alarms 2114, an AC power plug 2116 and an input/output (I/O) port or module 2118. Port 2118 coupled either via a wired connection or a wireless connection to a network 2120 of a healthcare facility so that data from bed 951 can be communicated to computer devices (e.g., nurse call computers, EMR computers, ADT computers, locating and tracking computers, etc.) of network 2120. In some embodiments, data from cart 950 is communicated to network 2120 via circuitry 2102 of bed 951. Alternatively or additionally, data is communicated to network 2120 from cart 950 without involving bed 951 in the communication path, such as by transmissions from transmitter 967 to a wireless access point of network 2120, for example. In some embodiments, transmissions are sent from devices of network 2120 to cart 950 and/or bed 951.

It should be appreciated that the block diagrams of FIG. 210 for cart 950 and bed 951 are rudimentary in nature but, nonetheless, are illustrative of the relevant aspects disclosed herein. Examples of the circuitry and related components of some suitable hospital beds 950 can be found in "*Service Manual, Progressa™ Bed From Hill-Rom,*" © 2013, Hill-Rom Services, Inc.; "*Service Manual, TotalCare® Bed System From Hill-Rom,*" © 2008, Hill-Rom Services, Inc.; and "*Service Manual, VersaCare® Bed From Hill-Rom,*" © 2008, Hill-Rom Services, Inc.; each of which is hereby incorporated by reference herein to the extent not inconsistent with the present disclosure which shall control as to any inconsistencies.

In some embodiments, foot inputs 962 control raising and lowering of an upper frame of the patient bed 951 relative to a base of patient bed 951. Alternatively or additionally, the foot inputs control tilting of the upper frame of the patient bed 951 between Trendelenburg and reverse Trendelenburg positions. Further alternatively of additionally, foot inputs 962 control movements of mattress support sections (sometimes referred to as "deck sections") such as head, thigh and foot sections, relative to the upper frame.

In some embodiments, the hand inputs of GUI 958 control motors 2108 that may move mattress support deck sections of the patient bed 951. Alternatively or additionally, the hand inputs of GUI 958 control pneumatic system 2112 that operates to inflate and deflate portions of a mattress of the patient bed 951. For example, the hand inputs control a mattress therapy function of a mattress of the patient bed 951. The mattress therapy functions include one or more of the following: a rotation therapy, an alternating pressure therapy, a percussion therapy, a vibration therapy, and a low airloss therapy. Further alternatively or additionally, the hand inputs control a turn assist function of the patient bed 951.

In some embodiments, the hand inputs of GUI 958 control scale system 2110 of bed 951. As mentioned above, circuitry 966 is configured to receive wireless communications from the patient bed 951. The wireless communications from patient bed 951 include information relating to one or more alarms 2114 occurring on patient bed 951 in some instances. GUI 958, in turn, displays information pertaining to the one or more alarms 2114. Alternatively or additionally, the wireless communications from patient bed 951 include information relating to a patient weight as measured by scale system 2110 of patient bed 951.

In some embodiments, the wireless communications from patient bed 951 include information received by patient bed 951 from network 2120. The hand inputs are usable to lockout functions of patient bed 951 from being controlled by user inputs 2106 on patient bed 951. Optionally, each of the hand controls of GUI 958 and foot controls 962 are able to be locked out from use by user inputs 2106 on the patient bed 951. As mentioned above, in some embodiments, circuitry 966 is configured to send wireless signals to control features of at least one other piece of healthcare equipment in response to use of any one or more of the foot inputs 962 and the hand inputs of cart 950.

In some embodiments, circuitry 966 of the bed control cart 950 communicatively pairs with bed circuitry 2102 of bed 951 after the bed control cart 950 is brought into a patient room in which the patient bed 951 is located. Furthermore, circuitry 966 communicatively pairs with bed circuitry 2102 of other patient beds 951 in other patient rooms after the bed control cart 950 is brought into respective rooms of the other patient beds 951. At least one user input selection on the hand controls of the GUI 958 is a prerequisite to the communicative pairing between circuitry 966 and bed circuitry 2102 in some embodiments. Alternatively or additionally, at least one user input selection on the foot controls 962 is a prerequisite to the communicative pairing between circuitry 966 and bed circuitry 2102. Further alternatively or additionally, at least one user input selection on at least one user input 2106 of patient bed 951 is a prerequisite to the communicative pairing between circuitry 966 and bed circuitry 2102. Optionally, a caregiver PIN is required to be entered on GUI 950 to accomplish the pairing of circuitry 966 with circuitry 2102. It should be appreciated that, in some embodiments, until a successful pairing between cart 950 and bed 951 occurs, cart 950 cannot be used to control features of bed 951.

Figure 106:
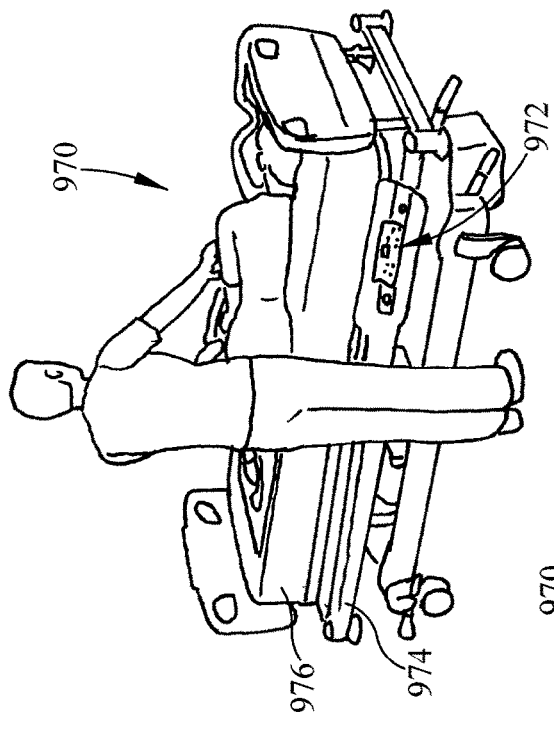
FIG. 106 is a perspective view of still another patient bed showing a caregiver selecting a bed feature on a control panel that the caregiver intends to operate hands free.
Figure 107:
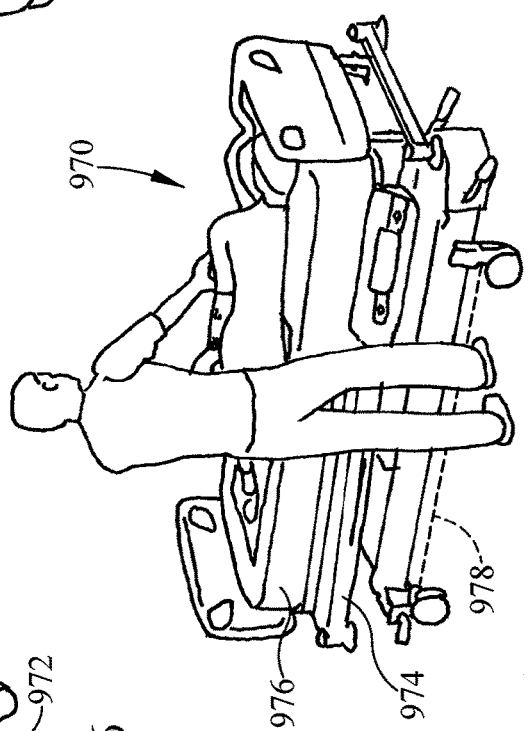
FIG. 107 is a perspective view, similar to FIG. 106, showing the caregiver repositioning a patient on a mattress of the patient bed.
Figure 108:
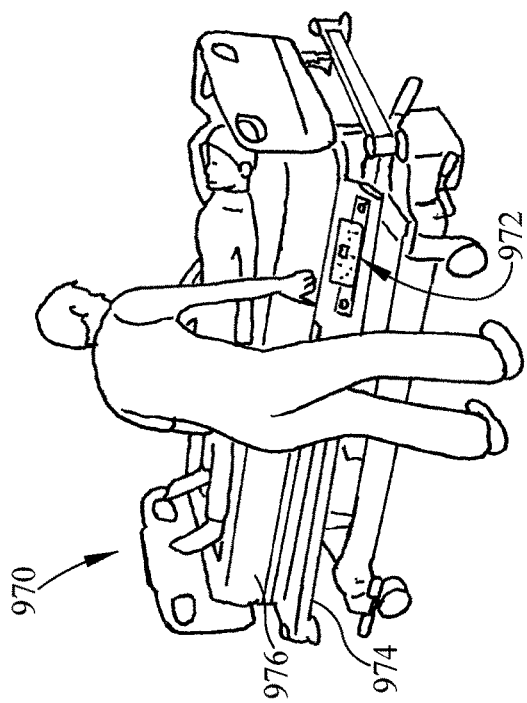
FIG. 108 is a perspective view, similar to FIGS. 106 and 107, showing the caregiver moving his foot to interrupt a light curtain that results in operation of the bed feature that the caregiver previously selected using the control panel.

Referring now to FIG. 106, a patient bed 970 has a control panel 972 that a caregiver uses to select a bed feature that the caregiver intends to operate hands free at a later time in the not too distant future. In the illustrative example, control panel 972 is coupled to an upper frame 974 of bed 970. In FIG. 107, the caregiver is shown repositioning a patient on a mattress 976 of the patient bed in preparation for a turn assist function of bed 970 that the caregiver has selected on control panel 972. In FIG. 108, the caregiver is shown moving his foot to interrupt a light curtain 978 that results in operation of the bed feature (turn assist in the illustrative example) that the caregiver previously selected using the control panel 972.

Patient bed 970, therefore, has a sensor to sense presence of a user's foot in a designated region and movement of the user's foot into the designated region causes a preselected feature of the patient bed 970 to operate. In the illustrative example, the designated region corresponds to light curtain 978. Thus, a suitable sensor is an IR receiver that is mounted near one end of bed 970 and that receives light from an IR transmitter located near the opposite end of bed 970. In other embodiments, a capacitive sensor or other type of proximity sensor is used in lieu of or in addition to the IR transmitter/receiver pair to sense the presence of the user's foot in the designated region.

Control panel 972 is used to select the preselected feature from among a plurality of bed features to be operated subsequently by movement of the user's foot into the designated region. Bed 970 has a frame that includes a base frame and an upper frame supported above the base frame. Control panel 972 is coupled to the upper frame and the designated region is defined, such as by light curtain 978, beneath the base frame. Interruption of the light curtain 978 by the user's foot results in operation of the preselected feature. In some embodiments, more than one preselected feature is able to be selected for operation in response to placement of the user's foot or really, any body part or object, into the designation region. It is contemplated by this disclosure that hands free operation of any one or more bed features in this manner is only active for a short period of time (e.g., 2 to 5 seconds) after the preselected feature is selected by the user. That is, the user must initiate the preselected action within a timeout period. Once initiated, the action itself will in many instances, take longer than the timeout period.

Referring now to FIG. 109, a caregiver GUI 980 has a control panel 982 that is used to control features and functions of a hospital bed (not shown, but similar to the various patient beds disclosed herein). As shown in FIG. 110, a phone 984 has bed controls 986 displayed on its display screen for use in controlling features and functions of the hospital bed. Thus, GUI 980 and phone 984 can both be used by a caregiver to control a bed. The various icons on the display screens of GUI 980 and phone 984 are substantially the same. That is, controls 982 and controls 986 are substantially the same. It is contemplated by this disclosure that caregivers purchase the software application for their phones 984 from the manufacture of the beds to be controlled by the phone 984.

Figure 111:
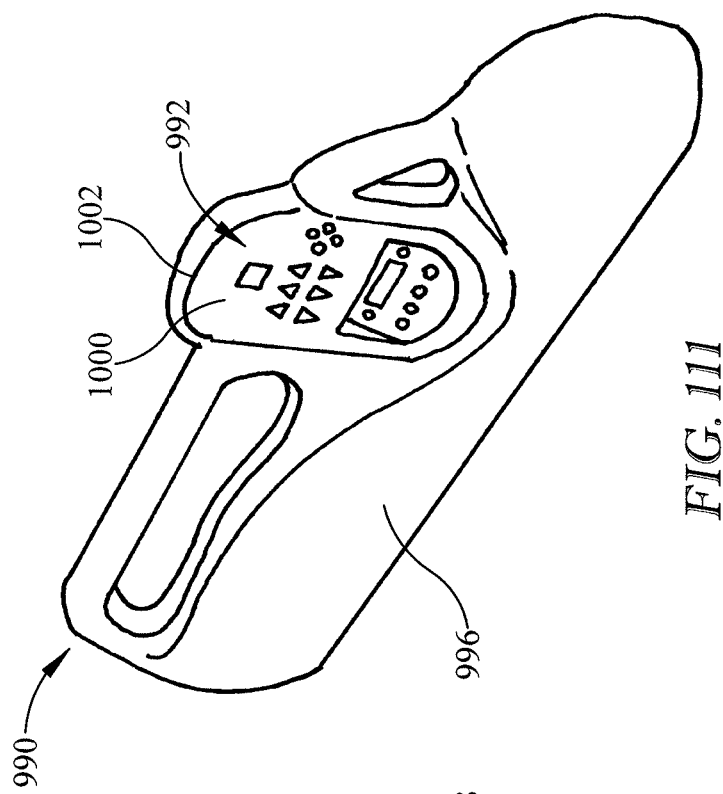
FIG. 111 is a perspective view of a siderail having a first style of caregiver control panel mounted in a recess of a siderail body.
Figure 112:
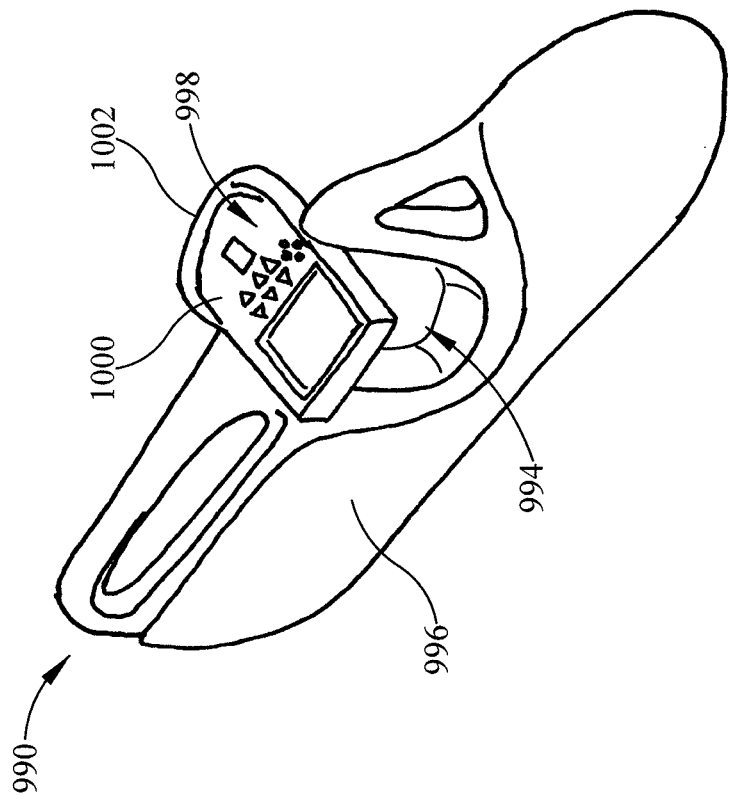
FIG. 112 is a perspective view, similar to FIG. 111, showing a second style of caregiver control panel mounted to the siderail body and pivoted out of the recess, the control panel including a housing having a brow projecting from its upper end to inhibit a patient from accessing user inputs of the control panel.

Referring now to FIG. 111, a siderail 990 has a first style of caregiver control panel 992 mounted in a recess 994 (see FIG. 112) of a siderail body 996. In FIG. 112, a second style of caregiver control panel 998 is mounted to the siderail body 996 and pivoted out of the recess 994. Each of the control panels 992, 998 include a housing 1000 having a brow 1002 projecting from its upper end to inhibit a patient from accessing user inputs of the control panel 992, 998.

Referring now to FIG. 113, a patient bed 1004 has caregiver control panels 1006 located on bottom portions of grip handles 1008 that extend from upper regions of a footboard 1010 toward a head end of the bed 1004. FIG. 114 is a top plan view of the patient bed 1004 showing a caregiver using one of the control panels 1006 of the footboard grip handles 1008. As shown in FIG. 115, a head rail 1012 of the patient bed 1004 has a grip handle 1014 at its foot end that pivots about 90° relative to a siderail body 1016 of the head rail 1012 to assist in patient egress.

Referring now to FIG. 116, a patient bed 1018 has a telescopic lift system 1020.

Referring now to FIG. 117, a patient bed 1022 has an upper portion 1024 mounted to a first type of base and lift system 1026. The upper portion 1024 includes a mattress, a mattress support deck and associated framework, an upper frame and siderails. FIG. 118 shows more detail of the first type of base and lift system 1026 of the bed 1022. Base and lift system 1026 includes a base frame covered by a shroud, casters, and a pair of vertically oriented telescopic lifts.

Referring now to FIG. 119, the upper portion 1024 of bed 1022 is mounted to a second type of lift system that includes vertical lift tubes 1028 attached to corner regions of the upper portion 1024 thereby to form an alternative bed 1022'. FIG. 120 is an enlarged perspective view of one of the vertical lift tubes 1028. As shown in FIG. 120, each lift tube 1028 includes a coupler 1030 that attaches to a mating coupler 1032 (see FIG. 117) at the corner regions of upper portion 1024. Thus, upper portion 1024 is configured to attach to two different types of lift systems.

Figure 121:
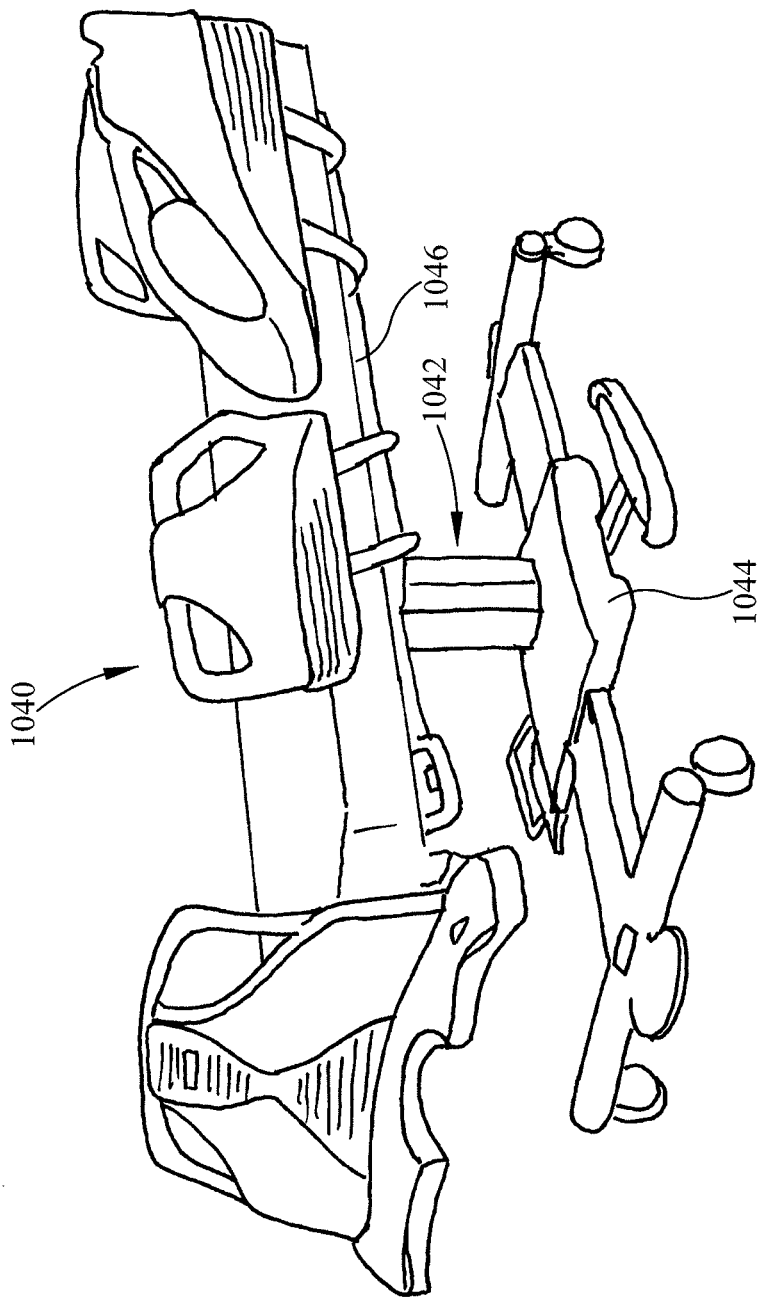

Referring now to FIG. 121, a patient bed 1040 has a single lift column 1042 that extends vertically between a base frame 1044 and an upper frame 1046 of the bed 1040.

Referring now to FIG. 122, a patient bed 1050 similar to the patient bed 220 of FIGS. 23-26 has a vertically oriented spiral lift mechanism 1052 extending between a laterally extending base portion 1054 and an upper frame 1056 of the bed 1050 at each end of the bed 1050. In FIG. 123, the upper frame 1056 is moved to a lowered position relative to the base portions 1054 of the bed 1050.

Referring now to FIG. 124, an upper rail 1058 of a siderail 1060 has a line management clip 1062 in an opened position pivoted upwardly out of a line receiving recess 1064 to allow patient care lines 1066 to be routed through the recess 1064. In FIG. 125, the line management clip 1062 is moved to a closed position to engage and retain the patient care lines 1066 in the recess 1064.

Referring now to FIG. 126, a pair of line managers 1068 are each attached to a top of a respective siderail 1070 of a patient bed 1072. A notch 1069 is formed at a top of each manager 1068 for receipt of patient care lines. In FIG. 127 a double headed arrow 1074 indicates that the line manager 1068 is slideable along the top of the siderail 1070 for repositioning.

Referring now to FIG. 128, a patient bed 1072 has a base 1074 with a central portion 1076 that raises and lowers relative to caster brackets 1078 (see FIG. 130) that are situated on opposite sides of the central portion 1076. In FIG. 129, a caregiver is stepping downwardly on a foot pedal 1080 to move the central portion 1076 of the base 1074 downwardly. As shown in FIG. 130, a caster 1082 is attached to an associated caster bracket 1078 and a linkage mechanism 1084 interconnects the caster bracket 1078 with the central portion 1076 of the base 1074 and allows for the central portion 1076 of the base to raise and lower relative to the caster bracket 1078 when the linkage mechanism 1084 is actuated by the foot pedal 1080 via rotation of the foot pedal 1080 in one direction or the other.

Referring now to FIGS. 131 and 132, a patient bed 1090 has an upper frame 1092 that includes longitudinal frame members 1094 that each have a central section 1096 dropped downwardly relative to head end and foot end portions 1098, 1100 of the longitudinal frame members 1094. A pair of sleep deck drives 1102 extend generally in opposite directions from a lateral frame member 1104 of the upper frame 1094 that extends between the central sections 1096 of the longitudinal frame members 1094. Upper ends of lift mechanisms 1106 attach to respective lateral frame members 1108 that extend between the respective portions 1098, 110 of the longitudinal frame members 1094.

Referring now to FIG. 133, a patient bed 1110 has an exercise machine 1112 mounted to an upper frame 1114 of the bed 1110. Exercise machine 1112 has first and second upside down U-shaped frame members 1116 and a folding longitudinal arm assembly 1118 that interconnects frame members 1116. Arm assembly 1118 has a first arm 1120 and a second arm 1122 that are foldable at a hinge type joint 1124. Exercise machine 1112 includes a seat 1126 that has a U-shaped channel member 1128 on it bottom for mounting to arm 1122 of folding arm assembly 1118. Machine 1112 further has a foot board unit 1130 with a footboard panel 1132, a connector frame 1134 at one end of the panel 1132, and a pair of wheels 1136 at an opposite end of the panel as shown in FIG. 133. In use, a patient sits on seat 1126 and hooks their feet into loops or straps (not shown) provided on the inner surface of panel 1132 facing the patient. The patient then flexes and extends their legs to translate the seat 1126 back and forth along arm assembly 1118.

As shown beds in FIG. 134, seat 1126 has a pair of grip handles 1138 that are gripped by a caregiver standing alongside the bed to assist the patient during use of machine 1112 if needed. In some embodiments, rollers or glide pads are provided inside channel member 1128 to facilitate the movement of chair 1128 along arm assembly 1118. Furthermore, in some embodiments, chair 1126 swivels relative to channel member 1128 about a vertical axis to permit a patient to egress and ingress the chair 1126 with the chair 1126 facing toward a side of the bed 1110.

As shown in FIG. 135, a slot 1140 is formed in an end portion 1141 of a foot deck section 1142 of upper frame 1114 and a handle bar 1144 of connector frame 1134 of footboard unit 1130 inserts into slot 1140 to couple the footboard unit 1130 to the bed 1110. Panel 1132 is then rotated upwardly from the lowered position, shown in FIG. 135, and locked into a raised use position, shown in FIG. 133. As shown in FIGS. 136 and 137, when the exercise machine 1112 is decoupled from the bed 1110 it is configured to be folded up for transport by a caregiver. A wheel is included in joint 1124 so that during transport, three wheels roll along the floor, including the two wheels 1136 attached to panel 1132 and the wheel included in joint 1124.

Referring now to FIG. 138, a patient bed 1150 includes a foot rail 1152 that, in a raised position, has a foot pedal 1154 that a patient engages and moves back and forth with the patient's foot as part of physical therapy. It is contemplated by this disclosure that both foot rails 1152 have the pedal 1154 and associated physical therapy mechanism. As shown in FIG. 139, a therapy device 1156 is located inside the foot rail 1152 between panels 1158 of the foot rail 1152. The therapy device 1156 includes a slotted plate 1160 having a slider 1162 that attaches to a rod 1163 of a gas cylinder damper 1164 and that slides along the plate 1160 within a slot 1166. The foot pedal 1154 has an arm 1168 that extends through a slot 1170 in one of the foot rail panels 1158 and pivotably couples to the slider 1162. The panel 1158 of the foot rail 1152 that has the slot 1170 also has a storage recess 1172 that receives the foot pedal 1154 for storage when not in use. When the pedal 1154 is in the use position, the patient pushes on the pedal 1154 with the patient's foot to compress the gas cylinder 1164 by pushing the rod 1163 further into the cylinder. The gas cylinder 1164 then assists the foot pedal 1154 in returning back to the starting position as the patient flexes the patient's knee. The patient repeats this cycle to perform physical therapy.

Referring now to FIG. 140, a patient bed 1180 is shown with a patient lying on a mattress 1182 of the bed 1180 and using a pedal mechanism 1184 that is deployed from a footboard 1186 of bed 1180 for physical therapy. The pedal mechanism 1184 has a pair of pedals 1188 on opposite sides of a pedal support arm assembly 1190. The pedals 1188 are akin to bicycle pedals and are cycled around by the patient's feet during physical therapy. As shown in FIG. 141, the pedal mechanism 1184 is also used for physical therapy while the patient is in a sitting position on the bed 1180 after the bed 1180 has been moved to a chair position. As shown in FIG. 142, the footboard 1186 has a recess 1192 that receives the pedal mechanism 1184 for storage. In FIG. 143, the pedal mechanism 1184 is deployed out of the recess 1192 for use by a patient.

Referring now to FIG. 144, a patient bed 1200 has a foot pad 1202 with a heel support 1204 and foot anchor straps 1206 attached to a foot board 1208 of the bed 1200. A patient's feet are anchored to the foot pad 1202 using straps 1206 while lying on the bed 1200. As shown in FIG. 145, the patient flexes her knees to draw her body toward the footboard 1208 as part of physical therapy. The bed 1200 has a pair of grip handles 1209 that are grabbed by the patient during the physical therapy, if desired. As shown in FIG. 146, the footboard 1208 has a graphical display screen 1207 that extends upwardly from a central region of the footboard 1208. It is contemplated by this disclosure that the display screen 1207 displays information and messages pertaining to the physical therapy.

FIG. 147 shows the same bed 1018 that is shown in FIG. 116. In FIG. 148, a pair of disposable drainage canisters 1210 of bed 1018 is shown. Canisters 1210 are attached to a mattress retention wall 1212 of the bed 1018 and are used for collection of fluids. As shown in FIG. 149, an upside down U-shaped grab bar 1214 is coupled to a bracket 1215 extending from a base 1218 of the bed 1018 and is coupled to a chair 1216 situated adjacent to the bed 1018.

Referring now to FIG. 150, a patient bed 1220 has a drainage bag holder 1222 at the foot end 1224 of an upper frame 1226 of the bed 1220. As shown in FIG. 151, the drainage bag holder 1222 has a sensor 1228 that detects the presence of a drainage bag 1230 (see FIG. 150) on the holder 1222. As shown in FIG. 151, the drainage bag holder 1222 has a vertically oriented plate 1232, a drainage bag bar 1234 that pivotably couples to pivot tabs 1236 extending from the plate 1234, and a limit switch 1228 (aka the sensor 1228 in the illustrative embodiment) that is received in a hole 1238 formed in the plate 1236. The limit switch 1228 has a lever 1240 that is contacted and moved to a closed position by an arm 1242 extending from a shelf 1244 of the drainage bag bar 1234 when a drainage bag 1230 is attached to the bar 1234. The drainage bag holder 1222 also has a pair of cosmetic trim pieces 1246 in the illustrative embodiment that are situated on plate 1232 between respective pairs of pivot tabs 1236.

Referring now to FIG. 152, a patient bed 1250 has a footboard 1252 that is pivoted upwardly in the direction of the arrow 1254 into a position overlying a patient's legs so that the footboard 1252 serves as an overbed table for the bed 1250. An arm 1256 supports footboard 1252 for pivoting movement relative to an upper frame 1258 of bed 1250. In the illustrative embodiment, a lower end of arm 1256 is situated between a mattress retaining wall 1260 of upper frame 1258 and a mattress 1262 of bed 1250. As shown in FIG. 153, the footboard 1252 is moved back to its normal position in the direction of arrow 1264 to serve as a traditional footboard 1252. As shown in FIG. 154, the footboard 1252 has a shallow recess 1266 formed therein to help retain items on the footboard 1252 when it is being used as an overbed table. As shown in FIG. 155, a caregiver is using a control panel 1268 that is included as part of the footboard 1252.

Referring now to FIG. 156, a footboard 1270 has a pair of posts 1272 extending downwardly from a main body 1274 of the footboard 1272. The posts 1272 are pivotably coupled to the main body 1274. As shown in FIG. 157, the footboard 1270 is attached to a patient bed 1276 and is pivoted downwardly in the direction of arrow 1278 about the posts 1272 to serve as a foot extender for the bed 1276. The main body 1274 of footboard 1270 has pad retaining wings 1280 to help retain a mattress pad on the portion of main body 1274 extending between the wings 1280.

Referring now to FIG. 158, a patient bed 1290 is in a chair position with a patient's feet resting atop a footboard 1292 that is attached to a foot section 1294 of the bed 1290 in a first orientation having a foot prop bulge 1296 in the footboard facing downwardly toward a floor. In FIG. 159, the patient's feet are resting atop the foot prop bulge 1296 when the footboard 1292 is attached to the foot section 1294 of the bed 1290 in a second orientation. FIG. 160 also shows the patient's feet resting atop the foot prop bulge 1296. The foot prop bulge 1296 prevents foot drop and enhances comfort for those patients who are shorter than others.

Referring now to FIG. 161, a patient bed 1300 has a split foot board 1302 situated adjacent a foot end 1304 of the bed 1300 to serve as a traditional footboard. In FIG. 162, a first section 1306 of the split footboard 1302 is being pivoted about a vertical axis, as indicated by the double headed curved arrow 1308, around a corner of a foot section 1310 of the bed. As shown in FIG. 163, the footboard section 1306 is situated alongside the foot section 1310 of the bed 1300 and has a grip handle panel 1312 of the footboard section 1306 pivoted upwardly to a raised position relative to another panel 1314 of the footboard. Grip handle pane 1312 is gripped by a patient during egress from bed 1300.

Referring now to FIGS. 164-167, a patient bed 1320 has a footboard 1322 that includes a plurality of segments 1324 that are telescopically coupled together. The footboard 1322 has a raised position in which the telescopic segments 1324 are in an expanded configuration as shown in FIGS. 164 and 166. The footboard 1322 also has a collapsed or lowered position having the telescopic segments 1324 retracted into an uppermost segment 1324 as shown in FIGS. 165 and 167. The lowermost segment 1324 has a pair of posts 1326 extending downwardly therefrom for receipt in sockets 1328 of a foot end frame member 1329 of bed 1320 as shown in FIGS. 166 and 167.

Referring now to FIG. 168, a patient bed 1330 includes a footboard 1332 having a television unit 1334 moved upwardly to a raised position for viewing by a patient on the bed 1330. As shown in FIG. 169, the footboard 1332 includes a main body 1336 that supports a pair of speakers 1338 for the sound of television unit 1334. As shown in FIG. 170, the television unit 1334 has a lowered position stored inside the footboard 1332. As shown in FIG. 171. Footboard 1332 includes a first panel 1340 with a decorative covering 1342 and a second panel 1344 with a decorative covering 1346. Second panel 1344 is formed to include a TV and speaker receiving recess 1348 that receives the television unit 1334 and speakers 1338 therein. First panel 1340 attaches to the second panel 1344 to retain the television unit 1334 and speakers 1338 in footboard 1332. A decorative cap 1359 attaches to a top of the television unit 1334 and aligns with a pair of handles 1337 of panel 1344 when the television unit 1334 is in the lowered position.

Referring now to FIG. 172, a hospital bed 1360 includes an IV pole 1362 having a flexible upper segment 1364 that extends upwardly from a rigid tube 1366 (e.g., a steel tube). Segment 1364 telescopes into and out of tube 1366. Tube 1366 is coupled at its lower end to a mounting socket 1368 that has a notch 1369 which allows the IV pole 1362 to fold downwardly to a storage position. Hooks 1363 are mounted to an upper end of flexible segment 1364. As shown in FIG. 173, a standard IV pole 1361 carrying a piece of equipment 1365 is being damaged due to contact of the pole 1361 or equipment 1365 with a head section 1367 of the bed 1360. In contrast, in FIG. 174, the flexible segment 1364 deflects in response to the head section 1367 of the bed 1360 contacting the pole 1362 or the piece of equipment 1365 carried by the flexible segment 1364 of the IV pole 1362. The flexible segment 1364 is made of fiberglass or spring steel in some embodiments.

Referring now to FIG. 175, a patient bed 1370 has an IV pole 1372 with a contact sensor (discussed below) that provides a signal to a bed controller (not shown) indicating that the IV pole 1372 is contacting an obstacle so that the bed controller can signal actuators (not shown) of the bed 1372 to take corrective action. In FIG. 176, a bed 1370' having an IV pole 1372' without any contact sensor has the pole 1372' being driven into a head wall unit 1373 due to tilting of an upper frame 1374 of the bed 1370'. In the bed 1370 having IV pole 1372 with a contact sensor, when IV pole 1372 contacts head wall unit 1372 during tilting of upper frame 1372, the contact sensor signals the bed controller to tilt upper frame 1374 in an opposite direction, indicated by arrow 1376 in FIG. 175, so that IV pole 1372 moves out of contact with head wall unit 1372. Similar bed control occurs if IV pole 1372 encounters other obstacles.

As shown in FIGS. 177 and 178, the IV pole 1372 has a telescopic pole 1378 with segments 1378a, 1378b, 1378c, a coupling socket 1380, and a load cell 1382 adjacent to the coupling socket 1380. Load cell 1382 is the contact sensor in the illustrative embodiment. Load cell 1382 is fastened to a bracket 1384 at the bottom of socket 1380 via a pair of screws 1386 that extends through holes 1388 in bracket 1384 and threads into apertures 1390 of load cell 1382. A pivot pin 1392 couples a lower end of segment 1378c of pole 1378 to socket 1380. A notch 1394 is provided in socket 1394 to allow pole 1378 to fold down for storage on bed 1370.

Referring now to FIG. 179, is a table 1400 having information pertaining to bed exit and patient egress alert modes of a patient bed. Table 1400 has first, second, and third columns 1402, 1404, 1406. Each column 1402, 1404, 1406 has three rows with a middle or second row each having indicia associated with an exit/egress mode named in the first row. In column 1402, the first row reads "BED EXIT" and the third row reads "2 SENSITIVITIES, PATIENT SITS UP, PATIENT MOVES TO EDGE." In column 1404, the first row reads "WANDERING ALERT" and the third row reads "SEPARATE FROM BED EXIT, ALERTS NURSE WHEN Pt. IS OUT OF BED, DOES NOT SOUND ALARM." In column 1406, the first row reads "PATIENT EXIST ASSIST" and the third row reads "PATIENT ACTIVATES BUTTON, LOWERS FOOT RAIL * IF EQUIPPED, RAISES HEAD, LOWERS KNEE, INFLATES SEAT * IF EQUIPPED, ALERTS NURSE, BRIGHTENS NIGHT LIGHT."

Based on the information in table 1400, it should be understood that the present disclosure contemplates a patient bed that includes a patient position monitoring system that has a first mode of operation in which an alarm is generated at the patient bed and an alert message is sent to a nurse call system in response to a threshold amount of movement of a patient relative to the patient bed. The patient position monitoring system also has a second mode of operation in which an alert is sent to the nurse call system but no alarm is generated at the patient bed in response to the threshold amount of movement of the patient relative to the patient bed. The second mode, therefore, may be described as a "wander" mode and the alert sent to the nurse call system may be considered a "wander" alert. This corresponds to column 1404 of table 1400. In the illustrative example, therefore, the threshold amount of the first and second modes corresponds to the patient being out of the patient bed.

In some embodiments, the patient position monitoring system related to table 1400 has a third mode of operation in which an alarm is generated at the patient bed and an alert message is sent to a nurse call system in response the patient moving by a lesser amount than the threshold amount relative to the patient bed. The lesser amount corresponds, for example, to the patient sitting up in the patient bed or moving to the edge of the patient bed. This corresponds to column 1402 of table 1400.

As suggested in table 1400, the patient bed further includes a patient exit assist input that, when selected, results in one or more of the following actions by the patient bed: at least one siderail of the patient bed moves automatically from a raised position to a lowered position; a head section of a mattress support deck of the patient bed raises to a predetermined position if the head section is lower than the predetermined position when the patient exit assist input is selected; a thigh and foot section of the mattress support deck of the patient bed lower, possibly to a flat position, if they are raised when the patient exist assist input is selected; and/or at least one bladder of an air mattress is inflated to a target pressure if the bladder has a lower pressure than the target pressure when the patient exit assist input is selected. In some embodiments, the at least one bladder includes, or is included in, a seat section of the air mattress.

In some embodiments, an exit assist alert is sent from the patient bed to a nurse call system in response to the selection of the patient exit assist input. Alternatively or additionally, a night light of the patient bed is illuminated brighter in response to the selection of the patient exit assist input. In some embodiments, the patient exit assist input includes a button that may be selected by pressing the button. However, a button or icon on a touch screen that is touched would suffice just as well, as would other inputs such as switches, levers, knobs, and the like.

Referring now to FIG. 180, a patient bed 1410 has the capability to project a lighted image 1412 onto a floor adjacent to the bed 1410 to indicate to a patient a location of a bed exit zone which corresponds to the area of the lighted image 1412. In the illustrative example, the words "BED NOT LOW" appear in the image 1412 to alert the patient and/or caregiver that an upper frame of the bed 1410 should be lowered prior to a patient exiting the bed. The words "EXIT ZONE" also appear in the lighted image in the illustrative example. Thus, words regarding the status of a bed feature (e.g., position of upper frame relative to lower frame, casters braked/unbraked status, and siderail position status) are included in image 1412 according to this disclosure. In the illustrative example, the lighted image is generally semicircular in overall shape, but other shapes are within the scope of this disclosure, such as square, round, triangular, rectangular, trapezoidal, hexagonal, etc.

Referring now to FIG. 181, a patient bed 1414 includes a footboard 1416 having an icon 1418 that illuminates when a bed exit alarm system of bed 1414 is armed. The icon 1418 provides a visual indication to the patient not to get out of the bed 1414.

Referring now to FIG. 182, a patient bed 1420 includes a footboard 1422 having a set of icons 1424 that are illuminated green to indicate a satisfactory status of an associated monitored bed feature and that are illuminated a color other than green (e.g., amber or red) to indicate an unsatisfactory status of the associated monitored condition. The icons are unlit if the associated feature of the bed is not being monitored. In the illustrative example, the icons 1424 comprise translucent portions of a wall of the footboard 1422 and lights are situated in the footboard behind the translucent portions. The lights may comprise individual LED's of different colors for example (e.g., green and amber LED's behind each translucent portion) or multi-color LED's behind each translucent portion.

Referring now to FIG. 183, a bed 1426, similar to the beds 720 of FIG. 87, has the capability to project a set of icons 1428 onto the floor near a foot end 1427 of the bed 1426 and to project a message 1429 near a side of the bed 1426. The icons 1428 indicate statuses of monitored features of the bed and the message advises the patient to call a nurse if the patient desires to get out of the bed 1426 in the illustrative example. In some embodiments, the icons 1428 are illuminated green to indicate a satisfactory status of an associated monitored bed feature and are illuminated a color other than green (e.g., amber or red) to indicate an unsatisfactory status of the associated monitored condition. The icons are not projected onto the floor if the associated feature of the bed is not being monitored.

Referring now to FIG. 184, a patient bed 1430 has a footboard 1432 that includes a built-in foot warmer (not shown). In some embodiments, the foot warmer comprises a heater 2200 as shown in FIG. 211. Bed 1434 is illustrated in FIG. 211 with components that are the same or substantially similar to those shown n FIG. 210 and so like reference numerals are used for like components and the descriptions need not be repeated. In some embodiments, footboard 1432 is detachable from the frame of bed 1430 and so first and second electrical couplers 2202, 2204 are provided in bed 1434 in the illustrative embodiment to accommodate the coupling and decoupling of footboard 1432. Suitable couplers that mate automatically when a footboard is attached to a bed frame and that decouple automatically when a footboard is detached from a bed frame are shown and described in U.S. Pat. No. 6,208,250 which is hereby incorporated by reference herein to the extent not inconsistent with the present disclosure which shall control as to any inconsistencies.

Referring now to FIG. 185, a patient bed 1434 has a footboard 1436 with a camera module or unit 1438 extending upwardly from a central region of a foot board 1436. The camera module 1438 has a camera 1440 that faces toward a patient on the bed 1434 and a GUI display screen 1442. The bed has control circuitry (not shown) that commands the camera 1440 to take a picture of the patient at substantially the same time as a patient weight reading is taken using a weigh scale system (not shown) of the bed 1434 and the GUI display screen 1442 displays the picture that was taken. In some embodiments, the weight reading and picture are transmitted from the circuitry of the bed 1434 for receipt by a remote computer.

Referring now to FIGS. 186-189, a patient bed 1444 has an RFID tag reader (not shown, but well known in the art) that reads RFID tags 1446 of equipment placed on the bed 1444 so that a weigh scale system (see block 2110 of FIGS. 210 and 211, for example) of the bed 1444 can recalculate a tare weight to account for the added equipment. Patient beds having RFID readers are shown and described in U.S. Pat. No. 7,679,520 and in U.S. Patent Application Publication No. 2014/0236629 which is hereby incorporated by reference herein to the extent not inconsistent with the present disclosure which shall control as to any inconsistencies.

As shown in FIG. 187 in an enlarged window, a mattress control box 1447 is an example of added equipment hanging on a footboard 1448 of the bed 1444 but the teaching of this disclosure regarding FIGS. 186-188 is applicable to all equipment that is added to a patient bed. In FIG. 188, a cover 1449 is removed from tag 1446 to expose a universal serial bus (USB) connector 1450 of the tag 1446. In FIG. 189, the RFID tag 1446 is coupled to a USB port of a computer 1452 to be encoded with data to be transmitted wirelessly to bed 1444 and to have its battery (not shown, but well known in the art) charged. The data encoded or programmed into the RFID tag includes weight data of the equipment to which the RFID tag is to be coupled. Connectors and ports other than USB connectors and ports, are within the scope of this disclosure. Tag 1446 communicates wirelessly with the tag reader of bed 1444 to provide the weight data of the associated equipment to bed 1444. The tare weight of the scale system of bed 1444 is then updated based on the weight data transmitted from tag 1446.

Referring now to FIGS. 190-192, a siderail 1454 has a built in grab handle 1455, a channel 1458 to receive a shaped edge of a control pendant 1460, a recess and coupling bar 1456 for a urinal 1462, and a built in line manager 1464. In FIG. 192, a mattress 1466 is also shown. Thus, the present disclosure contemplates siderail 1454 having a urinal dock. In the illustrative embodiment, the urinal dock includes a recess for a handle of the urinal 1462. Siderail 1454 includes coupling bar 1456 that extends across the recess to retain the handle of urinal 1462 in the recess when the urinal 1462 is docked to the siderail 1454. The recess is open at a top edge of the siderail 1454 so the handle can be moved into and out of the recess along a generally vertical path.

In the illustrative embodiment, grab handle 1455 of siderail 1454 is situated below the recess. Channel 1458 is complementary in shape to the shaped edge of the control pendant 1460. Line manager 1464 is located along a top edge of the siderail 1454 and comprises a notch that is situated alongside the opening to the recess.

Referring now to FIG. 193, a patient bed 1470 includes a foam mattress 1472 having integral foam side bolsters 1474 extending upwardly along opposite sides of the mattress 1472. Bed 1470 also has a white noise generator/noise cancellation unit 1476 supported by an arm assembly 1478 above a head section 1479 of the bed 1470.

Referring now to FIG. 194, a patient bed 1480 has sensors 1482 in surfaces, such as surfaces of one or more siderails 1484 and/or one or more endboards 1486, of the bed 1480 to sense whether the bed is clean or dirty. In some embodiments, the sensors 1482 detect cleaning agents. Bed 1480 also has a lighted sign 1488 on footboard 1486 of the bed 1480 that displays a message to indicate whether the bed 1480 is clean or dirty. Thus, lighted sing 1488 faces away from a mattress of bed 1480. It is contemplated by this disclosure that, if sensors 1482 indicate the bed 1480 is clean and if a weigh scale system of bed 1480 indicates a low weight (e.g., low enough that it is assumed a patient is not on the bed), then the weigh scale of the bed 1480 is automatically zeroed.

Referring now to FIG. 195, a patient bed 1490 includes a disinfectant mister system (not shown). As shown in FIG. 196, each siderail 1492 of the bed 1490 has a mister spray nozzle 1494 through which a mist of disinfectant is delivered. In FIG. 197, the mist is shown being delivered from the nozzle 1494 downwardly onto user inputs 1496 of the siderail 1492 to disinfect the user inputs 1496.

Referring now to FIGS. 198-200, a patient bed 1500 has directional ultraviolet (UV) lights 1502 included on siderails 1504 and a base 1506 of the bed 1500 for infection control. As shown in FIG. 199, the UV lights 1502 on siderails 1504 are located above user inputs 1508 so that the UV light rays from lights 1502 disinfect the user inputs 1508. The UV light 1502 on base 1506 also doubles as a night light for the bed 1500. In an alternative embodiment of siderails 1504' shown in FIG. 200, the siderail 1504' has translucent grip portions 1510 and a steel frame 1512 with UV light emitting diodes (LED's) 1514 mounted thereto. The UV light rays from LED's 1514 pass through translucent grip portions 1510.

Referring now to FIG. 201, a patient bed 1520 has an egress seat 1522 that deploys laterally outwardly from an upper frame 1524 of the bed 1520 in a direction substantially perpendicular to a long dimension of bed 1520. As shown in FIG. 202, a patient is sitting on the deployed egress seat 1522. In FIG. 203, a transport chair 1526 (aka a "wheeled chair") has been wheeled up to the patient by a caregiver. The transport chair 1526 has horizontal arms 1528 that slide into channels 1530 situated at the sides of the egress seat 1522 so that the patient is surrounded by portions of the bed 1520 and the chair 1526 during egress from the bed 1520 to the chair 1526. In FIG. 204, is the patient is shown sitting on a seat 1532 of the transport chair 1526. In FIG. 205, the horizontal arms 1528 of the transport chair 1526 are spaced from, and aligned with, the channels 1530 of the egress seat 1522. Arms 1528 are oriented generally horizontally and are configured so that the patient stands between the arms 1528 when moving from the egress seat 1522 onto seat 1532. Thus, the arms 1528 and channels 1530 are substantially at the same elevation and oriented horizontally when an upper frame of the bed 1520 is in a lowered position relative to a base of the bed 1520.

Referring now to FIG. 206, a patient room 1540 has a 3-dimensional (3D) sensor 1542 mounted to a panel 1544 of a headwall unit 1546. In FIG. 207, a caregiver at a nurse's station 1547 is using a computer 1548 to view an image obtained by the 3D sensor 1542 in the room. The nurse station 1547 is remote from the room. In FIG. 208, the information displayed on a display screen 1550 of the computer 1548 prior to a remote weight reading of the patient being taken using the computer 1548 is shown. In FIG. 209, the information displayed on the display screen 1550 after the weight reading is taken is shown.

It is within the scope of this disclosure for features in each of the embodiments disclosed in FIGS. 1-211 of the present application to be combinable into a single patient bed or system. For example, the present disclosure contemplates that cart 950 of FIGS. 103-105 and 210 can be configured for use with any of the patient beds disclosure herein. As another example, the turn assist panels 162, 164 of FIGS. 15 and 16 can be used with any of the patient beds disclosed herein. Furthermore, any of the patient beds disclosed herein can include the inductive recharging system of bed 270 of FIGS. 33-38. Accordingly, all permutations and combinations of features disclosed herein is intended to be within the scope of this disclosure, including beds having siderails of one of the disclosed types on one side of the patient bed and siderails of another of the disclosed types on an opposite of the patient bed.

In the various FIGS. 1-209 of U.S. Provisional Patent Application No. 61/951,236 to which the present application claims benefit and which is incorporated by reference herein, additional textual information is provided regarding the various embodiments disclosed herein. That textual information is considered to be part of the written description of the present disclosure.

Although certain illustrative embodiments have been described in detail above, many embodiments, variations and modifications are possible that are still within the scope and spirit of this disclosure as described herein and as defined in the following claims.

The invention claimed is:

1. A patient bed comprising:
a frame configured to support a patient, and
a plurality of siderails extending upwardly relative to the frame, each siderail of the plurality of siderails having an egress blocking position in which the patient is blocked from egressing off of the frame, at least a first siderail of the plurality of siderails having a user input accessible to the patient while the patient is supported by the frame to unlock the first siderail for generally horizontal movement of the first siderail relative to the frame by the patient from the egress blocking position to an out-of-the-way position to permit the patient to egress from the frame without lowering the first siderail relative to the frame.

2. The patient bed of claim 1, wherein the first siderail translates relative to the frame in a longitudinal direction of the patient bed when moving between the egress blocking position and the out-of-the way position.

3. The patient bed of claim 1, wherein the user input comprises a lever.

4. The patient bed of claim 1, wherein the first siderail has a hand hole and the user input is accessible in the hand hole.

5. The patient bed of claim 4, wherein the first siderail has a grip handle over the hand hole, the grip handle being grippable by the patient when moving the first siderail between the egress blocking position and the out-of-the-way position.

6. The patient bed of claim 5, wherein the grip handle has a stepped bottom surface to provide grip areas for the patient separated by steps.

7. The patient bed of claim 1, wherein the frame comprises a longitudinally extending frame member and a longitudinally extending rail supported with respect to the longitudinally extending frame member and wherein the first siderail is coupled to the longitudinally extending rail for translational movement along the longitudinally extending rail when moving between the egress blocking position and the out-of-the-way position.

8. A patient bed comprising:
a frame configured to support a patient, and
a plurality of siderails extending upwardly relative to the frame, each siderail of the plurality of siderails having an egress blocking position in which the patient is blocked from egressing off of the frame, at least a first siderail of the plurality of siderails having a user input accessible to the patient to unlock the first siderail for generally horizontal movement by the patient from the egress blocking position to an out-of-the-way position to permit the patient to egress from the frame, wherein the first siderail translates relative to the frame in a longitudinal direction of the patient bed when moving between the egress blocking position and the out-of-the way position, wherein the first siderail comprises a foot rail of the bed, the plurality of siderails further comprises a head rail, and wherein at least a portion of the foot rail overlaps a portion of the headrail when the foot rail is in the egress blocking position.

9. A patient bed comprising:
a frame configured to support a patient, and
a plurality of siderails extending upwardly relative to the frame, each siderail of the plurality of siderails having an egress blocking position in which the patient is blocked from egressing off of the frame, at least a first siderail of the plurality of siderails having a user input accessible to the patient to unlock the first siderail for generally horizontal movement by the patient from the egress blocking position to an out-of-the-way position to permit the patient to egress from the frame, wherein the first siderail translates relative to the frame in a longitudinal direction of the patient bed when moving between the egress blocking position and the out-of-the way position, wherein the first siderail comprises a foot rail of the bed, the plurality of siderails further comprises a head rail, and wherein at least a portion of the foot rail overlaps a portion of the headrail when the foot rail is in the out-of-the-way position.

10. A patient bed comprising:
a frame configured to support a patient, and
a plurality of siderails extending upwardly relative to the frame, each siderail of the plurality of siderails having an egress blocking position in which the patient is blocked from egressing off of the frame, at least a first siderail of the plurality of siderails having a user input accessible to the patient to unlock the first siderail for generally horizontal movement by the patient from the egress blocking position to an out-of-the-way position to permit the patient to egress from the frame, wherein the user input comprises a lever, wherein the first siderail has a hand hole and the lever is accessible in the hand hole.

11. A patient bed comprising:
a frame configured to support a patient, and
a plurality of siderails extending upwardly relative to the frame, each siderail of the plurality of siderails having an egress blocking position in which the patient is blocked from egressing off of the frame, at least a first siderail of the plurality of siderails having a user input accessible to the patient to unlock the first siderail for generally horizontal movement by the patient from the egress blocking position to an out-of-the-way position to permit the patient to egress from the frame, wherein the frame comprises a longitudinally extending frame member and a longitudinally extending rail supported with respect to the longitudinally extending frame member and wherein the first siderail is coupled to the longitudinally extending rail for translational movement along the longitudinally extending rail when moving between the egress blocking position and the out-of-the-way position, wherein the longitudinally extending rail is coupled to the longitudinally extending frame member by tubes situated at the opposite ends of the longitudinally extending rail.

12. A patient bed comprising:
a frame configured to support a patient,
a plurality of siderails extending upwardly relative to the frame, each siderail of the plurality of siderails having an egress blocking position in which the patient is blocked from egressing off of the frame, at least a first siderail of the plurality of siderails having a user input accessible to the patient to unlock the first siderail for generally horizontal movement by the patient from the egress blocking position to an out-of-the-way position to permit the patient to egress from the frame, wherein the frame comprises a longitudinally extending frame member and a longitudinally extending rail supported with respect to the longitudinally extending frame member and wherein the first siderail is coupled to the longitudinally extending rail for translational movement along the longitudinally extending rail when moving between the egress blocking position and the out-of-the-way position, and
a slider mounted on the longitudinally extending rail and at least one link that interconnects the first siderail and the slider.

13. The patient bed of claim 12, wherein the at least one link comprises a pair of links that are generally parallel and that extend between the slider and the first siderail.

14. The patient bed of claim 12, wherein the slider is normally locked to the longitudinally extending rail when the first siderail is in the egress blocking position and the slider is unlocked from the longitudinally extending rail in response to actuation of the user input by the patient.

15. The patient bed of claim 14, wherein the first siderail, the at least one link, and the slider are movable as a unit along the longitudinally extending rail when the slider is unlocked from the longitudinally extending rail.

16. The patient bed of claim 15, wherein the slider becomes locked to the longitudinally extending rail when the slider reaches a head end of the longitudinally extending rail corresponding to the first siderail being in the out-of-the-way position.

17. The patient bed of claim 16, wherein the first siderail includes a second user input that is accessible to the patient to unlock the slider from the longitudinally extending rail when the first siderail is in the out-of-the-way position.

18. A patient bed comprising:
a frame configured to support a patient, and
a plurality of siderails extending upwardly relative to the frame, each siderail of the plurality of siderails having an egress blocking position in which the patient is blocked from egressing off of the frame, at least a first siderail of the plurality of siderails having a user input accessible to the patient to unlock the first siderail for generally horizontal movement by the patient from the egress blocking position to an out-of-the-way position to permit the patient to egress from the frame, wherein the plurality of siderails includes a second siderail, wherein the second siderail blocks access to the user input when the first siderail is in the out-of-the-way position and wherein the first siderail has a second user input that is accessible to the patient to unlock the first siderail for movement by the patient from the out-of-the way position back to an egress blocking position.

19. The patient bed of claim 18, wherein the first siderail includes a first hand hole and a second hand hole, the user input is accessible in the first hand hole, and the second user input is accessible in the second hand hole.

20. A patient bed comprising:
a frame configured to support a patient, and
a plurality of siderails extending upwardly relative to the frame, each siderail of the plurality of siderails having an egress blocking position in which the patient is blocked from egressing off of the frame, at least a first siderail of the plurality of siderails having a user input accessible to the patient to unlock the first siderail for generally horizontal movement by the patient from the egress blocking position to an out-of-the-way position to permit the patient to egress from the frame, wherein the frame includes a head section that supports the patient's torso and that pivotably raises and lowers, wherein the plurality of siderails includes a head rail coupled to the head section to raise and lower therewith, and further comprising a pendulum cup holder that pivots relative to the head rail due to the force of gravity to maintain a drink cup in a substantially upright position as the head section raises and lowers.

* * * * *